US009458354B2

(12) United States Patent
Felice et al.

(10) Patent No.: US 9,458,354 B2
(45) Date of Patent: Oct. 4, 2016

(54) POLYURETHANE DISPERSIONS AND METHODS OF MAKING AND USING SAME

(75) Inventors: Kristopher M. Felice, Wolverine Lake, MI (US); Adam W. Emerson, Belleville, MI (US); George F. Willard, Ravenswood, WV (US); Eric W. Uffman, Maryland Heights, MO (US); Albert C. Lee, Creve Coeur, MO (US)

(73) Assignee: Resinate Technologies, Inc., Plymouth, MI (US)

(*) Notice: Subject to any disclaimer, the term of this patent is extended or adjusted under 35 U.S.C. 154(b) by 0 days.

(21) Appl. No.: 13/401,753

(22) Filed: Feb. 21, 2012

(65) Prior Publication Data

US 2012/0259061 A1 Oct. 11, 2012

Related U.S. Application Data

(63) Continuation-in-part of application No. 13/190,066, filed on Jul. 25, 2011, now abandoned.

(60) Provisional application No. 61/404,621, filed on Oct. 6, 2010, provisional application No. 61/445,006, filed on Feb. 21, 2011, provisional application No. 61/445,013, filed on Feb. 21, 2011, provisional application No. 61/511,378, filed on Jul. 25, 2011.

(51) Int. Cl.

| C09D 175/06 | (2006.01) |
|---|---|
| C09D 175/04 | (2006.01) |
| C08G 18/10 | (2006.01) |
| C08G 18/12 | (2006.01) |
| C08G 18/34 | (2006.01) |
| C08G 18/08 | (2006.01) |
| C08G 18/42 | (2006.01) |
| C08G 18/32 | (2006.01) |
| C08G 18/76 | (2006.01) |
| C08G 18/40 | (2006.01) |
| C08G 18/48 | (2006.01) |
| C08G 18/66 | (2006.01) |
| C09J 175/06 | (2006.01) |
| C08G 18/72 | (2006.01) |
| C08G 18/73 | (2006.01) |
| C08G 18/75 | (2006.01) |
| C09J 175/04 | (2006.01) |

(52) U.S. Cl.
CPC ......... *C09D 175/06* (2013.01); *C08G 18/0823* (2013.01); *C08G 18/0852* (2013.01); *C08G 18/0866* (2013.01); *C08G 18/10* (2013.01); *C08G 18/12* (2013.01); *C08G 18/3206* (2013.01); *C08G 18/3228* (2013.01); *C08G 18/3246* (2013.01); *C08G 18/348* (2013.01); *C08G 18/4018* (2013.01); *C08G 18/4208* (2013.01); *C08G 18/4213* (2013.01); *C08G 18/4833* (2013.01); *C08G 18/664* (2013.01); *C08G 18/6637* (2013.01); *C08G 18/6651* (2013.01); *C08G 18/6659* (2013.01); *C08G 18/6674* (2013.01); *C08G 18/6692* (2013.01); *C08G 18/721* (2013.01); *C08G 18/73* (2013.01); *C08G 18/758* (2013.01); *C08G 18/765* (2013.01); *C08G 18/7621* (2013.01); *C08G 18/7671* (2013.01); *C09D 175/04* (2013.01); *C09J 175/04* (2013.01); *C09J 175/06* (2013.01)

(58) Field of Classification Search
CPC .. C09D 175/06; C09D 175/04; C09J 175/06; C09J 175/04; C08G 18/10; C08G 18/12; C08G 18/0823; C08G 18/0852; C08G 18/0866; C08G 18/3206; C08G 18/3228; C08G 18/3246; C08G 18/348; C08G 18/4018; C08G 18/4208; C08G 18/4213; C08G 18/6659; C08G 18/664; C08G 18/6637; C08G 18/6651; C08G 18/4833; C08G 18/6692; C08G 18/6674; C08G 18/765; C08G 18/7621
USPC ............................ 524/591, 839, 840; 528/71
See application file for complete search history.

(56) References Cited

U.S. PATENT DOCUMENTS

| 1,883,182 A | 10/1932 | Webel |
|---|---|---|
| 2,335,813 A | 11/1943 | Stein |
| 2,465,319 A | 3/1949 | Whinfield et al. |
| 2,862,957 A | 12/1958 | Siggel et al. |
| 2,901,505 A | 8/1959 | Kolb |
| 2,932,662 A | 4/1960 | Ringwald |
| 3,037,049 A | 5/1962 | Vaitekunas et al. |

(Continued)

FOREIGN PATENT DOCUMENTS

| CN | 1231316 | 10/1999 |
|---|---|---|
| EP | 70684 | 1/1983 |

(Continued)

OTHER PUBLICATIONS

Achilias, Dimitris S., Glycolytic Depolymerization of PET Waste in a Microwave Reactor, Journal of Applied Polymer Science, vol. 118, pp. 3066-3073, 2020 Wiley Periodicals, Inc., 2010., Published on Wiley InterScience (www.interscience.wiley.com), DOI 10.1002/app.3737, Jun. 1, 2010.

(Continued)

*Primary Examiner* — Rabon Sergent
(74) *Attorney, Agent, or Firm* — Dilworth IP LLC

(57) ABSTRACT

The presently disclosed and claimed inventive concept(s) relates generally to polyethylene terephthalate ("PET") polymers, digested oligomeric derivatives of PET ("dPET"), functionalized oligomeric derivatives of dPET ("dfPET"), and polyurethane dispersions ("PUD") made from or incorporating dfPET therein.

8 Claims, 53 Drawing Sheets

(56) References Cited

U.S. PATENT DOCUMENTS

| | | | |
|---|---|---|---|
| 3,047,539 | A | 7/1962 | Pengilly |
| 3,257,335 | A | 6/1966 | Whitfield et al. |
| 3,305,495 | A | 2/1967 | Orde |
| 3,321,510 | A | 5/1967 | Lotz et al. |
| 3,377,519 | A | 4/1968 | Stong |
| 3,403,115 | A | 9/1968 | Gruschke et al. |
| 3,501,420 | A | 3/1970 | Stevenson |
| 3,544,622 | A | 12/1970 | England et al. |
| 3,565,852 | A | 2/1971 | Conix et al. |
| 3,639,448 | A | 2/1972 | Matsuzawa et al. |
| 3,652,649 | A | 3/1972 | Woo et al. |
| 3,801,273 | A | 4/1974 | Mays |
| 3,830,759 | A | 8/1974 | Barkey |
| 3,835,081 | A | 9/1974 | Remley |
| 3,857,817 | A | 12/1974 | Henshaw et al. |
| 3,884,850 | A | 5/1975 | Ostrowski |
| 3,907,868 | A | 9/1975 | Currie et al. |
| 3,956,088 | A | 5/1976 | Fassell et al. |
| 4,049,736 | A | 9/1977 | Lamson et al. |
| 4,078,143 | A | 3/1978 | Malik et al. |
| 4,204,070 | A | 5/1980 | Suzuki et al. |
| 4,284,700 | A | 8/1981 | Oguchi et al. |
| 4,394,430 | A | 7/1983 | Jadwin et al. |
| 4,439,549 | A | 3/1984 | Brennan |
| 4,485,196 | A | 11/1984 | Speranza et al. |
| 4,521,556 | A | 6/1985 | Adams |
| 4,540,768 | A | 9/1985 | Speranza et al. |
| 4,542,239 | A | 9/1985 | Lamparter et al. |
| 4,568,717 | A | 2/1986 | Speranza et al. |
| 4,609,680 | A | 9/1986 | Fujita et al. |
| 4,701,480 | A | 10/1987 | Markusch et al. |
| 4,714,738 | A | 12/1987 | Chang et al. |
| 4,808,663 | A | 2/1989 | Chang et al. |
| 5,045,122 | A | 9/1991 | Tindall et al. |
| 5,223,544 | A | 6/1993 | Burkett et al. |
| 5,252,615 | A | 10/1993 | Rao et al. |
| 5,319,008 | A | 6/1994 | Janoski |
| 5,328,982 | A | 7/1994 | Tindall et al. |
| RE34,730 | E * | 9/1994 | Salatin .............. B05D 5/068 427/407.1 |
| 5,371,112 | A | 12/1994 | Sayre et al. |
| 5,413,681 | A | 5/1995 | Tustin et al. |
| 5,414,107 | A | 5/1995 | Smith |
| 5,451,611 | A | 9/1995 | Chilukuri et al. |
| 5,532,404 | A | 7/1996 | Gallagher |
| 5,559,159 | A | 9/1996 | Sublett et al. |
| 5,614,161 | A | 3/1997 | Wilkens et al. |
| 5,635,584 | A | 6/1997 | Ekart et al. |
| 5,710,315 | A | 1/1998 | Gallagher |
| 5,726,277 | A | 3/1998 | Salsman |
| 5,750,776 | A | 5/1998 | Harvie |
| 5,792,887 | A | 8/1998 | Korn et al. |
| 5,820,982 | A | 10/1998 | Salsman |
| 5,858,551 | A | 1/1999 | Salsman |
| 5,874,630 | A | 2/1999 | Cook et al. |
| 5,877,255 | A | 3/1999 | Gerber et al. |
| 5,882,674 | A | 3/1999 | Herrmann et al. |
| 5,898,058 | A | 4/1999 | Nichols et al. |
| 5,898,059 | A | 4/1999 | Trojan |
| 6,046,295 | A | 4/2000 | Frisch, Jr. et al. |
| 6,075,163 | A | 6/2000 | Roh et al. |
| 6,166,264 | A | 12/2000 | Ishii et al. |
| 6,180,180 | B1 * | 1/2001 | Hintze-Bruning et al. ..................... 427/407.1 |
| 6,255,547 | B1 | 7/2001 | Smuda |
| 6,410,607 | B1 | 6/2002 | Ekart et al. |
| 6,444,862 | B1 | 9/2002 | Burkhardt et al. |
| 6,486,357 | B2 | 11/2002 | Suib et al. |
| 6,566,525 | B1 | 5/2003 | Kim et al. |
| 6,576,702 | B2 | 6/2003 | Anderle et al. |
| 6,580,005 | B1 | 6/2003 | Yazaki et al. |
| 6,649,792 | B2 | 11/2003 | Sirek et al. |
| 6,652,971 | B1 | 11/2003 | Delmotte et al. |
| 6,706,843 | B1 | 3/2004 | Ishihara et al. |
| 6,713,599 | B1 | 3/2004 | Hinz et al. |
| 6,720,448 | B2 | 4/2004 | Broccatelli |
| 6,723,873 | B1 | 4/2004 | Murdoch |
| 6,750,286 | B1 * | 6/2004 | Schwarte et al. ............. 524/591 |
| 6,767,485 | B1 | 7/2004 | Steiner |
| 6,770,680 | B2 | 8/2004 | Klenk |
| 6,780,962 | B2 | 8/2004 | Moya et al. |
| 6,887,909 | B2 | 5/2005 | Kawamura et al. |
| 6,911,546 | B2 | 6/2005 | Hedrick et al. |
| 6,916,936 | B2 | 7/2005 | Hedrick et al. |
| 6,919,383 | B2 | 7/2005 | Khan et al. |
| 7,053,221 | B2 | 5/2006 | Hedrick et al. |
| 7,095,974 | B2 | 8/2006 | Yoshino et al. |
| 7,098,299 | B1 | 8/2006 | Gutierrez et al. |
| 7,129,278 | B2 | 10/2006 | Kayima et al. |
| 7,132,383 | B2 | 11/2006 | Nakajima et al. |
| 7,157,139 | B2 | 1/2007 | Salsman et al. |
| 7,169,954 | B2 | 1/2007 | Mizuno et al. |
| 7,173,150 | B2 | 2/2007 | Yazaki et al. |
| 7,192,988 | B2 | 3/2007 | Smith et al. |
| 7,235,622 | B2 | 6/2007 | Inada et al. |
| 7,297,721 | B2 | 11/2007 | Kulkarni |
| 7,301,045 | B2 | 11/2007 | Ishihara et al. |
| 7,338,981 | B2 | 3/2008 | Gutierrez et al. |
| 7,544,800 | B2 | 6/2009 | Hedrick et al. |
| 7,709,067 | B2 | 5/2010 | Takagi et al. |
| 7,754,809 | B2 | 7/2010 | Stollmaier et al. |
| 7,795,320 | B2 | 9/2010 | Determan et al. |
| 7,799,836 | B2 | 9/2010 | Agarwal et al. |
| 7,820,756 | B2 | 10/2010 | Tammaji et al. |
| 7,842,373 | B2 | 11/2010 | Halahmi et al. |
| 7,893,122 | B2 | 2/2011 | Fregoso-Infante et al. |
| 7,897,651 | B2 | 3/2011 | Ikenaga |
| 7,902,263 | B2 | 3/2011 | Agarwal et al. |
| 7,902,264 | B2 | 3/2011 | Determan et al. |
| 7,910,657 | B2 | 3/2011 | Cohoon-Brister |
| 7,923,506 | B2 | 4/2011 | Cohoon et al. |
| 7,928,150 | B2 | 4/2011 | Kannan et al. |
| 8,096,119 | B2 | 1/2012 | Baughman et al. |
| 8,362,142 | B2 | 1/2013 | Stollmaier et al. |
| 2002/0077449 | A1 | 6/2002 | Nichols et al. |
| 2004/0102533 | A1 | 5/2004 | Durand et al. |
| 2005/0043560 | A1 | 2/2005 | Manea et al. |
| 2005/0096482 | A1 | 5/2005 | Tamada et al. |
| 2006/0229409 | A1 * | 10/2006 | Ilmenev .............. C08G 18/0823 524/589 |
| 2006/0251896 | A1 | 11/2006 | Ferencz et al. |
| 2006/0287408 | A1 | 12/2006 | Baikerikar et al. |
| 2007/0117922 | A1 | 5/2007 | Kayima et al. |
| 2007/0208133 | A1 * | 9/2007 | Stollmaier et al. ........... 524/591 |
| 2007/0299150 | A1 | 12/2007 | Nakao et al. |
| 2008/0214699 | A1 | 9/2008 | Halahmi et al. |
| 2008/0236443 | A1 | 10/2008 | Salsman |
| 2008/0269509 | A1 | 10/2008 | Hida et al. |
| 2008/0319236 | A1 | 12/2008 | McNeff et al. |
| 2009/0012202 | A1 | 1/2009 | Jacobine et al. |
| 2009/0122260 | A1 | 5/2009 | Salamone et al. |
| 2009/0148603 | A1 | 6/2009 | Goscha |
| 2009/0318579 | A1 | 12/2009 | Ikenaga |
| 2010/0092671 | A1 | 4/2010 | Goscha et al. |
| 2010/0160586 | A1 | 6/2010 | Koglin et al. |
| 2010/0273939 | A1 | 10/2010 | Stollmaier et al. |
| 2010/0280277 | A1 | 11/2010 | King et al. |
| 2011/0070413 | A1 | 3/2011 | Lausch et al. |
| 2011/0086217 | A1 | 4/2011 | Crain et al. |
| 2011/0098519 | A1 | 4/2011 | Ramesh et al. |
| 2011/0124889 | A1 | 5/2011 | Saladino et al. |
| 2011/0180509 | A1 | 7/2011 | Hutchinson et al. |
| 2011/0200827 | A1 | 8/2011 | Hutchinson et al. |
| 2011/0244172 | A1 | 10/2011 | Wright et al. |
| 2011/0244231 | A1 | 10/2011 | Erdogen-Haug et al. |
| 2012/0149791 | A1 | 6/2012 | Felice et al. |
| 2012/0190800 | A1 | 7/2012 | Felice et al. |

FOREIGN PATENT DOCUMENTS

| | | |
|---|---|---|
| IN | 160579 | 7/1987 |
| IN | 182728 | 7/1999 |
| IN | 187914 | 7/2002 |
| IN | 188894 | 11/2002 |

(56) References Cited

FOREIGN PATENT DOCUMENTS

| | | |
|---|---:|---|
| IN | 189146 | 12/2002 |
| IN | 2005MU00989 | 6/2007 |
| IN | 2006MU00563 | 12/2007 |
| JP | 53 011951 | 2/1978 |
| JP | 02088627 | 3/1990 |
| JP | 05339330 | 12/1993 |
| JP | 06-212117 | 8/1994 |
| JP | 08-209069 | 8/1996 |
| JP | 09-011406 | 1/1997 |
| JP | 10036717 | 2/1998 |
| JP | 10-316903 | 12/1998 |
| JP | 11286631 | 10/1999 |
| JP | 2000063702 | 2/2000 |
| JP | 2000256615 | 9/2000 |
| JP | 2001-040075 | 2/2001 |
| JP | 2001059012 | 3/2001 |
| JP | 2001288447 | 10/2001 |
| JP | 2002226778 | 8/2002 |
| JP | 2002226782 | 8/2002 |
| JP | 2002285391 | 10/2002 |
| JP | 2002285393 | 10/2002 |
| JP | 2004131456 | 4/2004 |
| JP | 2005105082 | 4/2005 |
| JP | 2006083305 | 3/2006 |
| JP | 2006328199 | 12/2006 |
| JP | 2008229406 | 10/2008 |
| JP | 2010214627 | 9/2010 |
| JP | 2011184627 | 9/2011 |
| KR | 10-2000-0021808 | 4/2000 |
| KR | 10-2001-0058978 | 7/2001 |
| KR | 2004076434 | 9/2004 |
| KR | 10-0808208 | 2/2008 |
| KR | 10-2004-0085881 | 3/2008 |
| KR | 10-2009-0062947 | 6/2009 |
| KR | 2009107837 | 10/2009 |
| WO | WO/2000/057998 | 10/2000 |
| WO | WO/2001/092612 | 12/2001 |
| WO | Wo/2005/062721 | 7/2005 |
| WO | Wo/2007/032127 | 3/2007 |
| WO | WO/2007/052291 | 5/2007 |
| WO | WO/2007/052292 | 5/2007 |
| WO | WO/2007/075373 | 7/2007 |
| WO | WO/2007/116416 | 10/2007 |
| WO | WO/2008/090566 | 7/2008 |
| WO | WO/2008/104999 | 9/2008 |
| WO | WO/2008/105000 | 9/2008 |
| WO | WO/2009/005835 | 1/2009 |
| WO | WO/2009/085587 | 7/2009 |
| WO | WO 2009/085587 A1 * | 7/2009 |
| WO | WO/2010/091797 | 8/2010 |
| WO | WO/2011/058130 | 5/2011 |
| WO | WO 2011/058130 A1 * | 5/2011 |
| WO | WO/2011/100375 | 8/2011 |
| WO | WO/2011/126742 | 10/2011 |
| WO | WO/2012/047360 | 4/2012 |
| WO | WO/2012/115984 | 8/2012 |
| WO | WO/2012/170978 | 12/2012 |
| WO | WO/2014/093991 | 6/2014 |
| WO | WO/2014/093995 | 6/2014 |

OTHER PUBLICATIONS

ASTM International, D3359-09, Standard Test Methods for Measuring Adhesion by Tape Test, Standard excerpt, West Conshohocken, PA, 2009.
ASTM International, D4274-99, Standard Test Methods for Testing Polyurethane Raw Materials: Determination of Hydroxyl No. of Polyols, Standard excerpt, West Conshohocken, PA, 1999.
ASTM International, F1351-96 (Reapproved 2008), Standard Practice for Determination of the Effect of Hard Creasing Paper on Images Produced by Business Imaging Systems, Standard excerpt, West Conshohocken, PA, 1996.
Athawale et al., Waterborne PUR-dispersions, European Coatings Journal, vol. 45, 2002.
Baker, D. R. A. et al., Chemical Recycling of PET Waste from Soft Drink Bottles to Produce a Thermosetting Polyester Resin, Malaysian Journal of Chemistry, vol. 8, Issue 1, pp. 22-26, 2006.
Baliga, Satish et al., Depolymerization of Poly(Ethylene Terephthalate) Recycled from Post-Consumer Soft-Drink Bottles, Journal of Polymer Science: Part A: Polymer Chemistry, vol. 27, pp. 2071-2082, John Wiley and Sons, Inc., Newark New Jersey, USA, 1989.
Bartha, Emeric et a., Glycolysis of PET Wastes with Isosorbide Identification and Characterization of Hydroxy Oligoesters, Rev. Chim. (Bucharest), www.revistadechimie.ro, vol. 62, No. 4, pp. 401-408, 2011.
Billiau-Loreau, M. et al., Structural effects of diacidic and glycolic moieties on physicochemical properties of aromatic polyesterdiols from glycolysis/esterification of poly(ethylene terephthalate) wastes, Polymer 44, www.elsevier.com/locate/polymer vol. 43, pp. 21-28, 2002.
Campanelli, John R., The kinetics of hydrolysis and glycolysis of poly(ethylene terephthalate) melts at high temperatures, Department of Chemical Engineering, McGill University, Montreal, Jun. 1993.
Cata, A. et al., Preliminary Studies about PET Degradation. Rheological Determinations on Glycolysis Products Obtained with Propoylene Glycol, Chem. Bull. "Politehnica" University (Timisoara), vol. 52, Issue 66, pp. 1-2, 2007.
Chen, Cheng-Ho et al., Studies of Glycolysis of Poly(ethylene terephthalate) Recycled from Postconsumer Soft-Drink Bottles. I. Influences of Glycolysis Conditions, Journal of Applied Polymer Science, vol. 80, pp. 943-948, John Wiley & Sons, Inc., 2001.
Cimecioglu, A. L. et al., Properties of Oligomers Present in Poly(ethylene Terephthalate), Journal of Applied Polymer Science, vol. 32, pp. 4719-4733, John Wiley & Sons, Inc., 2003.
Garcia-Pacios et al., Affect of polydispersity on the properties of waterborne polyurethane dispersions based on polycarbonate polyol, International Journal of Adhesion & Adhesives, vol. 30, Issue 6, pp. 456-465, 2010.
Ghadage, R. S., Thermotropic Mesomorphic Polyesters. I. Copolyesters of Terephthalic Acid, Hydroquinone, and Flexible Diols, Polymer Science and Engineering Group, Division of Chemical Engineering, National Chemical laboratory, Pune 411 008, India, Journal of Applied Polymer Science, vol. 37, Issue 4245, pp. 1579-1588, 1989.
Ghaemy, Mousa et al., Unsaturated Polyester from Glycolized PET Recycled from Postconsumer Soft-Drink Bottles, Iranian Polymer Journal, vol. 11, No. 1, pp. 77-83, Apr. 30, 2007.
Gintis, D., Glycolytic Recycle of Poly(ethylene Terephthalate) (PET), Makromol. Chem., Macromol. Symp. vol. 57, pp. 185-190, 1992.
Grzebieniak, et al., Glycolysis of PET Waste and the Use of Glycolysis Products in the Synthesis of Degradable Co-Polyesters, Institute of Chemical Fibres, Poland, Fibres & Textiles in Eastern Europe, Issue 2, vol. 12, pp. 19-22, Apr./Jun. 2004.
Füclü, G. et al., Glycolysis of Poly(ethylene terephthalate) Wastes in Xylene, Journal of Applied Polymer Science, vol. 69, pp. 2311-2319, 1998.
Güclü, G. et al., Simultaneous glycolysis and hydrolysis of polyethylene terephthalate and characterization of products by differential scanning calorimetry, Engineering Faculty, Istanbul University, Istanbul, Turkey, Polymer 44, www.elsevier.com/locate/polymer, pp. 7609-7616, 2003.
Hoydonckx, H. E. et al., Esterification and transesterification of renewable chemicals, Plenum Publishing Corporation, Topics in Catalysis, vol. 27, Nos. 1-4, pp. 83-96, 2004.
Ikladious, N.E., Recycling of Poly(Ethylene Terephthalate): Identification of Glycolysis Products, Journal of Elastomers and Plastics, vol. 32, pp. 140-151, Apr. 2000.
Jordi Labs, Polymer Solubility Index, Jordi Labs, Bellingham, MA, 8 pages.
Kao, C.Y. et al., Investigation of Catalytic Glycolysis of Polyethylene Terephthalate by Differential Scanning Calorimetry, Thermochimica Acta, vol. 292, pp. 95-103, 1997.
Kiesewetter et al., Organocatalysis: Opportunities and challenges for Polymer Synthesis, American Chemical Society, Macomolecules Perspective, vol. 43, pp. 2093-2107, 2010.

(56) References Cited

OTHER PUBLICATIONS

Li, R. "Single Polymer Composites Made of Slowly Crystallizing Polymers", A Dissertation Presented to The Academic Faculty, Georgia Institute of Technology, May 2009.
Limpiti T. et al., Mechanical Property Improvement of UPE Resin from Glycolyzed PET with Commercial UPE Resin, Journal of Metals, Materials and Minerals, vol. 19, No. 1, pp. 45-51, 2009.
Nasta, et al., Polyurethane dispersions, Tougher by design, New hydrophobic modifications of PUDs enhance performance, European Coatings Journal, www.european-coatings.com, 2011.
Nikles, D. et a., New Motivation for the Depolymerization Products Derived from Poly(Ethylene Terephthalate (PET) Waste: a Review, Macromolecular Materials and Engineering, www.mme-journal.de, vol. 290, Issue 1, pp. 13-30, 2005.
Pardal, F., Comparative Reactivity of Glycols in PET Glycolysis, Polymer Degradation and Stability, vol. 91, Issue 11, pp. 2567-2578, 2006.
Paszun, D. et al., Chemical Recycling of Poly(ethylene terephthalate), Polymer Institute, Technical University of Szczecin, Szczecin, Poland, Industrial & Engineering Chemistry Research, vol. 36, No. 4, pp. 1373-1383, 1997.
PCI Magazine, Troubleshooting Metal Catalyzed Urethane Systems, PCT, Paint & Coatings Industry, King Industries, Inc., Norwalk, CT, 2000.
Petrov et al., Depolymerization of Polyethylene Terephthalate Waste with Ethylene Glycol, Fibre Chemistry, Plenum Publishing Corporation, 1980.
Petrov et al., Faster Synthesis of Polyethylene Terephthalate, Fibre Chemistry, Plenum Publishing Corporation, 1976.
Petrov et al., Utilization of the Waste from the Production of Polyester Filament Yarn and Staple Fibre, Fibre Chemistry, Plenum Publishing Corporation, 1979.
Polk, M.B. Depolymerization and Recycling, in Synthetic Methods in Step-Growth Polymers (eds M.E. Rogers and T.E. Long), John Wiley & Sons, Inc., Hoboken, NJ, Chapter 10, ISBN 9780471387695, pp. 527-575, Apr. 2003.
Polk, M.B., Nylon 6, Nylon 66, and PET Depolymerization, Georgia Tech, School of Textile and Fiber Engineering, vol. 542, Issued 1995.
Rogers, M. E. et al., Synthetic Methods in Step-Growth Polymers, John Wiley & Sons, Inc., Hoboken, New Jersey, 2003.
Rosthauser et al., Waterborne Polyurethanes, Journal of Industrial Textiles, SAGE Publications, http://jit.sagepub.com/content/16/1/39, vol. 16, Issue 39, pp. 39-79, Jul. 1986.
Saint-Loup, R., Synthesis of (polyethylene terephthalate/polye-caprolactone) copolyesters, Polymer 44, www.elsevier.com/locate/polymer, vol. 44, Issue 12, pp. 3437-3449, 2003.
Saravari et al., Synthesis of Urethane oils from Palm Oil and Waste PET Bottles, Journal of Applied Polymer Science, vol. 105, pp. 1802-1807, 2007.
Shukla, S.R. et al., Glycolysis of Polyethylene Terephthalate Waste Fibers, Journal of Applied Polymer Science, Wiley InterScience (www.interscience.wiley.com), vol. 97, Issue 2, pp. 513-317, Nov. 19, 2004.
Sinha V. et al., Pet Waste Management by Chemical Recycling: A Review, Journal of Polymers and Environment, vol. 18, No. 1, pp. 8-25, Mar. 2010.
Smirnov et al., Transesterification of Dimethyl Terephthalate with Ethylene Glycol, Fibre Chemistry, Plenum Publishing Corporation, 1984.
Stevenson, R.W. et al., Polycondensation Rate of Poly(ethylene Terephthalate). I. Polycondensation Catalyzed by Antimony Trioxide in Presence of Reverse Reaction, Journal of Polymer Science, Part A-1, vol. 6, pp. 889-900, 1968.
Troev, K. et al., A Novel Catalyst for the Glycolysis of Poly(ethylene terephthalate), Journal of Applied Polymer Science, vol. 90, pp. 1148-1152, 2003.
USGAO, Opportunities to Reduce Corrosion Costs and Increase Readiness, Report to Congressional Committees, United States General Accounting Office, Washington D.C., Issue July, pp. 1-58, 2003.
Vaidya, U.R. et al., Polyester Polyols from Glycolyzed PET Waste: Effect of Glycol Type on Kinetics of Polyesterification, Journal of Applied Polymer Science, vol. 38, Issue 4323, pp. 1179-1190, 1989.
Vaidya, U.R. et al., Unsaturated Polyester Resins from Poly(ethylene terephthalate) Waste. 1. Synthesis and Characterization, Industrial & Engineering Chemistry Res., vol. 26, pp. 194-198, 1987.
Vaidya, U.R. et al., Unsaturated Polyester Resins from Poly(ethylene terephthalate) Waste. 2. Mechanical and Dynamic Mechanical Properties, Industrial & Engineering Chemistry Res., vol. 27, pp. 2056-2060, 1988.
Vakili, M.H., Chemical Recycling of Poly Ethylene Terephthalate Wastes, World Applied Sciences, Journal 8, Issue 7, pp. 839-846, 2010.
Vitkauskiene, I. et al., Glycolysis of industrial poly(ethylene terephthalate) waste directed to bis(hydroxyethylene) terephthalate and aromatic polyester polyols, Department of Polymer Chemistry, Vilnius University, Chemija, vol. 19, Issue 2, pp. 29-34, 2008.
Wang, H. et al., Fe-containing magnetic ionic liquid as an effective catalyst for the glycolysis of poly(ethylene terephthalate), www.elsevier.com/locate/catcom, Catalysis Communications, vol. 11, Issue 8, pp. 763-767, 2010.
Werner Blank, Isocyanate Titration, Werner Blank, Jun. 2006.
WO/2011/100375, International Search Report and Written Opinion, dated Nov. 30, 2011.
WO/2011/100375, International Preliminary Report on Patentability, dated Aug. 23, 2012.
WO/2012/047360, International Search Report and Written Opinion, dated Mar. 16, 2012.
WO/2012/047360, International Preliminary Report on Patentability; dated Apr. 18, 2013.
WO/2012/115984, International Search Report and Written Opinion, dated Sep. 28, 2012.
WO/2012/115984; International Preliminary Report on Patentability; dated Aug. 29, 2013.
Gurudatt, K. et al., "A study on drying of textile substrates and a new concept for the enhancement of drying rate", Journal of the Textile Institute, vol. 101, Issue 7, 2010, Abstract Only.
Davidson, et al., "Factors influencing the photoyellowing which occurs during the photoinitiated polymerization of acrylates", Pitture e Vernici Europe, vol. 72, Issue 4, 1996, pp. 42-46.
Dongre, R.N., "Phenol-crotonaldehyde resins. 1. Syntheseis andcharacterization of acid-catalyzed resins", Industrial & Engineering Chemistry Product Research and Development, vol. 24, Issue 4, 1985, Abstract Only.
Ghadage, R. S., "Thermotropic mesomorphic polyesters. I. Copolyesters of terphthalic acid, hydroquinone, and flexible diols", Journal of Applied Polymer Science, vol. 37, Issue 6, 1989, pp. 1579-1588, Abstract Only.
Granatstein et al., "Nonreinforcing filler-elastomer systems. I. Experiments based on model systems", Journal of Applied Polymer Science, vol. 18, Issue 1, 1974, pp. 1-20, Abstract Only.
Jog, J. P., "Structure development in powder processing of poly(phenylene sulfide)", Advances in Polymer Technology, vol. 11, Issue 1, 1992, pp. 41-52, Abstract Only.
LAN, et al., "Syntheseis and configuration of amphoteric polyurethane retanning filling agents PUR-A", Zhongguo Pige, vol. 31, Issue 3, 2002, p. 9-12, Abstract Only.
Li, Fusheng et al., "Preparation and characterization of ultraviolet-curable nanocomposite coatings initiated by benzophenone/n-methyl diethanolamine", Journal of Applied Polymer Science, vol. 96, Issue 3, 2005, pp. 912-918, Abstract Only.
Li, Min-ting, et al., "Preparation and in-situ FTIR detection of deblocked process for waterborne polyurethane crosslinking agent", Tanxingti, vol. 21, Issue 1, 2011, pp. 10-14, Abstract Only.
Nadkarni, V. M., "Emerging trends in polymer matrix composites", Defence Science Journal, vol. 43, Issue 4, 1993, pp. 351-364, Abstract Only.

(56) References Cited

OTHER PUBLICATIONS

Nadkarni, V. M., "Polymer alloys: science and practice", Proceedings—Indian Academy of Sciences, Chemical Sciences, vol. 92, Issue 6, 1983, pp. 623-637, Abstract Only.

Nadkarni, V. M., "On structure development and structure-property relationships in engineering plastics", Metals, Materials and Processes, vol. 3, Issue 3, 1991, pp. 197-208, Abstract Only.

Nadkarni, V. M., "Thermomechanical behavior of modified asphalts", Industrial & Engineering Chemistry Product Research and Development, vol. 24, Issue 3, 1985, Abstract Only.

Nadkarni, V. M., "Entensional flow induced crystallization in polyethylene melt spinning", Journal of Polymer Science, vol. 15, 1977, pp. 2151-2183.

Pandit, S., "Toughening of Unsaturated Polyesters by Reactive Liquid Polymers. 2. Processibility and Mechanical Properties", Industrial & Engineering Chemistry Research, vol. 33, Issue 11, 1994, Abstract Only.

Raval, et al., "Modified Karanja (Pongamia Pinnata). Oil-based curing of acid functional acrylic copolymer resin for anticorrosive coating", Chemical Engineering World, vol. 40, Issue 10, 2005, pp. 65-70, Abstract Only.

Vaidya, E. R., "Unsaturated polyester resins and polyurethane elastomers and non-CFC rigid foams from polyethylene terephthalate) waste", Polymeric Materials Science and Engineering, vol. 63, 1990, pp. 1029-1033, Abstract Only.

Vaidya, E. R. "Unsaturated polyester resins from poly(ethylene terephthalate) waste. 1. Synthesis and characterization", Industrial & Engineering Chemistry Research, vol. 26, Issue 2, 1987, Abstract Only.

Vaidya, E. R., "Unsaturated polyester resins from poly(ethylene terephthalate) waste. 2. Mechanical and dynamic mechanical properties", Industrial & Engineering Chemistry Research, vol. 27, Issue 11, 1988, Abstract Only.

Varma, A. J., "Curing characteristics of epoxy resins filled with cellulose and oxidized cellulose", Angewandte Makromolekulare Chemie, vol. 122, 1984, pp. 211-218.

Varma, A. M., "Electrical surface conductivity of fluorinated polymer films after chemical surface treatment", Makromolekulare Chemie, Rapid Communications, vol. 4, Issue 11, 1983, pp. 715-719.

Yin, S. et al., "Temperature-dependence modeling of highly crosslinked polymer networks", Journal of Applied Polymer Science, vol. 88, Issue 10, 2003, p. 2416-2426, Abstract Only.

Lorenz et al., "Investigation of the Particle Surface of Anionic Polyurethane Dispersions with COO⁻ -Groups", Die Angewandte Makromelekulare Chemie, 1979, pp. 113-127, Issue 83.

Xiao et al., Advances in Urethane Ionomers, Technomic Publishing Company, Inc., pp. 59-61, 1995.

\* cited by examiner

FIG. 8

| | |
|---|---|
| Client: | Chemlr |
| | Rajesh Tiwari |
| | rtiwari@chemlr.com |
| P.O. #: | 15799 |
| Report #: | L030CA |
| Date Received: | 1/29/10 |
| Date: | 1/31/10 |
| Phone: | 800 659 7659 | Fax: | 314 291 6630 |
| Pump: | Waters 590 | Flow Rate: | 0.85 ml/min |
| Injector: | Waters 717 WISP | Injection Vol.: | 25uL |
| Detector 1: | Waters 484UV @ 265nm | | |
| Detector 2: | Varian 380LC Evap57 Neb37 Gas1.2 PMTI Smth50 LED 20 | | |
| Columns: | Jordi Mixed Linear 500x10mm Cat # 15025 #11060805 |
| | Jordi Mixed Linear 500x10mm Cat # 15025 #11060806 |
| Temperature: | 35°C | | |
| Data: | Millenium 2.10 | Sampling Rate: | 1.0 point per second |
| Eluent: | Chloroform/10% Dichloroacetic acid 2.5mm tetrabutyl ammonium acetate |
| | Chloroform (amylenes) [67-66-3] 472476 Lot#11198KJ |
| | Dichloroacetic Acid [79-43-6] DS,470-2 Lot#08103MH |
| | Tetrabutylammonium Acetate [10534-59-533599-1 Lot#JF16014MZ |
| Standards: | 12 Polystyrene Standards (580 Mp - 2400000 Mp) |
| Curve Fit: | Linear | Correl = | -0.9964 |
| Sample: | PET and PET digests |
| Sample Conc <=: | 0.30% |
| Sample Prep: | 12mg/.05 ml. DCAA and 0.5ml. CHCl3 RT 1Hour |
| | diluted with 3ml CHCl3 |
| Results & Plot: | Triplicate Injections |

| UV Values | Mn | Mw | Mz | Mp | Disp. |
|---|---|---|---|---|---|
| 600151 | 282 | 338 | 417 | 300 | 1.20 |
| 600152 | 304 | 369 | 461 | 334 | 1.21 |
| 600153 | 11802 | 41253 | 72290 | 42204 | 3.50 |

POLYURETHANE DISPERSIONS AND METHODS OF MAKING AND USING SAME

CROSS REFERENCE TO RELATED APPLICATIONS

The present application claims the benefit under 35 U.S.C. 119(e) of U.S. Provisional Patent Application Ser. No. 61/445,006, filed Feb. 21, 2011; U.S. Provisional Patent Application Ser. No. 61/445,013, filed Feb. 21, 2011 and Provisional Patent Application Ser. No. 61/511,378, filed Jul. 25, 2011, the entire contents of each of which are hereby expressly incorporated herein by reference.

In addition, the present application is a continuation-in-part of and claims the benefit under 35 U.S.C. 120 of U.S. patent application Ser. No. 13/190,066, filed Jul. 25, 2011 now abandoned, and which claims the benefit under 35 U.S.C. 119(e) of U.S. Provisional Patent Application Ser. No. 61/404,621, filed Oct. 6, 2010.

BACKGROUND OF THE INVENTION

1. Field of the Presently Disclosed and Claimed Inventive Concepts

The presently disclosed and claimed inventive concept(s) relates generally to polyethylene terephthalate ("PET") polymers, digested oligomeric derivatives of PET ("dPET"), functionalized oligomeric derivatives of dPET ("dfPET"), and polyurethane dispersions ("PUD") made from or incorporating dfPET therein. More particularly, but not to be construed as limiting, the presently disclosed and claimed inventive concept(s) relate to lower molecular weight functionalized digested PET materials ("dfPET") made from digesting polyethylene terephthalate, especially recycled polyethylene terephthalate ("rPET"). In one particular aspect, the presently disclosed and claimed inventive concept(s) relate to the production of an oligomeric form of functionalized digested polyethylene terephthalic acid from waste products, such as beverage containers, made from polyethylene terephthalate. In one embodiment, the dfPET polymers have an average number molecular weights of from about 200 to about 2000 Daltons. These dfPET polymers have excellent solubility in various organic solvents and provide a functionalized backbone for the production of polymeric based products such as polyurethane dispersions (PUDs) and polyurethane resins (PURs), by way of example but not by way of limitation.

2. Background and Applicable Aspects of the Presently Disclosed and Claimed Inventive Concept(s)

Most polyester resins used in commercial applications are formed from raw materials, which are rising in price and have relatively large markets. Accordingly, recovery of these raw materials from scrap, waste and used products is an important economical consideration as well as an ecological consideration. One widely used polyester is polyethylene terephthalate (hereinafter "PET") made from terephthalic acid and ethylene glycol. Additionally, a Bisphenol A polyester resin could be used in a manner similar to PET. It should be understood that one of ordinary skill in the art, given the present disclosure and teachings, would be fully capable of using the presently disclosed and claimed inventive concept(s) to break down or degrade any polymer having a polyester backbone (e.g., polycarbonates) into oligomeric forms for use as a precursor molecule in the process of synthesizing polyurethane dispersions and resins.

Over the past 20 years, there has been an increased push throughout the world to increase recycling of polyester resins. Plastic bottles commonly used for drinks and carbonated beverages, for example, are made from polyethylene terephthalate and represent a large potential source of recoverable polyesters: either as bulk refined PET or the terephthalic acid and ethylene glycol monomers that constitute PET. It is estimated that from 375 to 500 million pounds of polyethylene terephthalate were used for beverage bottles in 1980, for example. More recently, more than 2.4 billion pounds of plastic bottles were recycled in 2008. Although the amount of plastic bottles recycled in the U.S. has grown every year since 1990, the actual recycling rate remains steady at around 27 percent. Recent legislation in several states requiring a deposit refundable upon return of all empty beverage containers has established an ongoing procedure for collecting and separating polyethylene terephthalate containers which must be recycled or otherwise disposed of in an economical manner. Additionally, many municipalities have implemented voluntary or mandatory recycling programs in conjunction with trash pickup and disposal.

PET beverage containers cannot be reused since the elevated temperatures required for sterilization deforms the container. PET containers can, however, be ground into small pieces for use as a filler material or remelted for formation of different articles. Such recycled material may be referred to interchangeably herein as "recycled PET", "scrap PET", "waste PET", and/or "rPET". The polyethylene terephthalate recovered by such processes contains impurities, such as pigment, paper, other undesirable polymers and metal from caps. Consequently, applications for polyethylene terephthalate reclamation by mechanical means are limited to non-food uses and low purity molded products.

In the past, several different techniques have been proposed for recovering pure or isolated terephthalic acid and ethylene glycol monomers from waste polyethylene terephthalate. One known technique involves, for example, the depolymerization of polyethylene terephthalate by saponification. Saponification is the hydrolysis of an ester under basic conditions to form an alcohol and the salt of a carboxylic acid (carboxylates).

In one known approach for saponification, polyethylene terephthalate is reacted with an aliphatic alcohol and a dialkyl terephthalate is recovered. This approach is exemplified in U.S. Pat. Nos. 3,321,510, 3,403,115 and 3,501,420, all of which are hereby incorporated by reference in their entirety. In a second known approach, polyethylene terephthalate is reacted with an aqueous solution of an alkali metal hydroxide or carbonate (usually sodium hydroxide) at an elevated temperature to yield a water soluble salt of terephthalic acid and ethylene glycol. The reaction product is acidified to liberate terephthalic acid which is water insoluble and the terephthalic acid precipitate is separated by filtration or the like. This approach is exemplified by U.S. Pat. Nos. 3,377,519, 3,801,273 and 3,956,088, all of which are hereby incorporated by reference in their entirety. U.S. Pat. No. 3,544,622, the entire contents of which is hereby incorporated by reference in its entirety, similarly discloses a variation to previously known approaches wherein the reaction is carried out under conditions to produce a water insoluble salt of terephthalic acid which is separated, washed and then acidified to produce terephthalic acid. Additional patents have also been issued on various improvements to these processes, such as U.S. Pat. Nos. 5,414,107, 5,223,544, 5,328,982, 5,045,122, 5,710,315, 5,532,404, 6,649,792, 6,723,873, 6,255,547, 6,580,005, 6,075,163, 7,173,150, 6,770,680, 7,098,299, and 7,338,981, the entire contents of each of which are hereby incorporated by reference in their entirety.

Empty beverage containers obtained from consumers may have aluminum caps lined with polyvinyl chloride or the like, wrap around polypropylene coated paper labels bonded to the surface with a polyvinyl acetate adhesive, residual sugars and, in some cases, polyethylene base caps for strengthening purposes. Without costly controls, reaction conditions in the saponification processes disclosed in the above-noted patents tend to cause some dissolution of these extraneous materials which then become impurities in the recovered terephthalic acid and require costly purification. Therefore, various approaches have been considered for removing these materials from the containers prior to grinding or separating them from the polyethylene terephthalate after grinding. Such separation procedures represent a significant increase in the overall cost of recovery as well as an energy inefficient means of recycling the waste PET. Thus, while such saponification methodologies for the recycling of PET into its monomer constituents are generally considered to be successful, it is an expensive and economically inefficient way in which to obtain such monomers for producing new PET polymers for use.

Polyurethane dispersions are used in a range of coatings as film formers or binders including adhesives, as well as other technical products. Polyurethane dispersions are considered an environmentally friendly alternative to solvent-based binders and they are increasing in importance in the manufacturing sector. The general advantages of polyurethane plastics are their flexibility at low temperatures, selectable mechanical properties, resistance to certain chemicals and, depending on the structure, resistance to weathering and environmental degradation. In order to achieve sufficient commercially desirable properties, high molecular polymer weights are required. A polyurethane dispersion is advantageous in that even at very high molecular weights the viscosity is determined mainly by the particle size of the dispersed resin in the dispersion. Polyurethane dispersions are, therefore, a solution for replacement of organic solvent based polyurethane coatings with regard to environmental considerations. For these reasons, polyurethane dispersions have become highly desirable for replacement products for organic solvent based polyurethane coating.

Polyurethane dispersions typically have a fairly broad distribution of different particle sizes in solution. Generally, polyurethane particles found in a stable dispersion are spherical in shape and are in a size range between about 30 nm and 1000 nm, and have a milky white (sometimes yellowish) appearance. Particles below about 50 nm in size result in a dispersion appearing increasingly transparent, while dispersions having particle sizes above about 1000 nm tend to settle out of solution and generally such dispersions are not storable for extended periods of time.

The percentage by weight (solids) of the polyurethane compounds in commercial polyurethane dispersions typically ranges from about 25 to about 50% weight percent and, in some cases, up to 60% by weight. Polyurethane dispersions having a high solids content are advantageous in terms of transport and storage, increased dry film thickness in a single application, and drying effective mass per share (as less energy is spent for evaporation of the water). While polyurethane dispersions having an increased solids content are preferable, in the past their production and use have been difficult and many compositions that appeared initially useful, oftentimes failed after commercial implementation.

Polyurethanes generally have a density, although specifically dependent upon their composition, of about 1.1 g/ml and are therefore heavier than water. The tendency for polyurethanes to settle out of solution and/or coagulate is typically prevented by mutual repulsion of the particles (e.g., internal ionic groups), and/or by the viscosity of the liquid dispersant. Polyurethane dispersions may, therefore, include thickeners and emulsifiers in the aqueous phase in order to retard settling and increase storability. Non-ionic stabilization occurs through, for example, the (i) incorporation of hydrophilic polyethylene oxide chains within the polymer chain or as terminal groups, (ii) an ionic stabilization through the incorporation of anionic groups such as carboxy or sulfonate groups, and/or (iii) incorporation of cationic group such as aminies. Non-ionic, anionic and cationic polyurethane dispersions can, therefore, be made depending upon application and starting material.

In addition to water, polyurethane dispersions may also contain a water-dilutable, high-boiling organic solvent/co-solvent (e.g., N-methylpyrrolidone (NMP)), as well as glycol ethers. The use of organic co-solvents allows, in some instances, the formation of hard polyurethane films at room temperature by partially dissolving the surface of the dispersion by evaporation of water and subsequent merger into a film (i.e., coalescence). The co-solvent evaporates, without any further heat treatment, and the film becomes harder and reaches its final strength. The co-solvents contribute to the emission of organic components (VOCs) and are, therefore, less desirable than fully aqueous dispersions. As an alternative to NMP, N-ethyl-2-pyrrolidone (NEP) may be used. In order that a desired high molecular weight polyurethane dispersion is produced, it is known in the art that the polyurethane polymers are preferably linear in structure— i.e., the polyurethane has very little branching in the polymer structure. Highly branched polyurethanes result in polymers that gel thereby hindering subsequent film formation.

The basic building blocks of a polyurethane dispersion consist, therefore, of bifunctional subunits that react to form substantially linear polymer chains. These polymer chains are generally similar to those of well-known polyurethane and are constructed of similarly known components—i.e., isocyanates, polyols, and polyamines. Depending on the isocyanates used, a distinction can be made between aliphatic and aromatic polyurethane dispersions. The latter are generally less expensive to produce, but have the disadvantage of yellowing when exposed to light (with the exception of tetramethyl xylylene diisocyanate (TMXDI)). The fraction of incorporated isocyanate in a polyurethane dispersion is generally less than about 20% by weight, and more generally from about 8 to about 12% by weight.

Polyols (including the dfPET of the presently disclosed and claimed inventive concept(s)) are typically the largest mass fraction of the polyurethane compound. Through selection of a polyol with a correspondingly low glass transition temperature, a polyurethane can be generated with a corresponding low-temperature flexibility and have two or more hydroxyl groups at the terminal ends. The structure of the polyurethane polymer generally proceeds in two steps: first, a branched prepolymer is prepared from a combination of diisocyanates and polyols (for example, the dfPET of the presently disclosed and claimed inventive concept(s)). By using an excess of diisocyanate, the prepolymers are formed having isocyanates terminal groups. In the second step, the prepolymers (e.g., short-chain diols and/or diamines) are linked to longer-chain molecules during dispersion. Such dispersions often occur in the presence of water and/or include an organic solvent as a cosolvent.

The chain extender composition (which can be water in certain instances) can incorporate ionic groups into the polymer and thereby stabilize the water-dispersed polyurethane particles. A typical chain extender composition is dimethylol propionic acid (DMPA) which adds carboxy-functionality, while diolsulfonate can be used to add sulfonic acid groups useful for anionic polyurethane dispersions. With regard to anionic polyurethane dispersion, isocyanates and polyols are reacted to form a prepolymer. Via chain extension, a hydrophilic group is added—e.g., a diamine with pendant sulfonate. The resulting polyurethane polymer is permanently hydrophilic and can be dispersed in an aqueous medium. For the preparation of cationic dispersions, quaternary amino functional groups may be incorporated into the polyurethane polymer using N-methyldiethanolamine (NMDEA), for example. As would be appreciated by one of ordinary skill in the art, there is a nearly endless list of variations that can be made to the polyurethane to incorporate different functional groups with variable functionality. The introduction of terminal, blocked isocyanates improves heat-activatable crosslinking reactions, for example. Additionally, the addition of epoxy groups and silane functionality into the polyurethanes is desirous, in some products, while pendant hydroxyl groups incorporated into the polyurethane polymer is desirous for crosslinking other reactive agents, such as those used in coating formulations.

Generally, it has been believed in the art that the dispersion of polyurethanes in water required high shear forces in order to obtain a corresponding finely dispersed product. This has been due to the high viscosity of the isocyanate prepolymer. Further, after chain extension the polyurethane polymers are even less dispersible in water. Therefore, there have been developed two traditional approaches to creating the finely dispersed products: (a) the prepolymer is dispersed directly in water and chain extension occurs under high shear forces and the chain extension takes place in the presence of the aqueous phase. In order to further lower the viscosity of the prepolymer, it can be heated prior to or during dispersion into the aqueous medium. Additionally, a co-solvent can be used to lower the viscosity of the prepolymer (e.g., acetone). The co-solvent will, however, generally remain in the finished dispersion and the co-solvent must be carefully chosen in order that it not interfere with the drying and curing of any coating composition made from the resulting polyurethane dispersion. (b) The complete polyurethane molecule is built up in a water-immiscible low-boiling solvent. The solution is dispersed with water, and the solvent is distilled or otherwise removed. As the solvent of choice is generally acetone in this method, this second process is referred to as the "Acetone Process." The advantage of the Acetone Process is that it has a high variability of starting materials that can be used as well as the absence of organic solvents. The disadvantage is the lower boiler efficiency compared to other techniques and the increased cost of acetone recovery. Alternatively, some have replaced the acetone with 2-butanone (MEK).

Typical applications of polyurethane dispersions include planar applications that allow the water to evaporate and, optionally, any cosolvents are able to leave the resulting polyurethane film. The drying of the polyurethane dispersion made films can occur at room temperature or at elevated temperatures, if permitted by the substrate. Once the dispersion and substrate are in contact, when enough water has evaporated the operation is not reversible (coagulation). In the gaps between the polyurethane particles dispersed on the substrate, high capillary forces ensures that the polyurethane particles lose their phase boundaries, fuse together (coalescence), and form a homogeneous film after drying. Cosolvents may be used to increase and/or inhibit the time to coalescence.

DETAILED DESCRIPTION

Figure 1:
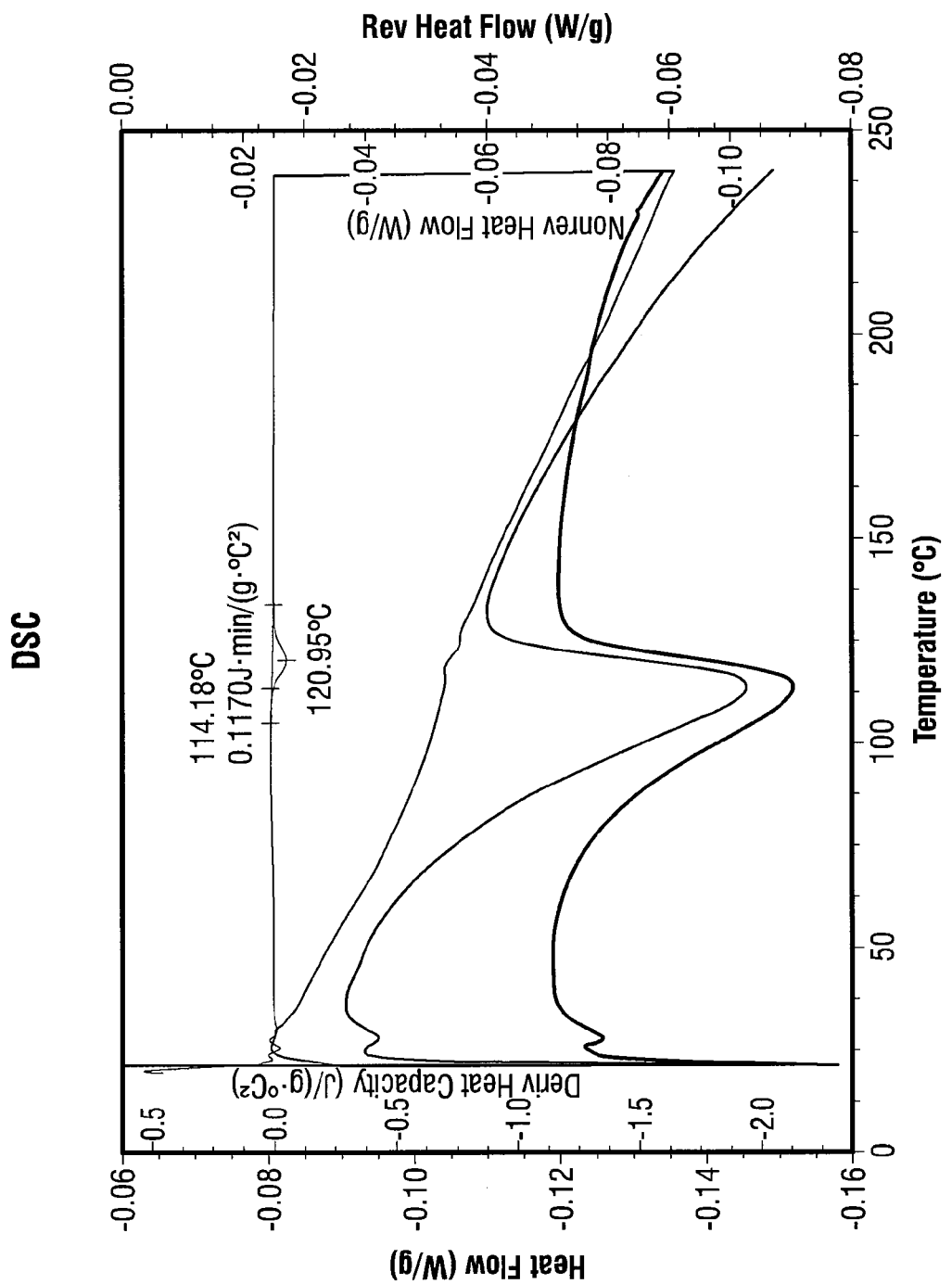
FIG. 1 is a modulated differential scanning calorimetry ("mDSC") analysis of the white precipitate from the first reaction. The derivative of the heat capacitance ($J/(g° C.^2)$) indicated the presence of a melt at 120.95° C., indicating the presence of a small amount of oligomer.

Before explaining at least one embodiment of the presently disclosed and claimed inventive concept(s) in detail, it is to be understood that the presently disclosed and claimed inventive concept(s) is not limited in its application to the details of construction, experiments, exemplary data, and/or the arrangement of the components set forth in the following description or illustrated in the drawings. The presently disclosed and claimed inventive concept(s) is capable of other embodiments or of being practiced or carried out in various ways. Also, it is to be understood that the phraseology and terminology employed herein is for purpose of description and should not be regarded as limiting.

Disclosed herein are functionalized polyethylene terephthalate ("PET") polymers, functionalized derivatives of PET ("WET"), and methods for digesting recycled ("rPET") into lower molecular weight functionalized digested PET materials ("dfPET"). Methods of manufacturing and making these dfPET polymers are disclosed and claimed in U.S. Provisional Patent Application 61/337,568, filed on Feb. 9, 2010 and U.S. Provisional Application Ser. No. 61/404,621, filed Oct. 6, 2010, the entirety of both of which are hereby expressly incorporated herein by reference. Given the present disclosure, teachings, and the disclosure and teachings of the above-referenced patent documents, one of ordinary skill in the art would be fully capable of digesting PET into dfPET.

A. Production of dfPET Compounds

Table A discloses general chemical structures representing the presently disclosed and inventive dfPET compounds. As shown in Table A, "n" can be any positive integer greater than 1—for example, n may be a positive integer from 2 to 500,000 and particularly, without limitation, "n" may be a positive integer from 2 to 2,000. $R^1$ and $R^2$ are independently hydrocarbons having at least one functional group selected from the group consisting of a hydroxyl group, an amino group, a carbonyl group and combinations thereof. For example, but not by way of limitation, $R^1$ and $R^2$ may be independently selected from the group consisting of H, OH, $NH_2$, $C=O$, hydroxyl terminated hydrocarbons, diol terminated hydrocarbons, amine terminated hydrocarbons, diamine terminated hydrocarbons, carbonyl terminated hydrocarbons, amino alcohols consisting of a hydrocarbon terminated with an amine group and an alcohol group, hydroxyl carboxylic acids consisting of a hydrocarbon terminated with a hydroxyl group and a carboxyl group, and amides consisting of a hydrocarbon terminated with a carbonyl group and an amine group.

In addition to the functional groups described above, $R^1$ and $R^2$ can be independently hydrocarbons containing other functional groups such as a halo group, a thiol group, a phosphate group, and an ether group. The hydrocarbons can be alkanes, alkenes, cycloalkanes, cycloalkenes and aromatics, for example but not by way of limitation The hydroxyl terminated hydrocarbons includes, for example but not by way of limitation, hydroxyl terminated alkanes and branched hydroxyl terminated alkanes. The diol terminated hydrocarbons includes, for example but not by way of limitation, diol terminated alkanes and branched diol terminated alkanes. The amine terminated hydrocarbons includes, for example but not by way of limitation, amine terminated alkanes branched amine terminated alkanes. The diamine terminated hydrocarbons includes, for example but not by way of limitation, diamine terminated alkanes branched diamine terminated alkanes. The amino alcohols include, for example but not by way of limitation, alkanes terminated with an amine group and an alcohol group and branched amino alcohols terminated with an amine group and an alcohol group. The hydroxyl carboxylic acids include, for example but not by way of limitation, alkanes terminated with a carboxyl group and an alcohol group and branched hydroxyl carboxylic acids terminated with a carboxyl group and an alcohol group. The amides include, for example but not by way of limitation, alkanes terminated with an amine group and a carbonyl group and branched amides terminated with an amine group and a carbonyl group.

In one embodiment, $R^1$ and $R^2$ can be independently a linear or branched $C_2$-$C_{18}$ alkane having at least one functional group selected from the group consisting of a hydroxyl group, an amino group, a carbonyl group and combinations thereof. In another embodiment, $R^1$ and $R^2$ can be independently a linear or branched $C_2$-$C_8$ alkane having at least one functional group selected from the group consisting of a hydroxyl group, an amino group, a carbonyl group and combinations thereof.

TABLE A

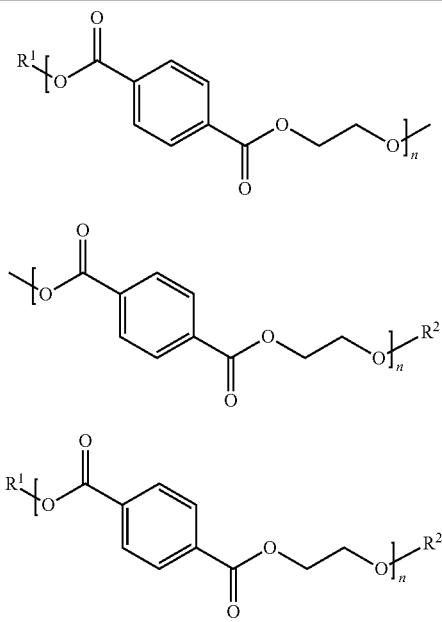

The oligomeric form of polyethylene terephthalate shown in Table A can be produced from a reaction of polyethylene terephthalate and a glycolysis agent. Optionally a catalyst may be used in order to change the kinetics and/or specificity of the reaction of PET and the glycolysis agent. It should be understood that while certain examples or exemplary methodologies describe the use of such a catalyst, such use is optional (e.g., Ref. No. 188-14 of Table 6, herein below) and is well within the discretion of one having ordinary skill in the art.

In one embodiment, the glycolysis agent can be a polyol. The polyols may be, for example but not by way of limitation, ethylene glycol, diethylene glycol, triethylene glycol, propylene glycol, 1,3-propanediol, 2-methyl-1,3-propanediol, 1,3-butanediol, 1,4-butanediol, 1,5-pentanediol, 1,6-hexanediol, 2,2-diethyl-1,3-propanediol, 1,7-heptanediol, 1,8-ocatanediol, 1,9-nonanediol, 1,4-cyclohexanedimethanol, 2-butyl-2-ethyl-1,3-propanediol, 2-butyl-2-diethyl-1,3-propanediol, 3-methyl-1,5-pentanediol, 2,2,4-trimethylpentanediol, 1,4-dimethyolcyclohexane, 1,10-decanediol, 1,11-undecanediol, 1,12-dodecanediol, 1,13-tridecanediol, 1,14-tetradecanediol, 1,15-pentadecanediol, 1,16-hexadecanediol, 1,17-heptadecanediol, 1,18-octadecanediol, neopentyl glycol, cyclohexanediol, hydrogenated bisphenol A, glycerol, trimethylolpropane, trimethylolethane, diglycerine, triglycerine, pentaerythritol, dipentaerythritol, sorbitol, 1,4-polyisoprenediol, 1,2-polybutadinediol, polybutanediol, and combinations thereof.

The oligomeric form of polyethylene terephthalate can comprise a reaction product of polyethylene terephthalate, a glycolysis agent, an amine and, optionally (as described hereinabove), a catalyst. In one embodiment, the amine can be hexamethyltetraamine. In another embodiment, the amine can be a diamine. The diamine can be an aliphatic diamine, an aromatic diamine and an alicyclic diamine. The aliphatic diamines may be, for example but not by way of limitation, ethylene diamine, trimethylene diamine, 1,2-diaminopropane, 1,3-diaminopropane, tetramethylene diamine, pentamethylene diamine, hexamethylene diamine, 1,8-diaminooctane, dodecamethylene diamine, and 2,2,4-trimethyl hexamethylene diamine.

The aromatic diamines may be, for example but not by way of limitation, p-phenylene diamine, o-phenylene diamine, m-phenylene diamine, m-toluylene diamine, p-xylene diamine, m-xylene diamine, 4,4'-diamino biphenyl, 3,3'-dimethyl-4,4'-diamino biphenyl, 3,3'-dichloro-4,4'-diamino biphenyl, 4,4'-diamino diphenyl ether, 3,4'-diamino diphenyl ether, 4,4'-diamino diphenyl propane, 4,4'-diamino diphenyl sulfone, 4,4'-diamino diphenyl sulfide, 4,4'-diamino benzanilide, 3,3'-dimethyl-4,4'-diamino diphenyl methane, 3,3'-diethyl-4,4'-diamino diphenyl methane, 4,4'-diamino anthraquinone, 3,3'-dimethoxybenzidine, α,α'-bis(4-aminophenyl)-p-isopropylbenzene, 1,5-diamino naphthalene, and 2,6-diamino naphthalene.

The alicyclic diamines may be, for example but not by way of limitation, 1,3-diamino cyclohexane, 1,4-diamino cyclohexane, 1,3-bis(aminomethyl)cyclohexane, isophorone diamine, piperazine, 2,5-dimethyl piperazine, bis(4-aminocyclohexyl)methane, bis(4-aminocyclohexyl)propane, 4,4'-diamino-3,3'-dimethyl dicyclohexylmethane, α,α'-bis(4-aminocyclohexyl)-p-diisopropylbenzene, α,α'-bis(4-aminocyclohexyl)-m-diisopropylbenzene, and methane diamine. Any one of, or any combination of, the diamine compounds as described above may be used. The glycolysis agents can be the same as those described previously and/or within the patent documents incorporated herein by reference.

The functionalized oligomeric form of polyethylene terephthalate can also be obtained from a reaction of polyethylene terephthalate, a glycolysis agent, a diacid and, optionally (as described hereinabove), a catalyst. In one embodiment, the diacid is selected from the group consisting of oxalic acid, malic acid, malonic acid, tartaric acid, glutaric acid, succinic acid, fumaric acid, adipic acid, sebacic acid, maleic acid, azelaic acid, isophthalic acid, terephthalic acid, phthalic acid, terephthalic acid dichloride, 1,4-cyclohexanedicarboxylic acid, 1,3-cyclohexanedicarboxylic acid, naphthalenedicarboxylic acid, 4,4'-biphenyldicarboxylic acid, diphenylmethane-4,4'-dicarboxylic acid, and combinations thereof.

In addition to diacids, a compound having both a hydroxyl group(s) and a carboxylic group(s) can also be used in the reaction or can be combined with diacids in the reaction. The hydroxycarboxylic acids may be, for example but not by way of limitation, glycolic acid, 3-hydroxylactic acid, 4-hydroxybutyric acid, 4-hydroxyvaleric acid, 6-hydroxycaproic acid, hydroxybenzoic acid, hydroxypivalic acid, 1,2-dihydroxystearic acid, 2,2-dimethylolpropinoic acid, 2,2-dimethylolbutanoic acid, 2,2-dimethylolpentanoic acid, 2,2-dimethylolhexanoic acid, and 2,2-dimethyloloctanoic acid. The glycolysis agents can be the same as those described previously and/or within the patent documents incorporated herein by reference.

Similarly, the functionalized oligomeric form of polyethylene terephthalate can be produced from a reaction of polyethylene terephthalate, a glycolysis agent, an anhydride and, optionally (as described hereinabove), a catalyst. In one embodiment, the anhydride is selected from the group consisting of propionic anhydride, maleic anhydride, succinic anhydride, methacrylic anhydride, glutaric anhydride, trimelletic anhydride, pyromellitic anhydride, phthalic anhydride, tetrabromophthalic anhydride, tetrachlorophthalic anhydride, hexahydrophthalic anhydride, tetrahydrophthalic anhydride, and combinations thereof. The glycolysis agents are the same as those described previously and/or within the patent documents incorporated herein by reference.

The polyethylene terephthalate polymer used in the reactions described herein is selected from the group consisting of recycled polyethylene terephthalate, virgin polyethylene terephthalate and combinations thereof. The optional catalyst is a transesterification catalyst, generally, and can be metal acetates, metal organocarboxylic acid complexes, oxides, halides, and/or thiocyanates, for example. In one non-limiting embodiment, the catalyst is zinc acetate and/or zinc propionate. Alternatively but not by way of limitation, the catalyst can be silica chloride.

Table B shows some examples of the resulting dfPET polymeric structures derived from the use of several different glycolysis agents along with propionic anhydride, in which "n" can be any positive integer equal to or greater than 1—for example, "n" may be a positive integer from 1 to 500,000.

TABLE B

| Glycolysis Agent | Resulting dfPET Structure |
|---|---|
| Neopentyl glycol | 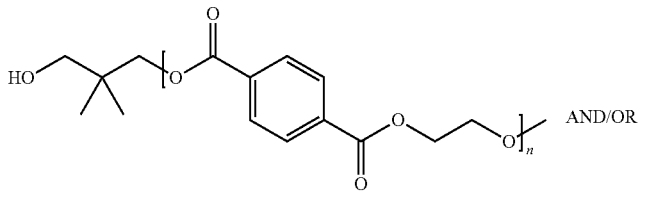 AND/OR |
| Ethylene Glycol | 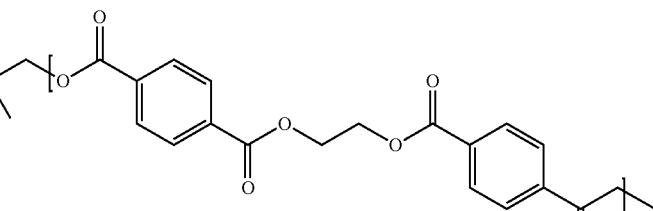 |
| Glycerol | 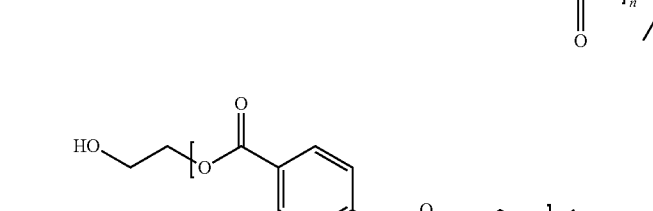 |

TABLE B-continued

| Glycolysis Agent | Resulting dfPET Structure |
|---|---|
| Propionic Anhydride | 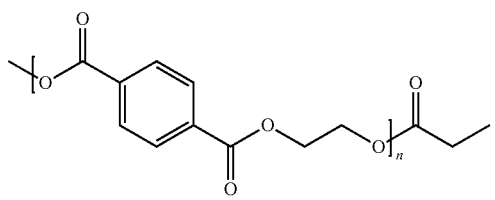 |

Table A1 shows additional examples of the general chemical structure of the presently disclosed inventive concept(s) including the dfPET compound. As shown in Table A1, $R^1$, $R^2$ and n are the same as those described previously with respect to Tables A and B. $X_1$, $X_2$, $X_3$ and $X_4$ are identical or different and each independently represents a hydrogen atom or a halogen atom, provided that $X_1$, $X_2$, $X_3$ and $X_4$ are not hydrogen atoms at the same time.

TABLE A1

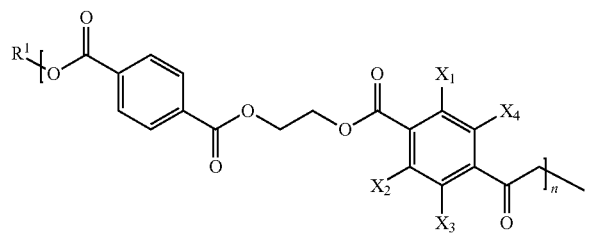

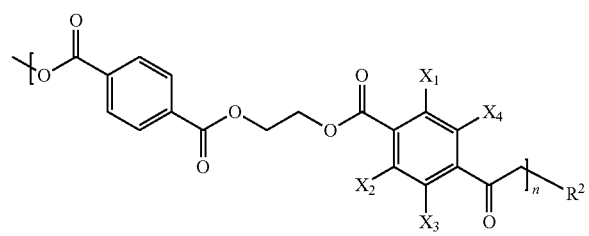

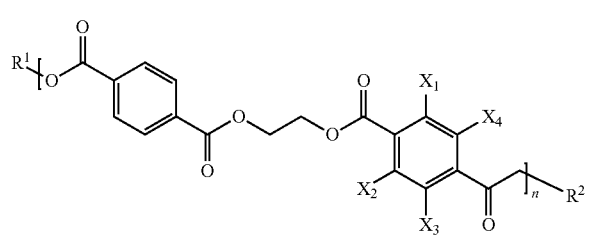

The oligomeric form of polyethylene terephthalate shown in Table A1 can be produced from a reaction of polyethylene terephthalate, a glycolysis agent, a halogen-substituted terephthalic acid and, optionally (as described hereinabove), a catalyst. The polyethylene terephthalate, the glycolysis agent and the catalyst are the same as those described previously with respect to Tables A and B.

The halogen-substituted terephthalic acid can be presented by a general formula (I):

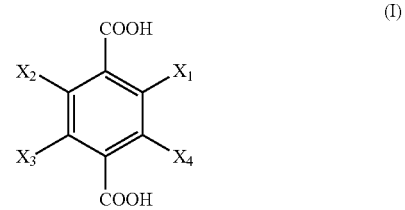

(I)

wherein $X_1$, $X_2$, $X_3$ and $X_4$ are identical or different and each independently represents a hydrogen atom or a halogen atom, provided that $X_1$, $X_2$, $X_3$ and $X_4$ are not hydrogen atoms at the same time.

Examples of the halogen-substituted terephthalic acid represented by the general formula (I) include, but are not limited to, 2-fluoroterephthalic acid, 2-chloroterephthalic acid, 2,5-difluoroterephthalic acid, 2,6-difluoroterephtalic acid, 2,3-difcluoroterephthalic acid, 2,5-dichloroterephthalic acid, 2,6-dichloroterephthalic acid, 2,3-dichlooroterephthalic acid, 2,3,5-trifluoroterephthalic acid, 2,3,5-trichloroterephthalic acid, 2,3,5,6-tetrafluoroterephthalic acid, 2,3,5,6-tetrachloroterephthalic acid, 2,3,5-trifluoro-6-chloroterephthalic acid, and combinations thereof.

The halogen-substituted terephthalic acid represented by the general formula (I) can be produced by any one of several known methods. For example but not by way of limitation, hydrolyzing the correspondent halogen-substituted terephthalinitrile substantially as described in U.S. Pat. No. 5,792,887, the entire disclosure of which is hereby incorporated by reference.

The oligomeric form of polyethylene terephthalate in Table A1 can also be produced by a reaction of polyethylene terephthalate, a glycolysis agent, an amine, a halogen-substituted terephthalic acid and optionally a catalyst; and/or a reaction of polyethylene terephthalate, a glycolysis agent, a diacid and/or a compound having a hydroxyl group(s) and a carboxylic group(s), a halogen-substituted terephthalic acid and, optionally (as described hereinabove), a catalyst; and/or a reaction of polyethylene terephthalate, a glycolysis agent, an anhydride, a halogen-substituted terephthalic acid and, optionally (as described hereinabove), a catalyst. The polyethylene terephthalate, the glycosis agents, the halogen-substituted terephthalic acid, the catalyst, the amine, the diacid, the compound having a hydroxyl group(s) and a carboxylic group(s), and the anhydride are the same as those described previously with respect to Tables A and B.

In the functionalized oligomeric form of polyethylene terephthalate of Table A1, the halogen functional group(s) can be modified by or substituted with one or more hydroxyl group(s). The functionalized oligomeric form of polyethylene terephthalate containing halogen functional group(s) can also be hydrolyzed to form hydroxyl group(s) using any one of several known methods. For example but not by way of limitation, the functionalized oligomeric form of terephthalate containing halogen function group(s) can be hydrolyzed by an alkaline condition. The hydrolysis can be carried out with hydroxide of alkaline metal (sodium hydroxide, potassium hydroxide or lithium hydroxide etc.), hydroxide of alkaline earth metal (barium hydroxide or calcium hydroxide etc.), hydrogen carbonate (sodium hydrogen carbonate and calcium hydrogen carbonate) and carbonate (sodium carbonate or potassium carbonate etc.)

As a result, the functionalized oligomeric form of polyethylene terephthalate obtained is shown in Table A2. $R^1$, $R^2$ and n are the same as those described previously with respect to Tables A, B and A1. $Y_1$, $Y_2$, $Y_3$ and $Y_4$ are identical or different and each independently represents a hydrogen atom or a hydroxyl group, provided that $Y_1$, $Y_2$, $Y_3$ and $Y_4$ are not hydrogen atoms at the same time.

TABLE A2

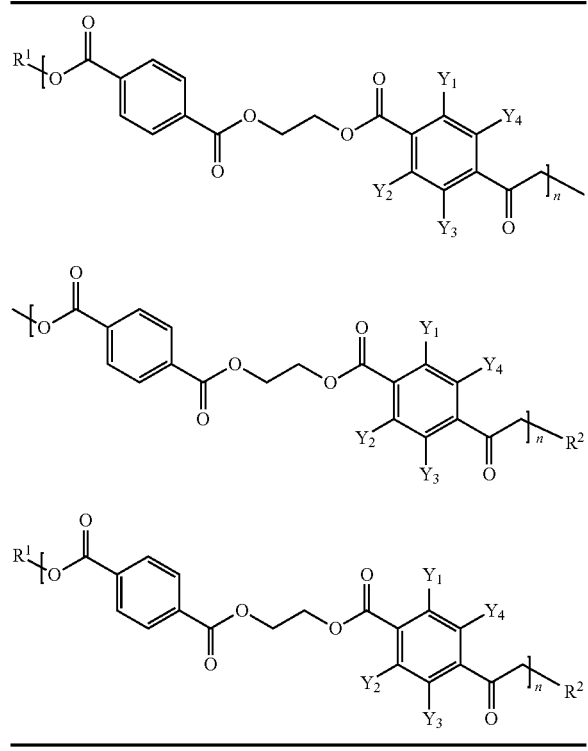

Such an oligomeric form of polyethylene terephthalate containing hydroxyl group(s) (as shown in Table A2) can be further converted into other widely useful chemical products. In one particular aspect but not by way of limitation, the oligomeric form of polyethylene terephthalate containing hydroxyl group(s) can be converted to the corresponding alkene(s) by dehydration in the presence of a catalyst composition. The catalyst composition can be an acid catalyst, for example but not by way of limitation. In one non-limiting embodiment, the catalyst composition is concentrated sulfuric acid or concentrated phosphoric acid. The catalyst composition can also be a solid acid catalyst. One such methodology utilizing a solid acid catalyst composition for dehydrating an alcohol is described in U.S. Pat. No. 4,049,736, the entire disclosure of which is hereby incorporated by reference. As such, the solid acid catalyst may be, for example but not by way of limitation, a bulk oxide. In one non-limiting embodiment, the bulk oxide may be alumina, zirconia, titania, silica, niobia, and combinations thereof.

The solid acid catalyst may be, for example, and without limitation, a zeolite. The meaning of the expression "zeolite" is well understood to those of ordinary skill in the art and a detailed recitation of all known zeolite compositions is not required therefore. Without limitation, the zeolite may include, for example a hydrated aluminosilicate of the alkaline and alkaline earth metals. Suitable zeolites would be understood and determinable by those of ordinary skill in the art. In an embodiment, the zeolite may be, for example and without limitation, of natural or synthetic origin. In an embodiment, the zeolite may be, for example and without limitation, crystalline. In an embodiment, the zeolite may be, for example, and without limitation, a pentasil-type zeolite. In an embodiment, the zeolite may be, for example and without limitation, HY, H-BETA, H-Mordenite or ZSM-5 zeolite. The expressions "HY", "H-BETA", "H-Mordenite" and "ZSM-5" would be understood to those of ordinary skill in the art. In an embodiment, the zeolite may be, for example and without limitation, ZSM-5 zeolite. The expression "ZSM-5" is used interchangeably with the expression "H-ZSM-5" throughout this entire specification. A modifying agent can be added into the above solid acid catalyst to enhance the surface acidity. Examples of the modifying agent include, but are not limited to, phosphate or sulfate compounds such as phosphoric acid or sulfuric acid, or a derivative thereof, or a transition metal oxide such as tungsten trioxide, $ZrO_2$ and $MoO_3$, or a derivative thereof, The resulted alkenes can be used as chemical intermediates or building blocks to produce other products applicable to and/or useful within a number of industries. Since the alkenes can be produced from waste products, such as beverage containers, made from polyethylene terephthalate, the production of valued chemicals from the alkenes has attracted considerable interest. In this regard, production of an alkene from oligomeric forms of polyethylene terephthalate (or other polyester polymers) containing hydroxyl group(s) is a one significant advantage and/or benefit of the presently disclosed and claimed inventive concept(s).

Metal alkoxides are widely used in industry as catalysts and stoichiometric reagents. These reagents are used in diverse reaction chemistries such as alkylation, isomerization, rearrangements, condensations, transesterifications and eliminations. The oligomeric form of polyethylene terephthalate containing hydroxyl group(s) can react with a metal reagent or a metal salt to form the corresponding metal alkoxide. In one particular aspect, the oligomeric form of polyethylene terephthalate containing hydroxyl group(s) reacts with at least a stoichiometric amount of a metal reagent. The metal reagent can be, but are not limited to a Group I metal, a Group II metal, zinc, a metal alloy of a Group I metal, a metal alloy of a Group II metal, a compound of zinc, or combinations thereof. In one embodiment, a metal reagent used includes K, Li, Na, Cs, Mg, Ca or Zn. In the case that a metal reagent is used, the reaction takes place above the melting point of the metal. The synthesis and isolation of metal alkoxides using a metal reagent is substantially described in U.S. Pat. No. 6,444,862, the entire disclosure of which is hereby incorporated by reference.

The metal alkoxide for use within the presently claimed and disclosed inventive concept(s) can also be formed by reaction of the oligomeric form of polyethylene terephthalate containing hydroxyl group(s) with a metal salt. In one embodiment, the metal salt is a metal halide. Typically, the metal halide reacts with the oligomeric form of polyethylene terephthalate containing hydroxyl group(s) in the presence of ammonia. Ammonia is used to remove the halide. Optionally, inert solvents such as benzene, toluene, xylene, octane, or cyclohexane may be used as the solvent or as a cosolvent. The ammonia reactant is sparged into the reaction medium until substantially all of the ammonium halide is formed.

Ethers are commercially important compounds and widely used with respect to solvents, propellants, fillers, food additives, fuel additives, cleaners, health care formations and the manufacture of polymers, etc. Ethers can also be found in many familiar commercial products from hair spray to cosmetics. In the presently disclosed and claimed inventive concept(s), the oligomeric form of polyethylene terephthalate containing hydroxyl group(s) can be converted to the corresponding symmetric ether by condensation in the presence of an acid catalyst. In one embodiment, a strong acid (such as sulfuric acid) is added to the solution of the oligomeric form of polyethylene terephthalate containing hydroxyl group(s) and then the reaction mixture is heated.

The symmetric ether can also be produced from the oligomeric form of polyethylene terephthalate containing hydroxyl group(s) using metal oxides as catalyst. First, a feedstock with the oligomeric form of polyethylene terephthalate containing hydroxyl group(s) is heated to a temperature greater than about 150 degree Celsius. Thereafter, the feedstock is passed through a catalyst comprising a metal oxide. The metal oxides can be, but are not limited to, zirconia, hafnia, titania, alumina, and combinations thereof. In some embodiments, the metal oxide is selected from the group consisting of titania and alumina. Ether synthesis of a polymer containing hydroxyl group(s) using such a metal oxide as catalyst is described in U.S. Patent Pub. 2008/0319236, the entire disclosure of which is hereby incorporated by reference.

The oligomeric form of polyethylene terephthalate containing hydroxyl group(s) can also be converted to an unsymmetrical ether using the metal alkoxide of the oligomeric form of polyethylene terephthalate produced as taught by the presently disclosed and claimed inventive concept(s). For example but not by way of limitation, the Williamson ether synthesis process may be utilized. The Williamson ether synthesis process involves converting an alkoxide ion into an ether by reaction with a hydrocarbyl halide. Alternatively, the ether can be produced by reaction of the oligomeric form of polyethylene terephthalate containing hydroxyl group(s) with a hydrocarbyl halide in the presence of a substantial, stoichiometric excess of water soluble, hygroscopic base. In one embodiment, the water soluble, hydroscopic base is sodium hydroxide. Initially, the oligomeric form of polyethylene terephthalate containing hydroxyl group(s) reacts with at least a 20 molar percent stoichiometric excess of a water-soluble hygroscopic base to form an alkoxide anion. The alkoxide anion is then reacted with a source of an alkyl moiety such as a hydrocarbyl halide or the like to form ether. An ether synthesis from alkoxide anions is described in U.S. Patent Pub. 2010/0280277, the entire disclosure of which is hereby incorporated by reference.

The oligomeric form of polyethylene terephthalate containing hydroxyl group(s) can also react with organic silyl halides in the presence of an acid acceptor to produce the corresponding silyl ether. Silyl ethers are usually used as protecting groups for alcohols in organic synthesis, especially for synthesis of pharmaceutical ingredients.

Esters encompass a large family of organic compounds with broad applications in medicine, biology, chemistry and industry. Esters are produced by reaction of acids with compounds containing hydroxyl group(s). In the presently disclosed and claimed inventive concept(s), the oligomeric form of polyethylene terephthalate containing hydroxyl group(s) can react with various inorganic and organic acids to form the corresponding esters. For example, the oligomeric form of polyethylene terephthalate containing hydroxyl group(s) can react with inorganic acids such as nitric acid, phosphoric acid and sulfuric acid to form the corresponding nitrate, phosphate and sulfate, respectively. The oligomeric form of polyethylene terephthalate containing hydroxyl group(s) can also react with organic acids and anhydrides to form corresponding organic esters in the presence of an inorganic acid catalyst. The acids include organic monoacids and diacids. The esters can be converted to a thionoester using Lawesson's reagent.

The oligomeric form of polyethylene terephthalate containing hydroxyl group(s) can also be converted to a sulfonate by reacting the oligomeric form of polyethylene terephthalate containing hydroxyl group(s) with an appropriate sulfonic acid. The sulfonic acid can be an alkyl sulfonic acid, an aryl sulfonic acid, an alkyl aryl sulfonic acid or combinations thereof.

The oligomeric form of polyethylene terephthalate containing hydroxyl group(s) can react with sulfonyl halides to form the corresponding sulfonates. The sulfonyl halides can be tosyl chloride, brosyl, mesyl and trifyl. As a result, a tosylate, a brosylate and a triflate can be produced. These are important chemical intermediates used widely in organic synthesis. For example, tosylate and triflate can be converted to the corresponding amines and esters.

The oligomeric form of polyethylene terephthalate containing hydroxyl group(s) can also be converted to the corresponding halides. In one embodiment, the oligomeric form of polyethylene terephthalate containing hydroxyl group(s) can react with a hydrogen halide to form the corresponding halide in the presence of sulfuric acid. The reaction is carried out with stoichiometric excess of the hydrogen halide relative to the oligomeric form of polyethylene terephthalate containing hydroxyl group(s).

In another embodiment, the oligomeric form of polyethylene terephthalate containing hydroxyl group(s) can react with thionyl halide in the presence of a base catalyst to generate the corresponding halide. The oligomeric form of polyethylene terephthalate containing hydroxyl group(s) is dissolved in aprotic polar solvent in the presence of base catalyst and then thionyl halide is slowly added at a low temperature in a range of from about $-20°$ C. to about $10°$ C. The halide may be selected from the group consisting of F, Cl, Br, I, and combinations thereof. In one non-limiting embodiment, Cl or Br is used. Among the thionyl halides, thionyl chloride and thionyl bromide are commercially available. Thionyl chloride is preferred in one non-limiting embodiment because it is readily available and generates less heat during the reaction. The aprotic polar solvents used include, but are not limited to, acetonitrile, methylene chloride, chloroform, carbon tetrachloride and diethyl ether. Among them, acetonitrile, methylene chloride or chloroform is more desirable.

Either organic or inorganic salts can be used as the base catalyst even in excess amount. Examples of the organic base include, but are not limited to, triethylamine, tripropylamine, N,N-diisopropylamine, and pyridine. Examples of the inorganic base include, but are not limited to, potassium hydroxide, sodium carbonate and potassium carbonate.

In yet another embodiment, the oligomeric form of polyethylene terephthalate containing hydroxyl group(s) can react with phosphorous halides to form the corresponding halides.

The halides are very important chemical intermediates that can be used to generate other useful chemicals. For example, the halides can be used to make the corresponding amine derivatives, which are widely used as intermediates for the synthesis of various organic compounds as well as pharmaceutical and agro-chemical compounds. In one embodiment, the halide is dissolved in aprotic polar solvent and reacts with amine in the presence of a base catalyst. The reaction can be carried out at temperatures ranging from about 0° C. to about 200° C., while refluxing under pressure within a range of from about 1 to about 100 atm depending on the amine. The polar solvents include, but are not limited to, acetonitrile, toluene, dimethylformamide, dimethylacetamide, dioxane, tetrahydrofuran, and pyridine. Among them, acetonitrile and dimethylacetamide may be, in one non-limiting embodiment, desirable. The base catalysts include either organic base such as pyridine, triethylamine, diisopropylamine or the inorganic base such as sodium carbonate, potassium carbonate, calcium carbonate, sodium hydroxide, potassium hydroxide, sodium hydride, potassium hydride, calcium hydride, sodium methoxide, and sodium ethoxide. Among them, sodium carbonate and potassium carbonate are recommended. Any amine compound can be used for the reaction. In one embodiment, alkyl amine and cycloalkyl amine are used. An exemplary process of converting halides to amines for use with the presently disclosed and claimed inventive concept(s) is described in U.S. Pat. No. 6,566,525, the entire disclosure of which is hereby incorporated by reference.

The oligomeric form of polyethylene terephthalate containing hydroxyl group(s) can also be oxidized to form the corresponding aldehydes, ketones and acids using oxidizing agents. The oxidizing agents can be oxygen (air) or hydrogen peroxide. In one specific aspect, the oligomeric form of polyethylene terephthalate containing hydroxyl group(s) can be oxidized by oxygen or air in the presence of catalysts. The oxidation can be carried out using ruthenium, cobalt, copper, palladium, and platinum metal catalysts with additives such as potassium carbonate, sodium bicarbonate, pyridine, molecular sieves and phenanthroline. Stoichiometric metal oxidants such as chromium (VI) compound and active manganese dioxide have also been widely used as oxidation catalysts. In one non-limiting embodiment, a ruthenium-carrying alumina can be used a catalyst. In another non-limiting embodiment, a ruthenium compound and a dioxybenzene or its oxidant is used as a catalyst. In yet another non-limiting embodiment, a manganese-containing octahedral molecular sieve can be used as the catalyst. The use of such catalysts and their respective oxidation processes are described in U.S. Pat. Nos. 7,169,954; 6,486,357; and 6,166,264, the entire disclosures of which are hereby incorporated by reference in their entirety.

The oligomeric form of polyethylene terephthalate containing hydroxyl group(s) can be oxidized by hydrogen peroxide in the presence of a catalyst. In one non-limiting embodiment, the catalysts can be, but are not limited to tungsten catalyst such as peroxotungstate, sodium tungstate, and tungstic acid. The oxidation of an alcohol using a hydrogen peroxide and tungsten catalyst is described in U.S. Patent Pub. 2008/0269509, the entire disclosure of which is hereby incorporated by reference. In another non-limiting embodiment, the catalyst is a rhenium based catalyst having a co-catalyst selected from the group consisting of $HBF_4$ and salts thereof. The rhenium based catalyst can be an unsupported and/or a supported rhenium based catalyst. The supported rhenium based catalysts usually comprise an inert polymeric matrix (support) and a rhenium compound (active part of the catalyst). Examples of rhenium compounds include, but are not limited to, $ReO_3$, $Re_2O_7$, $CH_3ReO_3$, a $C_2$ to $C_{20}$ alkyl rhenium oxide, a $C_3$ to $C_{10}$ cycloalkyl rhenium oxide. Oxidation of an alcohol using hydrogen peroxide and a rhenium based catalysts is described in U.S. Patent Pub. 2011/0124889, the entire disclosure of which is hereby incorporated by reference. The produced aldehydes or ketones can be further converted to the corresponding alkenes by reaction with a triphenyl phosphonium ylide (often called a Wittig reagent), for example but not by way of limitation.

The oligomeric form of polyethylene terephthalate containing hydroxyl group(s) can also react with hydrogen sulfide in the presence of a catalyst to produce the corresponding thiol. In one embodiment, the catalyst comprises a support, a base and a metal compound. The support is a catalytically active carrier that contains base and/or acid active sites.

Examples of such supports include, but are not limited to, alumina, zirconia, silica, titanic, alumin-silicate (zeolites) and magnesia-aluminates. The base is an alkali metal, alkaline earth metal bicarbonate, carbonate, oxide, or hydroxide. In one non-limiting embodiment, alkali metal bases and hydroxides are used. Examples of suitable bases include, but are not limited to, sodium hydroxide, potassium hydroxide, magnesium hydroxide, calcium hydroxide, sodium bicarbonate, sodium carbonate, magnesium oxide and calcium oxide. In one non-limiting embodiment, potassium hydroxide and rubidium hydroxide are used as base.

The metal compound may be an acid or an alkali metal or alkaline earth metal salt thereof. The metals are generally from Group III to XII of the Periodic Table and include tungsten, molybdenum, chromium, manganese, titanium, zirconium, cobalt and nickel. In one non-limiting embodiment, a tungsten compound is used. Examples of the metal compounds include, but are not limited to, $WO_3$, $K_2WO_4$, $Na_2WO_4$, $MoO_3$, $K_2MoO_4$, $Na_2MoO_4$, phosphotungstate, phosphomolybdate and silicotungstate. In one embodiment, $WO_3$ or $K_2WO_4$ are used. Synthesis of thiols from alcohols is described in U.S. Pat. No. 5,874,630, the entire disclosure of which is hereby incorporated by reference.

The thiol can be further converted to thioester condensate by reaction with acids in the presence of a solvent using a tetravalent hafnium compound as a condensation catalyst. Generally, the acids can be carboxylic acids including monocarboxylic acids, dicarboxylic acids, tricarboxylic acids, and tetracarboxylic acids. The tetravalent hafnium compound is a hafnium chloride (IV), a hafnium chloride (IV)(THF)$_2$, or hafnium (IV)t-butoxide. The solvent can be a polar solvent, a nonpolar solvent, or a combination of a polar and a nonpolar solvent. In one non-limiting embodiment, a nonpolar solvent is preferred and examples of the nonpolar solvent include, but are not limited to, toluene, xylene, mesitylene, pentamethylbenzene, m-terphenyl, benzene, ethylbenzene, 1,3,5-tri-isoporpyl benzene, o-dichlorobenzene, 1,2,4-tricholobenzene, naphthalene, and 1,2,3,4-tetrahydronaphthalene (tetralin). Production of condensation thioester is described in U.S. Pat. No. 7,301,045, the entire disclosure of which is hereby incorporated by reference.

In addition, the oligomeric form of polyethylene terephthalate containing hydroxyl group(s) can be oxidized by oxygen to produce the corresponding hydroperoxide. The oligomeric form of polyethylene terephthalate containing hydroxyl group(s) can also react with reducing agents to producing the corresponding alkanes and/or alkenes.

Broadly, the process of making at least one dfPET polymer according to the presently claimed and disclosed inventive concept(s) and, more particularly but without limitation, those dfPET polymers shown in Tables A, B, A1, and/or A2, includes the step of reacting polyethylene terephthalate scrap and/or waste, and/or virgin material and/or combinations thereof with ethylene glycol (i.e., a glycolysis agent) containing a catalyst at an elevated temperature and at atmospheric pressure (although one of ordinary skill in the art would appreciate that the reactions can also be run at elevated pressures in order to modify the kinetics of the reaction) for a sufficient time to decrease the molecular weight of the PET scrap to an oligomeric state. In one embodiment, the catalyst is a zinc acetate catalyst capable of decreasing the amount of activation energy for depolymerization of polyethylene terephthalate. In an additional step, precipitated PET oligomer is recovered from the reaction mixture and dried. In another embodiment, neopentyl glycol is used as the glycolysis agent. One of ordinary skill in the art would appreciate that other glycolysis agents such as, but not by way of limitation, glycerol and propionic anhydride, may also be used. As can be appreciated, the resulting dfPET polymeric material (and chemical structure) is determined by the glycolysis agent used and one of ordinary skill in the art, given the present disclosure, would appreciate and be capable of producing any specific dfPET material having a desired chemical structure—for example but not by way of limitation, the dfPET polymers substantially as shown in Tables A, B, A1, and/or A2.

While the process of the presently disclosed and claimed inventive concept(s) can be used to treat a wide variety of polyethylene terephthalate scrap or waste, it is particularly adaptable for processing used polyethylene terephthalate beverage containers. As used hereinafter, the term "scrap" means scrap, waste and/or used products of polyethylene terephthalate. The term "scrap" also includes within its definition varying sizes and shapes of waste and/or used products of polyethylene terephthalate. Scrap PET, as used herein, may include whole products made of PET (e.g., a beverage bottle) or further processed products made of PET. In one embodiment, the further processing includes the chipping or shredding of PET products in order to produce a scrap PET material suitable for use in the disclosed methodologies. Alternatively, the further processing may include nitrogen jet milling of the PET products in order to produce a scrap PET material having an average size of about 10 microns. One of ordinary skill in the art would appreciate that the further processing step may include a multitude of processing steps including, but not limited to, pin milling, jet milling, media milling, rolling and crushing, all of which would be understood to fall within the broad disclosure presented herein.

In one embodiment, further processing of the PET raw material is accomplished via milling. For example, recycled bulk PET (rPET) having a particle size in the range of 100-200 microns was obtained from Clean Tech Incorporated (Dundee, Mich.). This bulk recycled PET is formed from PET plastic bottles that are sorted by color, ground, washed and repelletized and dried under vacuum conditions. The recycled bulk PET was in the form of grayish pellets. Further processing for this embodiment entailed liquid nitrogen jet milling of the recycled bulk PET pellets according to the conditions outlined in Table 1 and performed by Liqua-Jet/The Jet Pulverizer Co. (Moorestown, N.J.). The processing steps performed by LiquaJet are proprietary methods kept as a trade secret by the company. Generally, the material was milled with liquid nitrogen in order to obtain a product having a desired state. The results of particle size shown in Table 1 were determined on a Wet Horiba Ri: 1.5750 (HORIBA Ltd., Austin, Tex.).

TABLE 1

| Test Condition | Avg. Particle Size of rPET in microns. | Grit |
|---|---|---|
| 1A | 64.4 | NO |
| 1B | 59.1 | NO |
| 2A | 33.1 | NO |
| 2B | 83.0 | NO |
| 3A (2A 2X) | 27.4 | NO |
| 4A | 51.6 | NO |
| 4B | 51.6 | YES |
| 5A | 108.5 | YES |
| 5B | 153.0 | YES |

After a second milling using the liquid nitrogen jet milling process, the rPET material was found to have an average size of 27.4 microns. Further processing (i.e., additional liquid jet milling steps) would achieve a specification of rPET material having an average size of less than about 33 microns and, more particularly, from about 7 to about 10 microns. Although such small sizes of rPET can be obtained, it was found that the process(es) according to the presently disclosed and claimed inventive concept(s) do not require such a small starting size of the rPET. Rather, it was found that rPET having a size of from about 25 microns to about 100 microns can be used and, more particularly, rPET scrap having a size of from about 50 microns to about 100 microns. Such sizes should not be considered as limiting, however, as the presently disclosed and claimed inventive concept(s) have been found to be suitably applied to rPET scrap having a size equal to or greater than 200 microns.

The depolymerization of the rPET into a reactive, lower melting point (mp) material was accomplished according to novel methodologies of the presently disclosed and claimed inventive concept(s). The molecular weight of the polymer is reduced until a molecular weight of 280-680 is achieved, for example but not by way of limitation. At this molecular weight the dfPET has a lower melting point (mp) and increased reactivity with compounds such as those described hereinafter. In one non-limiting embodiment, such a compound that reacts with the dfPET is an isocyanate for the production of a polyurethane polymer.

An initial reaction scheme for depolymerization of the rPET into a reactive lower melting point material according to the presently disclosed and claimed inventive concept(s) utilized the reactant weights given in Table 2.

TABLE 2

| Reactants | Amount |
|---|---|
| Deionized Water | 300 ml |
| rPET (TABLE A-1A) | 48.4393 g |
| Anhydrous Sodium Acetate | 3.0263 g |
| 50% by Weight Sodium Hydroxide | 30 ml |

The reactants were all weighed and added to the reaction kettle. The kettle was set up with a stir bar and a condenser with cold water running through it. A heating mantle was used to heat the mixture as it was stirring. The temperature of the reaction kettle was maintained at a constant temperature of from about 150-175° C. The reaction was allowed to proceed for 6 hours at which time the rPET had completely dissolved. The reaction solution was then cooled to a uniform highly basic solution. A small sample of the cooled mixture was placed into a beaker and concentrated hydrochloric acid was added until a white precipitate formed.

More particularly, the procedure for the reaction of Table 2 was as follows:
1. 250 ml of water was added to the reaction kettle.
2. 48.4393 g of rPET (Table 1-Sample 1A) was added to the reaction kettle.
3. 3.0262 g of anhydrous sodium acetate catalyst was added to the reaction kettle.
4. 30 ml of 50% by weight sodium hydroxide was added.
5. The reaction was heated to a temperature of 150-175° C.
6. Water (350 mL) was added in two increments.
7. When the rPET was completely dissolved (after approximately 6 hours), the reaction kettle was allowed to cool to room temperature.
8. An aliquot of the solution was removed from the kettle and acidified with concentrated hydrochloric acid which afforded a white precipitate.

The white precipitate was dried and characterization by Differential Scanning Calorimetry (DSC), FTIR, and LC-MS (Liquid Chromatography with Mass Spectrometric detection) revealed that the resultant products were primarily the monomers: ethylene glycol and terephthalic acid. Modulated DSC (mDSC) was used to determine the material's melting point. A small melt occurring at 109° C. indicated, moreover, that a minor amount of bis(2-hydroxyethyl) terephthalate (i.e., a glycol—terephthalic acid—glycol trimer) residually remained in the white precipitate (FIG. 1, mDSC heat flow). This melting point of 109° C. is consistent with a commercially available bis(2-hydroxyethyl) terephthalate material supplied by Sigma Aldrich Co. (CAS #959-26-2). The reaction scheme outlined above and in Table 2 shows that an atmospheric pressure based system could be used to depolymerize rPET into oligomers of rPET, i.e., a resin replacement or extender composition (indicated by the 109° C. melt on the mDSC). LC-MS analysis indicated, however, that the reaction according to Table 1 had proceeded to near completion. The chemical structure and molecular weight analysis indicated that the majority of the white precipitate was actually terephthalic acid or monomer, not a rPET oligomer(s) having a "n" equal to or greater than 2. As such, the reaction conditions were modified in order to obtain greater quantities of oligomeric rPET having varying molecular weights—i.e., having a "n" equal to or greater than 2.

The depolymerization process according to Table 2 is believed to proceed via basic hydrolysis of the ester linkages of the rPET in basic conditions using a sodium acetate catalyst. In order to obtain a low molecular weight oligomeric digested rPET species, a reaction was designed such that every additional mole of ethylene glycol (EG) added would be capable of reducing the molecular weight of the polymer through transesterification. Exemplary reactions were carried out in which 5 equivalents of ethylene glycol was added for every mole of terephthalic acid. These exemplary reactions are summarized in Table 3 and were carried out in accordance with the methods given for the initial reaction set forth in Table 2.

TABLE 3

|  | Reaction 2 | Reaction 3 |
| --- | --- | --- |
| Ethylene glycol (g) | 620 | 620 |
| PET (FW = 192 g/mol) (g) | 384 | 384 |
| Moles PET | 2 | 2 |
| ZnOAc (g) | 10 | 20 |
| Moles EG Added | 10 | 10 |

The exemplary reactions given in Table 3 were considered to be complete once the pellets of rPET were completely dissolved and the reaction reached a homogeneous, liquid phase. In each case, this required approximately 6 hours. The precipitates formed from Reaction #2 and Reaction #3 were added directly to reagent grade ethyl alcohol (Ethyl Alcohol CAS 64-17-5 90%, Methyl Alcohol CAS 67-56-1 5%, Isopropyl Alcohol CAS 67-63-0 5%) and made into a slurry. The slurries were then dried in an oven at 32° C. for 24 hrs. These resultant white products were then characterized analytically.

In each reaction, the recovered and dried precipitates comprised oligomeric units of rPET, i.e., the recovered and dried precipitates were primarily composed of incompletely digested oligomers of rPET (rPET wherein n is greater than or equal to 2). The mDSC analysis of the precipitates samples, according to the exemplary reactions of Table 2 (FIG. 1), showed that the material had reacted completely.

Figure 2:
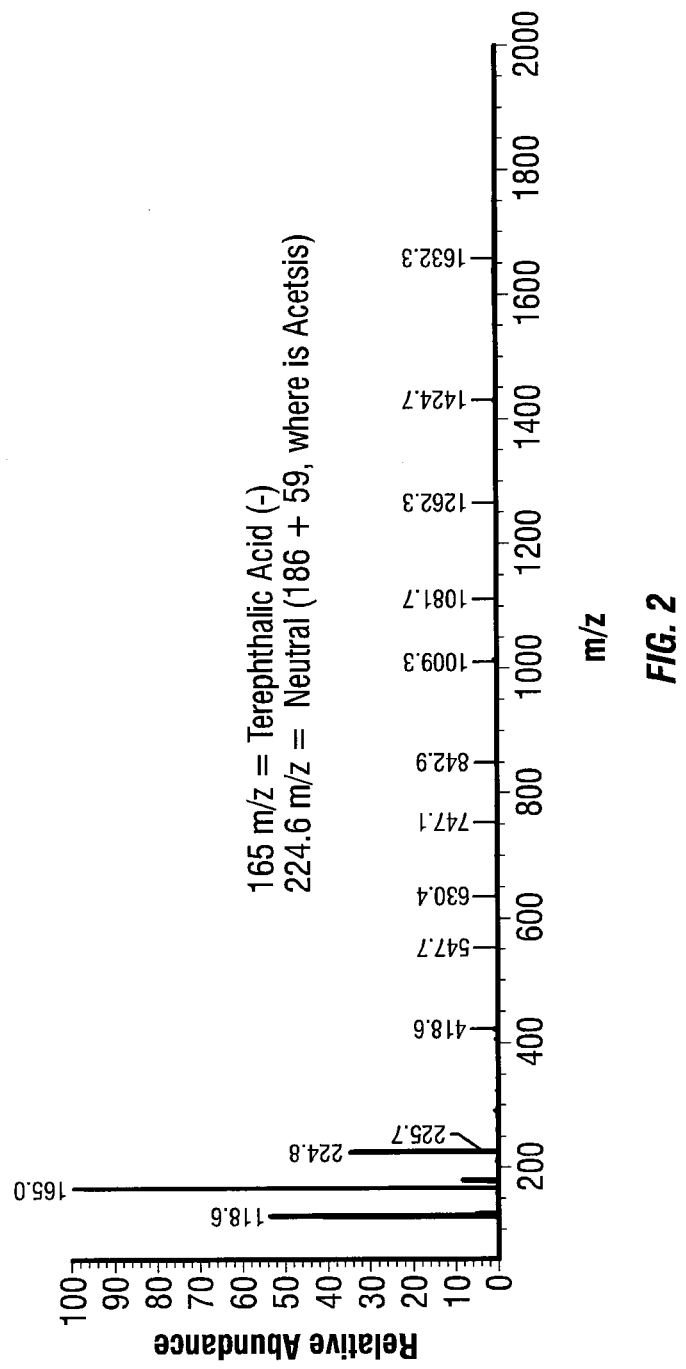
FIG. 2 is liquid chromatography-mass spectrometry analysis of fully digested rPET.
Figure 2:
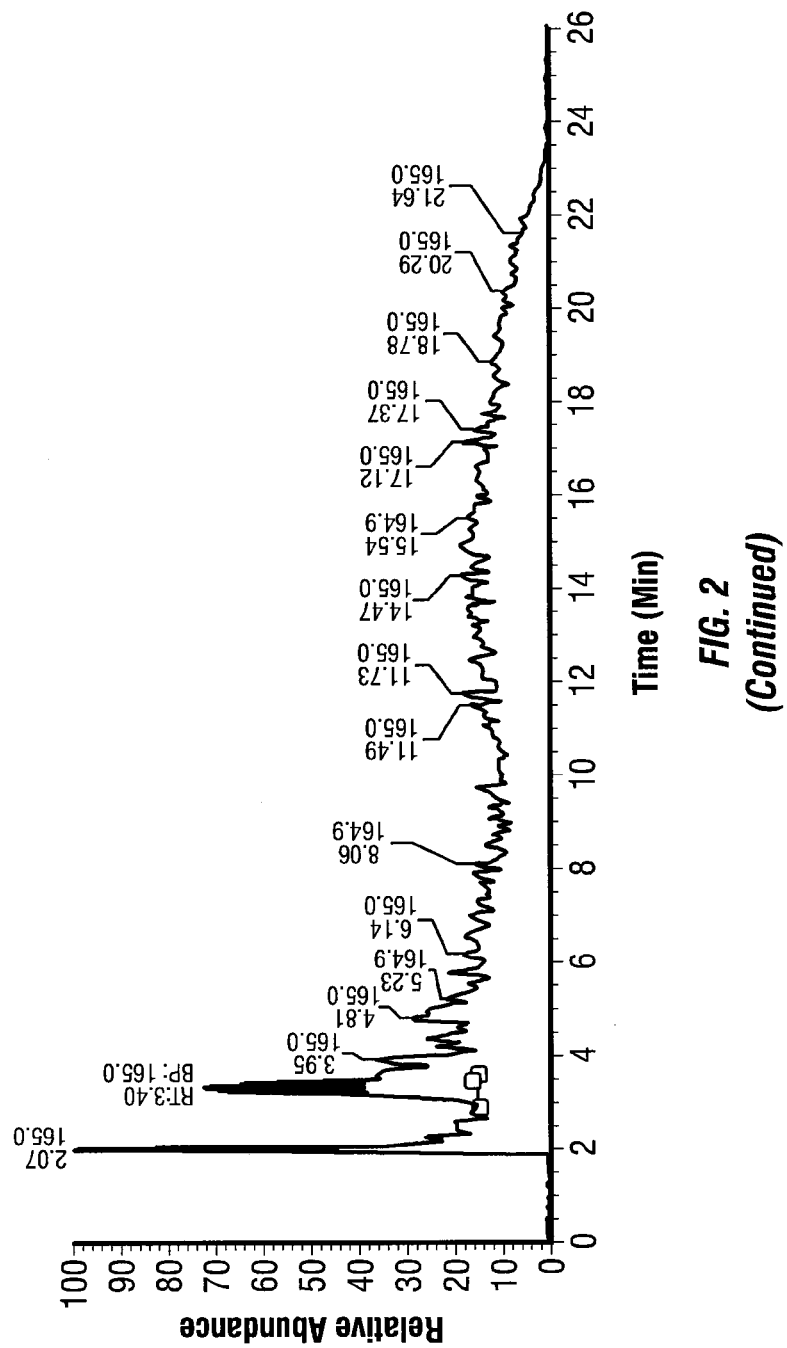
Figure 2:
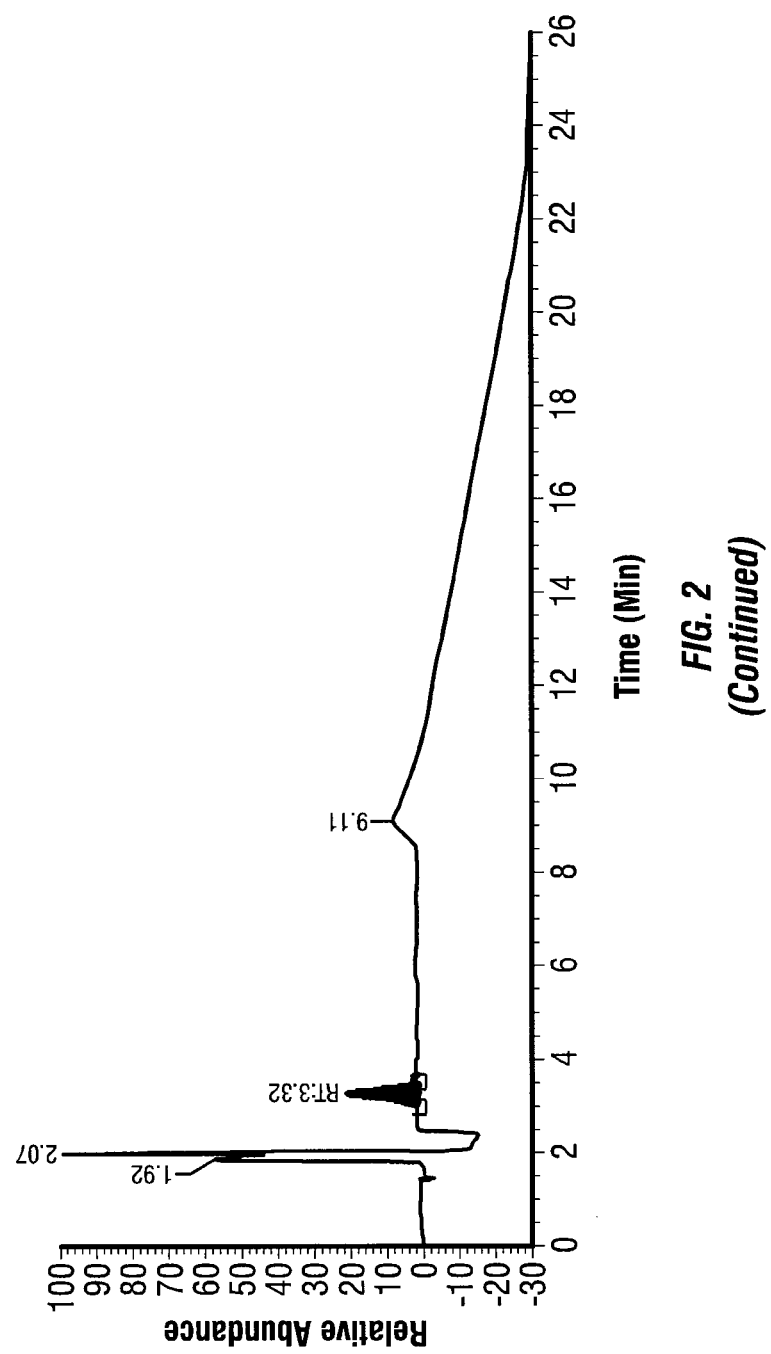
Figure 3:
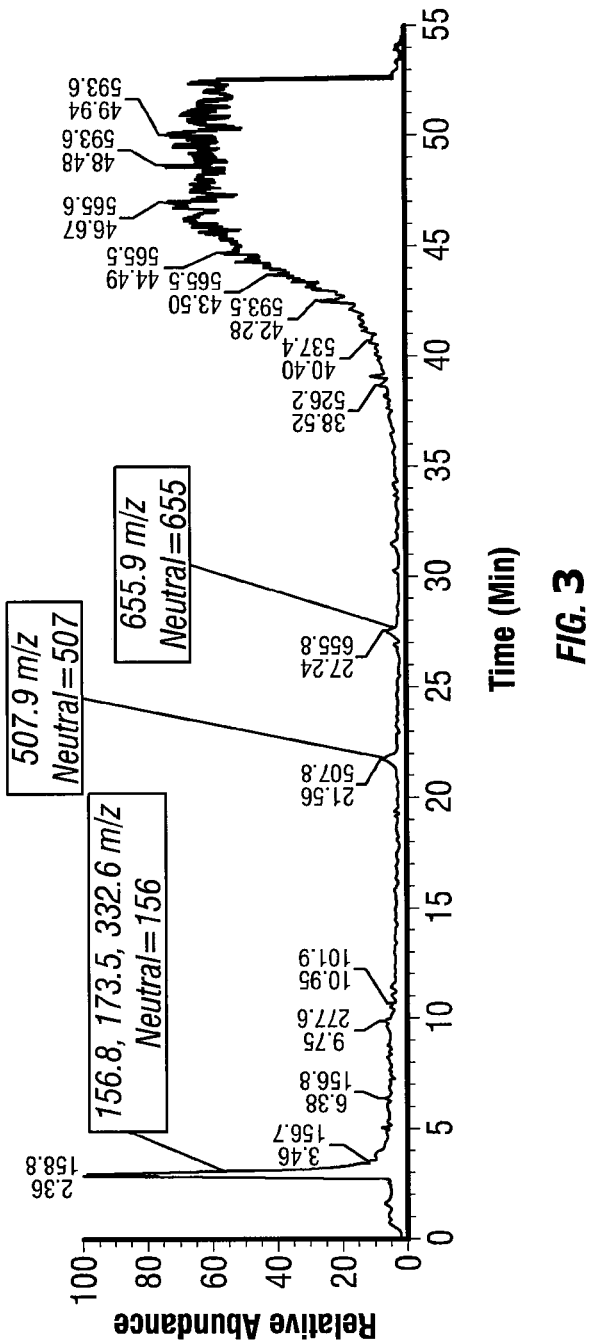
FIG. 3 details liquid chromatography-mass spectrometry analysis of digested rPET having a MW distribution of 277-656 daltons.
Figure 3:
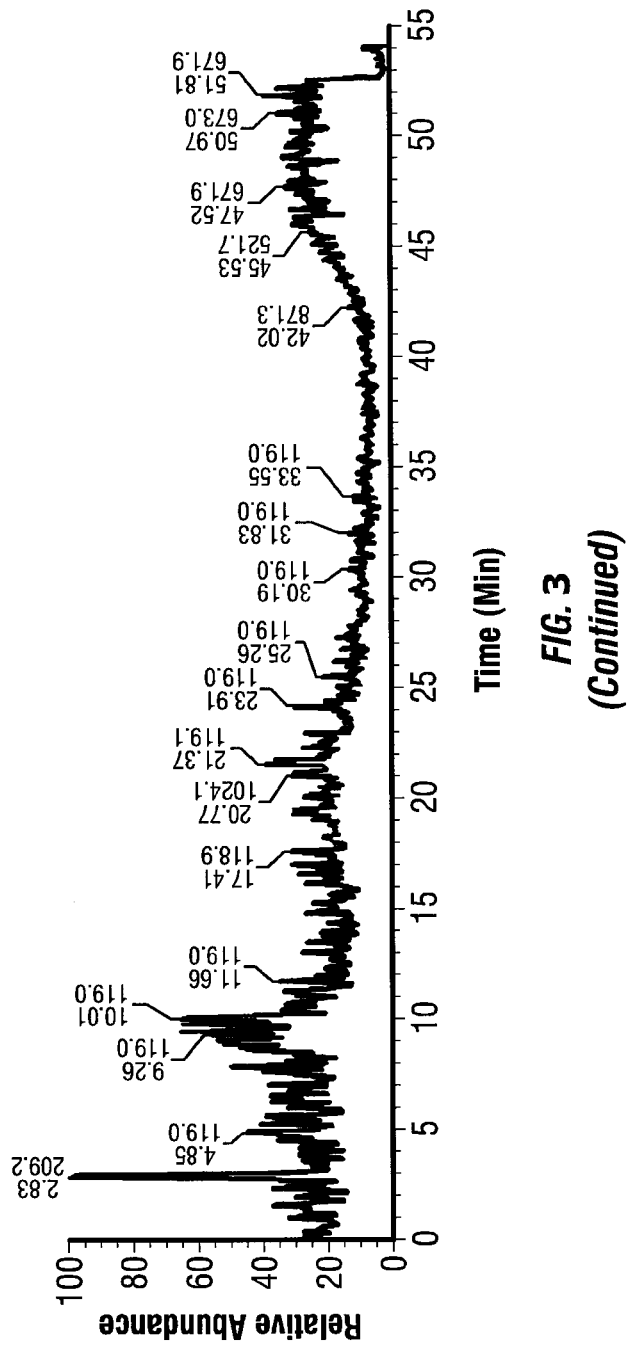
Figure 3:
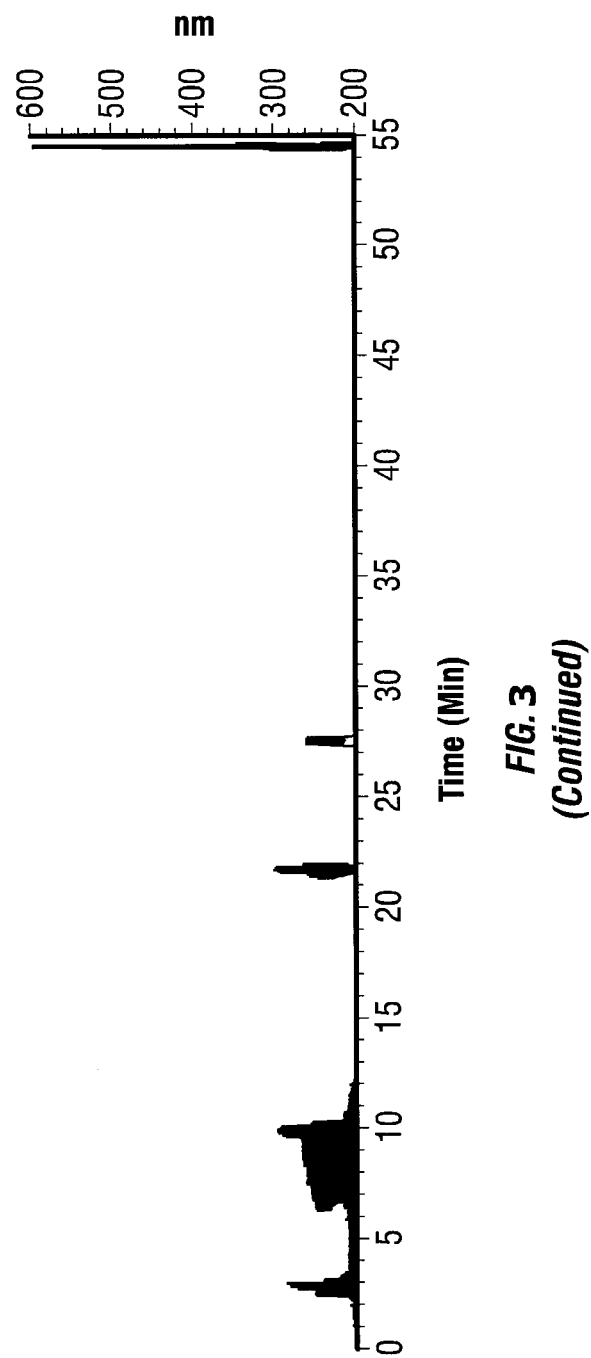
Figure 3:
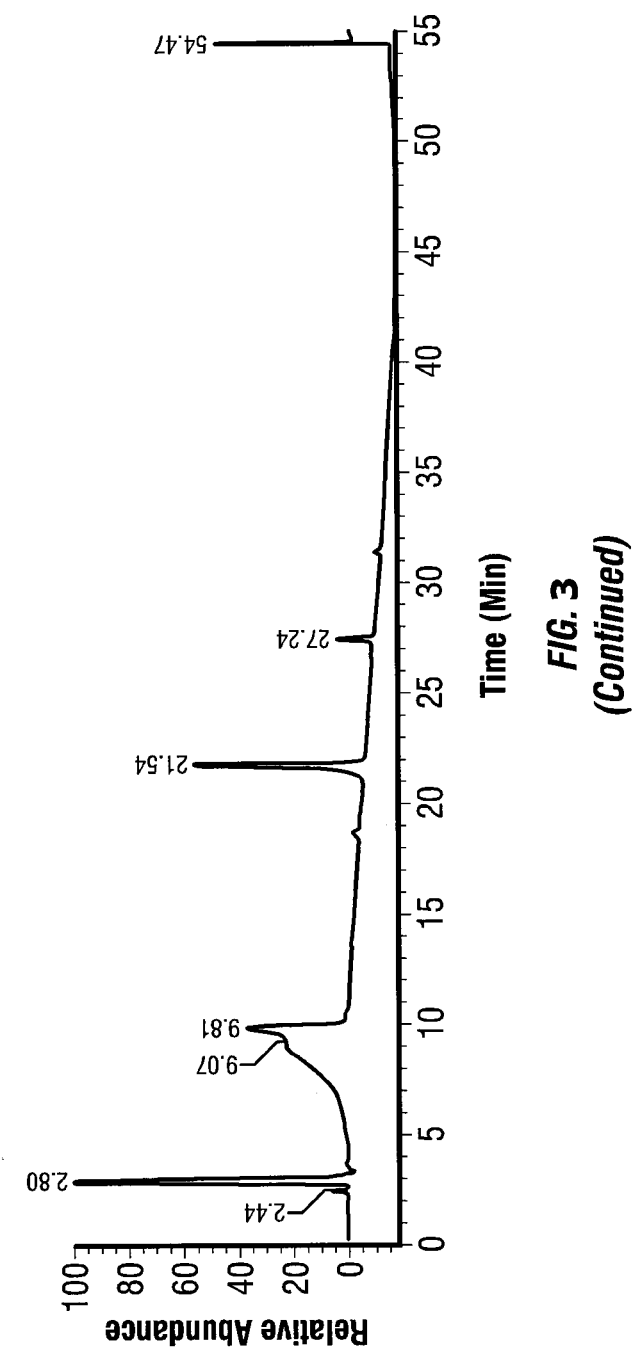
Figure 4:
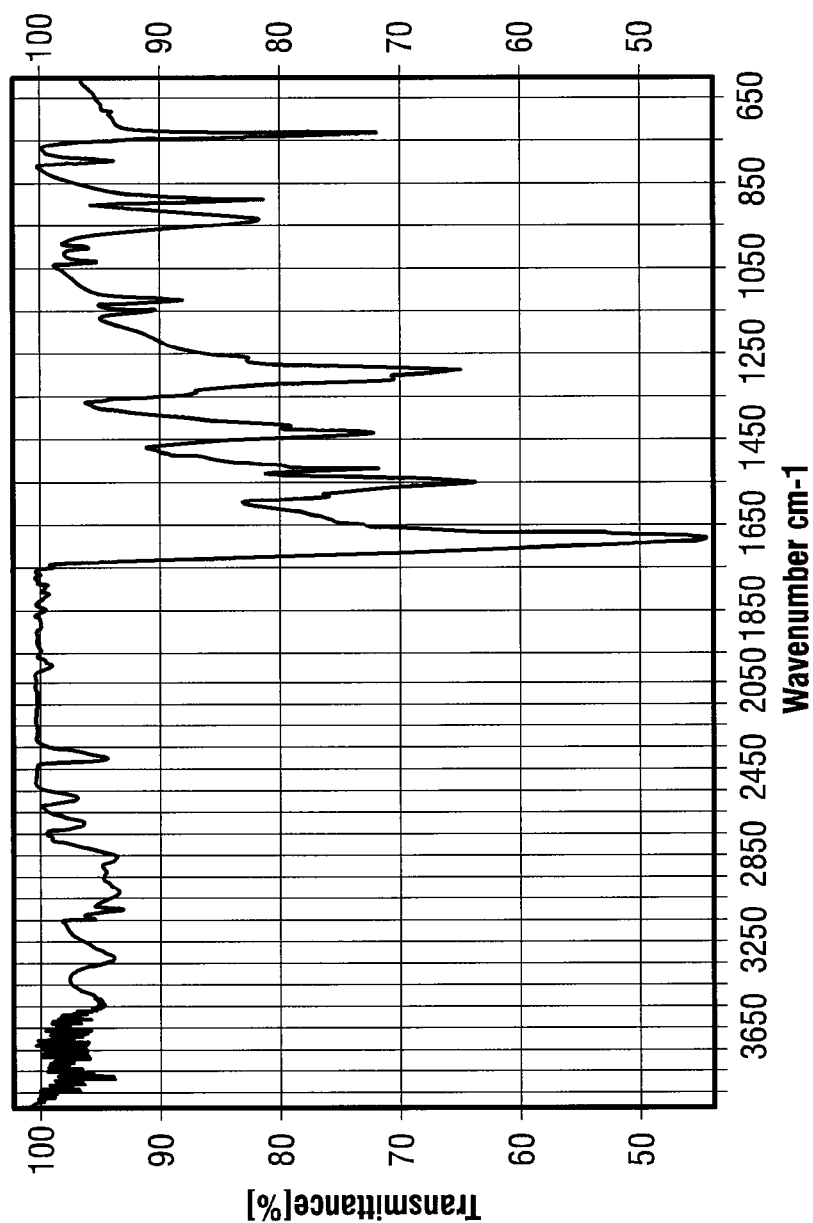
FIG. 4 is a Fourier Transform Infrared Spectroscopy (FTIR)/Hyperion Reflectance analysis of the white precipitate from the first reaction.
Figure 5:
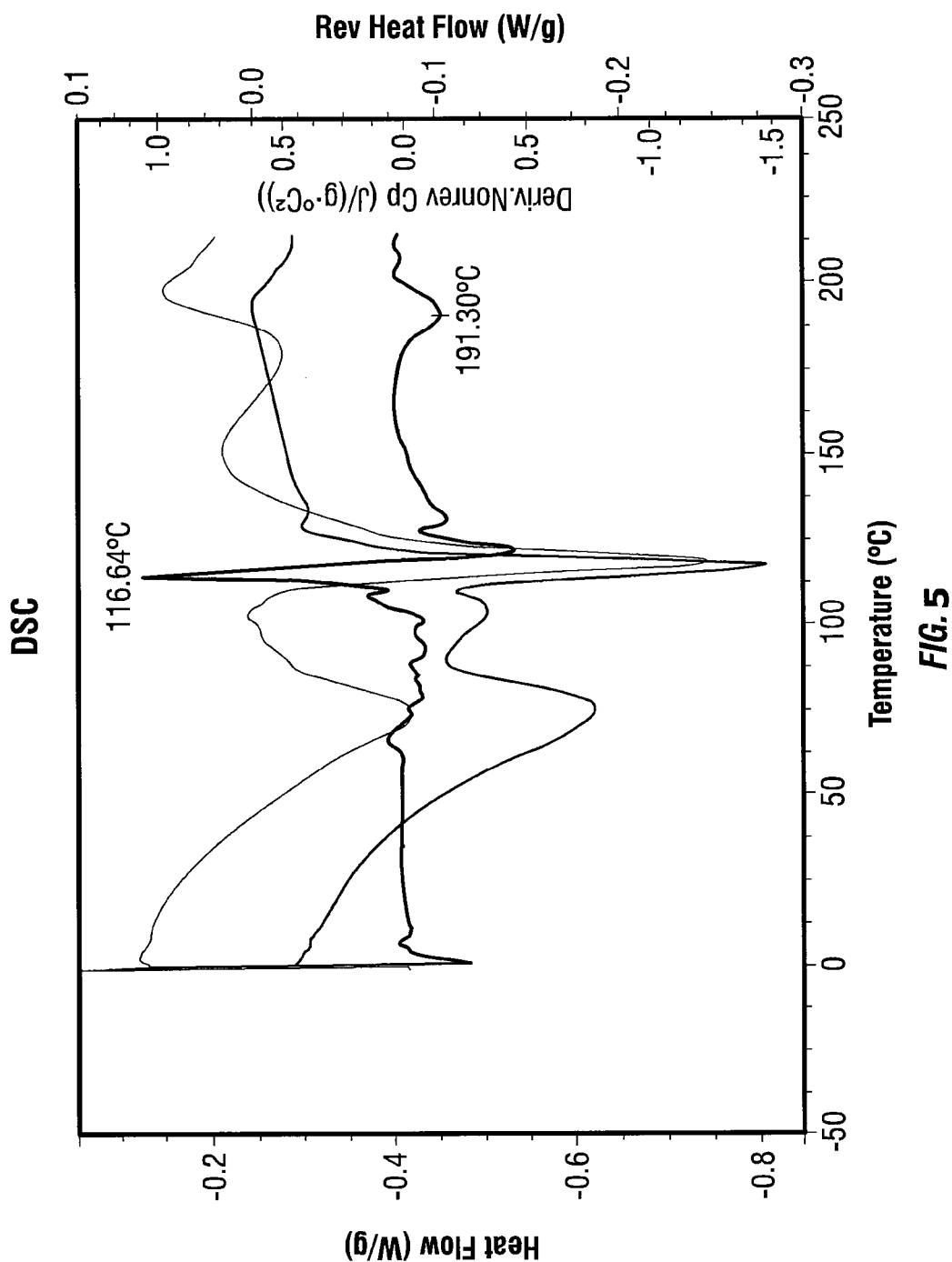
FIG. 5 is an mDSC analysis of the white precipitate from the second reaction. The derivative of the non-reversible capacitance shows copious amounts of reactivity.
Figure 6:
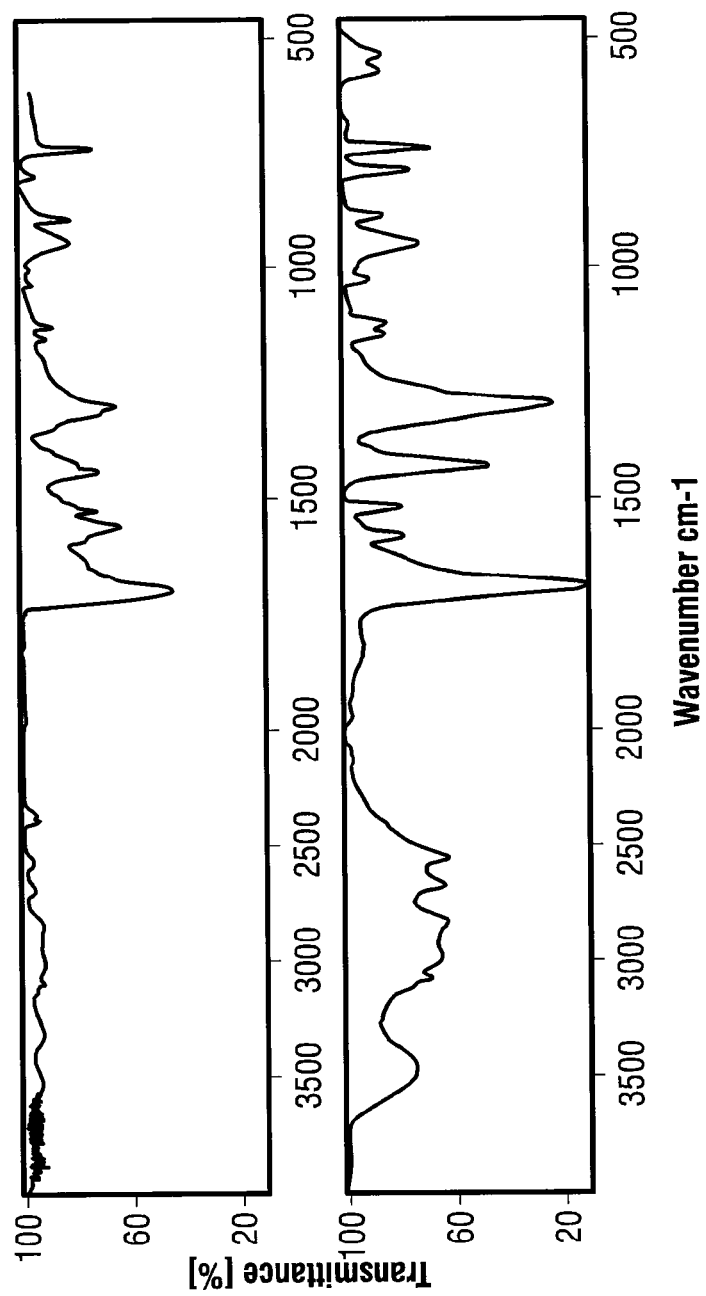
FIG. 6 is a Fourier Transform Infrared Spectroscopy (FTIR)/Hyperion Reflectance library match of FIG. 4. The top spectrum is of the white precipitate shown in FIG. 4, the matching bottom spectrum is Amoco TA-12, Terephthalic Acid.
Figure 7:
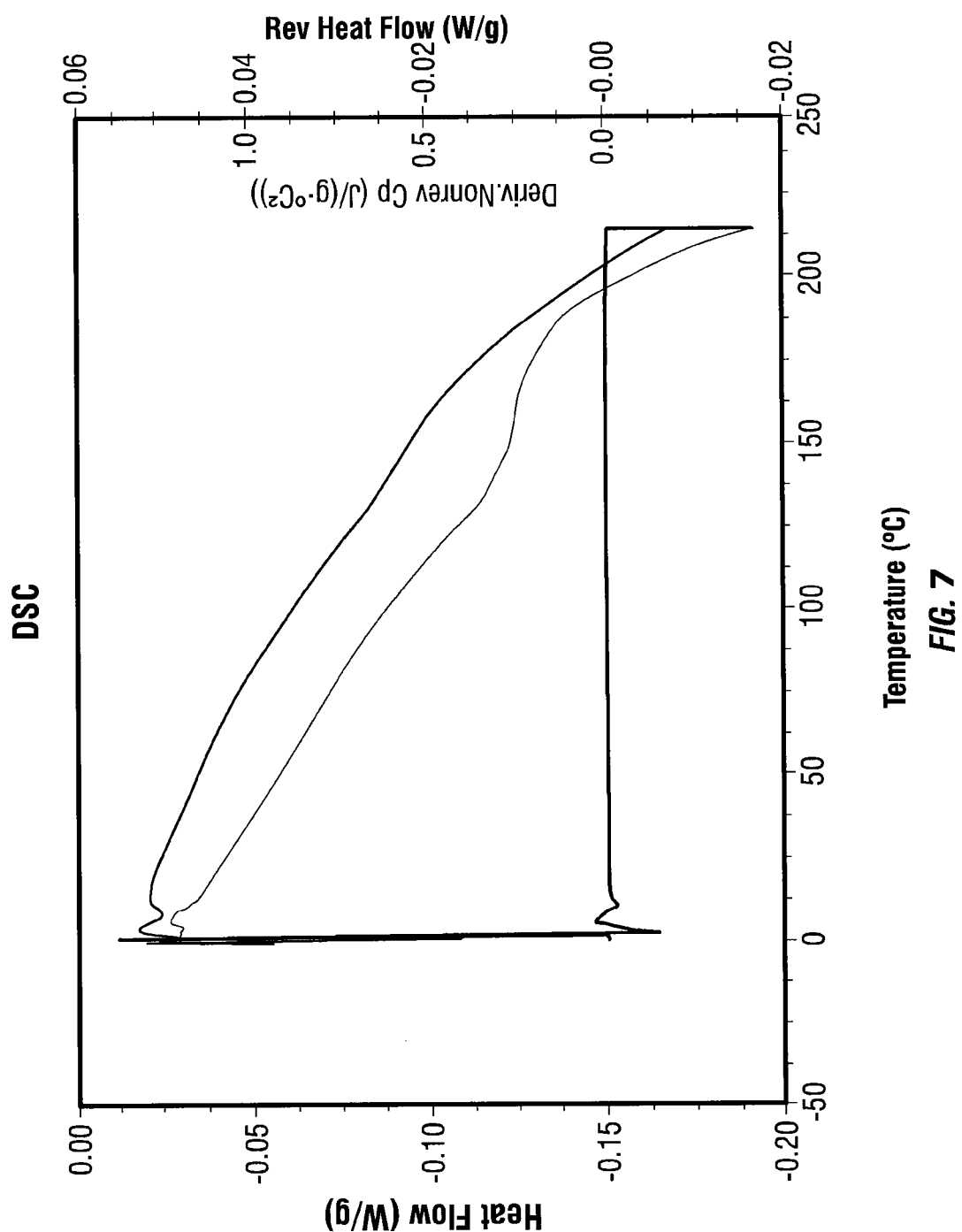
FIG. 7 is an mDSC analysis of the white precipitate from the second reaction. The linear derivative of the non-reversible heat capacitance and reversible heat flow indicates that the white precipitate has reacted completely.
Figure 8:
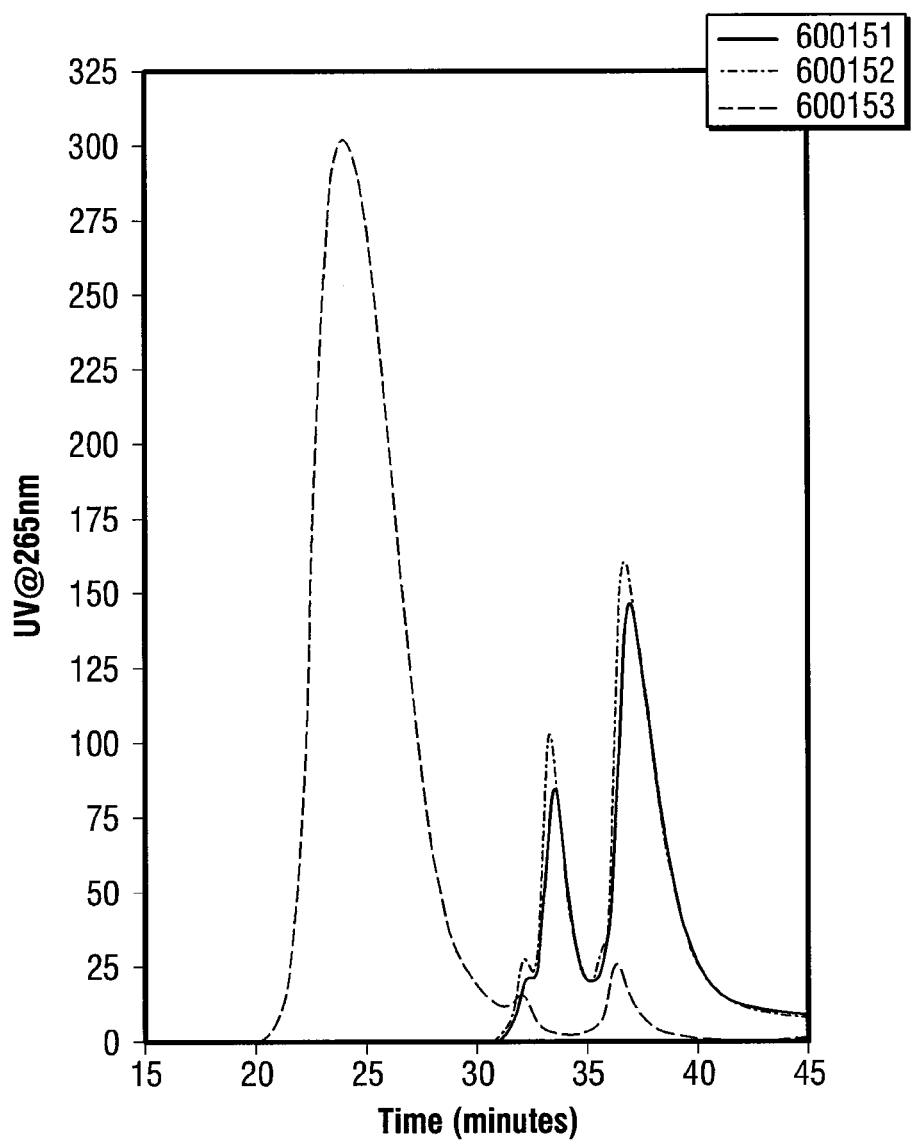
FIG. 8 shows the GPC data that illustrates that the rPET has been digested from a MW of 41,253 to a MW of 338-369 daltons.
Figure 9:
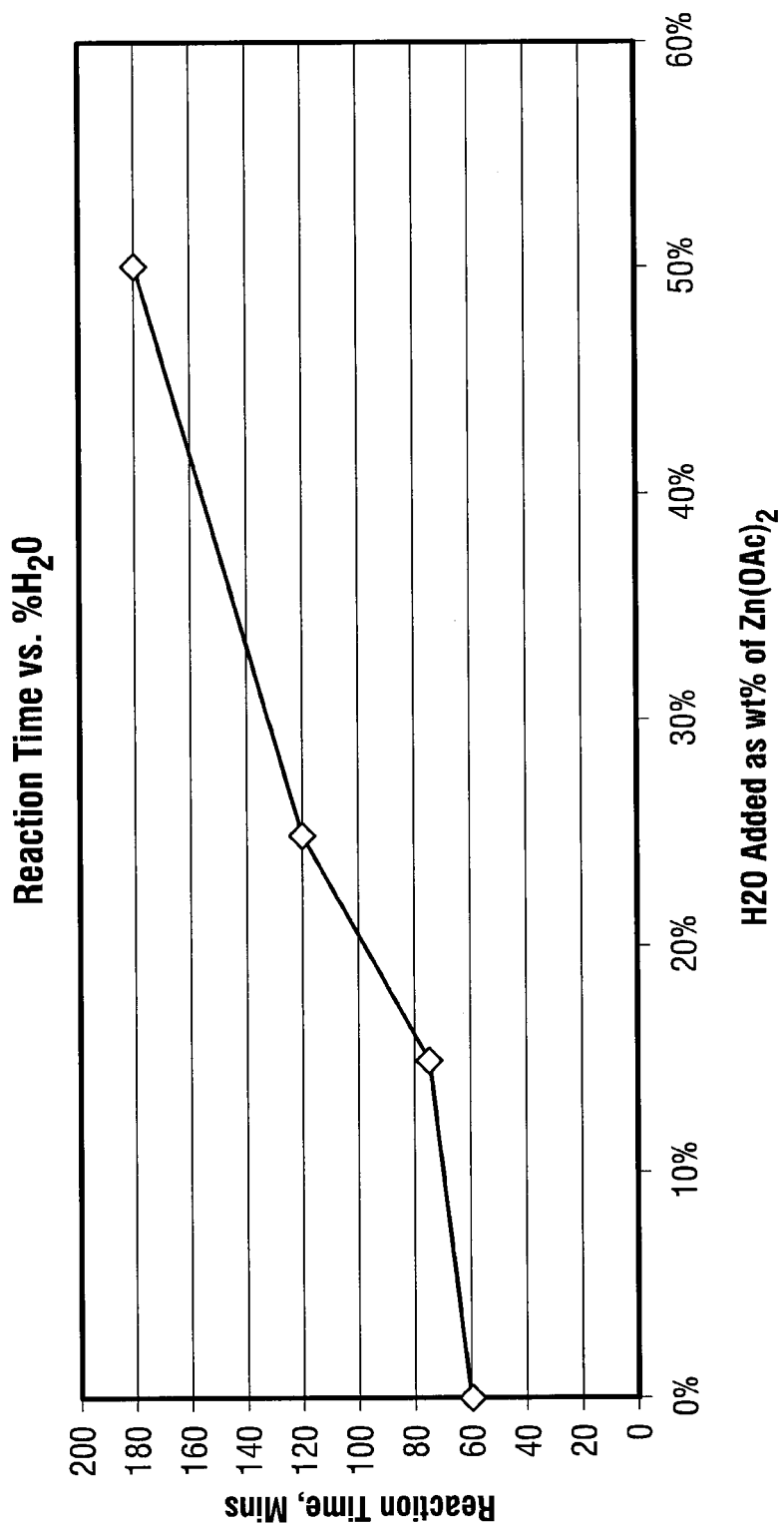
FIG. 9 is a graphical representation of the effect on reaction time by the addition of water.

GPC characterization of the molecular weight distribution was also performed. The white product collected from these reactions was analyzed by LC/MS and Gel Permeation Chromatography to determine the molecular weight distribution of the product mixture. LC/MS analysis of the product (FIG. 2) shows three main peaks in the chromatogram. The first broad peak with a maximum at 9.81 minutes gives a mass to charge ratio consistent with the ionized forms of the trimer species. The second peak having an elution time of 21.54 minutes has a mass to charge ratio of 508. The third and smaller peak eluting at 27.24 minutes has a mass to charge ratio of 656. Although there are other peaks that have much lower UV absorbances, these are the three major, non-solvent peaks presented in the chromatograms. This analysis was repeated on three separate preparations of the material with little to no variability of the results and demonstrates that the molecular weight distribution of the material produced by these reactions is in the range of 277-656 daltons.

As is common for GPC analysis of PET, the samples were analyzed in comparison to polystyrene MW calibration standards. Duplicate preparations of the digested rPET were analyzed. The results are listed in Table 4:

TABLE 4

|  | Mn | MW | Mz | Mp | Polydispersity |
| --- | --- | --- | --- | --- | --- |
| Undigested Scrap PET | 11,802 | 41,253 | 72,290 | 42,204 | 3.50 |
| Digested PET | 282 | 338 | 417 | 300 | 1.20 |
| Duplicate preparation | 304 | 369 | 461 | 334 | 1.21 |

As shown in Table 4, the molecular weight of the rPET has been reduced from an MW of 41,253 to an MW of 338-369 Daltons. The very low polydispersity values of 1.20 and 1.21 indicate that the material is highly uniform in its molecular weight distribution. Further, the high level of agreement in the two preparations of material indicates that the procedure is repeatable and consistent. The GPC results are also in strong agreement with the LC/MS data that shows the largest peak for oligomers in the range of 277 Daltons and smaller contributions for those in the 508 and 656 Dalton ranges.

Additional experiments were conducted to determine additional boundaries of the experimental design and the differentiation/production of rPET oligomers having differing molecular weights, the use of different sources and types of rPET as well as reaction kinetics and parameters. The variables studied were: (1) lowering the ratio of ethylene glycol to rPET, (2) the addition of water to the reaction, (3) differing amounts of catalyst used, (4) the use of additives, (5) the reaction time, (6) the reaction temperature, and (7) the use of mixed digestions (i.e., green and clear rPET).

While the foregoing has been described in conjunction with rPET (i.e., recycled polyethylene terephthalate), it is contemplated and has been experimentally determined (as shown hereafter) that virgin PET (vPET—i.e., polyethylene terephthalate that has not previously been molded into a product, a previously molded PET product that has not been commercially used, a previously molded PET product that has been used to hold a product or act as packaging but has not been put into commercial streams of commerce, combinations of the above, etc.) can be used in the described methods. As such, the term rPET should be understood as encompassing polyethylene terephthalate material having a recycled content of from 0% to 100% and still be within the scope of the described and claimed invention(s) herein.

Digestion of Virgin PET (Experimental Designator: 749-114): A 1 L, 4-neck flask was equipped with a mechanical stirrer, thermocouple, condenser and stopper. Neopentyl glycol (129.3 g, Aldrich 538256 lot#07304DHV) was added to the flask and melted. All of the solids dissolved when the flask was at 95° C. (internal temperature). Zinc acetate dihydrate (3.85 g, Alfa Aesar 11559, lot #C11W013) was added in one portion. The temperature was increased to 135° C. and virgin PET (i.e., vPET—240 g, Poly Sciences 04301 lot #46418) was added in portions over a 15 min period. The temperature was raised to 200° C. and held for 4.5 h. The pellets dissolved to give a slightly hazy solution—i.e., dPET obtained from a reaction of vPET. The resulting dPET from vPET was observed to have a hydroxyl number of 354 (over an average of three determinations) which corresponds to 6.31 mmol/g, while the viscosity was measured to be 1416 centipoise (cP) at 80° C. GPC data indicated that the resulting dPET from vPET had an average MW of 1237 and the resulting chromatograph was similar to dPET from a rPET source that was digested in a similar manner. Overall, the data for virgin digested material was consistent with material prepared from recycled PET using the same stoichiometry.

Scaling of rPET Digestion Reactions

In order to examine the ability of the rPET digestion to be scaled to commercial production scale, a series of experiments were conducted to approximate such commercial conditions.

Experimental Designator 188-73: A 22 L 4-neck flask was fitted with a Teflon stir blade connected to a high-torque overhead stirrer, thermocouple and condenser. Neopentyl glycol (3651 g, 35 mol Aldrich 538256-3KG Lot 10134519) was added to the flask and melted at 145° C. Zinc acetate dihydrate (109 g, 0.5 mol Alfa Aesar 11559 Lot A13U005) was added in portions over 2 min. Recycled PET (6743 g, 35 mol on the basis of the monomer, green pellets) were added in portions over 1 h 40 min as the set point of the temperature controller was increased to 200° C. after the final addition of rPET. The temperature was held at 200° C. until all of the pellets dissolved (approximately 4.7 h). After all of the pellets of rPET had dissolved, the solution was allowed to cool and the resulting product was packaged at approximately 72° C. Approximately 10.5 kg of digested PET product was produced.

Experimental Designator 749-74: A 22 L 4-neck flask was fitted with a Teflon stir blade connected to a high-torque overhead stirrer, thermocouple, stopper and condenser. Neopentyl glycol (3651 g, 35 mol Aldrich 538256-3KG Lot 07304DHV) was added to the flask and melted at 155° C. Zinc acetate dihydrate (109 g, 0.5 mol Alfa Aesar 11559 Lot A13U005) was added in portions over 2 min. Recycled PET (6744 g, 35 mol on the basis of the monomer, green pellets) were added in portions over 1 h 15 min. The set point of the temperature controller was increased incrementally to 200° C. The temperature was held at 200° C. until all of the pellets dissolved (approximately 3.75 h). After all of the pellets of rPET had dissolved, the solution was allowed to cool and packaged at approximately 80° C. Approximately 10.5 kg of digested PET product was produced and GPC indicated an average MW of 1389. As used herein, the term "molecular weight" or "MW" in reference to PET is defined as the peak average molecular weight ($M_p$) as determined by Gel Permeation Chromatography (GPC).

Experimental Designator Lymtal PP: A 175 gallon stainless steel reactor, fitted with a condenser, was charged with neopentyl glycol (399.4 lbs) and heated to 260° F. After the alcohol was melted, zinc acetate dihydrate (11.93 lbs) was added. After it dissolved, green recycled PET (737.7 lbs) was added in equal portions over 30 mins. The temperature was increased to 378° F. over approximately 4 h. The solids required 8 hours at 350 to 378° F. to completely dissolve. Upon cooling to 176° F., approximately 1124 lbs of digested PET product was produced and GPC indicated an average MW of 1386.

Effect of Lowering the Ratio of Ethylene Glycol to rPET for Digestion of the rPET A series of digestion experiments were performed to study the effect of reducing the relative amount of ethylene glycol used in the rPET digestions. Reactions were set up in 1 L round bottom flasks with a mechanical stirrer, thermocouple, temperature controller, heating mantle and condenser. The flasks were charged with rPET obtained from Clean Tech of Dundee, Mich., ethylene glycol (Aldrich "Reagent Plus" grade, the CoA indicated >99% by GC, no mention of water content in either the CoA or the Product Specification Sheet) and zinc acetate dihydrate. The reaction was performed with both clear and green rPET. The results of these experiments are summarized in Table 5.

TABLE 5

| | Molar ratio | | | | |
|---|---|---|---|---|---|
| Ref. | ethylene glycol | rPET | Zn(OAc)$_2$ | reaction time | Notes |
| 185-2 | 2.79 | 1.00 | 0.014 | 1 h | Clear PET, MP = 733 PI = 1.111 |

TABLE 5-continued

| | Molar ratio | | | | |
|---|---|---|---|---|---|
| Ref. | ethylene glycol | rPET | Zn(OAc)$_2$ | reaction time | Notes |
| 188-7-1 | 2.12 | 1.00 | 0.014 | 30 min | Clear PET, MP = 715 PI = 1.131 |
| 188-1-1 | 2.14 | 1.00 | 0.014 | 1 h | Clear PET, MP = 742 PI = 1.129 |
| 188-5-1 | 2.01 | 1.00 | 0.014 | 35 min | Clear PET, MP = 752 PI = 1.132 |
| 188-10 | 1.73 | 1.00 | 0.014 | 1 h | Clear PET, MP = 731 PI = 1.147 |
| 188-12 | 1.73 | 1.00 | 0.014 | 5 h | Clear PET |
| 188-9 | 1.06 | 1.00 | 0.014 | 13 h | Clear PET |
| 188-17 | 2.79 | 1.00 | 0.014 | 57 min | Green PET: MW 715, 1091, 1430 |
| 188-18-1 | 1.50 | 1.00 | 0.014 | 51 min | Green PET: MW 684, 1048, 1336 |
| 188-18-2 | 1.00 | 1.00 | 0.014 | 24 min | Green PET: MW 701, 1082, 1386 |

The digestion experiments with clear rPET showed a general trend of longer reaction times when decreasing amounts of ethylene glycol was used. The digestion experiments with green rPET showed a general trend of a faster reaction rate with decreasing amounts of ethylene glycol.

GPC analyses were performed on the green rPET digestions. The data showed that the molecular weight distributions were consistent, regardless of whether or not clear or green rPET was used. It was also observed that the differences in the amount of ethylene glycol used in this series of reactions appeared to have a minimal impact on MW distribution. The differences in the physical characteristics of the product were more pronounced, i.e., reducing the amount of ethylene glycol produced a less waxy solid digested rPET, for example.

Further efforts towards lowering the amount of ethylene glycol required to digest the rPET were also performed. For example, the use of additives to facilitate mixing was studied. Reactions were performed with 155 g clear rPET, 30 mL ethylene glycol and either (a) 30 g of predigested rPET material from sample Ref. No. 188-5, or (b) 30 g of bis(2-hydroxyethyl) terephthalate (BHTA) as additives. Zinc acetate was added to two of the three reactions. The results are summarized in Table 6.

TABLE 6

| | molar ratio | | | | | |
|---|---|---|---|---|---|---|
| Ref. | ethylene glycol | Neopental Glycol | rPET | Zn(OAc)$_2$ | other | reaction time |
| 188-13 | 0.67 | 0 | 1.00 | 0.014 | 16% BHTA | 30 min |
| 188-11 | 0.67 | 0 | 1.00 | 0.014 | 16% 188-5 | 12 min |
| 188-14 | 0.67 | 0 | 1.00 | 0 | 16% 188-5 | 33 min |
| 1002-27 Clear rPET flake used | 0 | 1 | 1 | 0 | 0 | 210 min |
| 1002-28 Green rPET pellets used | 0 | 1 | 1 | 0 | 0 | 195 min |

Reactions were also performed with green rPET. In sample Ref. No. 188-19, the reaction pot was charged with 310 g green rPET, 60 mL ethylene glycol, 2.0 g zinc acetate dehydrate and 30 g of predigested rPET product from sample Ref. No. 188-17. The reaction time was 30 min as measured from the time the pot was ≥170° C. until the solids were dissolved. The results are summarized in Table 7.

TABLE 7

| | molar ratio | | | | |
|---|---|---|---|---|---|
| Ref. | ethylene glycol | rPET | Zn(OAc)$_2$ | Other | reaction time |
| 188-19 | 0.67 | 1.00 | 0.006 | 9.7% 188-17 | 30 min |
| 188-20 | 0.67 | 1.00 | 0.014 | 9.7% BHTA | 4.5 h |

Sample Ref. No. 188-20 was similar to sample Ref No. 188-19 except that 30 g of bis(2-hydroxyethyl)terephthalate was the additive instead of predigested rPET of Sample Ref No. 188-17. The time for the reaction to reach completion was for Sample Ref No. 188-20 longer at 4.5 h. It is believed that the bis(2-hydroxyethyl)terephthalate chelated the $Zn^{+2}$ ions thereby increasing the time of the reaction.

These digestion experiments demonstrate that the amount of ethylene glycol used to digest the rPET material can be demonstrably lowered.

Effect of Adding Water to rPET Digestion

The effect of adding water to the digestion of rPET was studied by running a set of reactions in 1 L round bottom flasks set up as described above for the digestion of rPET with lower amounts of ethylene glycol. The flasks were charged with rPET (obtained from Clean Tech), ethylene glycol (Aldrich "reagent plus" grade, the CoA indicated >99% by GC, no mention of water content in either the CoA or the Product Specification Sheet) and zinc acetate dihydrate. Water was added in the following amounts: 0 mL, 0.75 mL, 1.25 mL and 2.50 mL Quantities and molar ratios of the constituents are shown in Table 8 and the results of the experiments are summarized in Table 9.

TABLE 8

| | MW | quantity, g | mol | Eq |
|---|---|---|---|---|
| Ethylene glycol | 62.07 | 192.0 | 3.09 | 1.93 |
| PET (ester), MW = monomer | 193 | 310.0 | 1.61 | 1.00 |
| zinc acetate | 219.51 | 5.00 | 0.023 | 0.014 |

TABLE 9

| Ref. | % H₂O with respect to Zn(OAc)₂ | Reaction time (min) |
|---|---|---|
| 188-1-1 | 0% | 60 |
| 188-1-3 | 15% | 75 |
| 188-1-2 | 25% | 120 |
| 185-3 | 50% | 180 |

Figure 10:
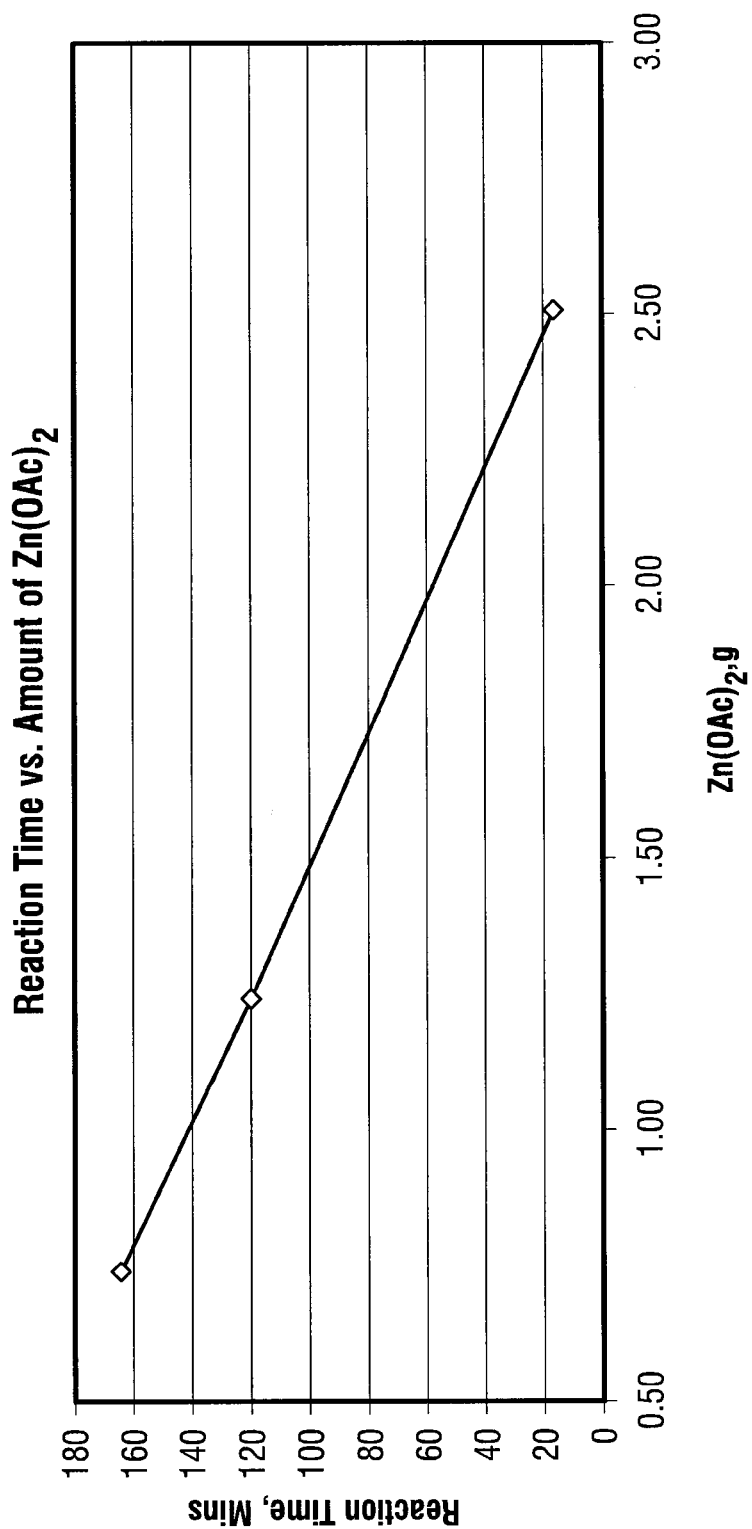
FIG. 10 is a graphical representation of the effect on reaction time by varying the amount of catalyst (i.e., zinc acetate) used in the reaction.

The mixtures were stirred and heated with a set point of 200° C. on the temperature controllers and full power going to the heating mantles. Reaction times were determined from the time when the pot reached a hold temperature of ca. 180-200° C. until a solution formed (solids fully dissolved). The reaction times are shown in Table 9. The data showed that the addition of water inhibited the progress of the reaction and that the greater the amount of water added, the longer the reaction time. FIG. 10 shows the reaction time for digesting rPET as a function of increased percentage water in the reaction mixture.

Effect of Different Amounts of Zinc Acetate Catalyst on the Digestion of rPET

Figure 11:
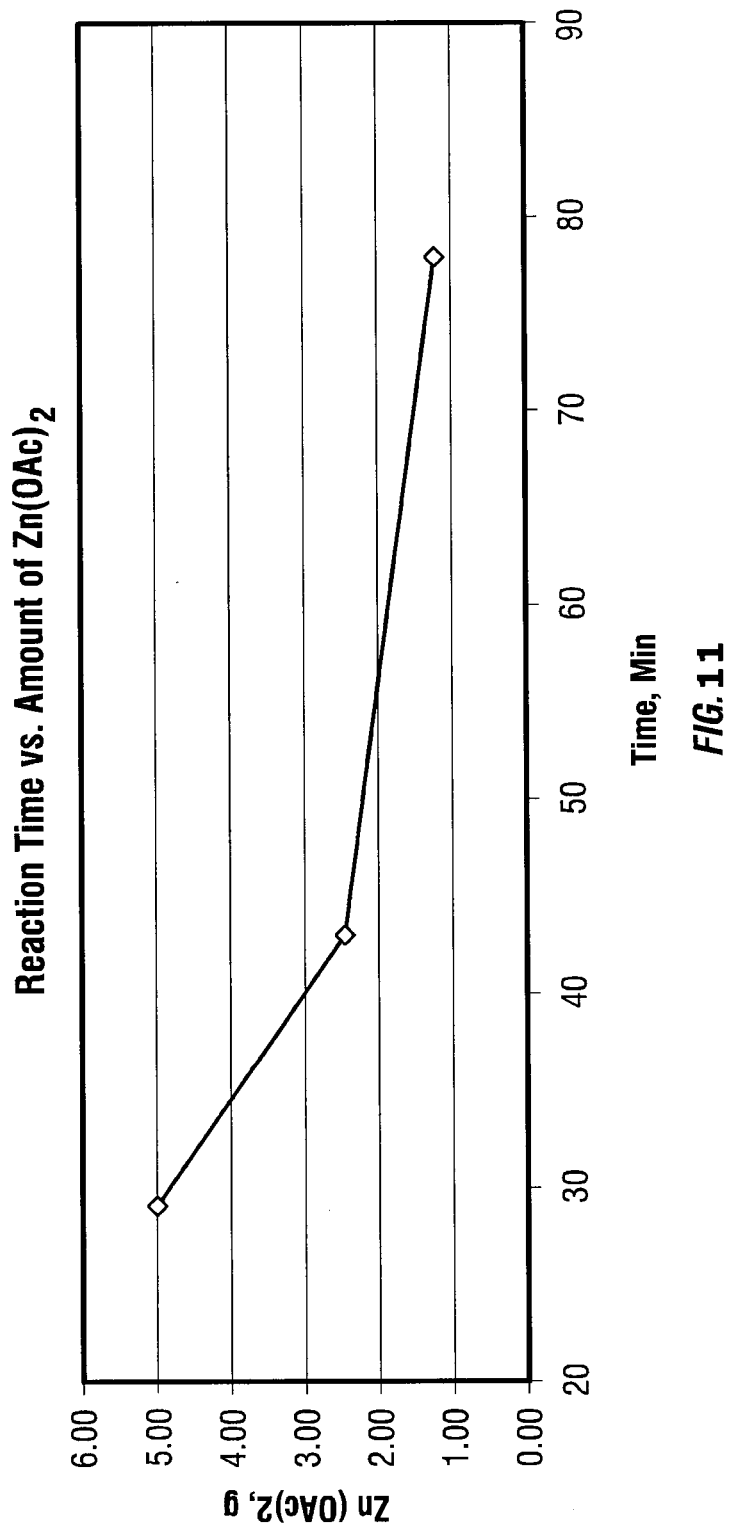
FIG. 11 is a graphical representation of the effect on reaction time versus the amount of catalyst.

A series of reactions were performed with varying amounts of catalyst to determine the time necessary for reaction completion. The experiments were set up in 1 L flasks as described above with respect to the experiments determining the amount of ethylene glycol required, provided: 310 g clear rPET and 180 mL ethylene glycol. The flasks were heated to 180-195° C. with full power setting on the temperature controller. Zinc acetate (Zn(OAc)₂) was prepared as a mixture in ethylene glycol. The quantities were 2.5 g, 1.25 g and 0.75 g in 10 mL ethylene glycol and the mixtures were sonicated for 15-20 min to aid in dissolving the solids. The 2.5 g Zn(OAc)₂ preparation had some insoluble material present. The catalysts were added to the hot reaction mixtures as a bolus. Reaction times for completion, based on consumption of PET (solids fully dissolved), are summarized in Table 10. FIG. 11 shows the reaction time for digesting rPET as a function of the increased amount of catalyst (Zn(OAc)₂) in the reaction mixture.

TABLE 10

| Ref. | Zn(OAc)₂, g | time, min |
|---|---|---|
| 188-3-1 | 2.50 | 16 |
| 188-3-2 | 1.25 | 120 |
| 188-3-3 | 0.75 | 165 |

As can be appreciated from FIG. 11, a linear relationship exists between the amount of catalyst (i.e., zinc acetate) used in the reaction and the reaction time. The reaction rate appeared to be unusually fast when 2.50 g Zn(OAc)₂ was added, i.e., it was shorter than the time observed when twice the amount of catalyst was used in previous experiments. Factors that may have influenced this are the differences between temperature controllers, characteristics of the mantle or predissolving the catalyst in ethylene glycol and adding it to a hot mixture of rPET and ethylene glycol.

In order to determine if predissolving zinc acetate had any effect, the reactions described above were repeated with:
1. 5.0 g zinc acetate slurried in 10 mL ethylene glycol;
2. 1.88 g zinc acetate dissolved in 10 mL ethylene glycol; and
3. 5.0 g zinc acetate added in neat.

The reaction mixtures were heated to 180° C. and the catalyst was added. The results are summarized in Table 11.

TABLE 11

| Ref. | Zn(OAc)₂ | Reaction time, min |
|---|---|---|
| 188-5-1 | 5.00 g in 10 mL ethylene glycol | 38 |
| 188-5-2 | 1.88 g in 10 mL ethylene glycol | 130 |
| 188-5-3 | 5.00 g added neat | 65 |

The reaction time with zinc acetate slurried in ethylene glycol was almost twice as fast as what was observed when the catalyst was used neat. The reaction time for the experiment using 5.0 g of zinc acetate was still longer than that observed when 2.5 g zinc acetate was used. This can probably be attributed to differences in equipment and/or atmospheric conditions, for example. As one skilled in the art will appreciate, the reaction time decreases as the amount of catalyst increases.

Figure 12:
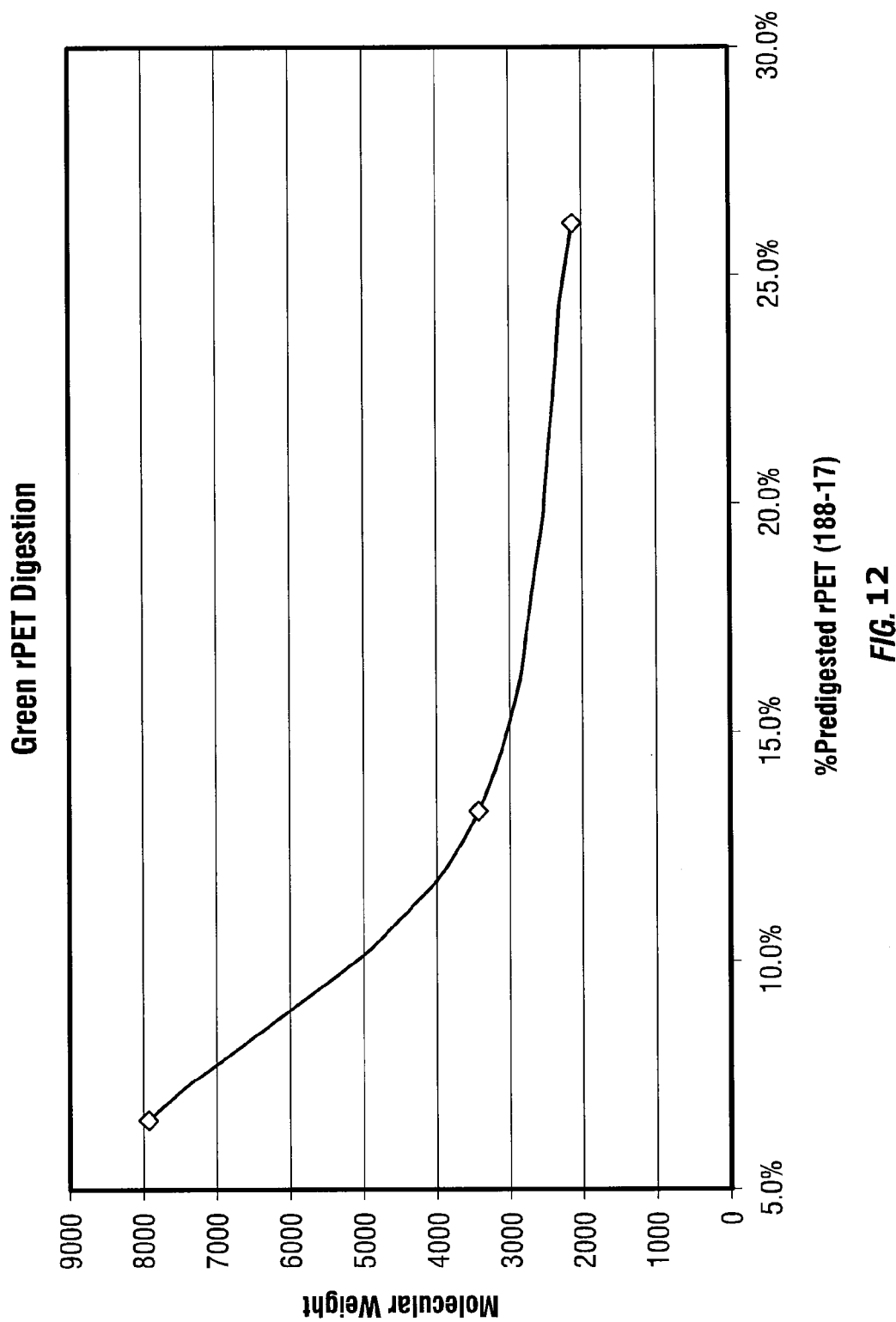
FIG. 12 is a graphical representation of the effect of predigested rPET (Sample Ref. No. 188-17) on the digestion of green rPET.

In an effort to ensure uniformity in the temperature of the pot at the start of the reaction (i.e., the addition of zinc acetate), the series was repeated by refluxing mixtures of rPET and ethylene glycol for approximately 1 h before adding the catalyst. The quantities used and the reaction times are given in Table 12. FIG. 12 graphically displays the results of reaction time versus the amount of Zn(OAc)₂.

TABLE 12

| Ref. | rPET | ethylene glycol | Zn(OAc)₂ | Reaction time, min |
|---|---|---|---|---|
| 188-7-1 | 310 g | 190 mL | 5.00 g | 29 |
| 188-7-2 | 310 g | 190 mL | 2.50 g | 43 |
| 188-7-3 | 310 g | 190 mL | 1.25 g | 78 |

In summary, it was found that decreasing the amount of catalyst resulted in longer reaction times.

Use of Additives: Predigested PET for Digestion of rPET rPET pellets were digested with rPET that had been previously digested in earlier experiments, i.e., the previously digested portions of rPET were investigated for use as a "digesting agent" for the reactions. Using previously digested rPET appears to allow lowering the amount of ethylene glycol necessary for digesting rPET by serving as the "glycolysis" agent, free ethylene glycol can be decreased or omitted from the reaction.

In order to determine the feasibility of such a digesting agent, green colored rPET was treated with an amount of the previously digested rPET material produced in sample Ref. No. 188-17. Two reactions were run with the green rPET pellets and previously digested rPET. A third reaction was run with the addition of zinc acetate to the mixture. The results of these experiments are summarized in Table 13.

TABLE 13

| Ref. | rPET | Predigested PET | additional Zn(OAc)$_2$ | reaction temp, °C. | reaction time | Mp | PI |
|---|---|---|---|---|---|---|---|
| 188-22 | 310 g | 50 g | 0 | 185 | 24 min | 3293 | 1.474 |
| 188-23 | 310 g | 50 g | 0 | 160 | 6 h | 3381 | 1.521 |
| 188-24 | 310 g | 50 g | 5.0 g | 165 | 70 min | 3743 | 1.631 |

Sample Ref. No. 188-22 was initially difficult to stir but when predigested rPET melted, mixing became easier. The reaction mixture was heated to 185° C. and went to completion in 24 min (based on rPET dissolving). Sample Ref. No. 188-23 was similar to sample Ref. No. 188-22 but run at 160-165° C. for 6 h. Mixing this reaction was difficult as a crust formed on top of the reaction mixture before all of the pellets dissolved. Therefore, it was required to be periodically broken up with a spatula. Sample Ref. No. 188-24 was similar to Sample Ref No. 188-23 with zinc acetate added. The reaction was heated for 70 min at the end of which the liquid portion was hazy but pellets were not evident. GPC analysis of the reactions showed that the resulting digested rPET material had a molecular weight range of 3293 to 3743. Polydispersity values for the resulting material ranged from 1.474 to 1.631.

Figure 13:
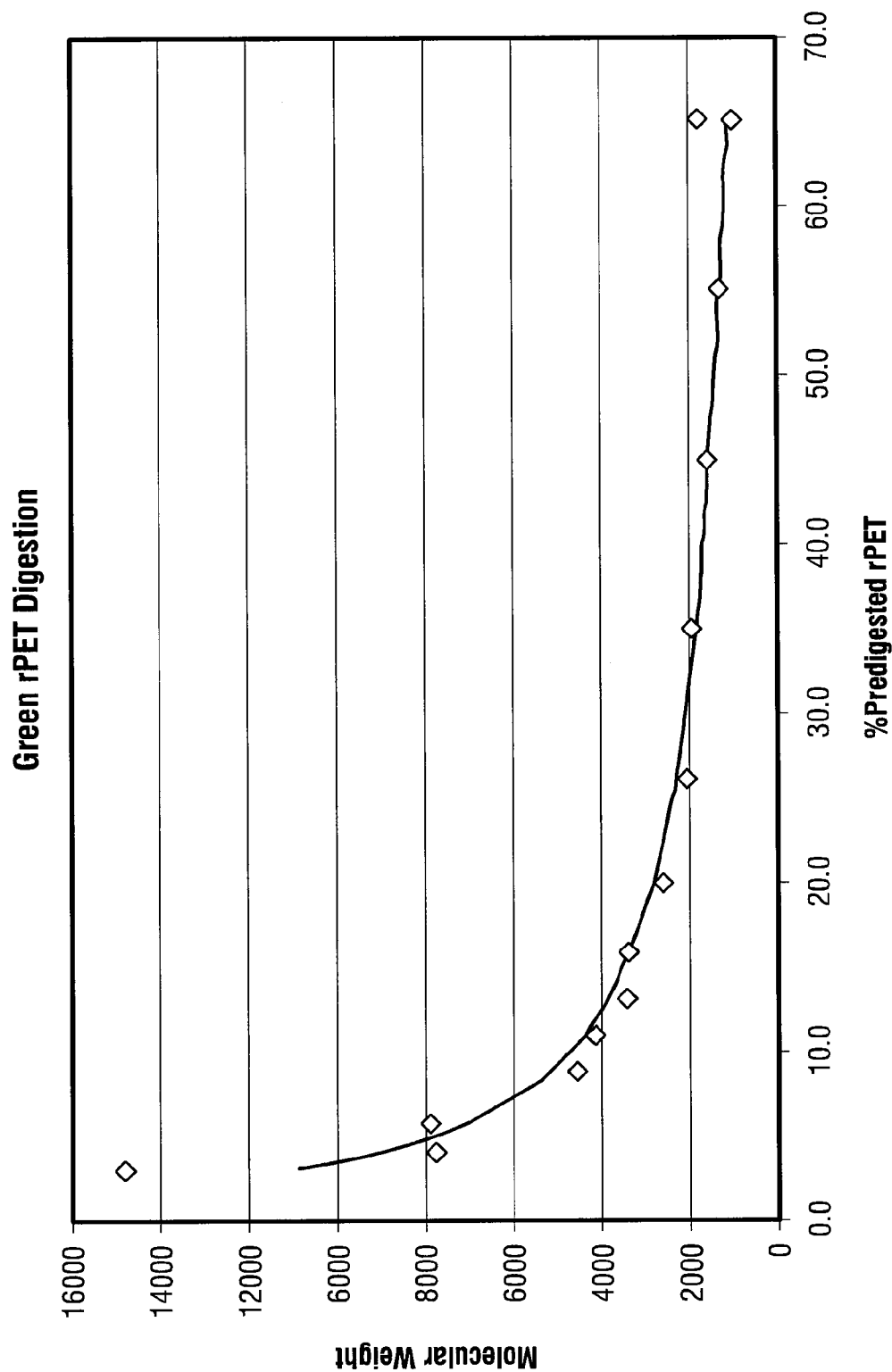
FIG. 13 is a graphical representation of the effect of predigested rPET on the digestion of green rPET.

In order to produce digested rPET with different molecular weight ranges, green rPET was heated with varying amounts of previously digested rPET from Sample Ref. No. 188-17 until a solution formed. The quantities used and GPC data are shown in Table 14. The relationship between the percentage of predigested rPET used (i.e., the "predigesting agent" rPET) and the molecular weight produced in the reaction showed a correlation of lower molecular weight digested rPET products being produced with increasing amounts of predigested rPET material being used as shown in FIG. 13.

TABLE 14

| Ref. | Description | % predigested PET | Mp | PI |
|---|---|---|---|---|
| 188-26 | green, used predigested 188-17 | 26.1% | 2139 | 1.393 |
| 188-27 | green, used predigested 188-17 | 13.2% | 3425 | 1.519 |
| 188-28 | green, used predigested 188-17 | 6.5% | 7921 | 1.770 |

In order to further explore the range of different molecular weight products that can be produced according to the above-discussed methodology, digestions utilizing 3.3% to 65% predigested rPET were performed. Three different lots of predigested rPET were used in these experiments (all three were produced by heating a mixture of 310 g rPET with 250 mL ethylene glycol and 5.0 g zinc acetate). The experiments using varying amounts of predigested PET and GPC results are shown in Table 15 and in FIG. 13a. As shown, digested rPET having molecular weight ranges of 1058 to 14777 were produced.

TABLE 15

| Ref. | Description | % predigested PET | Mp | PI |
|---|---|---|---|---|
| 732-2 | green, used predigested 188-17 | 3.3 | 14777 | 1.908 |
| 733-1 | green, used predigested 188-17 | 4.3 | 7723 | 1.757 |

TABLE 15-continued

| Ref. | Description | % predigested PET | Mp | PI |
|---|---|---|---|---|
| 188-28 | green, used predigested 188-17 | 6.5 | 7921 | 1.770 |
| 733-4 | green, used predigested 188-17 | 9.0 | 4575 | 1.657 |
| 733-5 | green, used predigested 188-17 | 11.0 | 4151 | 1.575 |
| 188-27 | green, used predigested 188-17 | 13.2 | 3452 | 1.519 |
| 188-23 | green, used predigested 188-17 | 16.1 | 3381 | 1.631 |
| 188-29 | green, used predigested 188-17 | 20.0 | 2584 | 1.442 |
| 188-26 | green, used predigested 188-17 | 26.1 | 2139 | 1.393 |
| 733-7 | green, used predigested 734-1 | 35.0 | 1951 | 1.398 |
| 733-9 | green, used predigested 734-1 | 45.0 | 1627 | 1.345 |
| 733-11 | green, used predigested 733-10 | 55.0 | 1307 | 1.301 |
| 733-2 | green, used predigested 734-1 | 65.0 | 1058 | 1.261 |
| 732-4 | green, used predigested 188-17 | 65.2 | 1772 | 1.335 |

Figure 14:
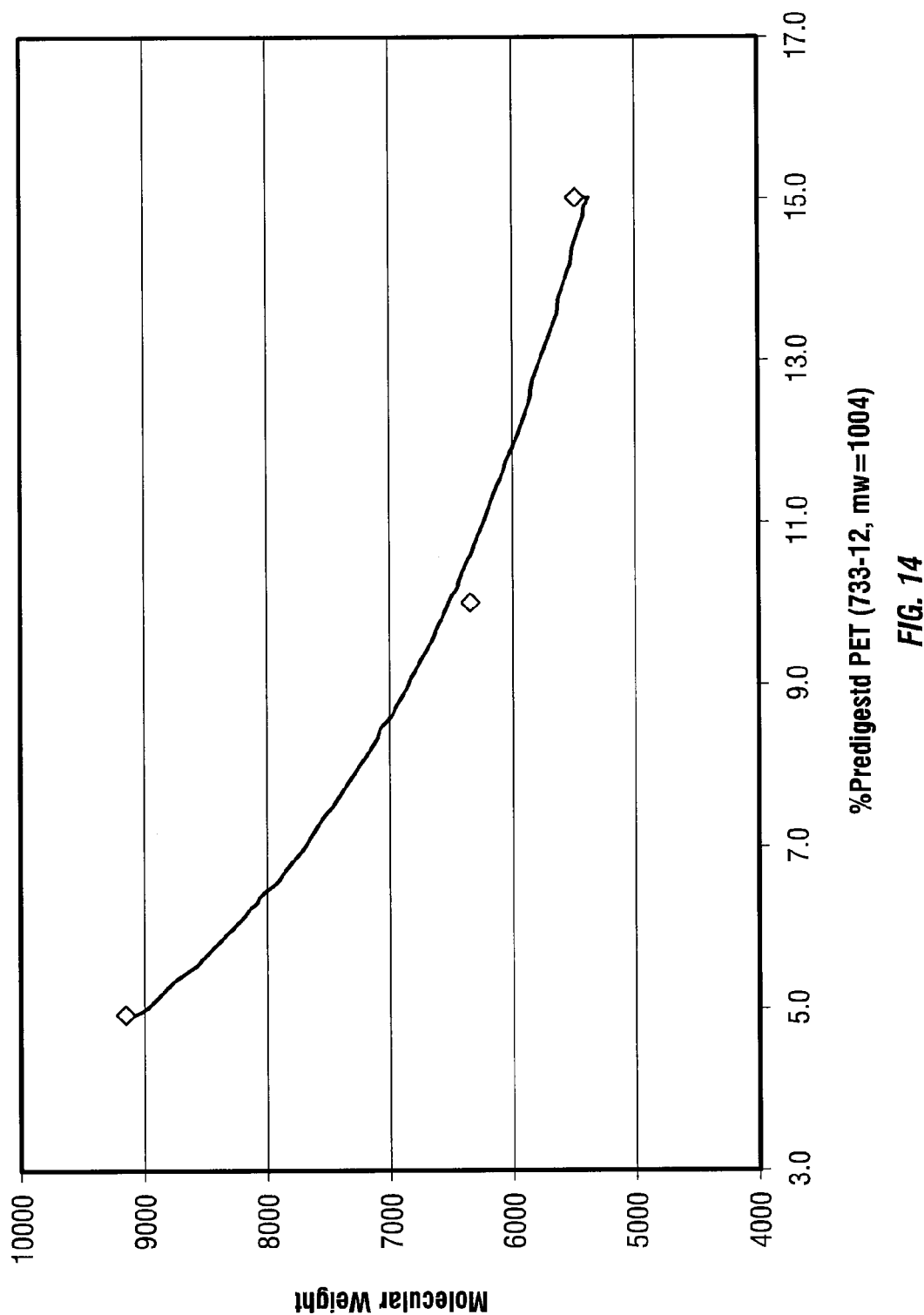
FIG. 14 is a graphical representation of the effect of predigested rPET (Sample Ref. No. 733-12, MW=1004) in a rPET digestion reaction.
Figure 15:
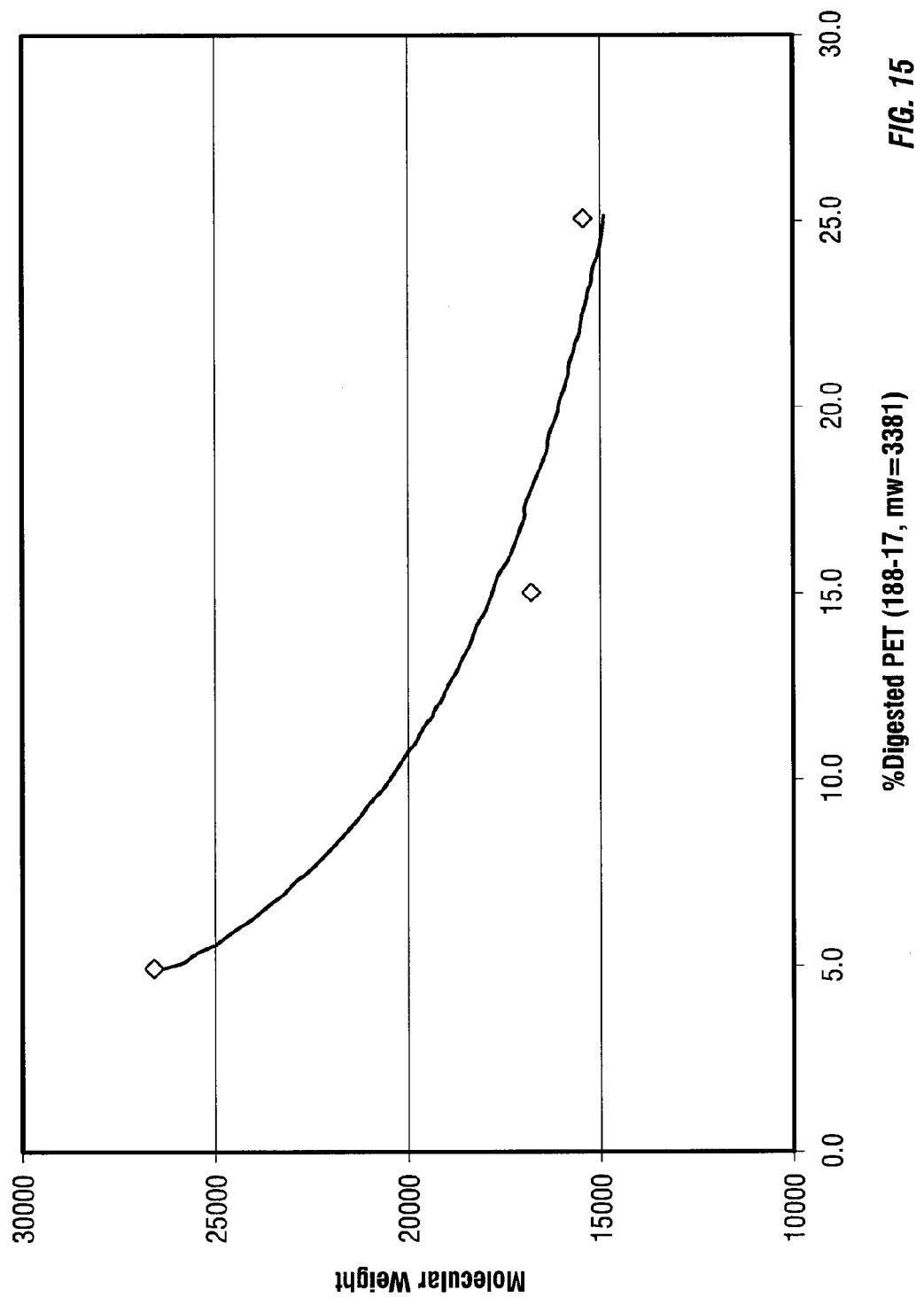
FIG. 15 is a graphical representation of the effect of predigested rPET (Sample Ref. No. 188-17, MW=3381) in a rPET digestion reaction.

Further experiments were conducted in order to produce digested rPET having a higher molecular weight. In the first set of experiments, green rPET was heated with 5%, 10% and 15% predigested green rPET sample Ref. No. 733-12 (MW 1004). In a second set of experiments, rPET was heated with 5%, 15% and 25% predigested green rPET Sample Ref. No. 188-23 (MW 3381). Both sets of experiments showed that higher molecular weight material was produced when decreasing amounts of predigested rPET material were used, e.g., using 5% predigested rPET material having a MW of 3381 produced a digested rPET material having a MW of 26,535, while 5% predigested rPET having a MW of 1004 produced a digested rPET material having a MW of 9,162. The results of these experiments are summarized in Table 16 and FIGS. 14 and 15.

TABLE 16

| Ref. | Description | % predigested PET | Mp | PI |
|---|---|---|---|---|
| 733-15 | green, used predigested 733-12 (MW = 1004) | 5.0 | 9162 | 1.856 |
| 733-14 | green, used predigested 733-12 | 10.0 | 6342 | 1.751 |
| 733-13 | green, used predigested 733-12 | 15.0 | 5492 | 1.679 |
| 732-12 | green, used predigested 188-23 (MW = 3381) | 5.0 | 26535 | 2.261 |
| 732-11 | green, used predigested 188-23 | 15.0 | 16765 | 2.133 |
| 732-10 | green, used predigested 188-23 | 25.0 | 15426 | 2.043 |

Additional experiments were also conducted with clear rPET. Clear rPET was heated with predigested rPET Sample Ref. No. 732-3 (732-3 was produced from 310 g rPET, 250 mL ethylene glycol and 5.0 g zinc acetate dehydrate, heated until a solution formed, GPC analysis of Mp=676, PI=1.103). Table 17 summarizes these results.

TABLE 17

| Ref. | Description | % predigested PET | Line Voltage | Mp | PI |
|---|---|---|---|---|---|
| 732-6 | clear, used predigest 732-3 | 3.3 | 100% | 19271 | 2.148 |
| 732-5 | clear, used predigest 732-3 | 4.3 | 100% | 15176 | 2.080 |
| 732-7 | clear, used predigest 732-3 | 9.0 | 100% | 8717 | 1.809 |
| 733-6 | clear, used predigest 732-3 | 11.0 | 100% | 5348 | 1.646 |
| 732-13 | clear, used predigest 732-3 | 35.0 | 47% | 4600 | 1.639 |
| 732-14 | clear, used predigest 732-3 | 45.0 | 47% | 1598 | 1.329 |
| 732-15 | clear, used predigest 732-3 | 55.0 | 47% | 1297 | 1.306 |

Figure 16:
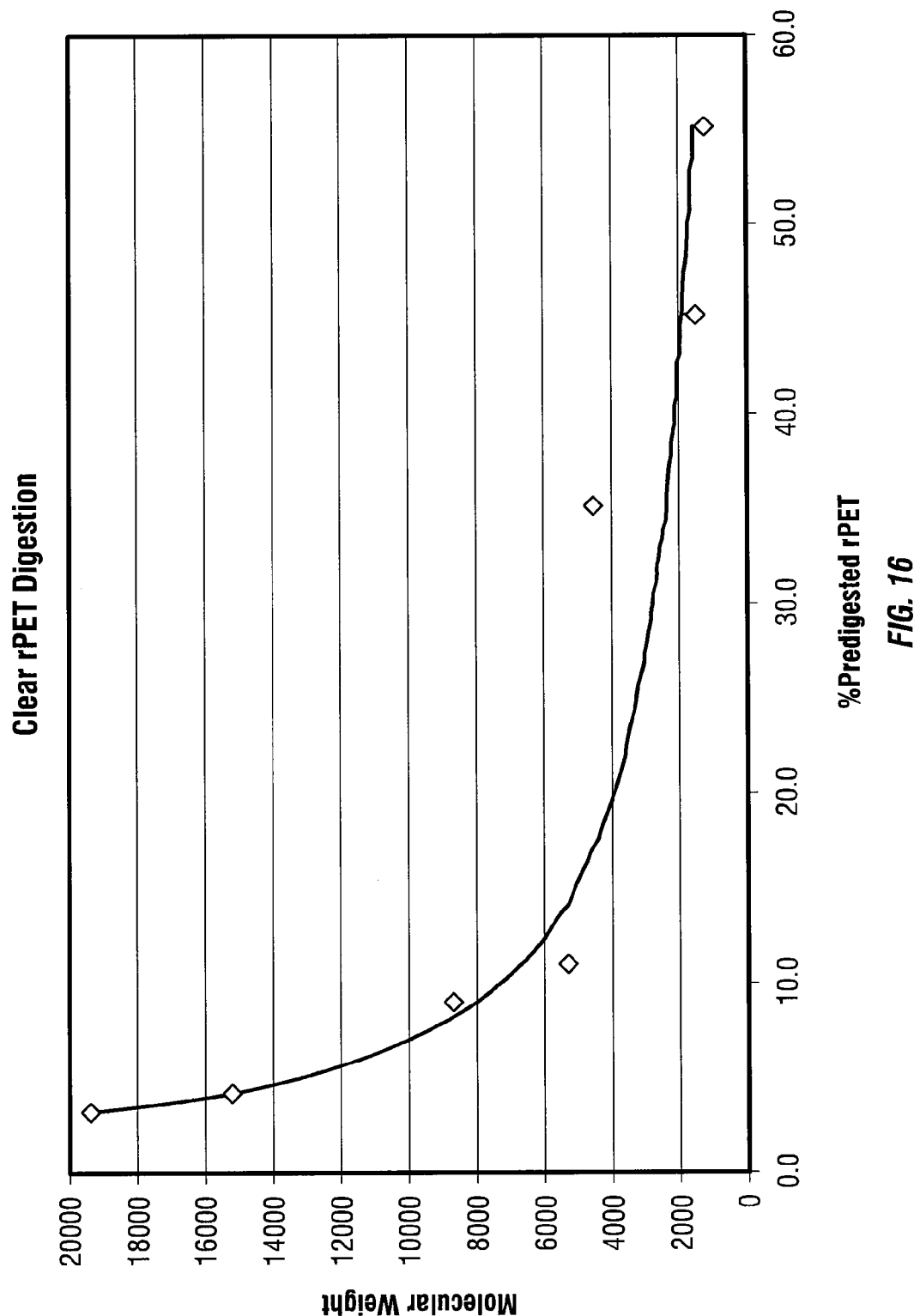
FIG. 16 is a graphical representation of the effect of predigested rPET on a clear rPET digestion.
Figure 17:
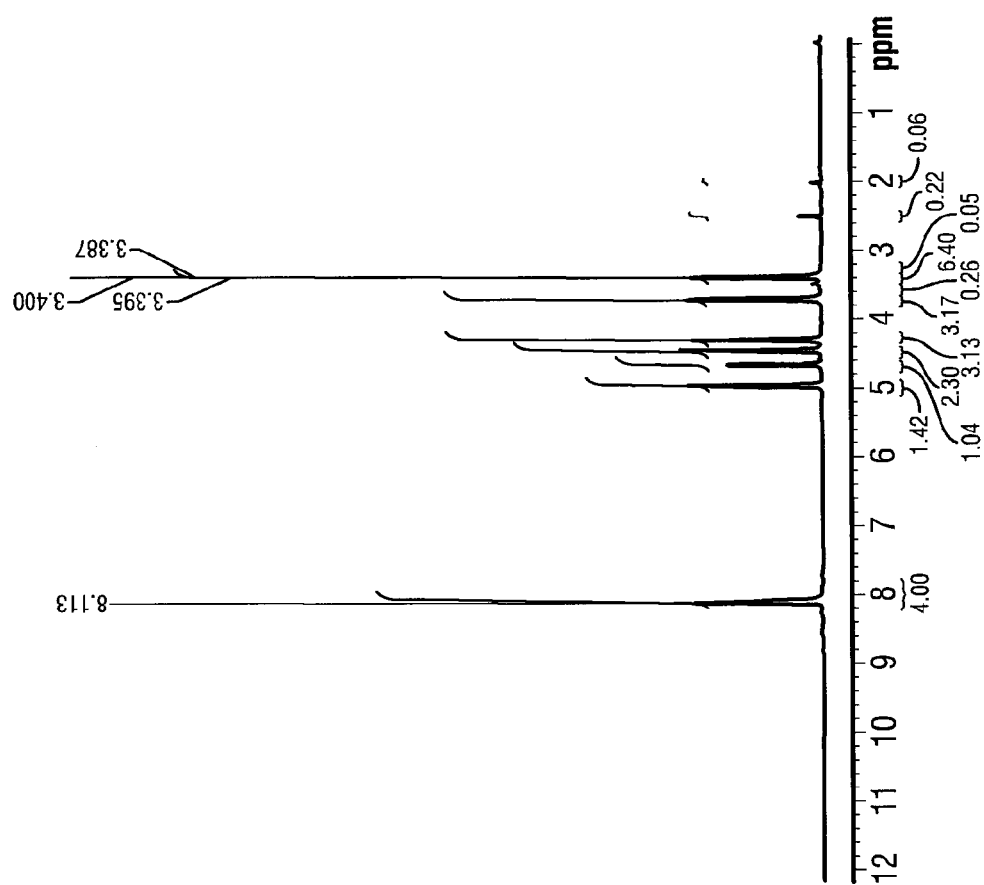
FIG. 17 is a graphical representation of $^1H$ NMR spectra of an isolated white solid obtained in accordance with the present disclosure.
Figure 18:
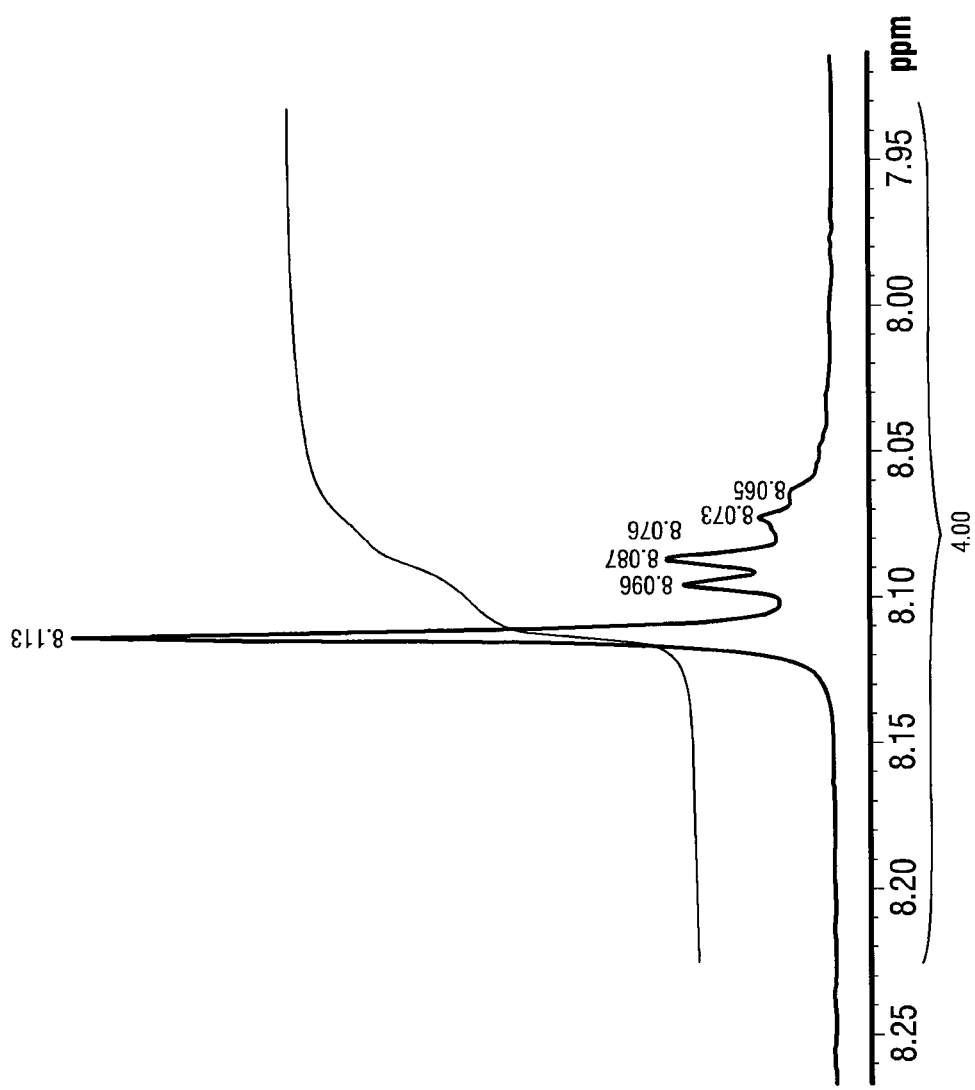
FIG. 18 is a graphical representation of $^1H$ NMR spectra over a 8.0-8.2 ppm range of an isolated white solid obtained in accordance with the present disclosure.
Figure 19:
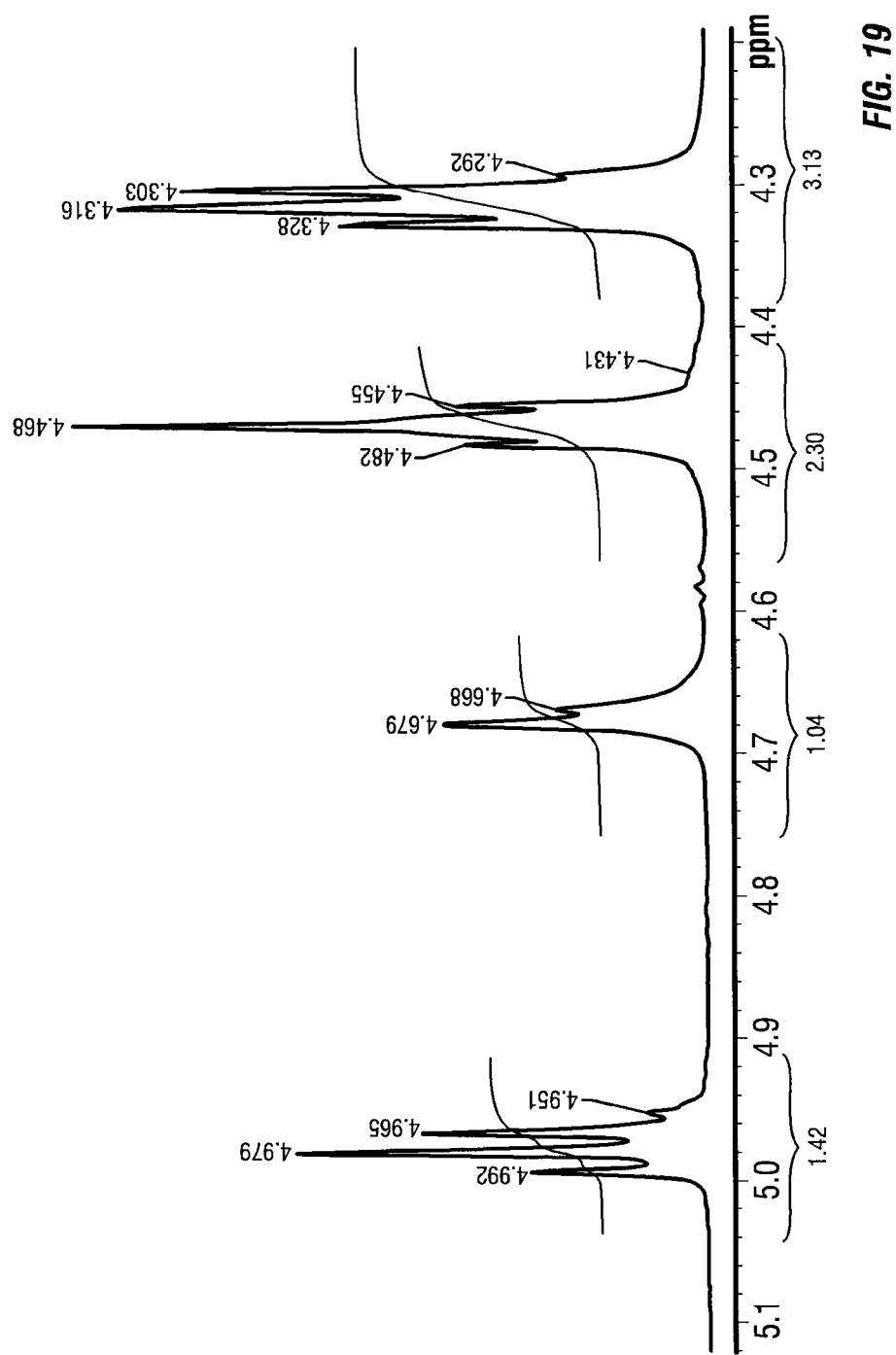
FIG. 19 is a graphical representation of $^1H$ NMR spectra over a 4.2-5.1 ppm range of an isolated white solid obtained in accordance with the present disclosure.
Figure 20:
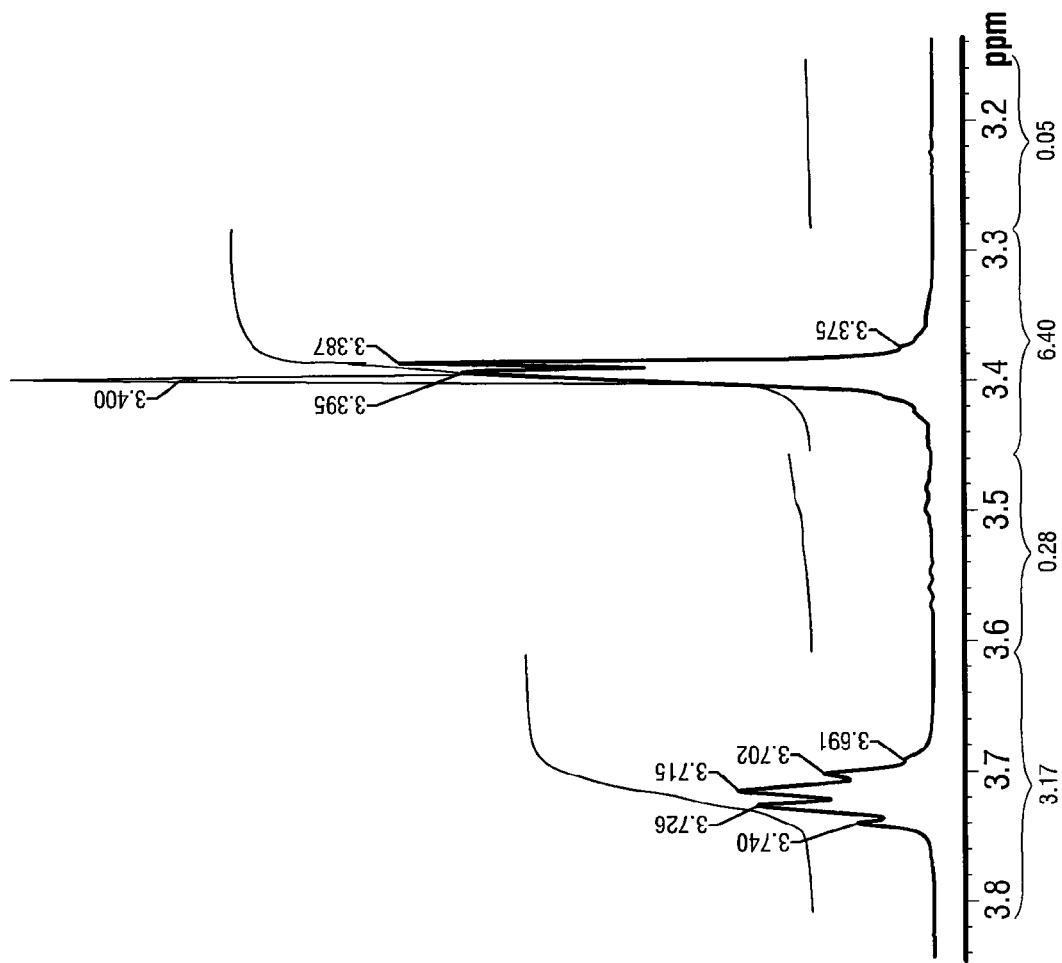
FIG. 20 is a graphical representation of $^1H$ NMR spectra over a 3.2-3.8 ppm range of an isolated white solid obtained in accordance with the present disclosure.
Figure 21:
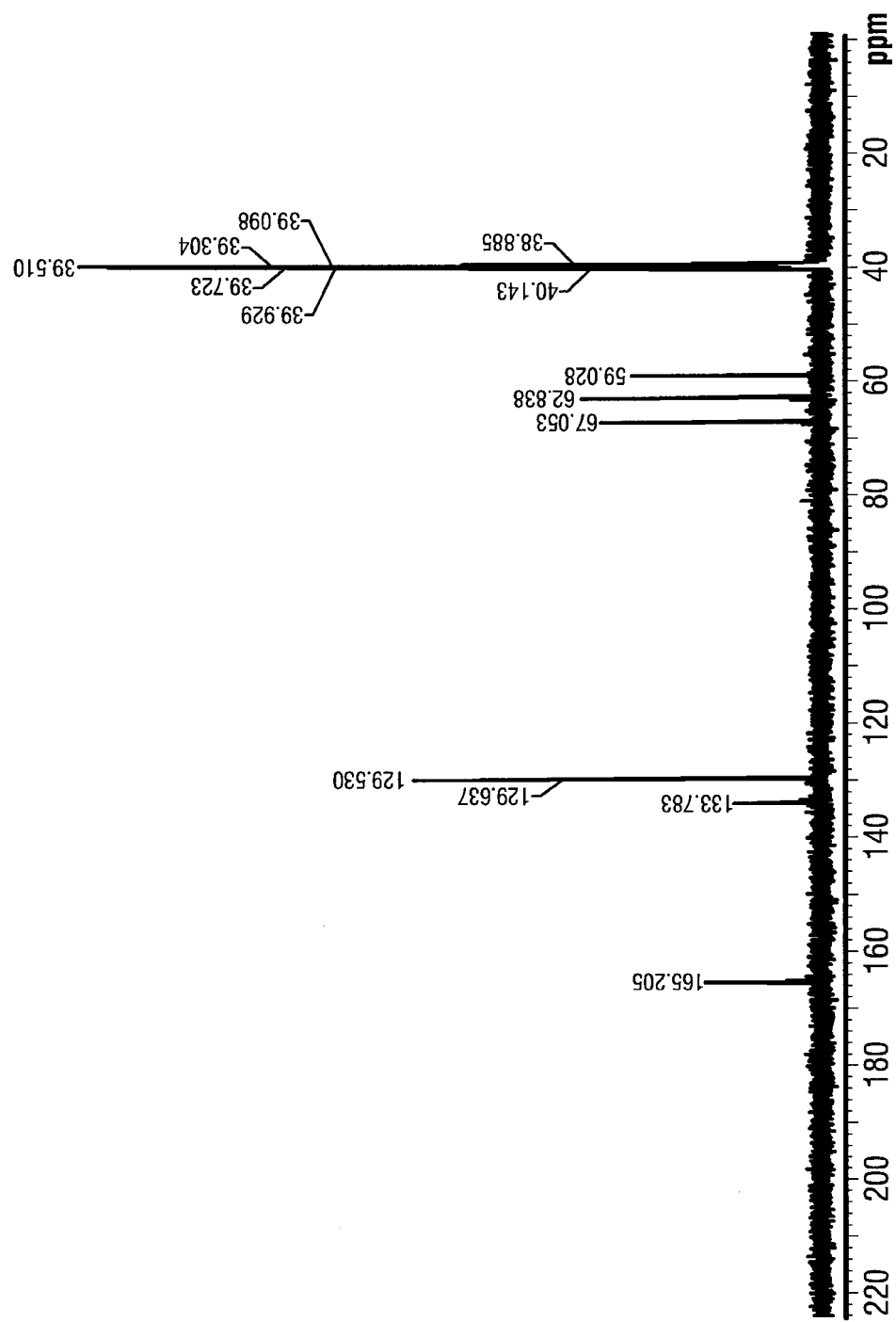
FIG. 21 is a graphical representation of $^{13}C$ NMR spectra over a 0-220 ppm range of an isolated white solid obtained in accordance with the present disclosure.
Figure 22:
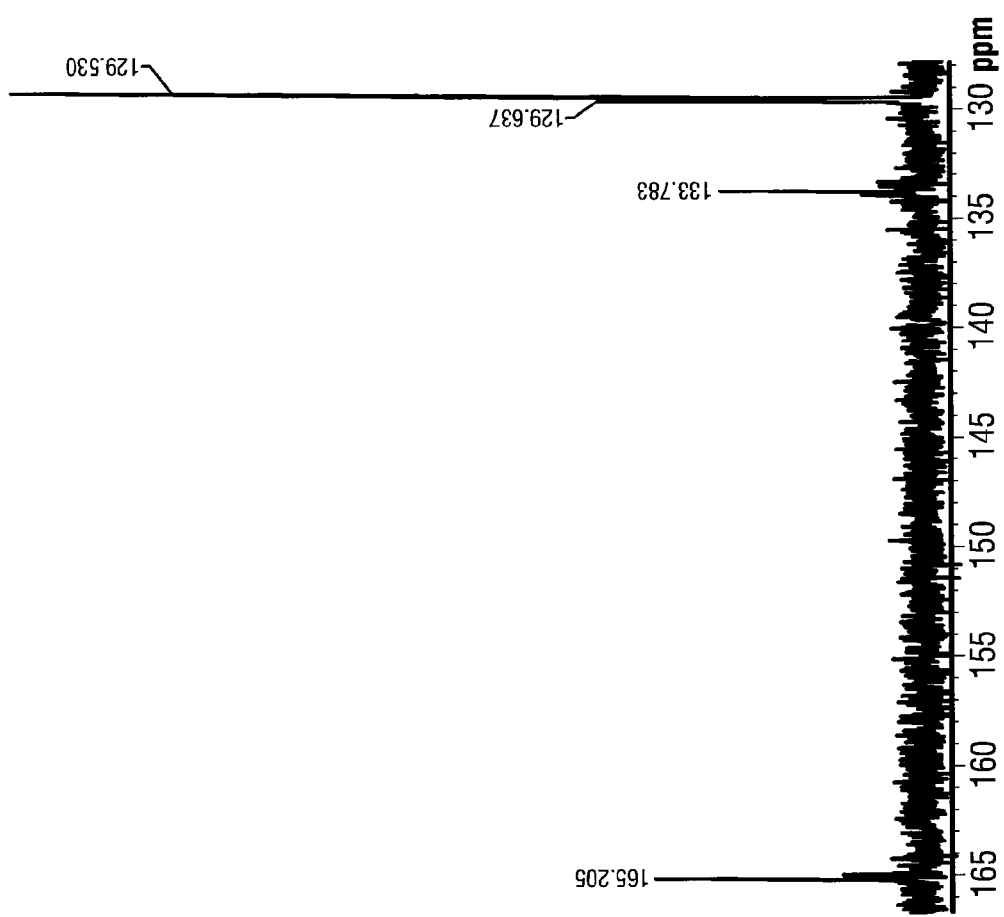
FIG. 22 is a graphical representation of $^{13}$C NMR spectra over a 128-160 ppm range of an isolated white solid obtained in accordance with the present disclosure.
Figure 23:
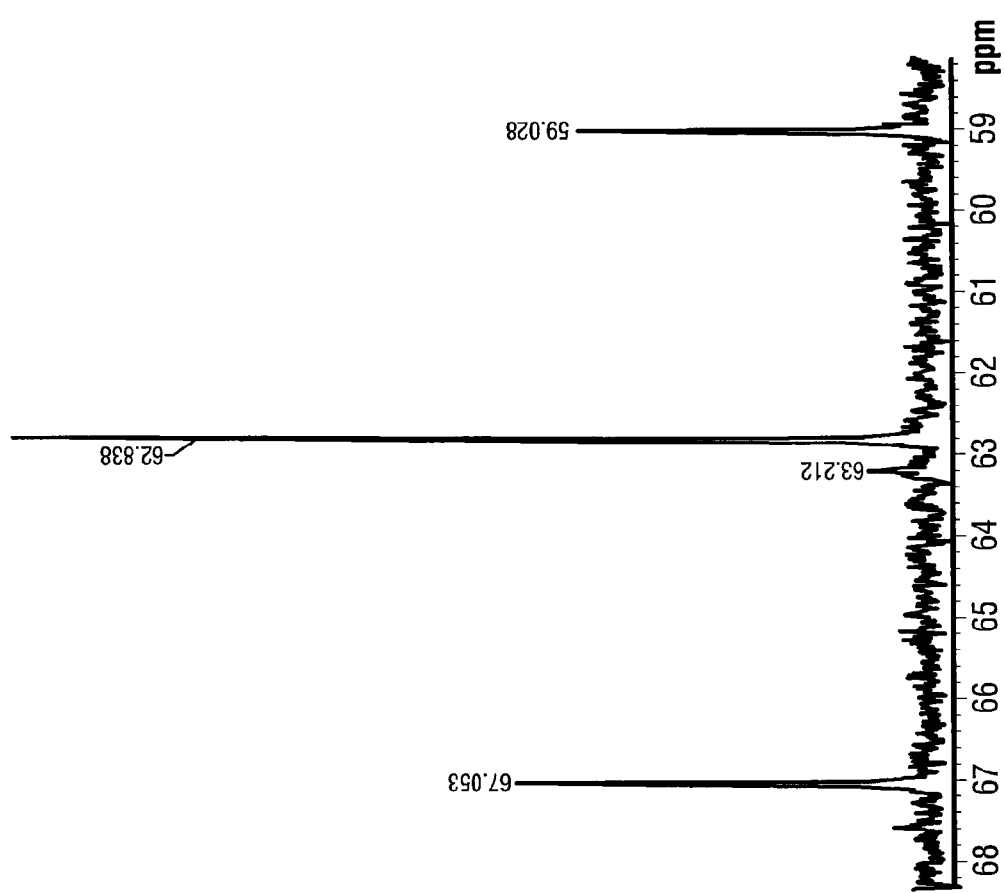
FIG. 23 is a graphical representation of $^{13}$C NMR spectra over a 58-68 ppm range of an isolated white solid obtained in accordance with the present disclosure.
Figure 24:
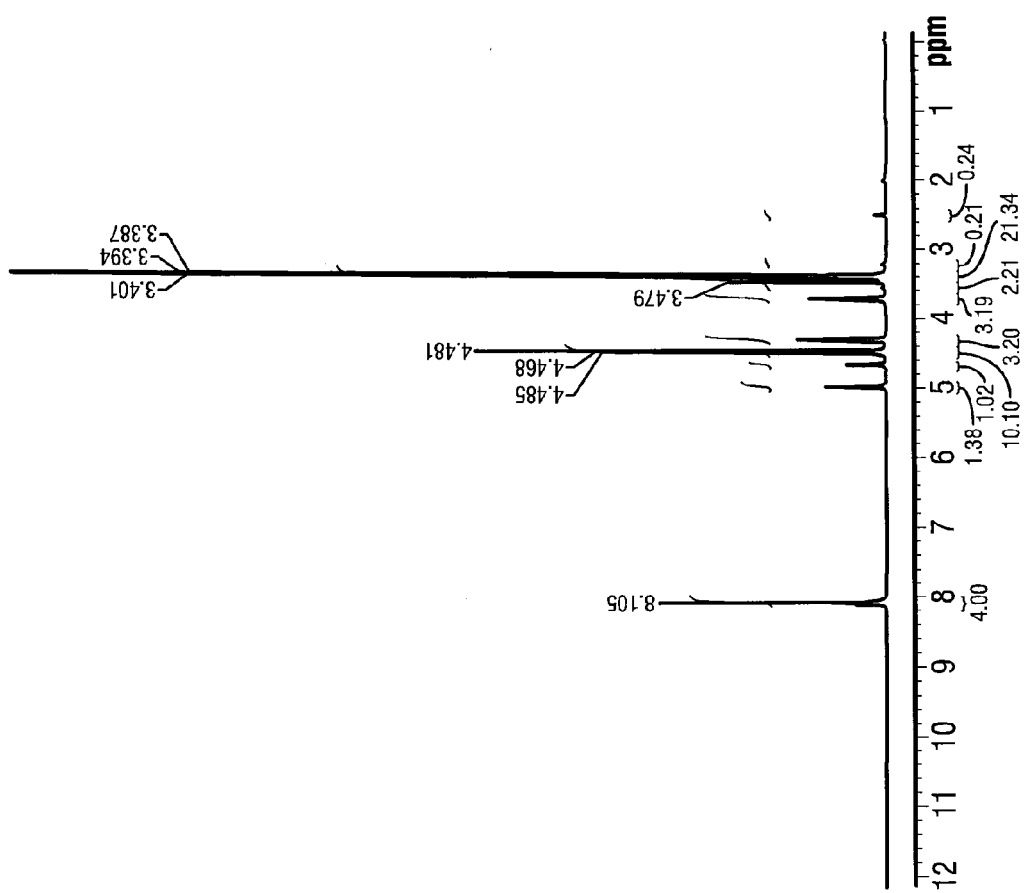
FIG. 24 is a graphical representation of $^1$H NMR spectrum of an isolated white solid plus 2 drops of ethylene glycol obtained in accordance with the present disclosure.
Figure 25:
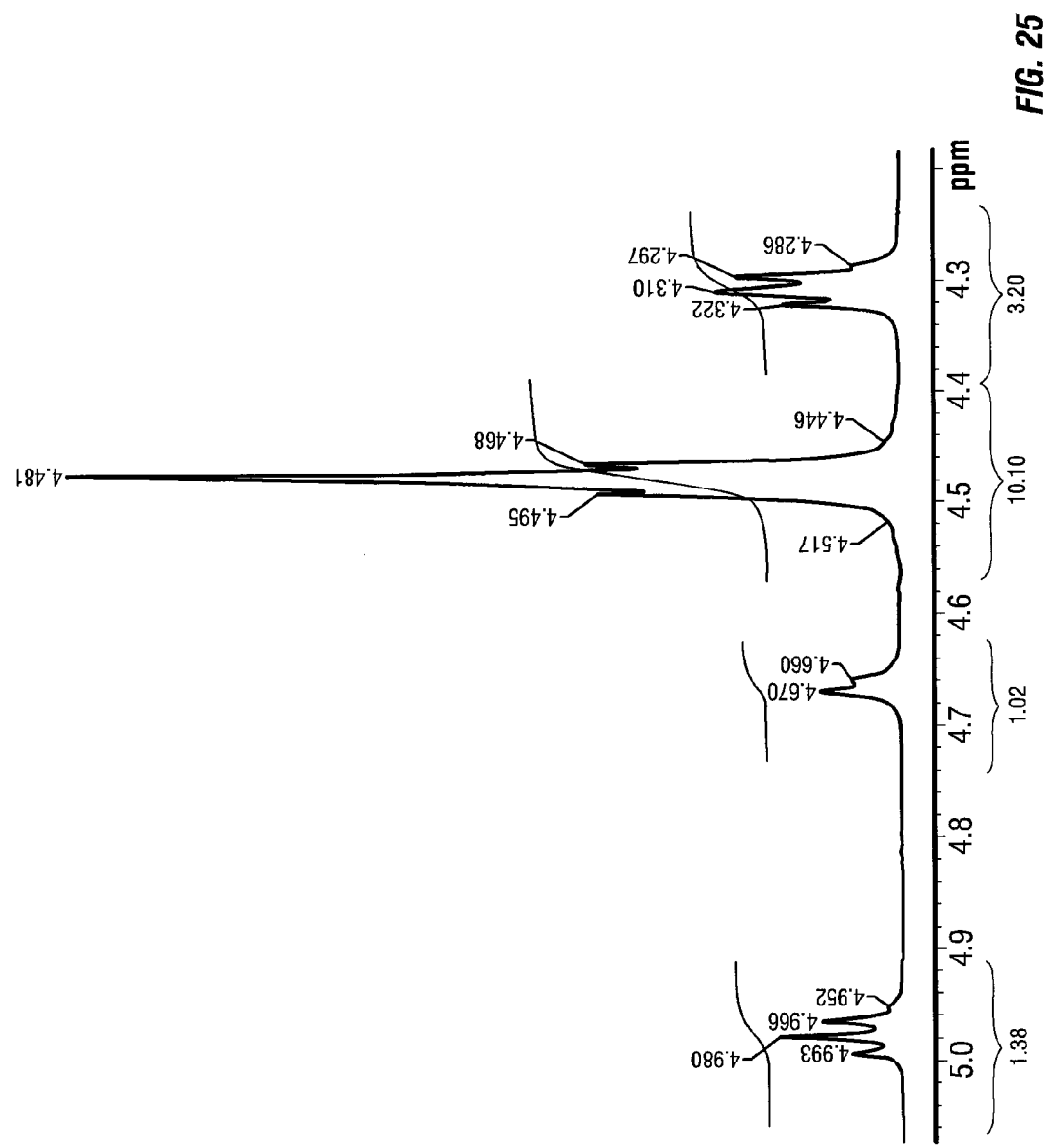
FIG. 25 is a graphical representation of $^1$H NMR spectrum of an isolated white solid plus 2 drops of ethylene glycol obtained in accordance with the present disclosure.
Figure 26:
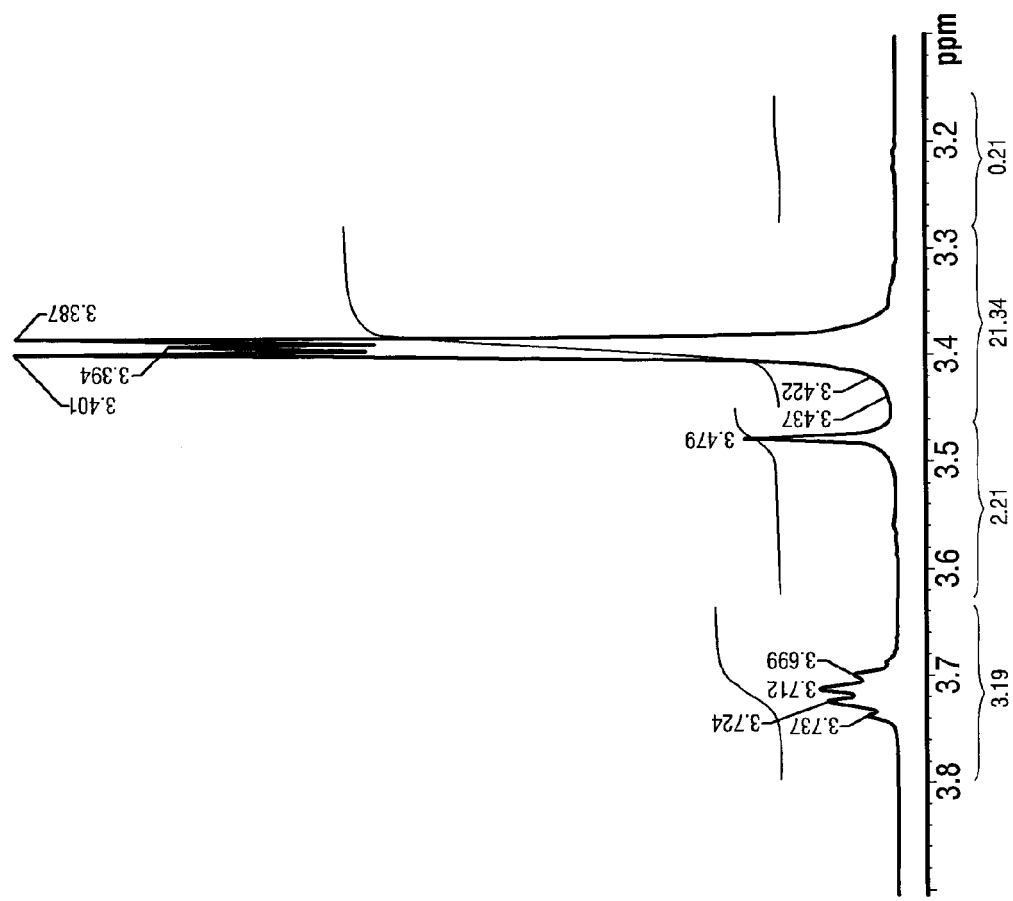
FIG. 26 is a graphical representation of $^1$H NMR spectrum of an isolated white solid plus 2 drops of ethylene glycol obtained in accordance with the present disclosure.
Figure 27:
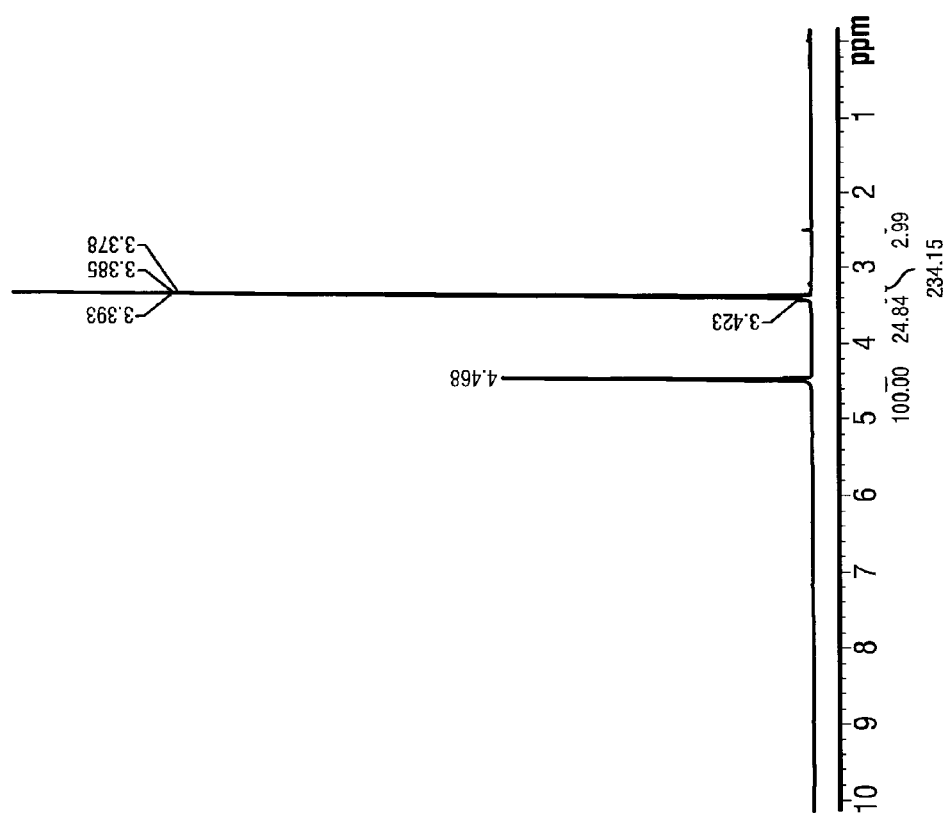
FIG. 27 is a graphical representation of $^1$H NMR spectrum of ethylene glycol in DMSO-d6.
Figure 28:
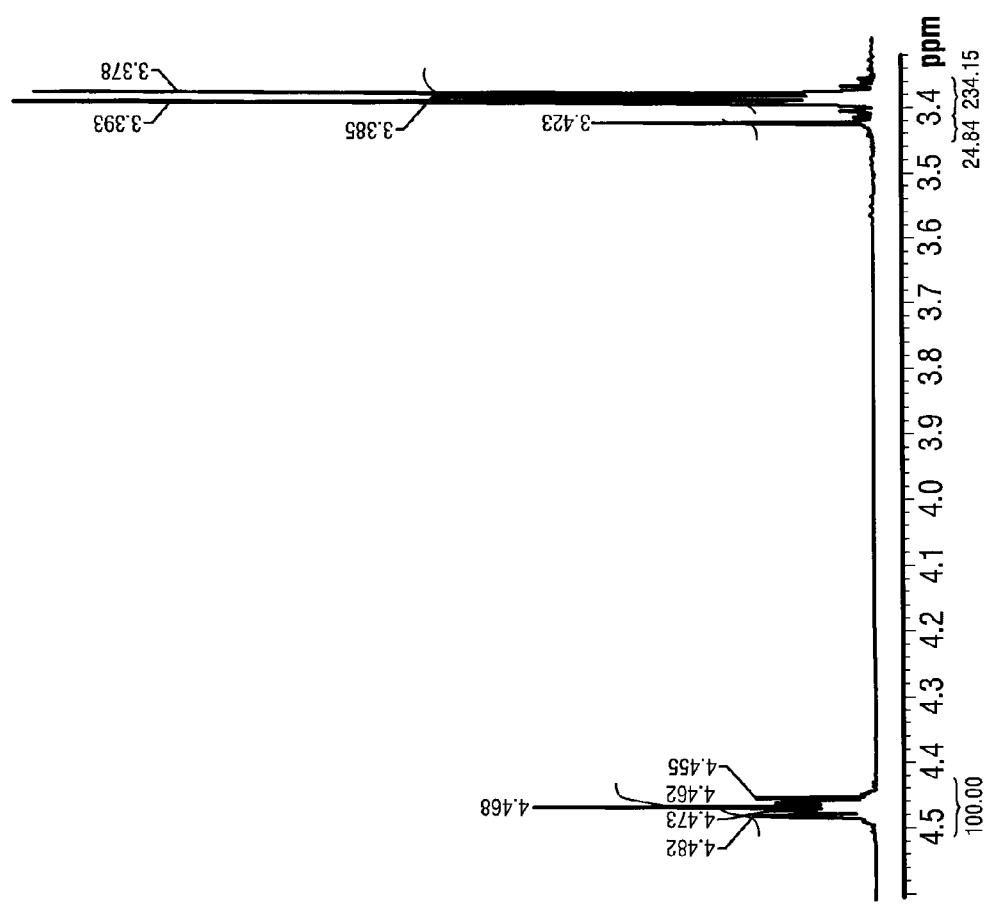
FIG. 28 is a graphical representation of $^1$H NMR spectrum of ethylene glycol in DMSO-d6.
Figure 29:
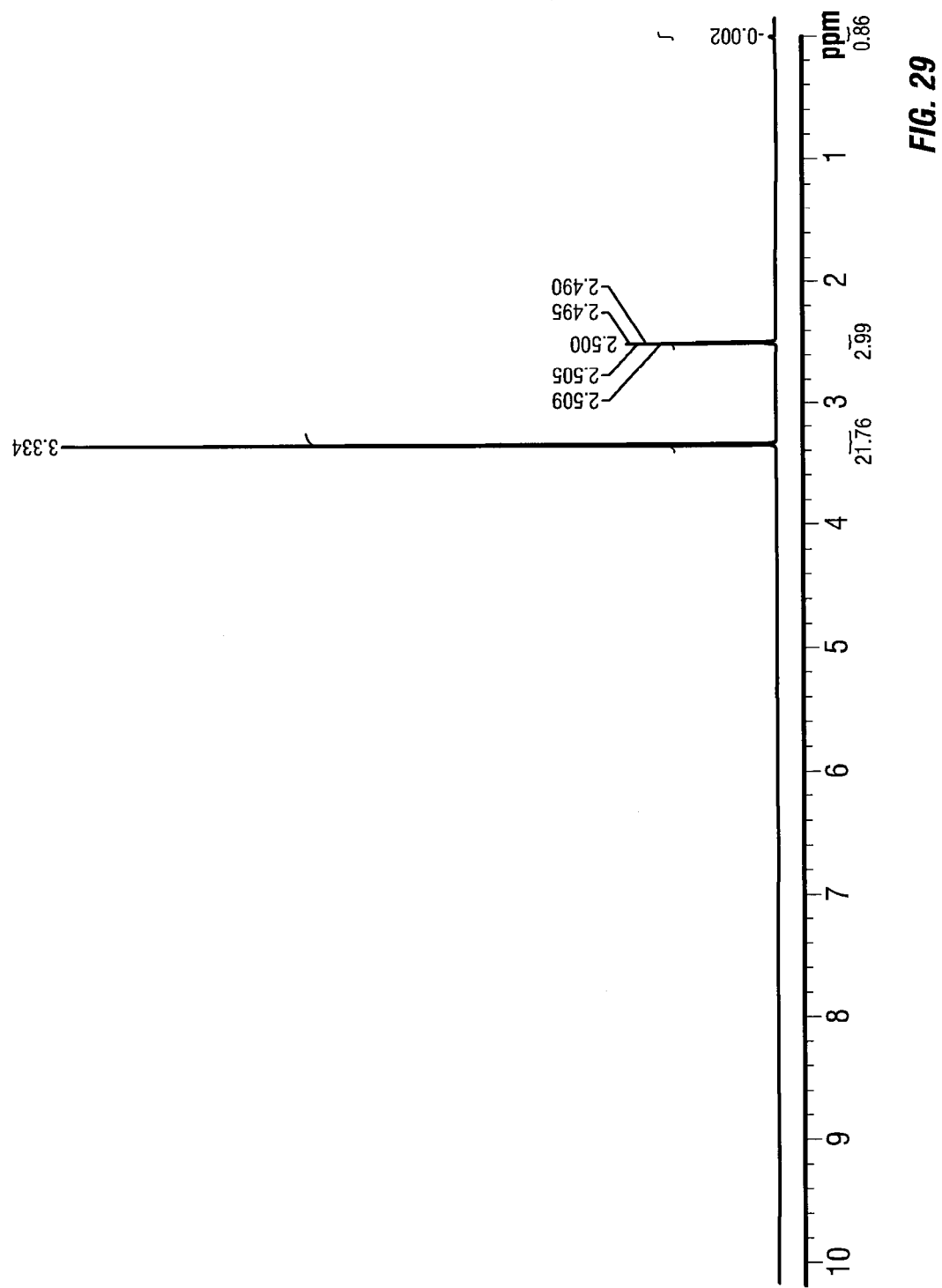
FIG. 29 is a graphical representation of $^1$H NMR spectrum of DMSO-d6 Blank.
Figure 30:
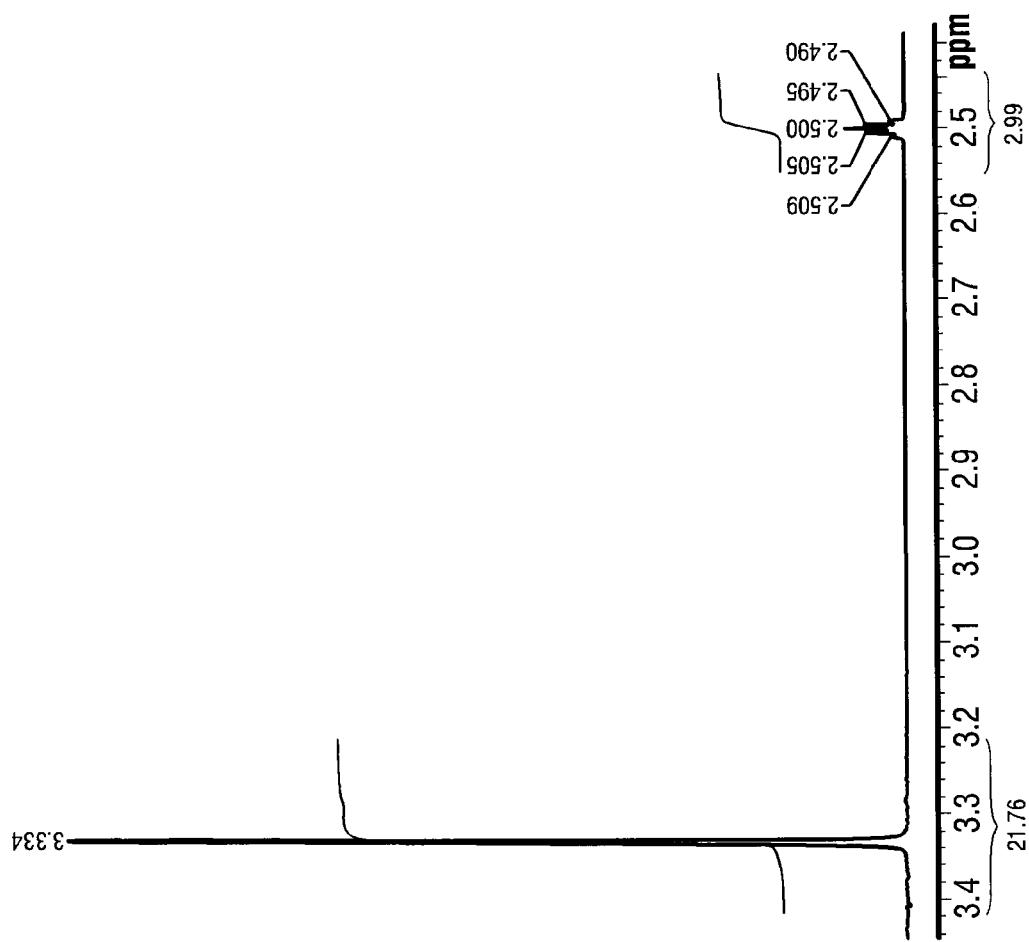
FIG. 30 is a graphical representation of $^1$H NMR spectrum of DMSO-d6 Blank.
Figure 31:
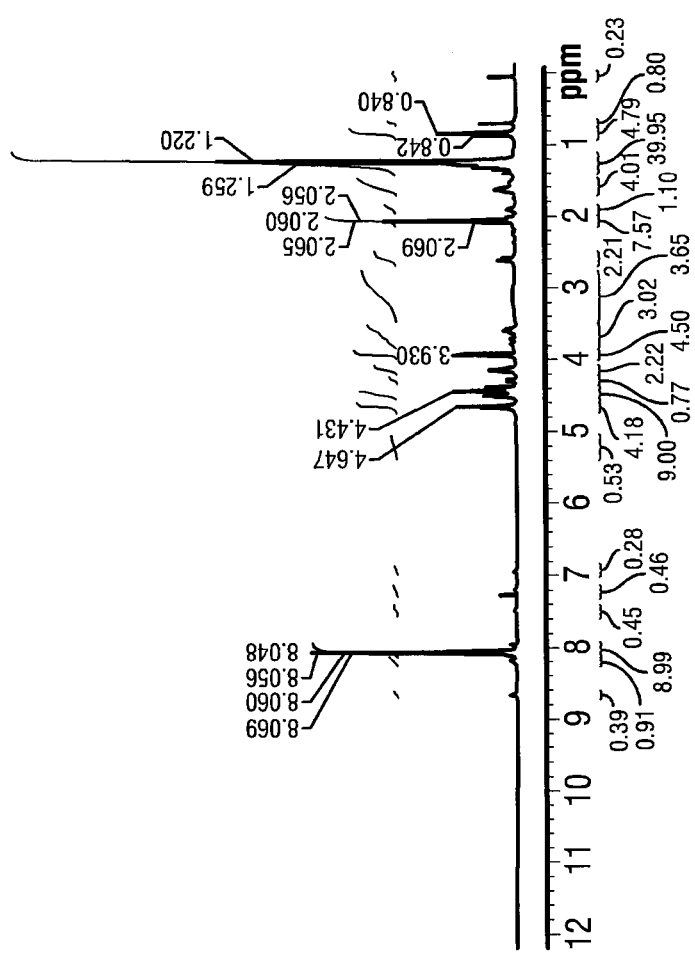
FIG. 31 is a graphical representation of $^1$H NMR spectrum over a 0-12 ppm range of DMSO-d6 Blank.
Figure 32:
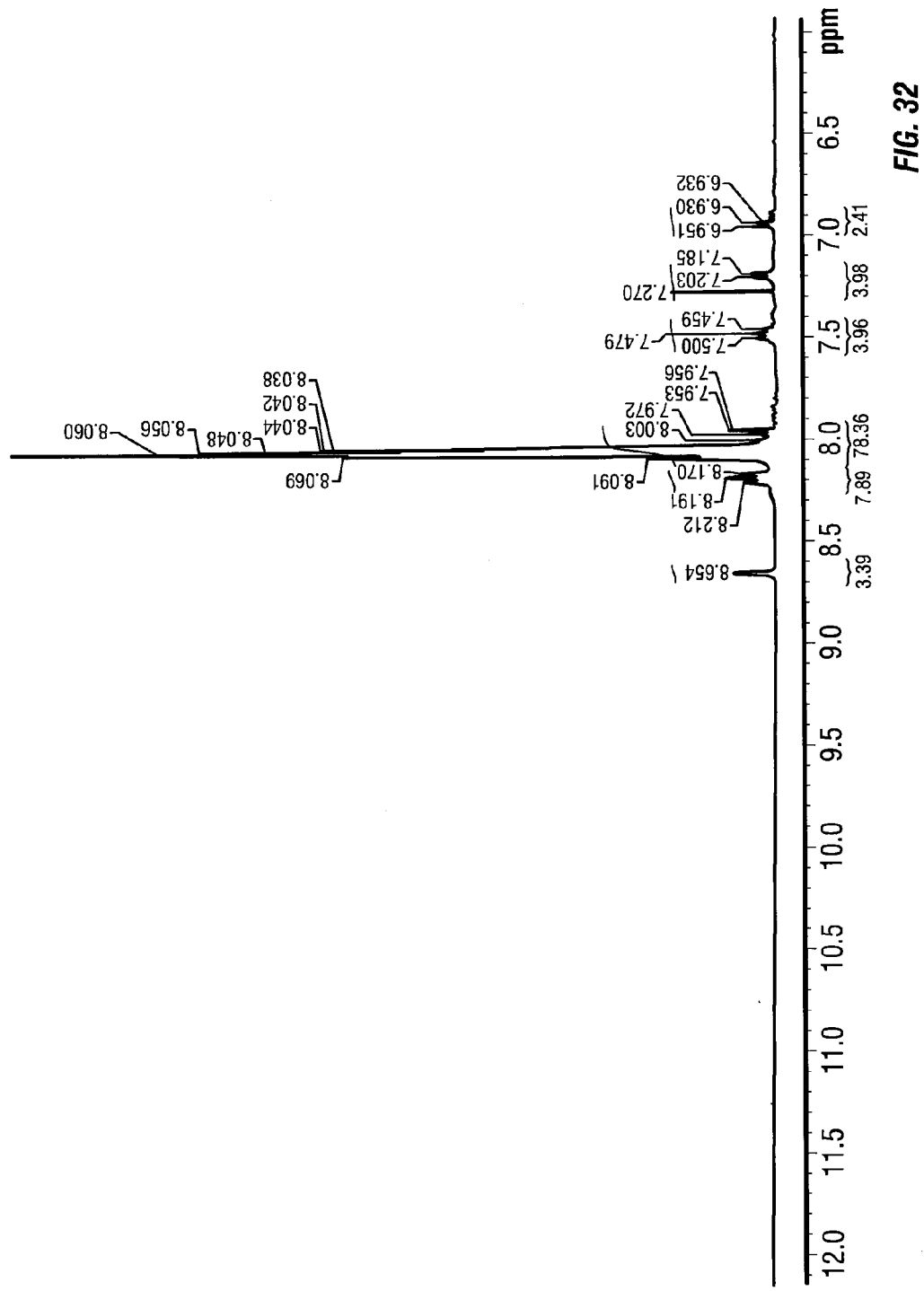
FIG. 32 is a graphical representation of $^1$H NMR spectra over a 6-12 ppm range of a green semi-solid isolated from green toluene filtrate in accordance with the present disclosure.
Figure 33:
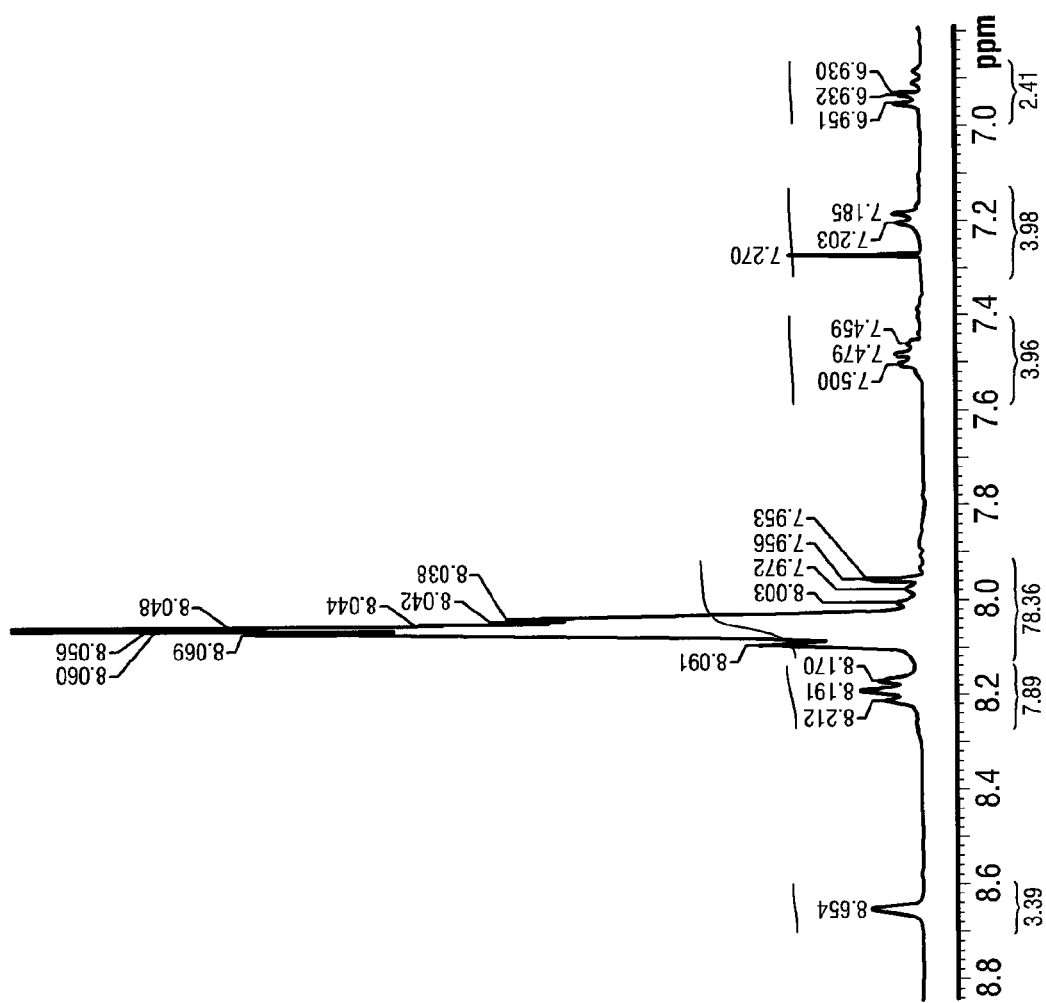
FIG. 33 is a graphical representation of $^1$H NMR spectra over a 6.8-8.8 ppm range of a green semi-solid isolated from green toluene filtrate in accordance with the present disclosure.
Figure 34:
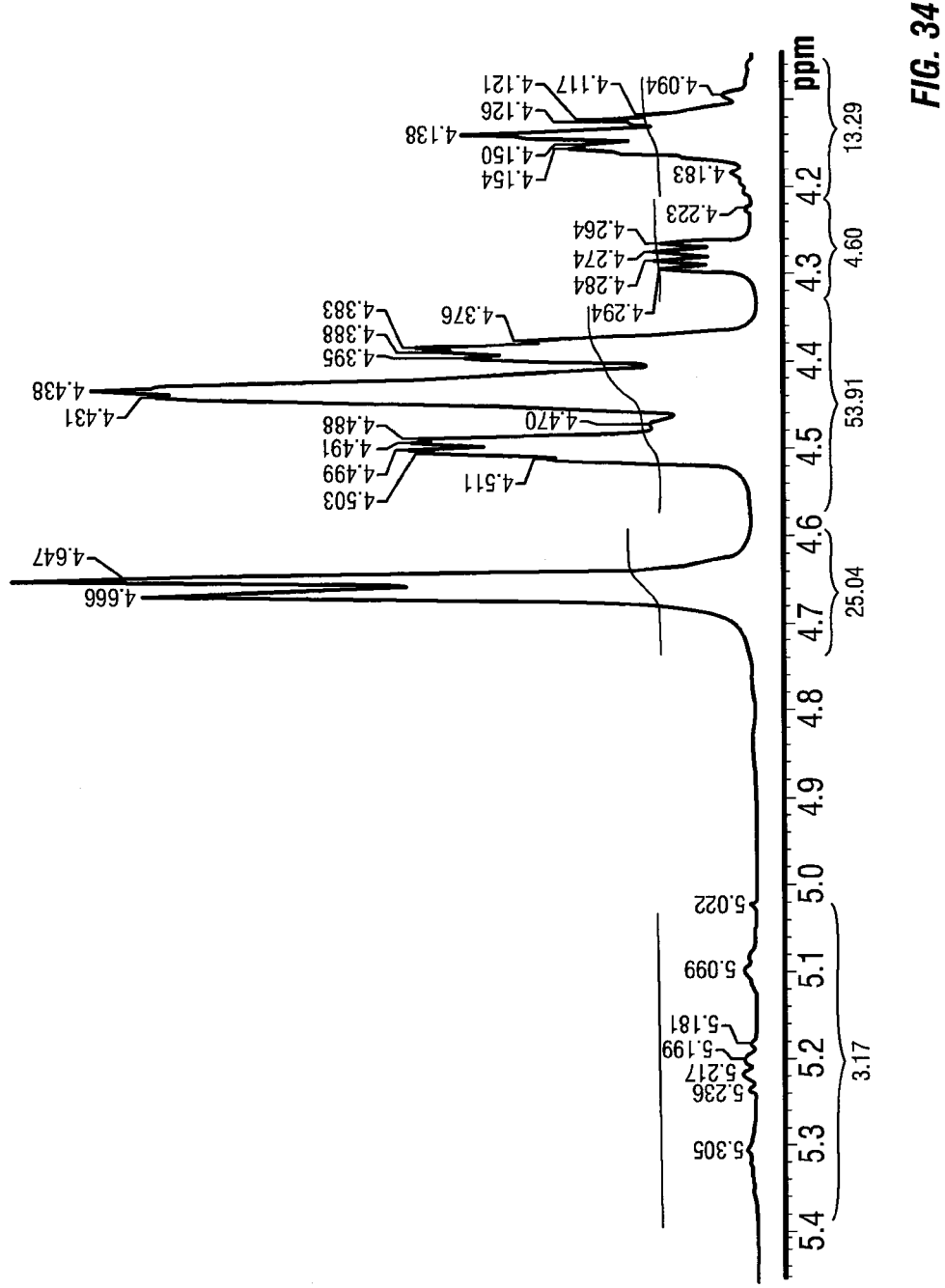
FIG. 34 is a graphical representation of $^1$HNMR spectra over a 4.1-5.4 ppm range of a green semi-solid isolated from green toluene filtrate in accordance with the present disclosure.
Figure 35:
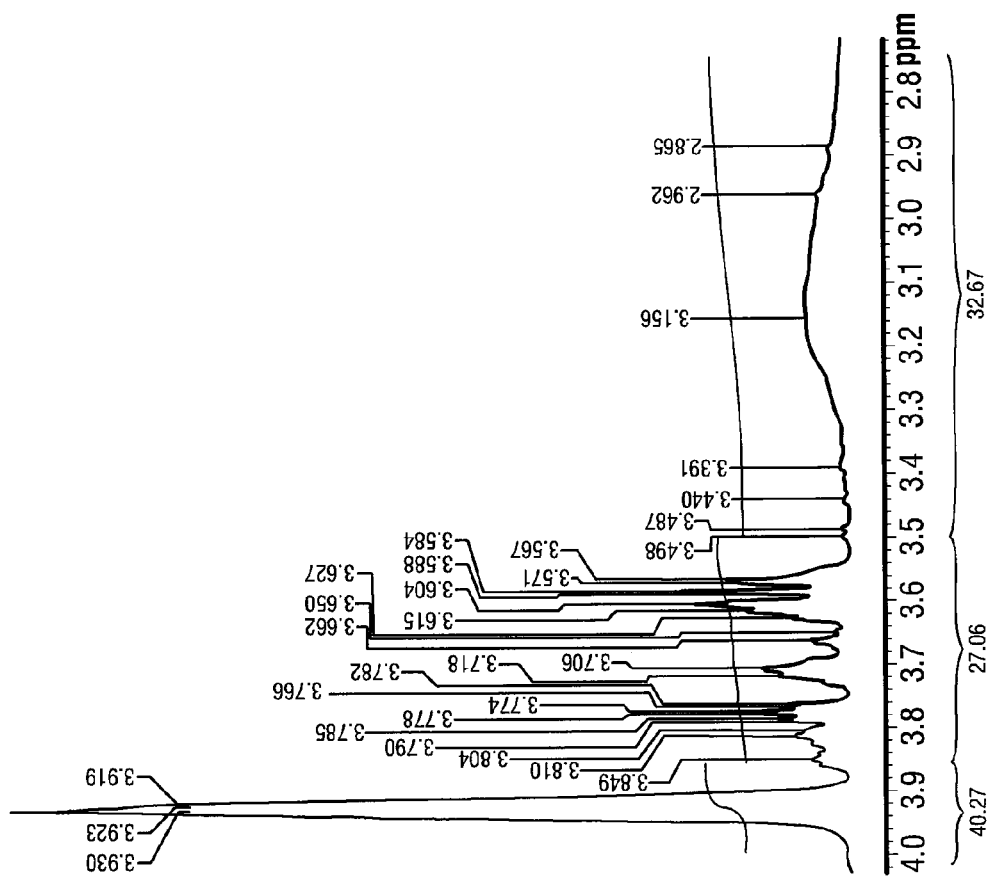
FIG. 35 is a graphical representation of $^1$H NMR spectra over a 2.8-4.0 ppm range of a green semi-solid isolated from green toluene filtrate in accordance with the present disclosure.
Figure 36:
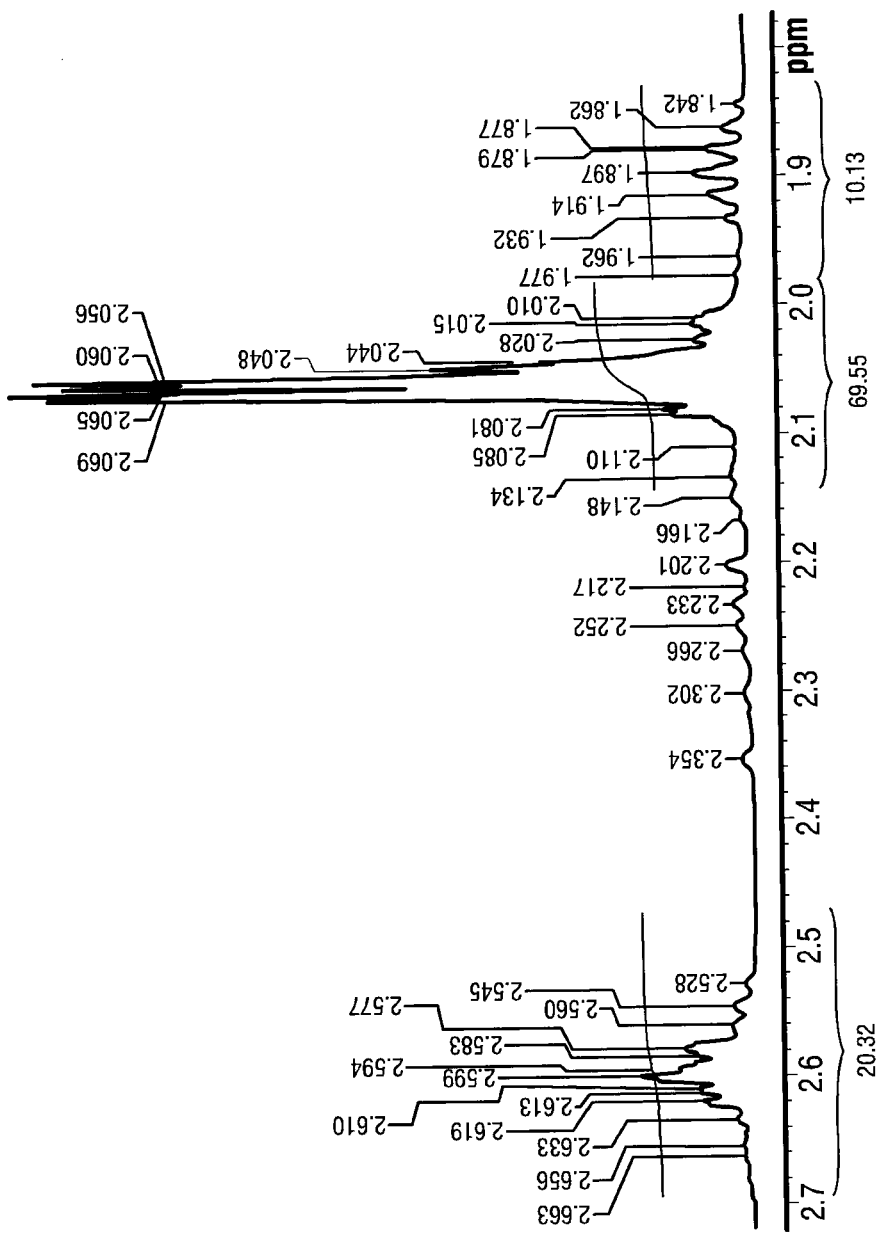
FIG. 36 is graphical representation of $^1$H NMR spectra over a 1.8-2.7 ppm range of a green semi-solid isolated from green toluene filtrate in accordance with the present disclosure.
Figure 37:
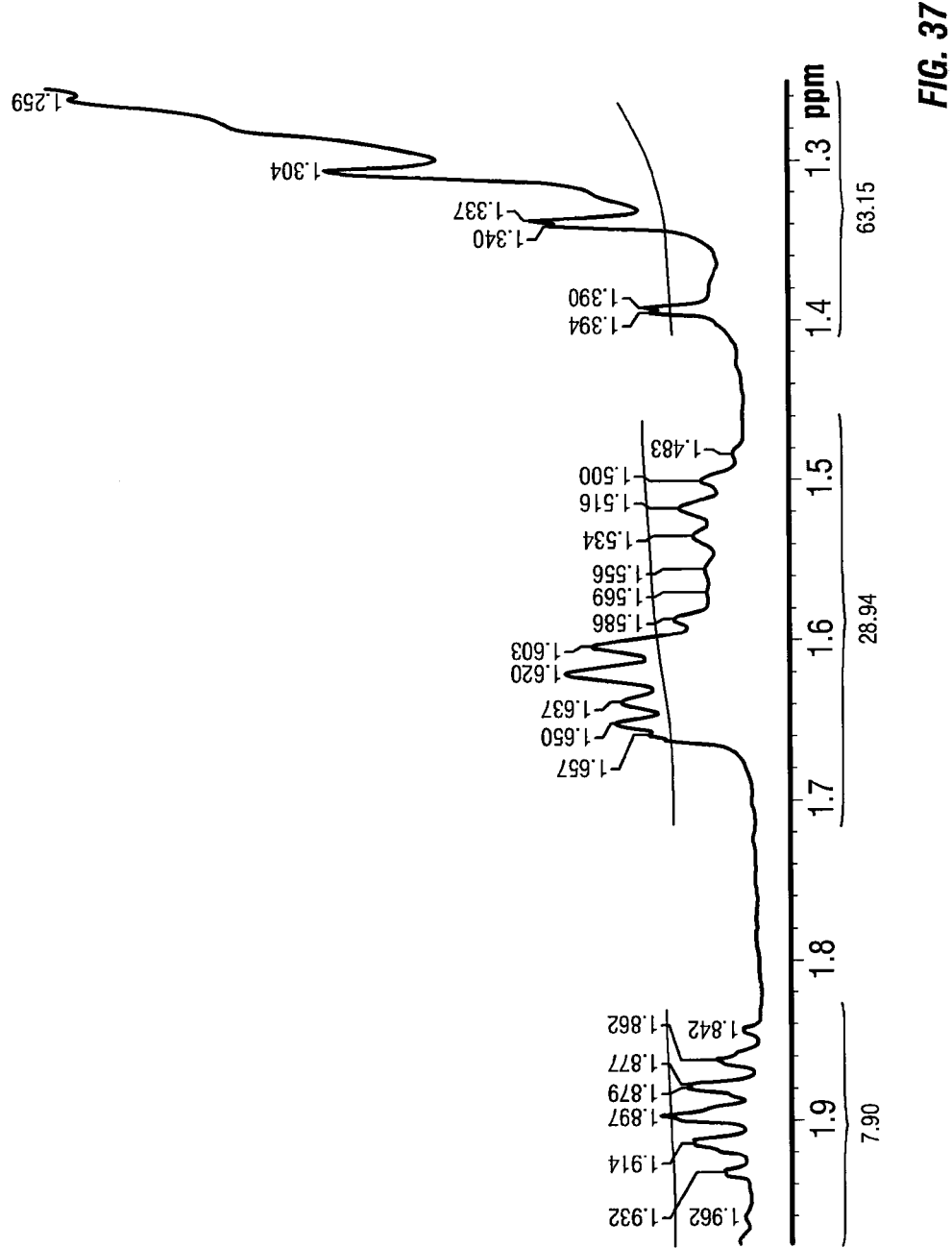
FIG. 37 is a graphical representation of $^1$H NMR spectra over a 1.25-1.95 ppm range of a green semi-solid isolated from green toluene filtrate in accordance with the present disclosure.
Figure 38:
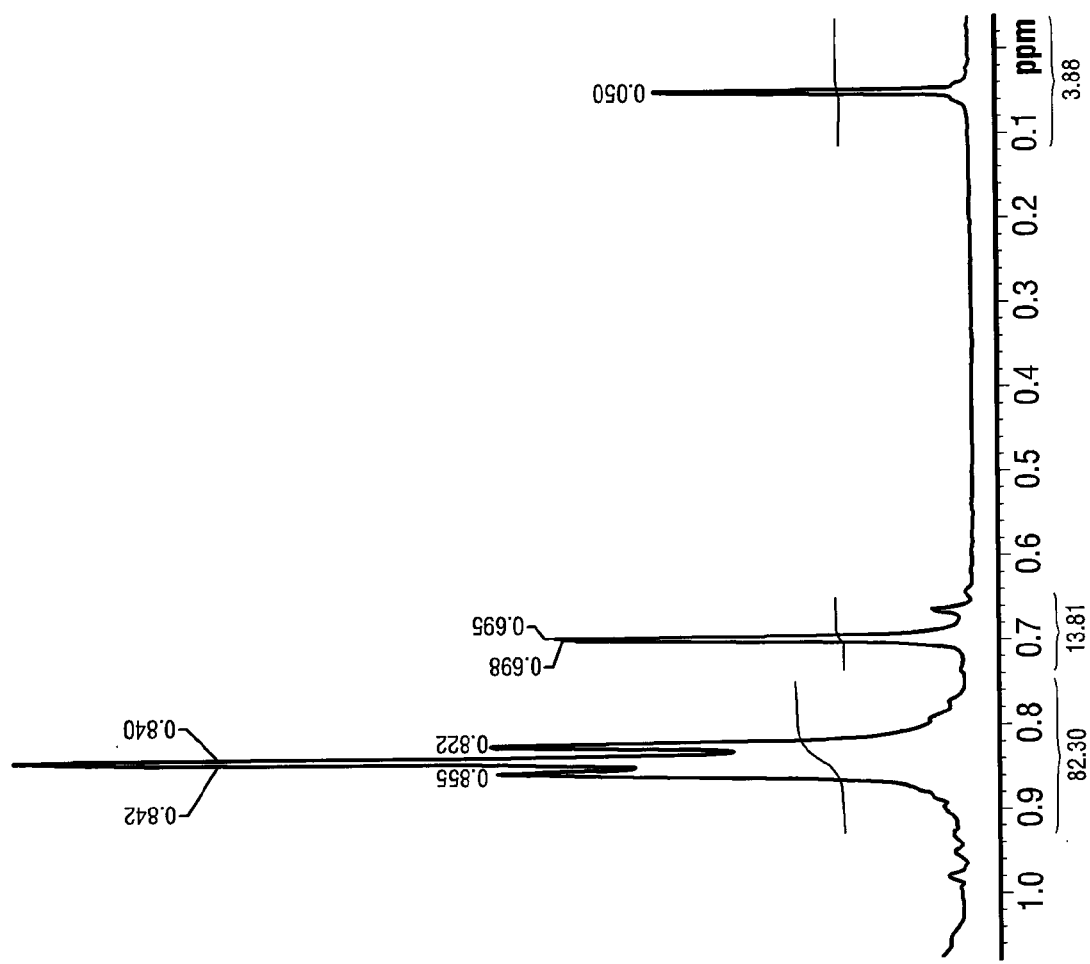
FIG. 38 is a graphical representation of $^1$H NMR spectra over a 0-1 ppm range of a green semi-solid isolated from green toluene filtrate in accordance with the present disclosure.
Figure 39:
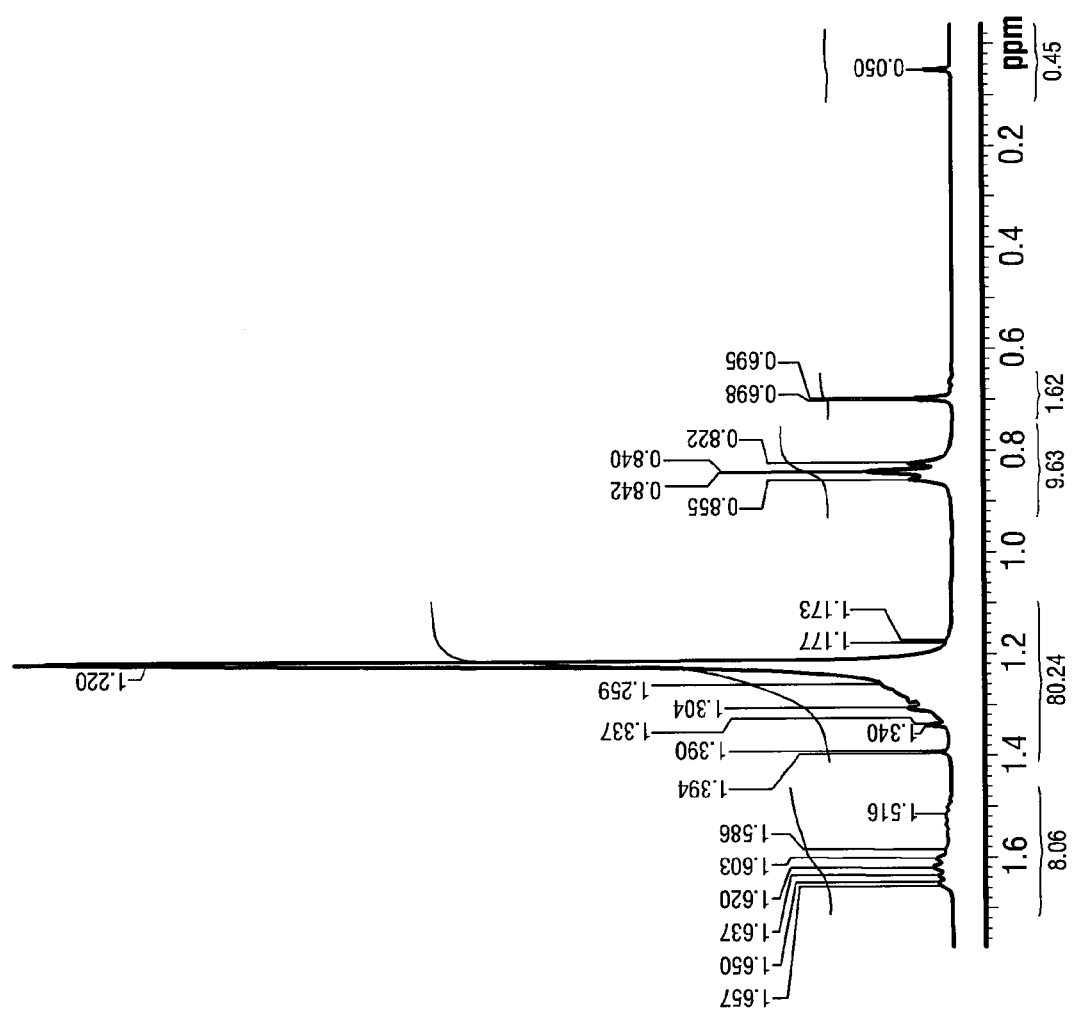
FIG. 39 is a graphical representation of $^1$H NMR spectra over a 0-1.7 ppm range of a green semi-solid isolated from green toluene filtrate in accordance with the present disclosure.
Figure 40:
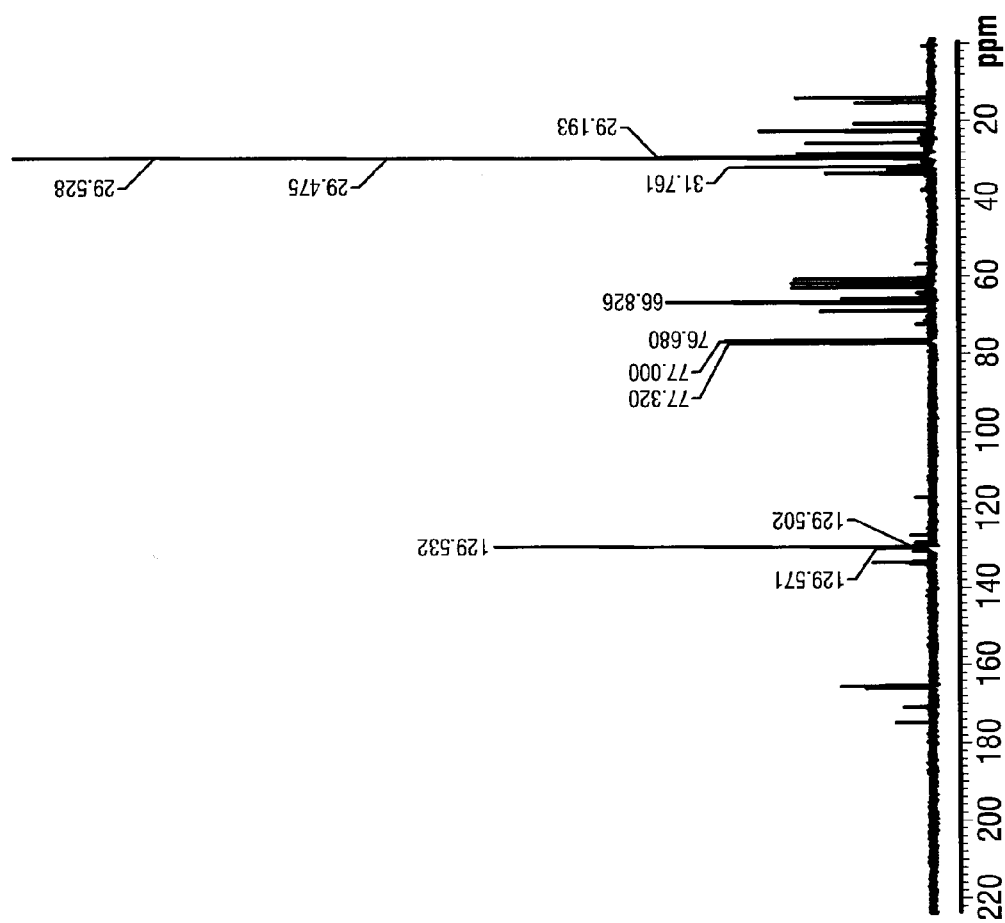
FIG. 40 is a graphical representation of $^{13}$C NMR spectra over a 0-220 ppm range of a green semi-solid isolated from green toluene filtrate in accordance with the present disclosure.
Figure 41:
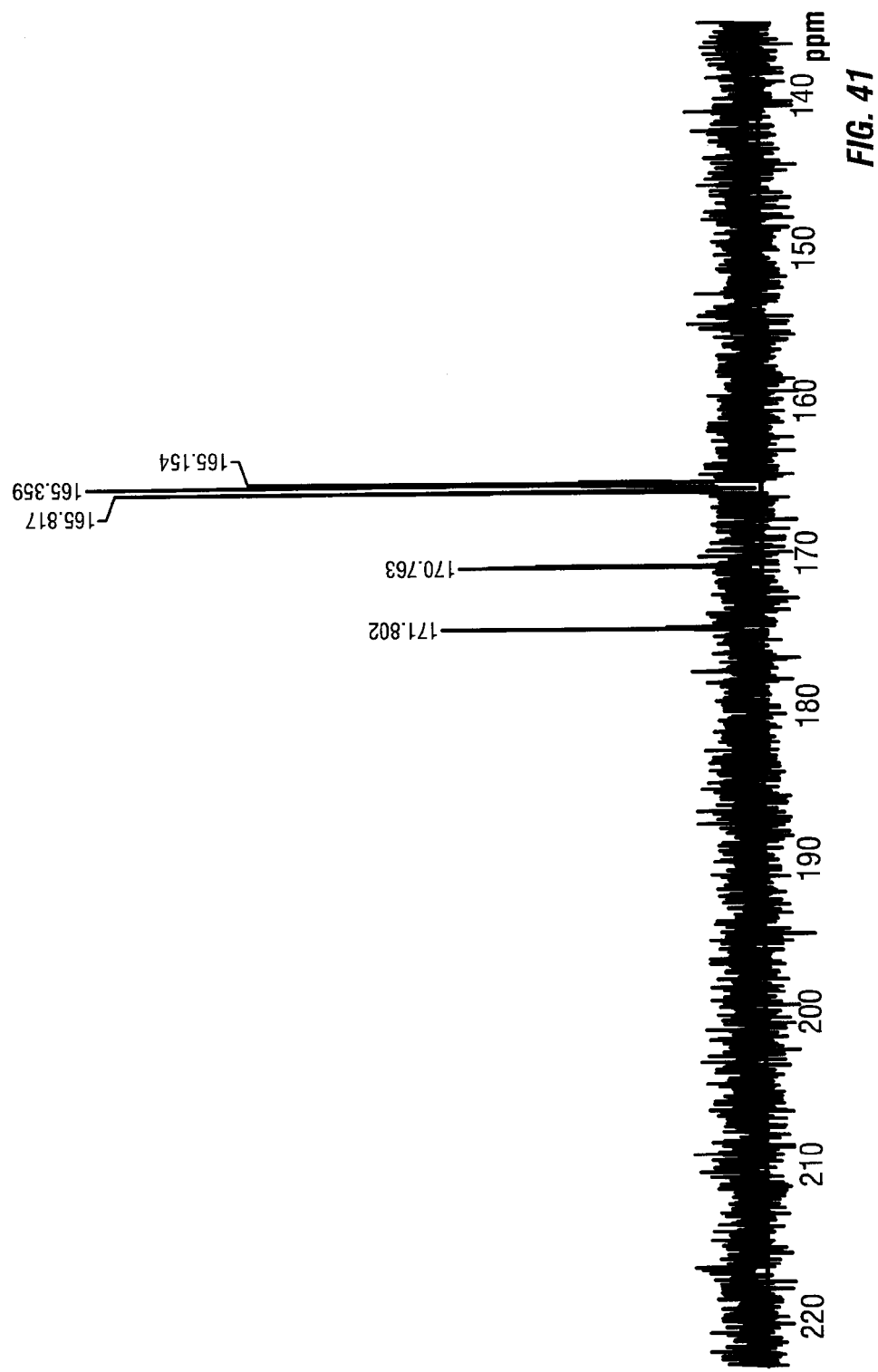
FIG. 41 is a graphical representation of $^{13}$C NMR spectra over a 140-220 ppm range of a green semi-solid isolated from green toluene filtrate in accordance with the present disclosure.
Figure 42:
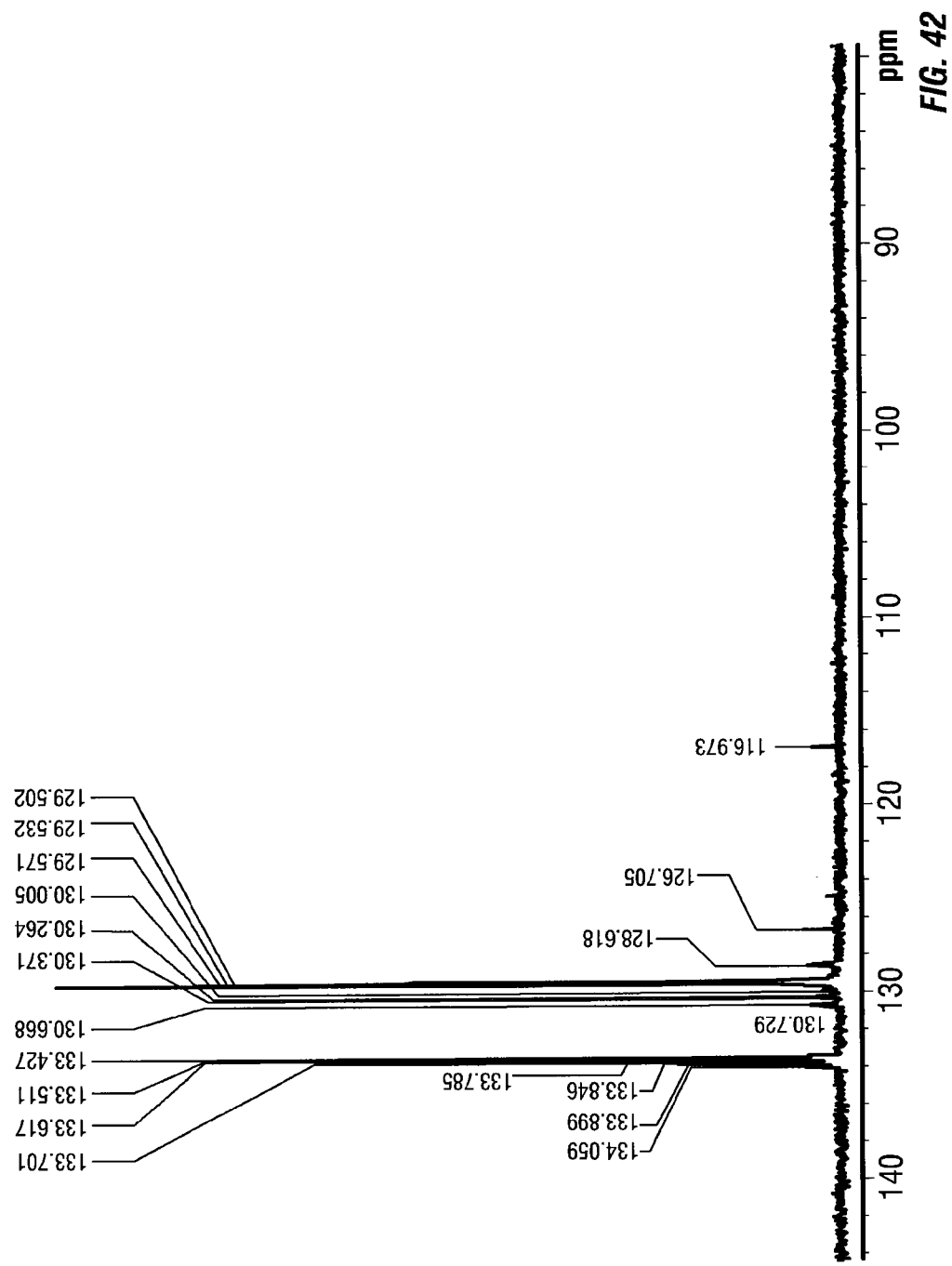
FIG. 42 is a graphical representation of $^{13}$C NMR spectra over a 80-140 ppm range of a green semi-solid isolated from green toluene filtrate in accordance with the present disclosure.
Figure 43:
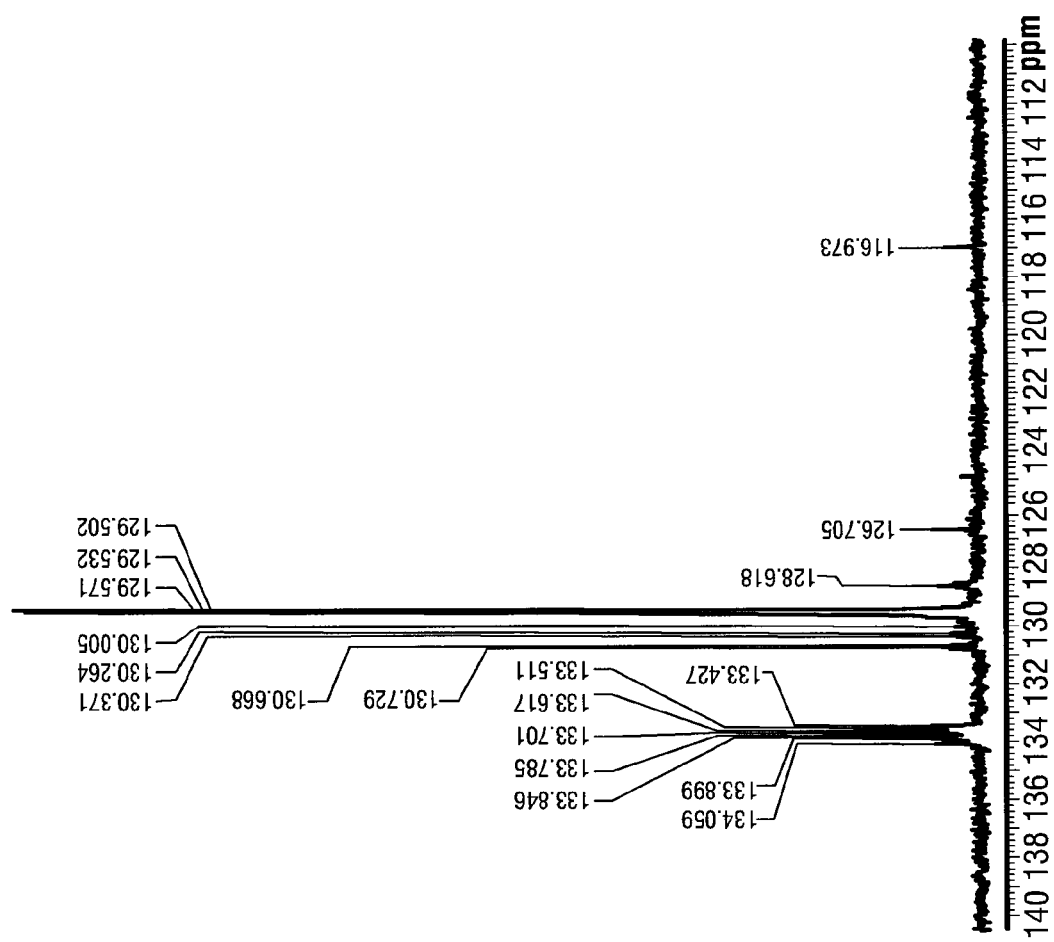
FIG. 43 is a graphical representation of $^{13}$C NMR spectra over a 112-140 ppm range of a green semi-solid isolated from green toluene filtrate in accordance with the present disclosure.
Figure 44:
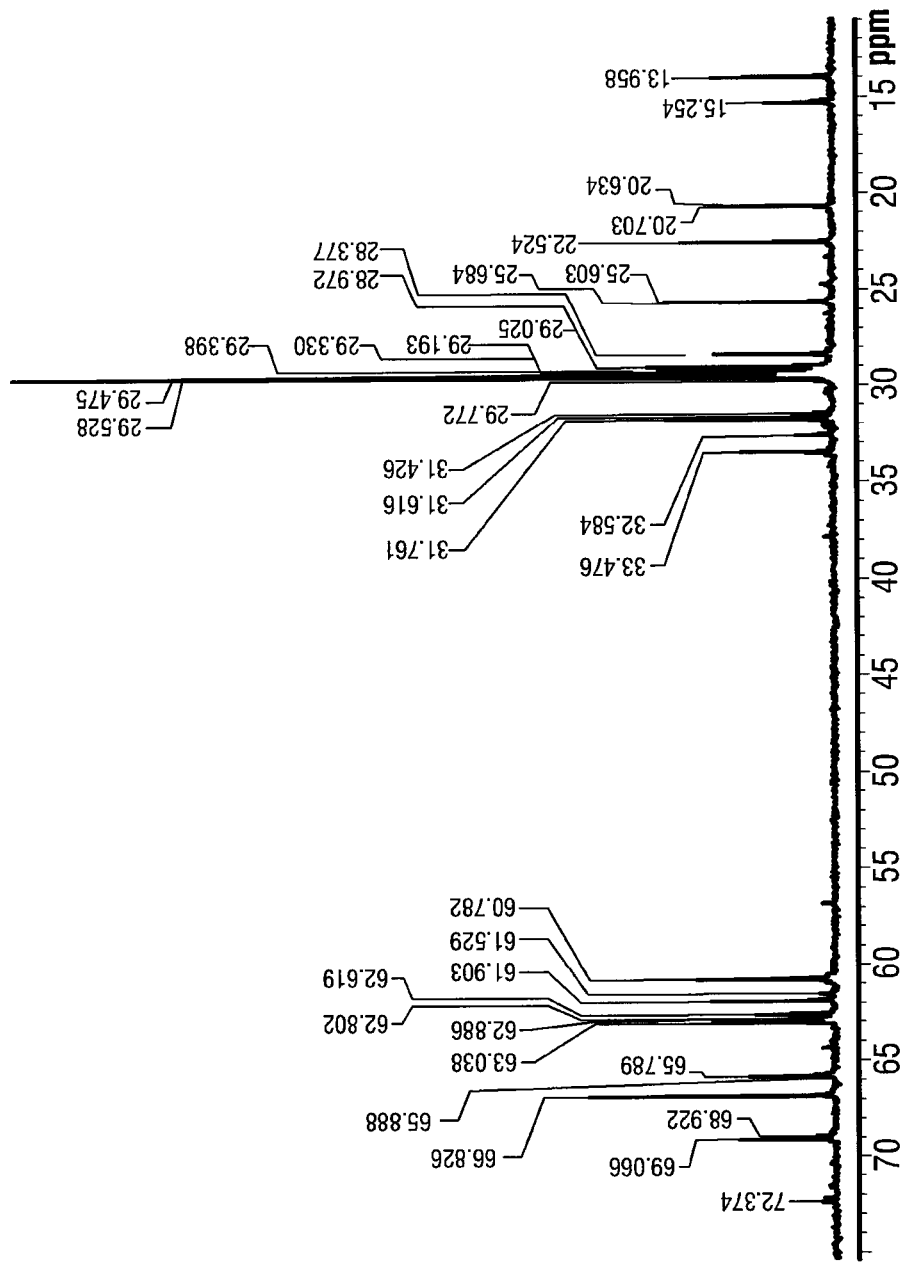
FIG. 44 is a graphical representation of $^{13}$C NMR spectra over a 10-75 ppm range of a green semi-solid isolated from green toluene filtrate in accordance with the present disclosure.
Figure 45:
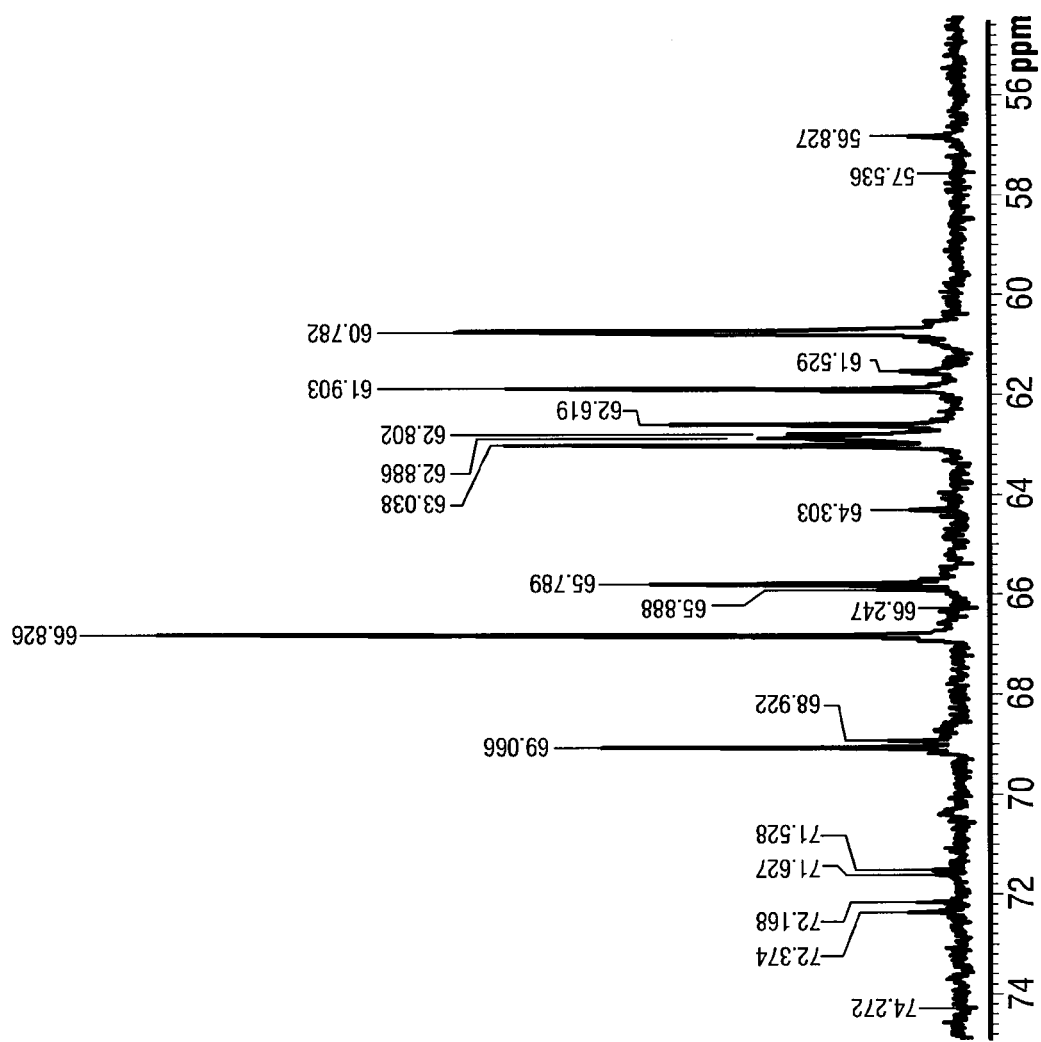
FIG. 45 is a graphical representation of $^{13}$C NMR spectra over a 56-75 ppm range of a green semi-solid isolated from green toluene filtrate in accordance with the present disclosure.
Figure 46:
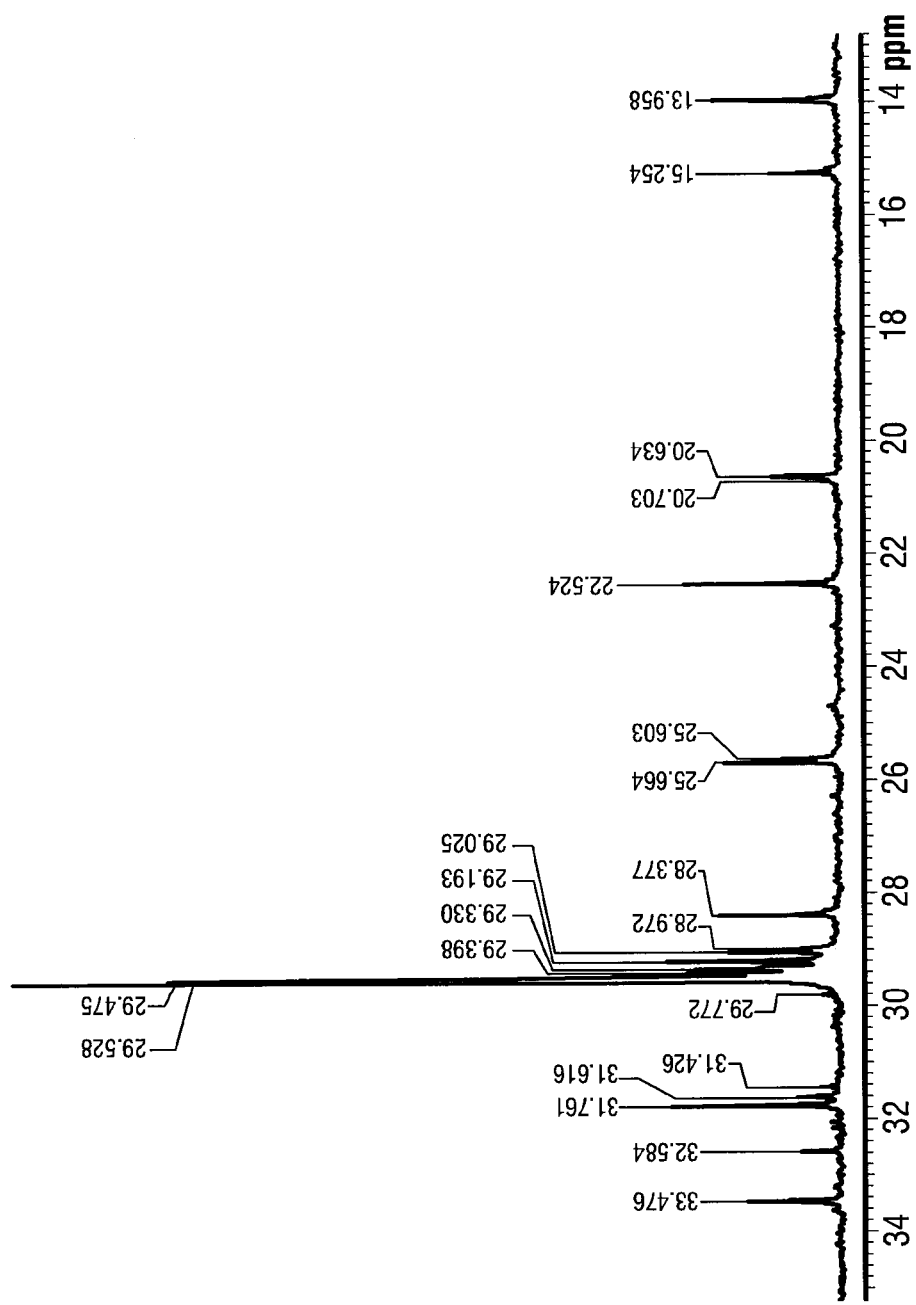
FIG. 46 is a graphical representation of $^{13}$C NMR spectra over a 13-34 ppm range of a green semi-solid isolated from green toluene filtrate in accordance with the present disclosure.
Figure 47:
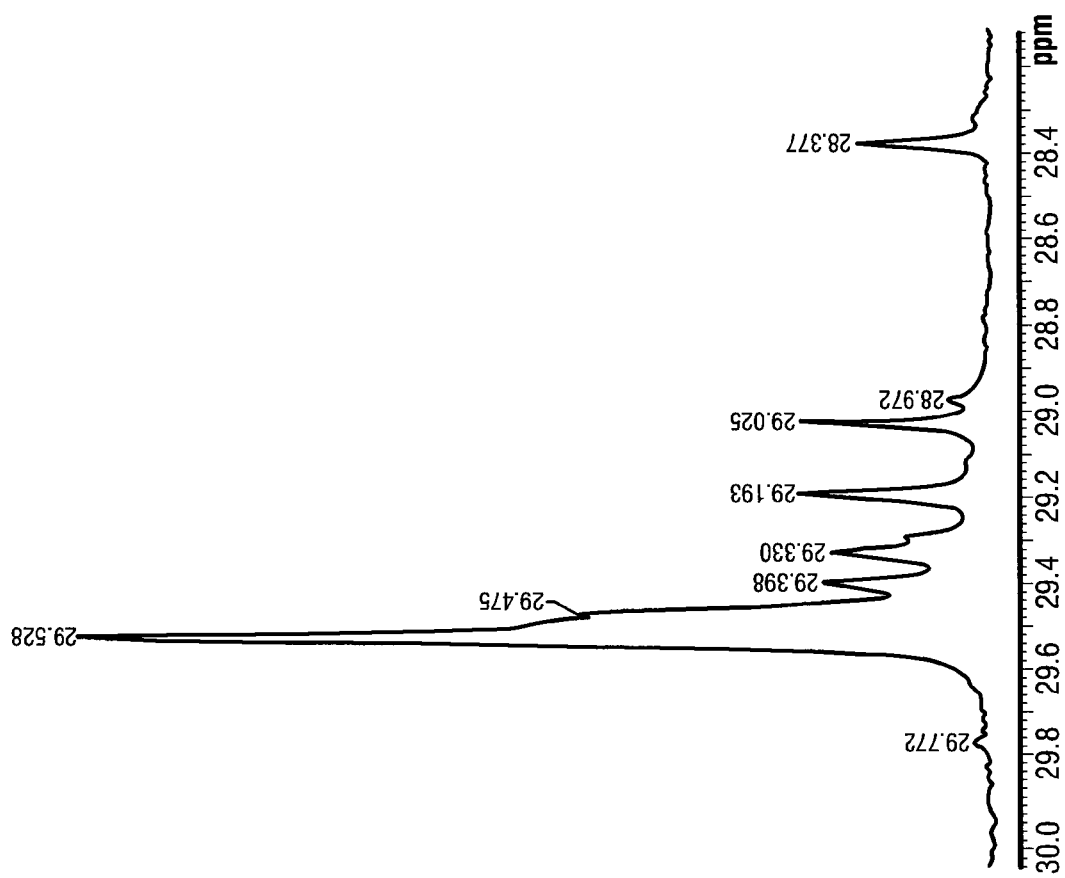
FIG. 47 is a graphical representation of $^{13}$C NMR spectra over a 28-30 ppm range of a green semi-solid isolated from green toluene filtrate in accordance with the present disclosure.

Digested rPET having a molecular weight range of 1,297 to 19,271 was produced and the polydispersity of these materials ranged from 1.306 to 2.148. FIG. 16 is a graphical representation of the percentage predigested rPET used against the molecular weight of the digested rPET produced. The curve depicted in FIG. 16 is similar to what was observed with respect to samples incorporating green rPET.

Samples with Ref. Nos. 732-13, 732-14 and 732-15 were produced by reducing power to the heating source. Instead of providing 100% line voltage to the heating mantle, a variable control power transformer was used to regulate power to 47% of line voltage. (Table 17) Milder heating resulted in higher molecular weight products which is evident in the way that data points fall off the curve at union where the two different heating methods were used. Thus, treating clear rPET with decreasing amounts of predigested rPET material results in higher molecular weight digested rPET material produced.

The use of predigested rPET as a glycolysis agent has, therefore, been proved to be quite effective as a digesting agent and/or as an effective replacement for free ethylene glycol in the reaction mixture. A higher concentration of predigested rPET material gave lower molecular weight digested rPET product.

In Situ Preparation of 16% "Predigested" rPET

Experiments were performed with both clear and green rPET to determine the effect of an in situ preparation of "predigested" rPET for use as a digesting agent.

For Sample Ref. No. 732-16, 26.1 grams of clear rPET, 0.42 grams of zinc acetate and 23.4 grams of ethylene glycol were heated to reflux, achieving homogeneity at 200° C. 310.0 grams of clear rPET were added to the predigested material over 17 minutes, completing the addition at 209° C. Sample Ref. No. 732-16A was taken at an internal thermocouple reading of 262° C. Fifteen minutes elapsed between completing the rPET addition and obtaining homogeneity of the mixture. GPC showed that the resulting material was digested rPET having a MP=3321 and polydispersity of PI=1.510.

For Sample Ref. No. 732-17, 26.1 grams of green rPET, 0.42 grams of zinc acetate and 23.4 grams of ethylene glycol were heated to reflux, achieving homogeneity at 195° C. 310.0 grams of green rPET were added to the pre-digested rPET material over 16 minutes, completing the addition at 199° C. Homogeneity was reached at 0.77 hours after completing the addition of the green rPET. The mixture (Sample Ref. No. 732-17A) reached homogeneity at 214° C. GPC showed that the resulting material was digested rPET having a MP=3614 and polydispersity of PI=1.541.

By way of comparison, Sample Ref No. 188-22 used 16.1% predigested rPET and produced a digested rPET material having a MP=3293 and polydispersity of PI=1.474. Thus, in situ preparation of "predigested" material gave the same results as using predigested rPET material that was isolated prior to addition to the reaction mixture.

Effect of Reaction Time and Increased Temperature

Digestion experiments were performed to study the effect of extended reaction times and elevated temperatures of the digested rPET produced. Reactions with extended reaction times were carried out with predigested rPET mixed with rPET pellets as described above but the reaction was held at 190-200° C. for up to 6 h beyond completion. The starting point (t=0) was determined when the rPET pellets went completely into solution. The reaction mixtures were sampled at regular intervals and the pulls were analyzed by GPC.

Tables 18 and 19 summarize the concentrations of predigested rPET which were used and the results of the GPC analysis. When 9% to 65% predigested rPET were used, a long reaction time did not make a difference in the molecular weight of the digested rPET produced (within the limits of the technique). At low concentrations, longer reaction times resulted in lower molecular weight digested rPET products. For instance, the experiment with 3.3% predigested rPET produced a digested rPET product having a MW=19,271 at t=0 and MW=15,407 at t=6 h; the experiment with 4.3% predigested rPET produced a digested rPET product having a MW=15,176 at t=0 and MW=12,854 at t=5.5 h.

TABLE 18

| Ref. | Description | Mn | MP | MW | PI |
|---|---|---|---|---|---|
| 733-2A | Green PET digested with 65% predigested PET (188-17) t = 0 h | 1162 | 1058 | 1466 | 1.261 |
| 733-2B | t = 1 h | 1162 | 1053 | 1464 | 1.260 |
| 733-2C | t = 2 h | 1160 | 1050 | 1464 | 1.262 |
| 733-2D | t = 3 h | 1170 | 1053 | 1476 | 1.261 |
| 733-2E | t = 4 h | 1146 | 1034 | 1447 | 1.264 |
| 733-2F | t = 5 h | 1137 | 1021 | 1438 | 1.264 |
| 733-2G | t = 6 h | 1133 | 1015 | 1431 | 1.263 |
| 733-4A | Green PET digested with 9% predigested PET (188-17) t = 5 h | 3352 | 5185 | 5646 | 1.684 |
| 733-4B | t = 4 h | 3286 | 5106 | 5490 | 1.671 |
| 733-4C | t = 3 h | 3229 | 4917 | 5321 | 1.648 |
| 733-4D | t = 2 h | 3188 | 4780 | 5239 | 1.643 |
| 733-4E | t = 1 h | 3074 | 4612 | 5073 | 1.650 |
| 733-4F | t = 0 h | 3014 | 4575 | 4994 | 1.657 |
| 733-4G | t = 6 h | 3342 | 5287 | 5636 | 1.686 |

TABLE 19

| Ref. | Description | Mn | MP | MW | PI |
|---|---|---|---|---|---|
| 732-6A | Clear PET digested with 3.3% predigested PET (732-3) t = 0 h | 9513 | 19271 | 20430 | 2.148 |

TABLE 19-continued

| Ref. | Description | Mn | MP | MW | PI |
|---|---|---|---|---|---|
| 732-6B | t = 1 h | 9580 | 19169 | 21590 | 2.254 |
| 732-6C | t = 2 h | 9248 | 18779 | 21497 | 2.324 |
| 732-6D | t = 3 h | 9357 | 18374 | 21510 | 2.299 |
| 732-6E | t = 4 h | 8813 | 16739 | 21010 | 2.384 |
| 732-6F | t = 5 h | 8506 | 15823 | 20391 | 2.397 |
| 732-6G | t = 6 h | 8254 | 15407 | 20137 | 2.440 |
| 732-5A | Clear PET digested with 4.3% predigested PET (732-3) t = 0 h | 7785 | 15176 | 16190 | 2.080 |
| 732-5B | t = 0.5 h | 7839 | 14627 | 15643 | 1.996 |
| 732-5C | t = 1.5 h | 8359 | 16932 | 19093 | 2.284 |
| 732-5D | t = 2 h | 8403 | 16625 | 19605 | 2.333 |
| 732-5E | t = 2.5 h | 8237 | 16561 | 19796 | 2.404 |
| 732-5F | t = 3.75 h | 7669 | 15013 | 19189 | 2.502 |
| 732-5G | t = 4.75 h | 7201 | 14236 | 18899 | 2.624 |
| 732-5H | t = 5.5 h | 6945 | 12854 | 17562 | 2.529 |
| 733-5A | Clear PET digested with 11% predigested PET (732-3) t = 0 | 2848 | 4151 | 4484 | 1.575 |
| 733-5B | t = 1 h | 2882 | 4178 | 4527 | 1.570 |
| 733-5C | t = 2 h | 2864 | 4261 | 4568 | 1.595 |
| 733-5D | t = 3 h | 2896 | 4332 | 4620 | 1.595 |
| 733-5E | t = 4 h | 2923 | 4478 | 4736 | 1.620 |
| 733-5F | t = 5 h | 2971 | 4482 | 4821 | 1.623 |
| 733-5G | t = 6 h | 2989 | 4618 | 4915 | 1.644 |

The effect of elevated reaction temperatures was further analyzed by performing a digestion reaction with 100.0 grams of clear rPET with 3.3% predigested clear rPET. Homogeneity was achieved 2.92 hours from the time that heat was applied to the clear rPET. The longer time required to reach homogeneity was a function of the attempt to control the temperature and heating rate. Three samples of the homogeneous mixture were taken and GPC results tabulated:

1. 216° C. internal temperature (Ref. No. 732-18A, time 1235), MP=21171 PI=2.088
2. 249° C. internal temperature (Ref. No. 732-18B, time 1419), MP=19616 PI=2.185
3. 272° C. internal temperature (Ref. No. 732-18C, time 1530), MP=15459 PI=2.231

Thus, reaction time has little, if any, effect on the molecular weight of the product when concentrations of predigested rPET are ≥9%. Low concentrations of predigested rPET, however, indicate that the molecular weight of the digested rPET product decreased as time passed.

Increasing the reaction temperature resulted in lower molecular weight products. Although additional time was needed to raise the temperature of the reaction mixture, the additional time needed was 3 h. The additional time was most likely not sufficient alone to be a factor in the observed results.

Mixed Green and Clear rPET Digestions

Digestion experiments were performed with a mixture of green and clear rPET to determine the effect of blending these recycled materials, i.e., to determine whether the separation of green and clear rPET is necessary for the digestion reactions to occur. Sample Ref. No. 733-18 is summarized in Table 20; 1:1 mixture of green and clear PET was digested with ethylene glycol and zinc acetate using stoichiometry which produced material used for most of the predigestion experiments. The reaction behaved normally. GPC showed that the resulting material was a digested rPET having a MP=701 and polydispersity of PI=1.112.

TABLE 20

| Ref. | ethylene glycol | green rPET | clear rPET | Zn(OAc)$_2$ | reaction time |
|---|---|---|---|---|---|
| 733-18 | 250 mL | 155 g | 155 g | 5.00 g | 93 min |

The product from above was then used as a predigested rPET starting material in the digestion of 1:1 mixtures of green and clear rPET, and the experiments are summarized in Table 21. GPC results showed that the resulting digested rPET material had a very low polydispersity despite the fact that the clear and green rPET have different average molecular weights.

TABLE 21

| Ref. | Description | % predigested PET (Ref. No. 733-18) | MP | PI |
|---|---|---|---|---|
| 733-19 | 155 g green PET + 155 g clear PET + 733-18 | 15.0% | 3546 | 1.547 |
| 733-20 | 155 g green PET + 155 g clear PET + 733-18 | 25.0% | 2380 | 1.421 |
| 733-22 | 155 g green PET + 155 g clear PET + 733-18 | 55.0% | 1120 | 1.228 |

It has been shown, therefore, that recycled PET (rPET) can be converted to lower molecular weight polymers by glycolysis with ethylene glycol and zinc acetate. Material which was digested in this manner can thereby become a digestion agent to produce a wide range of molecular weight polymers from rPET starting material. Low concentrations of predigested rPET used as the "starter" gave high molecular weight products while, conversely, high concentrations of predigested rPET used as the "starter" gave low molecular weight products. Experiments with green colored rPET and clear colored rPET behaved similarly to experiments where green and clear colored rPET where mixed together.

The precipitates from each of the reactions, i.e., the digested rPET oligomers, were then each separately tested as to suitability as a resin replacement and/or resin extender.

Removal of Green Tint Remaining in Digested Green rPET

Initially, pre-digested green PET was reacted with 2,2-dimethyl-1,3-propane diol to make higher molecular weight polymers. In particular, 250 mL of toluene were brought to reflux in a 4-neck reactor fitted with a Dean-Stark trap. 125.0 grams of predigested green rPET from Sample No. 732-34 (Table 22 below) were added in portions to the refluxing toluene. It appeared that the refluxing toluene could accept more than the 125.0 grams of digested rPET material.

The homogeneous green reaction mixture was heated at reflux (111.0-113.1° C.) for 6 hours after completing the digested rPET addition. 14.6 mL of water was collected from the Dean-Stark trap. As the reaction mixture cooled through 102.7° C., a 2-phase mixture formed on stopping the agitator, an upper, homogeneous green layer and a lower, opaque faint green layer. At approximately 75° C. the mixture began to solidify. After cooling to ambient temperature, the heterogeneous mixture was transferred to a beaker and allowed to stand at ambient temperature overnight. Decanted homogeneous green solution was used to complete the transfer to the beaker.

Vacuum filtration of the mixture produced a white filter cake having a faint blue-green tint and a lime green homogeneous filtrate. The filter cake was washed with 50 mL of toluene. The filter cake yielded 105.26 grams of white solid material after drying the solid on a 40-50° C., Buchi pump rotary evaporator for 15 minutes followed by 15 minutes on a 40° C., 0.1 mm Hg vacuum Kugelrohr. 0.32 grams of green semi-solid were recovered from the concentration of 50 mL of the green filtrate on a rotary evaporator at 40-50° C. and Buchi pump vacuum followed by 15 minutes on a 40° C., 0.4 mm Hg vacuum Kugelrohr.

The solubility of the isolated white solid was performed with the following analysis:
  Solubility of the isolated white solid
    Mostly soluble: DMSO
    Somewhat soluble: chloroform; methylene chloride
    Insoluble: acetone; acetonitrile; methanol
  $^1H$ and $^{13}C$ NMR spectra of the white solid and isolated green filtrate solid; ($^1H$ NMR only of white solid spiked with ethylene glycol, ethylene glycol and DMSO-d6 blank) were obtained and are shown in FIGS. 17-47.
  White solid melting point: first signs of melting at 81° C.; clear material at 135° C.

Thus, it has been shown that any remaining green tint in the digested rPET can be substantially removed without affecting the properties of the digested rPET.

Green rPET Treated with Amines and Polyols

Green rPET was treated with various amines and polyols. The reactions were run as previously described: mixtures of green rPET pellets and the amine and/or polyol were heated with zinc acetate. Some reactions included ethylene glycol whiles others did not.

Diamines and hexamethylenetetramines produced hard brittle solids. This was presumably caused by cross-linking between various oligomers/low molecular weight polymers. Although these experiments did not give promising looking material, if indeed cross-linking occurred, the use of limited amounts of diamines/polyamines might prove useful in future experiments as the synthesis of higher molecular weight components from digested PET are targeted.

The reactions run with glycerin and 2,2-dimethyl-1,3-propanediol were promising. A reaction with 1.0 eq 2,2-dimethyl-1,3-propanediol (with respect to monomer MW) and green rPET gave a green pliable material, increasing to 2.0 eq of the diol gave a viscous green syrup. Several other experiments with this diol gave material which ranged from a syrup to a green brittle solid. When glycerin was used, higher amounts of glycerin gave gelatinous material. The results are summarized in Table 22.

TABLE 22

| Notebook ref. | rPET | Ethylene glycol | Additive 2 | $Zn(OAc)_2$ | Notes | $M_P$ | PI |
|---|---|---|---|---|---|---|---|
| 733-31 | green, 310 g | 0.50 eq | 0.19 eq 1,8-diaminooctane | 0.014 eq | Heated to 200-220° C. for 2 h. Opaque mint green brittle solid. | 1707 | 1.386 |
| 733-32 | green, 310 g | 0.50 eq | 0.42 eq ethylenediamine | 0.014 eq | Stirred easily during heat up, reaction solidified at 180° C. Added 1.0 eq EG and 0.42 eq ethylenediamine and temperature increased to 200° C. Solid remained after 2 h additional heating. Presumably, cross-linking occurred. | 1060 | 1.233 |
| 733-35 | green, 310 g | 0.50 eq | 0.27 eq hexamethylenetetraamine | 0.014 eq | Heated at 200° C. for 52 min to give tar like solution. Solidified to a dark, hard solid. | 1015 | 2.602 |
| 733-33 | green, 310 g | 0.50 eq | 0.33 eq glycerin | 0.014 eq | Heated at 200-210° C. for 79 min to form solution. Mint green wax-like solid. | 1007 | 1.262 |
| 733-34 | green, 310 g | 0.50 eq | 0.24 eq 1,6-hexanediol | 0.014 eq | Heated to 200° C. for 178 min for a solution to form. Mint green opaque taffy | 1301 | 1.303 |
| 733-36 | green, 310 g | 2.79 eq | — | 0.014 eq | Green rPET digestion with new rPET lot, standard stoichiometry. Performed to demonstrate technique is reproducible. | 672 | 1.113 |

TABLE 22-continued

| Notebook ref. | rPET | Ethylene glycol | Additive 2 | Zn(OAc)$_2$ | Notes | M$_P$ | PI |
|---|---|---|---|---|---|---|---|
| 733-37 | green, 310 g | — | 1.0 eq glycerin | 0.014 eq | Heated to 200-225° C. got 3 h. Material resembled lime green jello. | 1034 | 1.242 |
| 733-38 | green, 310 g | — | 0.75 eq glycerin | 0.014 eq | Heated to 200° C. for 67 min. Material resembled lime green jello. | 1030 | 1.303 |
| 732-27 | green, 310 g | 0.50 eq | 0.3 eq 2,2-dimethyl-1,3-propanediol | 0.014 eq | Heated at 210° C. for 2 h. Opaque green pliable material, resembled Gumby. | 1132 | 1.242 |
| 732-28 | green, 310 g | — | 0.6 eq 2,2-dimethyl-1,3-propanediol | 0.014 eq | Heated at 220° C. for 5.5 h. Clear green sticky pliable material, will take and hold shape when handled. | 1563 | 1.297 |
| 732-29 | green, 310 g | — | 1.0 eq 2,2-dimethyl-1,3-propanediol | 0.014 eq | Heated at 220° C. for 2.5 h. Steady reflux last 78 min (ethylene glycol?). Clear green sticky pliable material, will take and hold shape when handled (resembled 732-28). | 1224 | 1.226 |
| 732-30 | green, 155 g | — | 2.0 eq 2,2-dimethyl-1,3-propanediol | 0.014 | Heated to 220° C. for 3.25 h, milky reaction mixture, steady reflux. Opaque green liquid, slightly less viscous than honey. Glassware easily cleaned with acetone. | 1142 | 1.140 |
| 732-31 | green, 310 g | — | 0.2 eq 2,2-dimethyl-1,3-propanediol | 0.014 | Heated to 220° C. for 4.5 h, isolated a dark green brittle solid. | 3601 | 1.612 |
| 732-34 | green, 620 g | 2.79 eq | — | 0.014 | Heated to 200° C. for 1 h to give a waxy green solid. | 691 | 1.104 |
| 733-46 | green, 310 g | — | 1.5 eq glycerin | 0.014 | Heated to 200-240° C. for 112 min to give a sticky green gel. | 700 | 1.185 |
| 733-48 | green, 310 g | — | 0.5 eq 1,6-hexanediol | 0.014 | Heated to 200° C. for 6.1 h. Cooled to give a hard mint green solid. | 2066 | 1.378 |
| 733-49 | dPET from 733-36 | — | 0.5 eq 1,6-hexanediol | — | dPET (MW 672) was melted at 150° C. and treated with diol. Heated for 3 h, samples were drawn at t = 0, 1, 2, 3 h (column to right) and molecular weight increased. A flexible green solid was obtained after cooling. | 724 1584 11439 6647 | 1.120 1.301 2.211 1.936 |

Reaction of dPET with Carboxylic Acids and Anhydrides

Predigested material produced in experiment 733-36 from the customary procedure of 2.79 eq ethylene glycol, 1.0 eq rPET and 0.014 eq zinc acetate dihydrate was treated with a variety of diacids and anhydrides in an effort to produce higher molecular weight material. The reactions were performed by heating a mixture of the predigested material along with either a diacid or anhydride. A stream of nitrogen was blown through the flask to remove water which was produced as a by-product. Oxalic acid was the smallest of the diacids used, and it gave a hard green solid. Higher molecular weight diacids and anhydrides gave materials which ranged from pliable to a sticky jelly-like material. GPC data is presented for different times in descending order are t=0, t=1 h, t=2 h and t=3 h (or final time point as indicated). The results are summarized in Table 23.

TABLE 23

| Notebk ref | Predigested PET | Additive | Notes | | MP | PI |
|---|---|---|---|---|---|---|
| 733-39 | 1.0 eq | 0.5 eq oxalic acid | Exothermic reaction with considerable outgassing. Heated 3 h at 150° C. Isolated hard green solid. | | 676<br>686<br>706<br>729 | 1.121<br>1.131<br>1.128<br>1.130 |
| 733-40 | 1.0 eq | 0.5 eq D-malic acid | Heated 3 h at 150° C. to give a mint green gummy material, very sticky, viscous syrup which could not be separated from aluminum sheet. | | 697<br>691<br>1025<br>1022 | 1.120<br>1.149<br>1.193<br>1.232 |
| 733-42 | 1.0 eq | 0.5 eq malonic acid | Heated 3 h at 150° C. to give a mint green gummy solid. Material could be hand shaped and hold its form. Sticky, could not be separated from aluminum sheet. | | 687<br>693<br>1038<br>1076 | 1.110<br>1.146<br>1.182<br>1.205 |
| 733-43 | 1.0 eq | 0.5 eq tartaric acid | Heated for 3 h at 150° C. to give a hard green solid. | | 707<br>706<br>716<br>673 | 1.121<br>1.131<br>1.140<br>1.171 |
| 733-44 | 1.0 eq | 0.5 eq L-malic acid | Heated for 3 h at 150° C. to give a pliable green solid. Sticky, pliable enough to take and hold a thumb print impression. | | 659<br>645<br>997<br>1004 | 1.113<br>1.150<br>1.191<br>1.212 |
| 733-45 | 1.0 eq | 0.5 eq maleic anhydride | Heated for 3 h at 150° C. to give a clear green sticky jello-like solid | | 670<br>1006<br>1372<br>1646 | 1.107<br>1.327<br>1.366<br>1.432 |
| 733-47 | 1.0 eq | 0.5 eq succinic anhydride | Heated for 3 h at 150° C. to give a dark brittle rubber like solid. | | 680<br>4336<br>16165<br>22674 | 1.122<br>1.606<br>2.403<br>3.575 |
| 733-51 | 1.0 eq | 0.5 eq propionic anhydride | Heated for 2.5 h at 150° C., after 2 h the reaction mixture solidified. Increased temp to 250° C. to give a thick syrup which cooled to a hard mint green solid. | | 791<br>765<br>1861<br>13499 | 1.104<br>1.122<br>1.293<br>2.222 |
| 733-52 | 1.0 eq | 0.5 eq methacrylic anhydride | Heated for 2.5 h at 150° C. A hard brittle green solid was obtained. | | 766<br>1375<br>2098<br>5248 | 1.143<br>1.206<br>1.289<br>5.433 |

TABLE 23-continued

| Notebk ref | Predigested PET | Additive | Notes | | MP | PI |
|---|---|---|---|---|---|---|
| 733-53 | 1.0 eq | 0.5 eq glutaric anhydride | Heated for 3 h at 150° C. Upon cooling, a gummy mint green mass formed. The material could be deformed and hold a shape. | 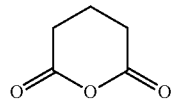 | 828<br>1230<br>1242<br>1593 | 1.096<br>1.167<br>1.204<br>1.260 |
| 733-54 | 1.0 eq | 0.5 eq glutaric acid | Heated for 3 h at 150° C. Upon cooling, a mint green play-dough like mass formed. The material could be deformed and hold a shape, it was harder to manipulate than 733-53. | 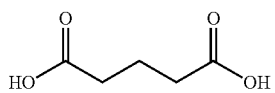 | 842<br>1246<br>1581<br>2366 | 1.106<br>1.255<br>1.286<br>1.334 |
| 733-55 | 1.0 eq | 0.5 eq D-malic acid | dPET was stirred in refluxing toluene and treated with D-malic acid. Refluxed for 3 h with a Dean-Stark trap to collect water. Cooled and collected a gummy off-white solid. (This experiment was similar to 733-40 but with toluene, the previous experiment could not be separated from aluminum foil used in collecting it.) | 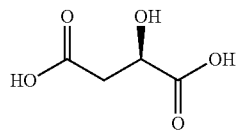 | 829 | 1.107 |
| 733-56 | 1.0 eq | 0.5 eq maleic anhydride | dPET was stirred in refluxing toluene and treated with maleic anhydride. Refluxed for 3 h with a Dean-Stark trap to collect water. Cooled and collected a gummy off-white solid. | 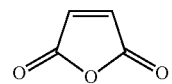 | 852 | 1.117 |
| 733-61 | 1.0 eq | 0.25 eq trimellitic anhydride | dPET was melted at 150° C. and treated with trimellitic anhydride. This was selected to provide cross-linking between oligomers. A sampled at t = 0 when the anhydride was added and at 20 min when the reaction mixture solidified. | 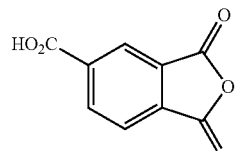 | t = 0: 677<br>t = 20 min: 2339 | 1.122<br>2.544 |
| 733-62 | 1.0 eq | 0.25 eq trimellitic anhydride | dPET (732-3, clear MW 672) was stirred in refluxing toluene and treated with trimellitic anhydride for 3 h. Reaction was similar to 733-61 but with solvent to facilitate mixing and removal from reaction flask. Upon cooling to r.t., a hard white solid separated from the toluene layer. | 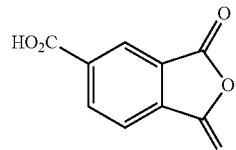 | 701 | 1.117 |

TABLE 23-continued

| Notebk ref | Predigested PET | Additive | Notes | MP | PI |
|---|---|---|---|---|---|
| 733-64 | 1.0 eq | 0.1 pyromellitic anhydride | dPET (732-3, clear MW 672) was stirred in refluxing toluene and treated with pyromellitic anhydride for 3 h. Upon cooling to r.t., a hard white solid separated from the toluene layer. It had the same texture as st. material. | 714 | 1.139 |

Solubility Studies

Several of the resulting dfPETs were taken up in toluene, NMP, THF and water. dPET from 732-28, 732-29 and 732-30 showed excellent solubility in NMP.

Table 24 describes the results of several digestions of PET (both virgin and recycled) with both neopentyl glycol (NPG) and ethylene glycol (EG) as the glycolysis agents. With respect to the "OH #" column, this refers to the resulting hydroxyl number of the respective dfPET. One of ordinary skill in the art will appreciate that changes can be made to the ratios of reactants, reaction temperature, reaction time, etc. to produce dfPETs of varying structure, reactivity, and/or function. Outside of the broad process disclosed herein—one of ordinary skill in the art should not consider any particular combination of reactants and reaction conditions as limiting to the disclosed inventive processes and concept(s) herein.

TABLE 24

| Sample Ref. No. | Recycled/ Virgin PET | Color | Glycolysis Agent | Molar Ratio of Alcohol to PET (monomer basis) | OH # | Avg. MW |
|---|---|---|---|---|---|---|
| 732-29 | recycled | green | NPG | 1.00 | 339 | 1224 |
| 732-34 | recycled | green | EG | 2.78 | 434 | 691 |
| 732-38 | recycled | clear | EG | 2.78 | | 722 |
| 732-40 | recycled | clear | NPG | 1.00 | | 1272 |
| 732-43 | recycled | clear | NPG | 1.00 | 373 | — |
| 732-58 | recycled | green | NPG | 1.00 | 368 | 1158 |
| 732-78 | recycled | green | NPG | 1.00 | 225 | 1268 |
| 732-102 | recycled | green | NPG | 1.00 | | 1198 |
| 733-58 | recycled | clear | NPG | 1.00 | | 1514 |
| 733-65 | recycled | clear | NPG | 1.00 | | 1240 |
| 749-114 | virgin | clear | NPG | 1.00 | 354 | 1237 |
| 749-82 | recycled | green | NPG | 1.00 | | 1410 |
| 751-19 | recycled | green | NPG | 1.00 | 379 | — |
| 753-11 | recycled | green | NPG | 1.00 | 365 | 1246 |
| 768-8 | recycled | green | NPG | 0.40 | 184 | 1920 |

NPG = Neopentyl Glycol
EG = Ethylene Glycol

B. Use of dfPET in Making Polyurethane Dispersions

The solubility of the dfPET materials in both NMP and acetone allows them to be incorporated into polyurethane dispersions ("PUDs") using a synthetic route commonly known by those of ordinary skill in the art as "The Acetone Process." Although the Acetone Process is one exemplary methodology for making PUDs, one of ordinary skill in the art will appreciate that other processes for making PUDs—e.g., other solvent processes (MEK, for example), prepolymer processes, etc.—can be used with dfPET and are contemplated for use with and/or as a part of the presently disclosed and claimed inventive concept(s). Several experiments testing the resulting PUDs made via the Acetone Process utilizing dfPET were, for example, cast on steel panels and analyzed for hardness, water resistance and solvent resistance. The properties of the resulting polyurethane films indicate their suitability for commercial applications and therefore, the dfPET may be used to make a polyurethane dispersion for commercial use.

For example, but not by way of limitation, the properties of an experimental polyurethane dispersion formulation having an internal reference No. 734-63 (made from a dfPET polyol and according to the Acetone Process), provided a good balance between ease of synthesis, emulsion formation, hardness, and water resistance. The robustness of the methodologies for making PUDs with dfPET as disclosed herein (e.g., the Acetone Process etc.), has been demonstrated by the present inventors at both bench scale (i.e., a 1 L resin kettle) as well as within a pilot plant reactor (i.e., a 350 gallon reactor operated by Anderson Development Company in Adrian, Mich.]

Polyurethane Dispersion (PUD) Synthesis

A process to form a polyurethane dispersion based on an oligomeric form of polyethylene terephthalate with hydroxyl and/or amine group(s) is disclosed. In the presently disclosed and claimed inventive concept(s), the term "polyurethane" is used as shorthand for a chain-extended isocyanate-terminated prepolymer. The "polyurethane" may contain urethane linkages, urea linkages, silane, ester or other groups or, as is usual, combinations of two or more of these constituents. The prepolymer itself may contain urethane or urea groups, or combinations of these constituents prior to chain extension.

Although not critical to the presently disclosed and claimed inventive concept(s), the prepolymer is preferably water-dispersible. By "water-dispersible", it is meant that the prepolymer is capable of being dispersed in water to form a dispersion without significant separation of the aqueous and prepolymer phases into distinct layers. A water-dispersible prepolymer provides at least two advantages: first, it facilitates making a stable dispersion of prepolymer droplets during the dispersing step and second, it promotes the formation of smaller droplets (which also tends to improve stability). However, it is possible to achieve these properties even with a prepolymer that is not water-dispersible, using an appropriate selection of external surfactant(s) and/or a costabilizer.

Water dispersibility may also be further promoted or enhanced by incorporating hydrophilic groups such as poly (ethylene oxide) chains, carboxylic acid, carboxylate, phosphate, sulfonate or ammonium groups into the prepolymer structure.

Given the above broad outline and the following details, examples and teachings, one of ordinary skill in the art, provided the present disclosure and teachings, will appreciate that the presently disclosed and claimed inventive concept(s) encompass any PUD based upon or incorporating the presently disclosed taught, and/or claimed dfPET material. As such, the claims should not be limited to any particular methodology or process chemistry for making the PUDs in the absence of any specific teaching or notation to the contrary.

In a non-limiting embodiment, the aqueous polyurethane dispersion is made in at least two stages: formation of the polyurethane prepolymer and formulation of the polyurethane dispersion. In the first stage, an isocyanate terminated polyurethane prepolymer is prepared by combining chemical reactants including dfPET and at least one isocyanate reactive compound. The isocyanate reactive compound is capable of imparting some hydrophobicity to the polyurethane prepolymer. Thereafter, the isocyanate reactive group is neutralized with a neutralizing agent having a suitable organic counter ion. The product of this first process is a polyurethane prepolymer composition incorporating at least the dfPET into the polymer backbone and having at least one iso-functionality associated therewith. In the step of forming the dispersion, the above-prepared polyurethane prepolymer is dispersed in water to provide an aqueous-based dispersion. In practice, the water in the dispersion acts as a chain extender thereby terminating the polyurethane prepolymer and forming a polyurethane polymer dispersed in an aqueous solvent. Of course, the polyurethane prepolymer can be mixed with additional chain extending agents, as will be discussed in more detail below.

In certain preferred embodiments, the aforementioned steps within each stage are conducted sequentially. However, in alternative embodiments, one or more of the above steps of either or both stages may be performed in a variety of different orders or during at least a portion of one or more steps. In certain instances, for example, the neutralizing step may be conducted during at least a portion of the reacting step, the neutralizing step may be conducted during at least a portion of the dispersing step, or the reacting step may be conducted during at least a portion of the chain extending steps, and variations thereof.

In one embodiment, the process of making a PUD involves (i) reacting a polyisocyanate with an active hydrogen containing compound (e.g., dfPET) at a temperature ranging from about 20° C. to about 180° C. to provide a prepolymer; (ii) dispersing the prepolymer in an aqueous medium to provide a prepolymer dispersion; and (iii) extending the prepolymer by adding a chain extender to the prepolymer dispersion to provide a polyurethane dispersion.

In another embodiment, the process of making a PUD involves (i) reacting a polyisocyanate with an active hydrogen containing compound (e.g., dfPET) at a temperature ranging from about 20° C. to about 180° C. to provide a prepolymer; (ii) dispersing the prepolymer in an aqueous medium to provide a prepolymer dispersion; and (iii) heating the prepolymer dispersion to a temperature sufficient to extend the prepolymer to provide a polyurethane dispersion.

Active hydrogen containing compounds most commonly used in polyurethane production are those compounds having at least two hydroxyl groups and/or amine groups. Those compounds are referred to herein as polyols. Examples of active hydrogen containing compounds include, but are not limited to the oligomeric form of polyethylene terephthalate with hydroxyl and/or amine group(s) described previously. In one embodiment, the active hydrogen containing compound is the oligomeric form of polyethylene terephthalate with hydroxyl group(s) as described hereinabove—i.e., the dfPET compounds as set forth in Tables A, B, A1, A2, and combinations thereof.

The oligomeric form of polyethylene terephthalate with hydroxyl and/or amine group(s) can be reacted with a polyisocyanate to form a polyurethane prepolymer. The polyurethane prepolymer can be formed according to any method known in the art, such as by heating the oligomeric form of polyethylene terephthalate with hydroxyl and/or amine group(s) with the polyisocyanate until a desired NCO equivalent weight is achieved. Preferably, the polyisocyanate and the oligomeric form of polyethylene terephthalate with hydroxyl and/or amine group(s) are brought together and heated under reaction conditions sufficient to prepare the polyurethane prepolymer. The stoichiometry of the prepolymer formulations, in one embodiment of the presently disclosed and claimed inventive concept(s), is such that the polyisocyanate is present in excess. In other embodiments of the presently disclosed and claimed inventive concept(s), the stoichiometry of the prepolymer formulations is such that there is an excess or equivalent amount of dfPET to polyisocyanate.

The prepolymer can be made in the presence of a solvent and the solvent removed before or after the production of the dispersion. Generally, producing a PUD without using a solvent is called a "prepolymer process." The prepolymer process has the advantage of using very little to no solvent. This is also a disadvantage: if the reaction is exothermic, controlling the heat output may be difficult if little or no solvent is used; manipulation and handling of high viscosity polymers is also difficult and commercially disadvantageous. The prepolymer process also has issues with foam formation due to the higher isocyanate content and reaction with isocyanate to form carbon dioxide.

If a solvent is present, the solvent is removed to give an aqueous dispersion which is essentially free of solvent. That is, the dispersion generally will contain less than 5 percent, preferable less than 2.5 percent and more preferably less than 1 percent by weight of solvent. The prior ranges of solvent will be understood as being examples and should not be construed as limiting with regard to the presently disclosed and claimed inventive concept(s). Examples of solvents which are not reactive with the polyisocyanate and may be used herein include ketones, such as acetone, butanone and methyl ethyl ketone; ethers such as tetrahydrofuran, dioxane and dimethoxyethane; ether esters, such as methoxypropyl acetate and di(propylene)glycol methyl ether; (cyclic)amide and ureas, such as dimethylformamide, dimethylacetamide, N,N'-dimethyl-2,5-dizapentanone; N-methylpyrrolidone (NMP); N-ethylpyrrolidone (NEP); ethyl acetate and capped glycol ethers. These solvents may be added at any stage of the prepolymer preparation.

In one non-limiting embodiment, the solvent can be acetone. A process which utilizes acetone as a solvent is generally referred to as an "Acetone Process." NMP is generally used as a co-solvent in low or very-low percentages. NMP has traditionally been used as a co-solvent because of its coalescing properties. The presently disclosed and claimed inventive concept(s) encompass the use of the Acetone Process with and without co-solvents such as NMP, for example but not by way of limitation.

Any suitable polyisocyanate can be used to make the aqueous polyurethane dispersions of the presently disclosed and claimed inventive concept(s). In a non-limiting embodiment, the polyisocyanates include one or more polyisocyanates selected from the group consisting of isophorone diisocyanate (IPDI), methylene bisphenyl isocyanate (MDI), dicyclohexylmethane 4,4'-diisocyanate ($H_{12}$MDI), cyclohexyl diisocyanate (CHDI), m-tetramethylxylylene diisocyanate (m-TMXDI), tetramethylxylylene diisocyanate (TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), 1,4-diisocyanatobutane, 1,5-diisocyanatopentane, 1,6-diisocyanatohexane, 2-methyl-L5-diisocyanatopentane, 1,5-diisocyanato-2,2-dimethylpentane, 2,2,4-trimethyl-1,6-diisocyanatohexane, 2,4,4-trimethyl-1,6-diisocyanatohexane, 1,1,0-diisocyanatodecane, 1,3-diisocyanatocyclohexane, 1,4-diisocyanatocyclohexane, 1,3-bis-(isocyanatomethyl)cyclohexane, 1,4-bis-(isocyanatomethyl)cyclohexane, isophorone diisocyanate, 4,4'-diisocyanatodicyclohexylmethane, triisocyanatononane, ω,ω'-diisocyanato-1,3-dimethylcyclohexane, 1-isocyanato-1-methyl-3-isocyanatomethylcyclohexane, 1-isocyanato-1-methyl-4-isocyanatomethylcyclohexane, bis-(isocyanatomethyl)norbornane, 1,5-naphthalene diisocyanate, 1,3-bis-(2-isocyanatoprop-2-yl)benzene, 1,4-bis-(2-isocyanatoprop-2-yl)benzene, 2,4-diisocyanatotoluene, 2,6-diisocyanatotoluene, 2,4'-diisocyanatodiphenylmethane, 4,4'-diisocyanatodiphenylmethane, 1,5-diisocyanatonaphthalene, 1,3-bis(isocyanatomethyl)benzene, and combinations thereof.

Mixtures of isocyanates may also be used with the PUDs of the presently disclosed and claimed inventive concept(s). For example but not by way of limitation, commercially available mixtures of 2,4- and 2,6-isomers of toluene diisocyanates (TDI) may be used. A "crude" polyisocyanate may also be used in the practice of the presently disclosed and claimed inventive concept(s). For example but not by way of limitation, toluene diisocyanate obtained by the phosgenation of a mixture of toluene diamine isomers or diphenylmethane diisocyanate obtained by the phosgenation of crude methylene diphenylamine may be used as such "crude" polyisocyanates. TDI/MDI blends may also be used and one of ordinary skill in the art would appreciate the advantages of using same.

In another non-limiting embodiment of the presently disclosed and claimed inventive concept(s), the polyisocyanates may include one or more polyisocyanate adducts containing biuret, urethane, uretdione, allophanate, isocyanurate, and/or iminooxadiazinedione groups.

In one non-limiting embodiment, forming the prepolymer comprises reacting: (i) a polyisocyanate; (ii) an oligomeric form of polyethylene terephthalate with hydroxyl and/or amine group(s)(e.g., the dfPET compounds described with respect to Tables A, B, A1, A2, and combinations thereof); and (iii) a water solubilizing monomer, at a temperature ranging from about 20° C. to 180° C. to provide a polyurethane prepolymer that comprises a water solubilizing group. A water solubilizing monomer is a compound bearing a hydrophilic group or an ionic group (or a group that can be made into a hydrophilic group or an ionic group) that facilitates solubility or dispersion in water and that can be incorporated into the polymer chain of the prepolymer. Representative groups that facilitate solubility in water include, but are not limited to, hydroxyl groups, carboxyl groups, sulphonate groups, amino groups, and quaternary ammonium groups.

One skilled in the art would readily appreciate and be aware of suitable water solubilizing monomers that are useful for preparing the prepolymers described above and thereafter the PUDs of the presently disclosed and claimed inventive concept(s). Representative water solubilizing monomers useful in the methods of the presently disclosed and claimed inventive concept(s) include, but are not limited to, hydroxy-carboxylic acids having the general formula $(HO)_xQ(COOH)_y$, wherein Q is a straight or branched hydrocarbon radical containing 1 to about 12 carbon atoms, x and y ranges from 1 to about 3. Such hydroxyl-carboxylic acids are described in U.S. Pat. No. 6,576,702, the contents of which are incorporated herein by reference. Examples of such hydroxy-carboxylic acids include, but are not limited to, citric acid, dimethylolpropanoic acid (DMPA), dimethylol butanoic acid (DMBA), glycolic acid, lactic acid, malic acid, dihydroxymalic acid, and dihydroxytartaric acid. In one non-limiting embodiment, dihydroxy-carboxylic acids are used. Other suitable water solubilizing monomers include thioglycolic acid, 2,6-dihydroxybenzoic acid, sulfoisophthalic acid, and polyethylene glycol.

Typically, the water solubilizing monomer is present in an amount ranging from about 0.1 to about 30 percent by weight of the prepolymer. In one non-limiting embodiment, the water solubilizing monomer is present in an amount ranging from about 2 to about 8 percent by weight of the prepolymer. In another embodiment, the water solubilizing monomer is present in an amount ranging from about 3 to about 6 percent by weight of the prepolymer. In another non-limiting embodiment, the hydrophilic monomer is dimethylolpropionic acid (DMPA). Typically, N-methyl-2-pyrrolidone (NMP) is also present in order to support the addition of DMPA into the prepolymer structure.

A monol can also be included in the prepolymer formulation. The monol is, in one non-limiting embodiment, a mono-functional hydrophilic polyether. The monols can be incorporated into the prepolymer in order to modify the properties of the latex and improving ease of emulsion formation. When present, the monol is present in amount of from 0.1 to about 15 weight percent of the prepolymer formulation, preferably from 2 to about 5 weight percent of the prepolymer formulation.

Formation of the prepolymer can take place with or without the use of a catalyst. Suitable catalysts useful for preparing the prepolymer include, but are not limited to, stannous octoate, dibutyl tin dilaurate, and tertiary amine compounds such as triethylamine and bis-(dimethylaminoethyl) ether, morpholine compounds such as ββ'-dimorpholinodiethyl ether, bismuth carboxylates, zinc bismuth carboxylates, iron (III) chloride, potassium octoate, potassium acetate, DABCO®(bicycloamine) (commercially available from Air Products), and FASCAT®2003 (commercially available from Arkema). The amount of catalyst used may be, but not by way of limitation, from about 5 to about 200 parts per million of the total weight of prepolymers. In one non-limiting embodiment, a zirconium chelate catalyst such as K-KAT® XC9213 (commercially available from King Industries, Inc.) is used. Additionally, water degradable catalyst can be used to form the prepolymer. The term "water degradable" means the catalyst deactivates in the presence of water—i.e., the catalyst used in the production of the polyurethane product (which may contain some amount of residual catalyst) is dispersed into the aqueous solvent to thereby create PUD. In this manner, residual catalyst remaining in the PUD, which is thereafter used in a commercial application, does not interfere or react with the resulting PUD coating. Suitable water degradable catalysts include, but are not limited to, zirconium chelate such as the K-KAT® XC9213 catalyst from King Industries, Inc. The amount of water degradable catalyst used may be from about 5 to about 200 parts per million. One of ordinary skill in the art would appreciate that any water degradable catalyst for isocyanate reactions could be used.

Additional polyurethane dispersion additives may include, for example but not by way of limitation, PEG-200, PEG-600, PEG-1500 (indeed, PEG-N, wherein N=200 to 500,000), 1,4-butanediol, 1,6-hexanediol, Tetraethylene glycol, Cis-2-butene-1,4-diol, Glycerin, 1,4-cyclohexanedimethanol, Tris(hydroxymethyl)ethane, 1,1,1-tris(hydroxymethyl)ethane, Ethylene diamine, Piperazine, 1,3-diaminopropane, 1,8-diaminooctane, and combinations thereof Based on the nature of the oligomeric form of polyethylene terephthalate containing hydroxyl and/or amine group(s) and polyisocyanates employed (i.e., the dfPET represented by the formulas found in Tables A, B, A1, A2, and combinations thereof), the polyurethane dispersion will have a measurable acid number. The acid number of the polyurethane can be at least about 27, in some cases at least about 30, in other cases at least about 50 and in some situations at least about 65 mg KOH/g. Also, the acid number of the polyurethane in the dispersion can be up to about 240, in some cases about 220, in other cases at least about 200, in some situations up to about 150 and in other situations up to about 100 mg KOH/g.

In a non-limiting embodiment, the acid groups of the polyurethane prepolymer can be neutralized using a suitable neutralizing agent. Suitable neutralizing agents include, but are not limited to, amines and/or alkali metal hydroxides. In a particular non-limiting embodiment of the presently disclosed and claimed inventive concept(s), the amine neutralizing agents can be tertiary amines selected from N-methyl morpholine, trimethyl amine, triethylamine, triethanol amine, pyridine, methylpyridine, benzyldimethylamine, N,N-endoethylenepiperazine, N-methylpiperidine, pentamethyldiethylenetria-mine, N,N-dimethylaminocyclohexane, N,N'-dimethylpiperazine, N,N-dimethylbenzylamine, and combinations thereof.

In certain preferred but non-limiting embodiments of the presently disclosed and claimed inventive concept(s), one or more chain terminating agents may be used to control the molecular weight of polyurethane polymer contained within the aqueous polyurethane dispersion. The amount of chain terminating agent present may range from 0% to about 2.5%, preferably from about 0.3% to about 1.25%, and more preferably from about 0.5% to about 0.8% by weight of the reaction mixture excluding solvent (if present). In certain preferred embodiments such as those where the neutralizing agent is added prior to the chain terminating agent, the amount of chain terminating agent that is added is sufficient to react from about 2 to 50 molar % of the remaining isocyanate groups contained therein. Compounds, particularly monofunctional compounds, such as those containing hydroxyl, amino, and thio groups that have only one active hydrogen relative to isocyanate groups are suitable chain terminating agents. Examples of suitable monofunctional chain terminators include amino alcohols, ammonia, primary or secondary aliphatic, alicyclic, aromatic, aralyphatic, or heterocyclic amines, especially primary aliphatic amines such as ethylamine. Compounds containing secondary amino groups are preferred. Particular non-limiting embodiments of compounds containing secondary amino groups include those compounds wherein at least one of the organic groups attached to the nitrogen atom contains greater than 2 carbon atoms. In certain preferred non-limiting embodiments, the chain terminating agent comprises di-n-butylamine.

The prepolymer can be dispersed in an aqueous medium using any method known to those skilled in the art. Typically, the prepolymer is simply added to the aqueous medium with stirring, preferably rapid stirring. Sometimes, high speed/high shear stirring is used to obtain a dispersion of good quality. Typically, the prepolymer and the aqueous medium are combined to provide a polyurethane dispersion.

The prepolymer can be dispersed in the aqueous medium at any temperature. Typically, however, the temperature is below the boiling point of the aqueous medium. By using a closed reactor capable of withstanding elevated pressure, however, it is possible to disperse the prepolymer in the aqueous medium at a temperature higher than the boiling point of the aqueous medium. Generally, in commercial processes for preparing polyurethane dispersions the prepolymer is dispersed in the aqueous medium at a temperature of less than about 50° C. and often less than about 25° C. The relatively low temperature is required since the isocyanate groups of the prepolymer undergo a relatively rapid reaction with water that leads to polymerization rendering the prepolymer non-dispersible in water. Furthermore, the rapid reaction of the isocyanate groups of the prepolymer with water, at higher temperatures, leads to the formation of carbon dioxide—thereby resulting in foaming, which renders the process difficult to perform. By lowering the temperature at which the dispersion is formed, such side reactions are reduced. Accordingly, in one non-limiting embodiment, the prepolymer is dispersed in the aqueous medium at a temperature less than about 50° C. In another non-limiting embodiment, the prepolymer is dispersed in the aqueous medium at a temperature ranging from about 20° C. to about 50° C.

The polyurethane prepolymer, once it is dispersed in the aqueous medium, can thereafter be chain extended to further increase its molecular weight and provide the final PUD with additional advantages. For example but not by way of limitation, any chain extension agent having more than one reactive functional group that is capable of reacting with isocyanates may be added to the PUD so as to react with the isocyanate functional groups of the prepolymer and thereby increase its molecular weight. Examples of compounds which can react with the isocyanate functional groups and thereby chain extend the polymer (in addition to the water) include polyols, polyamines, polythiols, or other compounds having reactive functional groups, such as hydroxyl groups, thiol groups, amine groups, carboxylic acids, and acetylacetonate protons.

Suitable polyol chain extenders include, but are not limited to, 1,6-hexanediol; cyclohexanedimethanol; 2-ethyl-1,6-hexanediol; 1,4-butanediol; ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; 1,3-propanediol; 1,4-butanediol; neopentyl glycol; dihydroxyalkylated aromatic compounds such as the bis(2-hydroxyethyl)ethers of hydroquinone and resorcinol (HER); p-xylene-a,a'-diol; the bis(2-hydroxyethyl)ether of p-xylene-a,a'-diol; m-xylene-a,a'-diol and the bis(2-hydroxyethyl)ether, trimethylol propane, 1,2,6-hexantriol, glycerol, and mixtures thereof.

Suitable polyamine extenders include, but are not limited to, p-phenylenediamine, m-phenylenediamine, benzidine, 4,4'-methylenedianiline, 4,4'-methylenibis(2-chloroaniline), ethylene diamine, m-xylylenediamine (MXDA) and combinations of these. Other suitable chain extenders are amino alcohols such as ethanolamine, propanolamine, and butanolamine. Acidic chain extenders include 2,2-bis(hydroxymethyl)propionic acid (DMPA), 2,2-bis(hydroxymethyl)butyric acid, and diphenolic acid. Other suitable chain extenders and combinations of chain extenders are also within the scope of the present invention. Polyisocyanates can also be used, such as any of those listed previously, to further chain extend the molecule and/or impart desired properties.

Chain extension can also be accomplished by means standard in the art. For example, the chain extenders can be heated in a flask and the polyurethane and/or PUD added thereto. In certain nonlimiting embodiments, it may be desired to neutralize a chain extended polyurethane having acidic functionality to increase the stability of the polyurethane when it is dispersed in water. Any amine or other neutralizing agent can be used; certain chain extenders may also provide neutralization. Examples include, but are not limited to, MXDA, N-methyl dithanolamine (NMDEA), N-ethyldiethanolamine, N-propyldiethanolamine, N-isopropyl diethanolamine, N-butyldiethanolamine, N-isobutyldiethanolamine, N-oleyl diethanolamine, N-stearyldiethanolamine, ethoxylated coconut oil fatty amine, N-allyl diethanolamine, N-methyldiisopropanolamine, N-ethyl diisopropanolamine, N-propyl diisopropanolamine, N-butyl diisopropanolamine, C-cyclohexyl diisopropanolamine, N,N-diethoxylaniline, N,N-diethoxyl toluidine, N,N-diethoxyl-1-aminopyridine, N,N'-diethoxyl piperazine, dimethyl-bis-ethoxyl hydrazine,N,N'-bis-(2-hydroxyethyl)-N, N'-diethylhexahydrop-phenylenediamine, N-12-hydroxyethyl piperazine, polyalkoxylated amines, such as propoxylated methyl diethanolamine, also such compounds as N-methyl-N,N-bis-3-aminopropylamine, N-(3-aminopropyl)-N,N'-dimethyl ethylenediamine, N-(3-aminopropyl)-N-methylethanolamine, N,N'-bis-(3-aminopropyl)-N,N-dimethyl ethylenediamine, N,N'-bis-(3-aminopropyl)-piperazine, N-(2-aminoethyl)-piperazine, N,N'-bisoxyethylpropylenediamine, 2,6-diaminopyridine, diethanolaminoacetamide, diethanolamidopropionamide, N,N-bisoxyethylphenyl thiosemicarbazide, N,N-bis-oxyethylmethyl semicarbazide, p,p'-bis-aminomethyldibenzylmethylamine, 2,6-diaminopyridine, 2-dimethylaminomethyl-2-methylpropanel, 3-diol, dimethylethanol amine (DMEA), and combinations thereof. The neutralizing agent can also contribute to the barrier properties of the coating. In certain nonlimiting embodiments, the polyurethane is in solvent, and neutralization of any acid in the polyurethane molecule is not desired and/or sought.

Other materials, particularly water, can function to extend chain length and so may (and should) be considered as being chain extenders for purposes of the presently disclosed and claimed inventive concept(s). In a particularly preferred but limiting example, the chain extender is water or a mixture of water and an amine such as, for example but not by way of limitation, aminated polypropylene glycols such as Jeffamine D-400 (as well as other such compounds available from Huntsman Chemical Company), amino ethyl piperazine, 2-methyl piperazine, 1,5-diamino-3-methyl-pentane, isophorone diamine, ethylene diamine, diamino butane, hexamethylene diamine, tetramethylene tetraamine, aminoethyl propyl trimethoxy silane, diethylene triamine, triethylene tetramine, triethylene pentamine, ethanol amine, lysine in any of its stereoisomeric forms and salts thereof, hexane diamine, hydrazine, piperazine, and combinations thereof. In the practice of one non-limiting embodiment of the presently disclosed and claimed inventive concept(s), the chain extender may preferably be a solution of any difunctional and/or multifunctional water soluble amine compound in water—e.g., hexanediamine.

Surfactants can also be useful for preparing a stable PUD accordingly to the presently claimed and disclosed inventive concept(s). Surfactants useful for preparing a stable dispersion in the practice of the presently disclosed and claimed inventive concept(s) can be cationic surfactants, anionic surfactants, zwitterionic, non-ionic surfactants, and combinations thereof. Examples of anionic surfactants include sulfonates, carboxylates, and phosphates. Examples of cationic surfactants include quaternary amines. Examples of non-ionic surfactants include block copolymers containing ethylene oxide and silicone surfactants, such as ethoxylated alcohol, ethoxylated fatty acid, sorbitan derivative, lanolin derivative, ethoxylated nonyl phenol or an alkoxylated polysiloxane. Furthermore, the surfactants can be either external surfactants or internal surfactants. External surfactants are surfactants which do not become chemically reacted into the polymer during dispersion preparation. Examples of external surfactants useful herein include salts of dodecyl benzene sulfonic acid, and lauryl sulfonic acid salt. Internal surfactants are surfactants which do become chemically reacted into the polymer during dispersion preparation. An example of an internal surfactant useful herein includes anionic molecules such as 2,2-dimethylol propionic acid and dihydroxy and amino sulfate and sulfonate their salts, quaternized ammonium salts, and nonionic hydrophilic species, such polyethylene oxide monols, polyols, and combinations thereof. Such hydrophilic ionic and nonionic moieties may be built into the polymer backbone and such non-limiting examples are preferred for use with the presently disclosed and claimed inventive concepts.

The PUDs may also contain further auxiliaries and additives, such as, for example, inorganic and organic pigments, dyes, leveling agents, viscosity regulators, natural and synthetic waxes, anti-foaming agents, matting agents and the like. One of ordinary skill in the art, given the present specification and teachings, would be capable of appreciating and implementing the use of such auxiliary and additive compounds with the PUDs of the presently disclosed and claimed inventive concept(s).

Processes for making dispersions are well known in the art. The dispersions can be done by a batch process or by a continuous process. In one embodiment of a batch process, the dispersion is performed by an inverse phase process wherein a small amount of water, including a small amount of anionic surfactant, is first added to a continuous prepolymer phase and mixed and then more water is added with mixing until the phase inverts. The resulting dispersion has a particle size sufficient to make the dispersion stable. Additionally, the PUD containing acetone may be directly dispersed in water. In one such embodiment, the prepolymer containing acetone is directly dispersed into water by use of either an internal or external surfactant.

Dispersion of the prepolymer in an aqueous solvent to produce the exemplary PUDs of the presently disclosed and claimed inventive concept(s) were generally carried out in resin kettles using a variety of stirring blades (e.g., crescent shaped Teflon stirring blades, Cowles stirring blades, etc.). Direct observations indicate that a commercially feasible and stable PUD formulation does not require the aggressive shearing force obtainable through use of the Cowles blade although it is contemplated for use in the methods of the presently disclosed and claimed inventive concept(s). Examples of bench scale and pilot plant scale reactions to produce PUDs of the presently disclosed and claimed inventive concept(s) follow herein below.

C. Examples of PUDs Made from dfPET

As set forth in Tables X, Y and Z, PUDs made from dfPET (representing the compounds set forth in Tables A, B, A1, A2, and combinations thereof) and isocyanates have been synthesized and characterized. The PUDs of Tables X, Y, and Z, were produced according to ten (10) different processes which share similar characteristics, steps, and/or reactive compounds and/or conditions. Each of these ten different processes are outlined hereinbelow in detailed and are denoted as "Procedure X"—wherein the "X" stands for the letters A through J. Each of these procedures are described with particularity hereinafter and each PUD in Tables X, Y, and Z are cross-referenced to these procedures. One of ordinary skill in the art would appreciate multiple and varied changes which can be made to these processes and all such changes or variations are considered to be encompassed within the scope of the presently disclosed and claimed inventive concept(s). Additionally, one of ordinary skill in the art given the present disclosure, would be capable of making the PUDs of Tables X, Y, and Z and would also appreciate that such PUDs are merely examples and should not be construed as being limiting with respect to the full breadth and scope of PUDs that can be made according to the presently disclosed and claimed inventive concept(s).

All percentages are indicative of weight percent unless otherwise noted. All chemical reactants were obtained from Sigma-Aldrich unless otherwise noted. As used below, the phrase "the NCO value is within a desirable range" means that based on the calculated value of NCO, the reaction has progressed substantially to completion—i.e., the amount of NCO remaining is substantially equivalent to the molar excess of NCO added to the reaction as compared to dfPET. Lesser amounts of NCO remaining in the solution is preferable as reducing the amount of NCO: (i) decreases the formation of carbon dioxide when the polyurethane is dispersed in the aqueous solvent, and (ii) increases the likelihood that a uniform prepolymer (i.e., the polyurethane) is prepared. The NCO value (acid value) was calculated according to equation AA. The hydroxyl value was calculated according to equation BB. And the weight percent of isocyanate was calculated according to equation CC.

$$AC = \frac{(\text{mL Titrant})(56.1)(N_{base})}{(\text{Sample wt.})(\text{Non-vol})} \quad \text{Equation AA}$$

$$OH = \frac{(\text{Blank} - \text{Sample})(56.1)(\text{Normality})}{(\text{Sample wt.})(\text{Non-vol})} + \text{Acid Number} \quad \text{Equation BB}$$

$$\frac{8.410 \cdot (\text{blank} - \text{mL of titrant})}{\text{sample weight}} \quad \text{Equation CC}$$

1. Procedure A

Creation of Polyurethane Prepolymer.

Charge isocyanate to a glass or glass lined reaction kettle equipped with condenser, a form of agitation via either a magnetic stir or overhead mixer, a heat source either by jacketing the reactor or by using a hotplate, and a $N_2$ purge. Solubilize the dfPET in acetone and co-solvent and add this mixture to the TDI under stir. Add catalyst and heat for 1 hour at reflux. Intermittently ascertain NCO values. When NCO values are within a desirable range, add dimethylol propionic acid, followed by the catalyst and heat to reflux for an additional hour. Remove an aliquot from the pot for NCO titration to determine how far the reaction has progressed. When NCO values are within a desirable range, add the triethylamine to the pot and proceed to the dispersion step.

Dispersion—

Heat deionized water to approximately 70° C. and add triethylamine to the water. Heat the polyurethane in acetone up to reflux temperature (approximately 60° C.). The Pot and content are removed from the heating mantel and heating is discontinued. Keep water/amine mixture to be agitated at a consistent rate maintaining a slight vortex without aeration. Then slowly add the hot polyurethane as a steady stream. This mixture is then vacuum stripped until all acetone is removed.

2. Procedure B

Creation of Polyurethane Prepolymer.

Charge isocyanate to a glass or glass lined reaction kettle equipped with condenser, a form of agitation via either a magnetic stir or overhead mixer, a heat source either by jacketing the reactor or using a hotplate, and a $N_2$ purge. Solubilize the dfPET in acetone and cosolvent. Add this mixture to the TDI under stir. Add catalyst and heat for 1 hour at reflux. Remove an aliquot from the pot for NCO titration to determine how far the reaction has progressed. When NCO values are within a desirable range, add dimethylol propionic acid, followed by the catalyst and heat to reflux for an additional hour. The hydroxyl functional chain extender is then solubilized in acetone and added to the pot. An additional charge of catalyst is added. Heat the pot to reflux for an additional hour and then remove an aliquot for NCO titration. If the NCO value is within a desirable range, add the triethylamine to the pot and proceed to the dispersion step.

Dispersion—

Heat deionized water to approximately 60° C. and add triethylamine to the water. Heat the polyurethane in acetone up to reflux temperature (approximately 60° C.). The pot and content are removed from the heating mantel and heating is discontinued. Keep water/amine mixture to be agitated at a consistent rate maintaining a slight vortex without aeration. Then slowly add the hot polyurethane as a steady stream. This mixture is then vacuum stripped until all acetone is removed.

3. Procedure C

Creation of Polyurethane Prepolymer.

Charge isocyanate to a glass or glass lined reaction kettle equipped with condenser, a form of agitation via either a magnetic stir or a overhead mixer, a heat source either by jacketing the reactor or using a hotplate, and a $N_2$ purge. Solubilize the dfPET in acetone and cosolvent. Add this mixture to the TDI under stir. Add catalyst and heat for 1 hour at reflux. Remove an aliquot from the pot for NCO titration to determine how far the reaction has progressed. When NCO values are within a desirable range, add dimethylol propionic acid, followed by the catalyst and heat to reflux for an additional hour. The hydroxyl functional chain extender is then solubilized in acetone and added to the pot. An additional charge of catalyst is added. Heat the pot to reflux for an additional hour and then remove an aliquot for NCO titration. If the NCO value is within a desirable range, add the triethylamine to the pot and proceed to the dispersion step.

Dispersion—

Heat deionized water to approximately 70° C. and add triethylamine to the water. Heat the polyurethane in acetone up to reflux temperature (approximately 60° C.). The Pot and content are removed from the heating mantel and heating is discontinued. Keep water/amine mixture to be agitated at a consistent rate maintaining a slight vortex without aeration. Then slowly add the hot polyurethane as a steady stream. The amine chain extender is then solubilized in water and added to the dispersion. This mixture is then vacuum stripped until all acetone is removed.

4. Procedure D

Creation of Polyurethane Prepolymer.

Charge isocyanate to a glass or glass lined reaction kettle equipped with condenser, a form of agitation via either a magnetic stir or an overhead mixer, a heat source either by jacketing the reactor or using a hotplate, and a $N_2$ purge. Solubilize the dfPET in acetone and cosolvent and add this mixture to the TDI under stir. Add catalyst and heat for 1 hour at reflux. When NCO values are within a desirable range, add dimethylol propionic acid, followed by the catalyst and heat to reflux for an additional hour. Remove an aliquot from the pot for NCO titration to determine how far the reaction has progressed. When NCO values are within a desirable range, add the triethylamine to the pot and proceed to the dispersion step.

Dispersion—

Heat deionized water to approximately 70° C. and add triethylamine to the water. Heat the polyurethane in acetone up to reflux temperature (approximately 60° C.). The Pot and content are removed from the heating mantel and heating is discontinued. Keep water/amine mixture to be agitated at a consistent rate maintaining a slight vortex without aeration. Then slowly add the hot polyurethane as a steady stream. The amine chain extender is then solubilized in water and added to the dispersion. This mixture is then vacuum stripped until all acetone is removed.

5. Procedure E

Creation of Polyurethane Prepolymer.

Charge isocyanate to a glass or glass lined reaction kettle equipped with condenser, a form of agitation via either a magnetic stir or overhead mixer, a heat source either by jacketing the reactor or using a hotplate, and a $N_2$ purge. Solubilize the dfPET in acetone and cosolvent. Add this mixture to the TDI under stir. Add catalyst and heat for 1 hour at reflux. Remove an aliquot from the pot for NCO titration to determine how far the reaction has progressed. When NCO values are within a desirable range, add dimethylol propionic acid, followed by the catalyst and heat to reflux for an additional hour. The hydroxyl functional chain extender is then solubilized in acetone and added to the pot. An additional charge of catalyst is added. Heat the pot to reflux for an additional hour and then remove an aliquot for NCO titration. If the NCO value is within a desirable range, add the second hydroxyl functional chain extender solubilized in acetone added to the pot and an additional charge of catalyst is added. Heat the pot to reflux for an additional hour and then remove an aliquot for NCO titration. When NCO values are within a desirable range, add the triethylamine to the pot and proceed to the dispersion step.

Dispersion—

Heat deionized water to approximately 70° C. and add triethylamine to the water. Heat the polyurethane in acetone up to reflux temperature (approximately 60° C.). The Pot and content are removed from the heating mantel and heating is discontinued. Keep water/amine mixture to be agitated at a consistent rate maintaining a slight vortex without aeration. Then slowly add the hot polyurethane as a steady stream. This mixture is then vacuum stripped until all acetone is removed.

6. Procedure F

Creation of Polyurethane Prepolymer.

Charge isocyanate to a glass or glass lined reaction kettle equipped with condenser, a form of agitation via either a magnetic stir or overhead mixer, a heat source either by jacketing the reactor or using a hotplate, and a $N_2$ purge. Solubilize the dfPET in acetone and cosolvent. Add this mixture to the TDI under stir. Add catalyst and heat for 1 hour at reflux. Remove an aliquot from the pot for NCO titration to determine how far the reaction has progressed. When NCO values are within a desirable range, add dimethylol propionic acid, followed by the catalyst and heat to reflux for an additional hour. The hydroxyl functional chain extender is then solubilized in acetone, added to the pot, and an additional charge of catalyst is added. Heat the pot to reflux for an additional hour and then remove an aliquot for NCO titration. If the NCO value is within a desirable range, the second hydroxyl functional chain extender (solubilized in acetone) is added to the pot and an additional charge of catalyst is added. Heat the pot to reflux for an additional hour and then remove an aliquot for NCO titration. When NCO values are within a desirable range, add the triethylamine to the pot and proceed to the dispersion step.

Dispersion—

Heat deionized water to approximately 70° C. and add triethylamine to the water. Heat the polyurethane in acetone up to reflux temperature (approximately 60° C. The Pot and content are removed from the heating mantel and heating is discontinued. Keep water/amine mixture to be agitated at a consistent rate maintaining a slight vortex without aeration. Then slowly add the hot polyurethane as a steady stream. The amine chain extender is then solubilized in water and added to the dispersion. This mixture is then vacuum stripped until all acetone is removed.

7. Procedure G

Creation of Polyurethane Prepolymer.

Charge isocyanate to a glass or a glass lined reaction kettle equipped with a condenser, a form of agitation via either a magnetic stir or an overhead mixer, a heat source either by jacketing the reactor or using a hotplate, and a $N_2$ purge. Solubilize the MET in acetone and cosolvent and add this mixture to the TDI under stir. Add catalyst and heat for 1 hour at reflux. When NCO values are within a desirable range, add n-methyldiethanol amine and heat to reflux for an additional hour. Remove an aliquot from the pot for NCO titration to determine how far the reaction has progressed. When NCO values are within a desirable range, add the propionic acid to the pot and proceed to the dispersion step.

Dispersion—

Heat deionized water to approximately 70° C. and add triethylamine to the water. Heat the polyurethane in acetone up to reflux temperature (approximately 60° C.). The Pot and content are removed from the heating mantel and heating is discontinued. Keep water/acid mixture to be agitated at a consistent rate maintaining a slight vortex without aeration. Then slowly add the hot polyurethane as a steady stream. This mixture is then vacuum stripped until all acetone is removed.

8. Procedure H

Creation of Polyurethane Prepolymer.

Charge isocyanate to a glass or a glass lined reaction kettle equipped with a condenser, a form of agitation via either a magnetic stir or an overhead mixer, a heat source either by jacketing the reactor or using a hotplate, and a $N_2$ purge. Solubilize the dfPET in acetone and cosolvent and add this mixture to the TDI under stir. Add catalyst and heat for 1 hour at reflux. The hydroxyl functional chain extender is then solubilized in acetone, added to the pot, and an additional charge of catalyst is added. Heat the pot to reflux for an additional hour and then remove an aliquot for NCO titration. When NCO values are within a desirable range, add n-methyldiethanol amine and heat to reflux for an additional hour. Remove an aliquot from the pot for NCO titration to determine how far the reaction has progressed. When NCO values are within a desirable range, add the propionic acid to the pot and proceed to the dispersion step.

Dispersion—

Heat deionized water to approximately 70° C. and add triethylamine to the water. Heat the polyurethane in acetone up to reflux temperature (approximately 60° C.). The Pot and content are removed from the heating mantel and heating is discontinued. Keep water/acid mixture to be agitated at a consistent rate maintaining a slight vortex without aeration. Then slowly add the hot polyurethane as a steady stream. This mixture is then vacuum stripped until all acetone is removed.

9. Procedure I

Creation of Polyurethane Prepolymer.

Charge isocyanate to glass or a glass lined reaction kettle equipped with a condenser, a form of agitation via either a magnetic stir or an overhead mixer, a heat source either by jacketing the reactor or using hotplate, and a $N_2$ purge. Solubilize the dfPET in acetone and cosolvent. After the dfPET is completely dissolved, add the additional polyol. Add this mixture to the TDI under stir. Add catalyst and heat for 1 hour at reflux. Remove an aliquot from the pot for NCO titration to determine if reaction is complete. When NCO values are within a desirable range, add dimethylol propionic acid, followed by the catalyst and heat to reflux for an additional hour. Remove an aliquot from the pot for NCO titration to determine if reaction is complete. When NCO values are within a desirable range, add the triethylamine to the pot and proceed to the dispersion step.

Dispersion—

Heat deionized water to approximately 70° C. and add triethylamine to the water. Heat the polyurethane in acetone up to reflux temperature (approximately 60° C.). The Pot and content are removed from the heating mantel and heating is discontinued. Keep water/amine mixture to be agitated at a consistent rate maintaining a slight vortex without aeration. Then slowly add the hot polyurethane as a steady stream. This mixture is then vacuum stripped until all acetone is removed.

10. Procedure J

Creation of Polyurethane Prepolymer.

Charge TDI to a glass or glass lined reaction kettle equipped with a condenser, a form of agitation via either a magnetic stir or an overhead mixer, a heat source either by jacketing the reactor or using a hotplate, and a N2 purge. Solubilize the dfPET in acetone and cosolvent. After the dfPET is completely dissolved add the additional polyol. Add this mixture to the TDI under stir. Add catalyst and heat for 1 hour at reflux. Pull a pot sample for NCO titration to determine if reaction is complete. When NCO values are within a desirable range, add dimethylol propionic acid, followed by the catalyst and heat to reflux for an additional hour. The chain extender is then added to the pot, after an additional load of catalyst is added. Finally add triethylamine to the pot and proceed to the dispersion step.

Dispersion—

Heat deionized water to approximately 70° C. and add triethylamine to the water. Heat the polyurethane in acetone up to reflux temperature (approximately 60° C.). The Pot and content are removed from the heating mantel and heating is discontinued. Keep water/amine mixture to be agitated at a consistent rate maintaining a slight vortex without aeration. Then slowly add the hot polyurethane as a steady stream. This mixture is then vacuum stripped until all acetone is removed.

The following examples are provided to illustrate synthesis of polyurethane dispersions (i.e., PUDs) in the presently disclosed and claimed inventive concepts(s). The examples are not intended to limit the scope of the presently disclosed and claimed inventive concept(s) and should not be so interpreted.

EXAMPLES dfPET Example 1

The functionalized and digested PETs (dfPETs) used in Example 734-63 and Example 10320PRE001 were produced by the following methods: treating a ratio of 1 mole rPET (with respect to the monomer weight of PET) with 1 mole neopentyl glycol and 0.014 mole zinc acetate dihydrate at about 180-200° C. to give material with an average MW of ca. 1300; treating 1 mole rPET (with respect to the monomer weight of PET) with 2.79 mole of ethylene glycol and 0.014 mole zinc dihydrate at about 180-200° C. to give material with an average MW ca. 720. Digestions were performed on scales ranging from 20 lbs to 1150 lbs. Most PUD examples used dfPET prepared by the first method, four PUDs were prepared with material from the latter method (dfPET 732-34).

PUD Bench Scale Example 734-63

Toluene diisocyanate (67.7 g) and N-methylpyrrolidone (NMP, 20 mL) were heated to 60° C. A solution of 1% dibutyltin dilaurate in NMP (3 drops) was added. A 100° C. mixture of dfPET (60.4 g) and 2,2 bis(hydroxymethyl) propionic acid (DMPA, 13.1 g) in NMP (20 mL) was slowly added to the TDI solution. A water bath was used to maintain the temperature about 50-70° C. and an additional 10 mL NMP was used to complete the transfer. After stirring for 45 min at about 55° C., a solution of PEG-200 in acetone (50 mL) was added. An additional charge of 1% dibutyltin dilaurate in NMP (3 drops) was added. The solution was stirred for 30 min at about 55° C. Triethylamine (18 mL) was added. The reaction mixture was stirred with 400 mL deionized water and acetone was removed on a rotary evaporator under vacuum. The resulting polyurethane dispersion was a green solution with a slight amount of haze.

PUD Pilot Plant Scale Example 10320PRE001

A 100 gallon reactor was purged with nitrogen and charged 113 lbs (11.2 gallons) of toluene diisocyanate. The following were then added: 160 lbs of reagent grade acetone, 22.1 lbs. of 1-methyl-2-pyrrolidinone (NMP) and 21.7 lbs of 2,2-bis(hydroxymethyl)propionic acid, 0.0763 lbs. (0.0089 gallons; 35.02 grams) of 1% dibutyltin dilaurate in NMP, 106.8 lbs. of hot dfPET, 20 lb (3 gallons) of reagent grade acetone, and 17.1 (2 gallons) of NMP. The reaction mixture was stirred at about 55° C. for 30 minutes. A charge of 13.6 lb PEG 200 and 0.0763 lb (35.02 grams) of 1% dibutyltin dilaurate/NMP solution were added followed by a charge of 64.3 lbs (9.74 gallons) reagent grade acetone. The resulting reaction mixture was stirred at about 55° C. for 60 minutes. The reaction was sampled after 60 min and 90 min, titration showed the first sample was 1.22% NCO and the second sample was 0.9% NCO. The reaction mixture was cooled to about 40-50° C. 16.3 lbs of triethylamine were added to the reactor while maintaining at about 40-50° C. during TEA addition. The mixture was stirred for 30 minutes and then sampled for viscosity at about 40° C. (1040 cps@40° C.). 650 lbs of deionized water were charged into a dispersion vessel fitted for high shear agitation. The water was heated to about 40° C. and stirred at 121 rpm (full speed on variable speed drive). Using nitrogen pressure, the polymer reaction mixture was transferred to the dispersion vessel. After transfer was complete, the dispersion was stirred at 121 rpm for about 5 minutes. The pH was adjusted with 5 lbs TEA to pH 9.01. Added 1.0 lbs of BYK 28 (water defoamer) and stirred for 15 minutes. Acetone was removed to 0.12% by vacuum distillation at about 25-30° C. An additional charge of 115 lbs deionized water was added to obtain desired viscosity. The PUD was filtered and packaged. Total amount isolated was 871 lbs.

dfPET Example 753-65

The functionalized and digested PETs (dfPETs) used in Examples 753-67, 753-69, 753-91 and 1067-93 were produced as follows: 310 grams (1.61 moles) rPET, 110.5 grams (1.45 moles) propylene glycol and 5.0 grams zinc acetate dihydrate were charged into a 1 L 4-neck round bottom flask fitted with a mechanical stirrer, thermocouple, condenser, heating mantle under nitrogen at room temperature. The mixture was heated to about 180-200° C. and stirred until it became homogeneous. The dfPET had an average hydroxyl number of 354.

PUD Bench Scale Example 753-67 dfPET (50.0 g) from Example 753-65 and acetone (207.5 ml) were mixed in a water bath to form a dfPET/acetone solution. In a 1 L 4-neck round bottom flask fitted with a mechanical stirrer, thermocouple and condenser under $N_2$, toluene diisocyanate (72.6 g) and N-methylpyrrolidone (NMP, 75.8 g) were added. Then 137.5 ml acetone was added. 2,2 bis(hydroxymethyl)propionic acid (DMPA, 23.13 g) was added as the temperature was raised from ambient to about 30° C. A solution of 4% zirconium (IV) acetylacetonate in NMP (15 drops) was added at about 35° C. At about 40° C., the dfPET/acetone solution was added in the flask. The temperature was raised to about 55° C. 4.67 grams sample were withdrawn and the NCO was measured as about 156.8 mmoles. After stirring for about three hours at 55° C., 11.93 g glycerin and 15 drops of 4% zirconium (IV) acetylacetonate in NMP were added. The solution was stirred for about one hour at 55° C. Then, triethylamine (27.5 g) was added. The reaction mixture was stirred with 250 g deionized water and acetone was removed on a rotary evaporator under vacuum. The resulting polyurethane dispersion was a clear gold solution.

PUD Bench Scale Example 753-69 dfPET (39.0 g) from Example 753-65 and acetone (150 ml) were mixed in a water bath to form a dfPET/acetone solution. In a 1 L 4-neck round bottom flask fitted with a mechanical stirrer, thermocouple and condenser under $N_2$, toluene diisocyanate (87.06 g), N-methylpyrrolidone (NMP, 90.99 g) and acetone (100 ml) were added. 2,2 bis(hydroxymethyl)propionic acid (DMPA, 27.0 g) was added as the temperature was raised from ambient to about 50° C. At about 50° C., the dfPET/acetone solution was added in the flask. A solution of 4% zirconium (IV) acetylacetonate in NMP (8 drops) was added at about 35° C. The temperature was raised to about 55° C. After stirring for about two and a half hours at 55° C., a 2.48 gram sample was withdrawn and the NCO was measured at about 265.0 mmoles. Then, 15.3 g ethylene glycol and 18 drops of 4% zirconium (IV) acetylacetonate in NMP were added. The solution was stirred for about one hour at 55° C. Then, triethylamine (33.0 g) was added. The reaction mixture was stirred with 300 g deionized water and acetone was removed on a rotary evaporator under vacuum. The resulting polyurethane dispersion was a clear gold solution.

PUD Bench Scale Example 753-91 dfPET (83.0 g) from Example 753-65 and acetone (138 ml) were mixed in a water bath to form a dfPET/acetone solution. In a 1 L 4-neck round bottom flask fitted with a mechanical stirrer, thermocouple and condenser under $N_2$, toluene diisocyanate (80.0 g), acetone (95 ml) and N-methylpyrrolidone (NMP, 29.5 ml) were added. A solution of 4% zirconium (IV) acetylacetonate in NMP (2 drops, about 0.03 g) was added at room temperature. Then the dfPET/acetone solution was added in the flask and the temperature was increased to about 40° C. 4.59 grams sample were withdrawn and the NCO was measured as about 361.9 mmoles. Then N-methyldietheanolamine (46.0 g) was added. The temperature was increased to about 50° C. Two drops of a solution of 4% zirconium (IV) acetylacetonate in NMP at 50° C. After about one hour, the sample was withdrawn (3.76 g) and the NCO was measured as about 363.0 mmoles. Then 28.59 g propionic acid. The reaction mixture was stirred with 500 g deionized water. Acetone was removed on a rotary evaporator under vacuum. The resulting polyurethane dispersion was a clear gold solution.

PUD Bench Scale Example 1067-93 dfPET (83.03 g) from dfPET Example 753-65, acetone (102.06 g) and N-methylpyrrolidone (NMP, 31.29 g) were mixed at room temperature. In a 500 ml 1-neck round bottom flask equipped with a magnetic stirrer, hot plate and condenser, toluene diisocyanate (80.04 g) and the above dfPET/aetone/NMP mixture were added under nitrogen at room temperature. The temperature was raised to about 50° C.; two drops of K-KAT®XC-9213 (zirconium chelate catalyst, King Industries Inc.) were added. The mixture was heated to about 50° C. for about one hour at reflux. A pot sample was withdrawn for NCO titration to determine whether the reaction was complete. The NCO value was measured less than 395.8 mmoles and then 46.06 grams NMDEA was added. The mixture was heated to reflux for about one hour. A pot sample was withdrawn for NCO titration and the NCO value was less than 376.0 mmoles. 33.76 grams propionic acid was added. 249 grams DI water was added for dispersion. Acetone was removed on a rotary evaporator under vacuum. The average solid weight percentage in the resulting PUD was about 34.03 wt %.

dfPET Example 1067-49

The functionalized and digested PETs (dfPETs) used in Examples 1067-52 and 1067-68 were produced as follows: 193.02 grams rPET pellets, 62.37 grams propylene glycol and 2.06 grams zinc acetate dihydrate were charged into a 500 ml resin kettle with a central stirrer and condenser. The mixture was heated to about 160-180° C. and stirred until it became homogeneous.

PUD Bench Scale Example 1067-52 dfPET (79.6 g) from Example 1067-49, acetone (103.53 g), N-methylpyrrolidone (NMP, 21.01 g) and toluene diisocyanate (87.50 g) were charged in a 1 L 4-neck round bottom flask equipped with a central stirrer, heating mantle, thermocouple and condenser. The temperature was increased to about 50° C. and three drops of K-KAT®XC-9213 (zirconium chelate catalyst, King Industries Inc.) were added. The mixture was heated to about 60° C. for about one hour at reflux. A pot sample was withdrawn for NCO titration to determine whether the reaction was complete. The NCO value was less than 574.6 mmoles. 58.0 grams NMEDA was added. The mixture was heated to reflux for about two hours. 58.26 grams DBA were added. 500 grams DI water and 27.2 grams glacial acetic acid were added for dispersing the product. Acetone was removed on a rotary evaporator under vacuum. The average solid weight percentage in the resulting PUD was about 25.3 wt %.

PUD Bench Scale Example 1067-68 dfPET (20.72 g) from Example 1067-49, acetone (108.84 g), N-methylpyrrolidone (NMP, 30.35 g), toluene diisocyanate (29.14 g) and one drop of K-KAT®XC-9213 (zirconium chelate catalyst, King Industries Inc.) were added under nitrogen at room temperature in a 500 ml 1-neck round bottom flask equipped with a magnetic stirrer, hot plate and condenser. The mixture was heated to about 150° C. for about one hour at reflux. A pot sample was withdrawn for NCO titration to determine whether the reaction was complete. The NCO value was less than 260.3 mmoles, and 9.24 grams DMPA was added. Then 7.23 grams ethylene glycol was added. The mixture was heated to reflux for about one hour. A pot sample was withdrawn for NCO titration and the NCO value was less than 122.3 mmoles. 8.36 grams TEA was added. 125 grams DI water and 2.22 grams TEA were added for dispersing the product. Acetone was removed on a rotary evaporator under vacuum. The average solid weight percentage in the resulting PUD was about 34.03 wt %.

dfPET Example 753-70

The functionalized and digested PETs (dfPETs) used in Example 1067-92 was produced as follows: 1000.0 grams (5.2 moles) rPET pellets, 542.0 grams neopentyl glycol and 16.1 grams zinc acetate dihydrate were charged under nitrogen into a 5 L 4-neck round bottom flask with a mechanical stirrer, thermocouple, heating mantle and condenser. The mixture was heated to about 160-180° C. and stirred until it became homogeneous.

PUD Bench Scale Example 1067-92 dfPET (80.98 g) from Example 753-70, acetone (105.58 g) and N-methylpyrrolidone (NMP, 29.58 g) were mixed at room temperature. In a 500 ml 1-neck round bottom flask equipped with a magnetic stirrer, hot plate and condenser, toluene diisocyanate (80.01 g) and the above dfPET/acetone/NMP mixture was added at room temperature under nitrogen. The temperature was raised to about 55° C. Two drops of K-KAT®XC-9213 (zirconium chelate catalyst, King Industries Inc.) were added. The mixture was heated to about 50° C. for about one hour at reflux. A pot sample was withdrawn for NCO titration to determine whether the reaction was complete. The NCO value was less than about 384.1 mmoles, and 46.06 grams NMDEA was added. The mixture was heated to reflux for about one hour. A pot sample was withdrawn for NCO titration and the NCO value was less than 366.7 mmoles. 29.76 grams propionic acid was added. 249 grams DI water was added for dispersion. Acetone was removed on a rotary evaporator under vacuum. The average solid weight percentage in the resulting PUD was about 34.03 wt %.

dfPET Example 753-88

The functionalized and digested PETs (dfPETs) used in Examples 753-93, 1072-76, 1084-12 and 1084-41 were produced as follows: 800 grams (4.16 moles) rPET, 285.1 grams (3.75 moles) propylene glycol and 12.9 grams zinc acetate dihydrate were charged into a 5 L 4-neck round bottom flask fitted with a mechanical stirrer, thermocouple, condenser, heating mantle under nitrogen at room temperature. The mixture was heated to about 180-200° C. and stirred until it became homogenous. The resulting dfPET had an average hydroxyl number 352.6.

PUD Bench Scale Example 753-93 dfPET (83.5 g) from Example 753-88 and acetone (95 ml) were mixed in a water bath at about 35-40° C. to form a dfPET/acetone solution. In a 1 L 4-neck round bottom flask fitted with a mechanical stirrer, thermocouple and condenser under $N_2$, toluene diisocyanate (80.0 g), acetone (95 ml) and N-methylpyrrolidone (NMP, 29.5 ml) were added. A solution of 4% zirconium (IV) acetylacetonate in NMP (2 drops, about 0.03 g) was added at room temperature. Then the dfPET/acetone solution was added in the flask and the temperature was increased to about 40° C. 4.45 g sample was withdrawn and the NCO was measured as about 342.3 mmoles. Then N-methyldietheanolamine (46.0 g) was added. The temperature was increased to about 50° C. Two drops of a solution of 4% zirconium (IV) acetylacetonate in NMP at 50° C. After about one hour, 4.52 grams sample were withdrawn and the NCO was measured as about 416.5 mmoles. 28.59 g propionic acid was added. The reaction mixture was stirred with 500 g deionized water. Acetone was removed on a rotary evaporator under vacuum. The resulting PUD was a clear gold solution.

PUD Bench Scale Example 1072-76 dfPET (90.04 g) from Example 753-88, acetone (151.26 g) and N-methylpyrrolidone (NMP, 31.6 g) were mixed at room temperature. In a 500 ml 1-neck round bottom flask equipped with a magnetic stirrer, hot plate and condenser, toluene diisocyanate (80.06 g) and the above dfPET/aetone/NMP mixture were added at room temperature. Two drops of K-KAT®XC-9213 (zirconium chelate catalyst, King Industries Inc.) were added. The mixture was heated to about 180° C. for about one hour at reflux. After about one hour, a pot sample was withdrawn for NCO titration to determine whether the reaction was complete. The NCO value was less than 317.6 mmoles. Then 41.45 grams NMDEA was added. The mixture was heated to reflux for about one hour. 30.72 grams propionic acid was added. 249 grams DI water was added for dispersion. Acetone was removed on a rotary evaporator under vacuum. The average solid weight percentage in the resulting PUD was about 34.03 wt %.

PUD Bench Scale Example 1084-12 dfPET (61.33 g) from Example 753-88, acetone (123.03 g) and N-ethylpyrrolidone (NEP, 34.52 g) were mixed at room temperature. In a 500 ml 1-neck round bottom flask equipped with a magnetic stirrer, hot plate and condenser, toluene diisocyanate (59.78 g) and the above dfPET/acetone/NMP mixture were added at room temperature. At the temperature about 80° C., a sample was withdrawn and the NCO was measured as about 295.53 mmoles. Then, five drops of K-KAT®XC-9213 (zirconium chelate catalyst, King Industries Inc.) was added. The mixture was heated to about 80° C. for about one hour at reflux. Then 125.05 grams acetone and 34.0 grams NMDEA were added. 100 grams DI water was added for dispersion. Acetone was removed on a rotary evaporator under vacuum.

PUD Bench Scale Example 1084-41 dfPET (61.33 g) from Example 753-88, acetone (123.03 g) and N-ethylpyrrolidone (NEP, 34.52 g) were mixed at room temperature. In a 1000 ml resin kettle flask equipped with a magnetic stirrer, hot plate and condenser, toluene diisocyanate (59.78 g) and the above dfPET/acetone/NMP mixture were added at room temperature. Two drops (about 0.03 g) of K-KAT®XC-9213 (zirconium chelate catalyst, King Industries Inc.) were added. The mixture was heated to about 55° C. for about one hour at reflux. A pot of sample was withdrawn and the NCO was measured to be less than 446.2 mmoles. Pre-dissolved polythelene glycol (PEG-4000) in acetone was added. The mixture was held at reflux for about 30 minutes and a sample was withdrawn. The NCO was measured to be less than 360.7 mmole. Then 25.0 grams NMDEA were added and heat to reflux for another hour. 30.0 grams propionic acid was added and the reactor was cooled down to room temperature. 500 grams DI water was added for dispersion. Acetone was removed on a rotary evaporator under vacuum.

Test Methods Related to Results of PUD Synthesis as Described Above and as Outlined in Tables X, Y, and Z % Non-volatiles—Based on ASTM 1259-85. This method describes a procedure for determining the quantity of non-volatile components in the PUDs. Approximately 1 g of material was weighed into an aluminum dish. The dish was placed in a ventilated oven at 105° C. for 2 h and reweighed after cooling to ambient temperature. The % non-volatiles were calculated as:

$$\frac{\text{Net mass of dried solids}}{\text{Initial net mass of } PUD} \times 100$$

For the remainder of the testing procedures, the PUDs were diluted to 35% non-volatiles (unless the PUDs were prepared at lower concentrations). The 35% solutions were used for measuring pH, viscosity, pencil hardness, water resistance and MEK double rubs. Film properties were determined on steel plates on which 3 mil (wet thickness) films were cast.

pH measurements—The pH of the 35% solid solution was measured using a Chek-Mate pH meter calibrated at pH 7 and pH 10.

Viscosity—The viscosity of the 35% solutions was measured using a Brookfield DV-E viscometer. Spindle 62 was used for most samples, very low viscosity samples were measured with spindle 61. A spin rate of 100 rpm was used for all samples. PUDs were equilibrated in a 25° C. water bath for 1 h before measurements were recorded.

Pencil Hardness—Per ASTM D3363. This method covers a procedure for the rapid determination of film hardness of an organic coating on a substrate in terms of drawing leads or pencil leads of known hardness (see hardness scale below).

| 6B - 5B - 4B - 3B - 2B - B - HB - F - H - 2H - 3H - 4H - 5H - 6H - 7H - 8H - 9H |
|---|
| Softer                                                                 Harder |

The test was performed by coating 2 steel panels with 3 mil wet films, drying the panels (one panel was dried at ambient temperature while the other was oven dried), placing the dried coated panels on a firm horizontal surface and pushing the tip of a pencil across the surface at a 45 deg angle. The process is started with a soft lead and continued up the scale of hardness until the pencil cuts into the film. The last pencil grade which did not cut the film is reported.

Water Resistance—Ten drops of water were placed on the film, the water was covered with a piece of filter paper which was folded into a 1 inch square and the combination was covered with a watch glass. Observations were recorded at ca. 1 h, 6-7 h and 24 h.

MEK Double Rub—Per ASTM D4752. This method describes a solvent rub technique for assessing the methyl ethyl ketone (MEK) resistance of the films. The test was performed by soaking a pad of cheese cloth with MEK, placing a protected index finger into the pad while holding the excess cloth with the thumb and remaining fingers of the same hand. The index finger was held at a 45 deg angle to the film surface, pushed away from and then pulled towards the analyst. One forward and backward motion constituted a double rub. The rubs were continued and solvent replenished as needed until the surface of the test panel was exposed.

In general, the PUDs of the presently disclosed and claimed inventive concept(s) are useful in coatings for hard surfaces, particularly as wood coatings. Such PUDs may be applied by conventional methods such as painting, spraying, flow-coating, transfer-coating, roller coating, brushing, dipping spreading, curtain coating etc. The PUDs can be puddled or pooled on a substrate and then spread over the substrate using a brush or other spreading means. Spraying includes atomizing the PUD and ejecting the atomized material onto the substrate. The PUDs are preferably applied at ambient temperatures. Drying of the products obtained by the various applications of the PUDs can be carried out at room temperature or at elevated temperature.

All references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of the presently disclosed and claimed inventive concept(s) can be made without departing from its spirit and scope, as will be apparent to those skilled in the art. The specific embodiments described herein are offered by way of example only, and the presently disclosed and claimed inventive concept(s) is to be limited only by the terms of the appended claims, along with the full scope of equivalents to which such claims are entitled.

TABLE X

| Internal Ref. No. | diNCO | Solvent | % solvent | dfPET | dfPET Description |
|---|---|---|---|---|---|
| 753-95 | TDI | NMP | 8 | 753-88 | clear dfPET produced from 0.9 eq Propylene Glycol |
| 753-93 | TDI | NMP | 4 | 753-88 | clear dfPET produced from 0.9 eq Propylene Glycol |
| 753-91 | TDI | NMP | 4 | 753-65 | clear dfPET produced from 0.9 eq Propylene Glycol |
| 753-69 | TDI | NMP | 15 | 753-65 | clear dfPET produced from 0.9 eq Propylene Glycol |
| 753-67 | TDI | NMP | 15 | 753-65 | clear dfPET produced from 0.9 eq Propylene Glycol |
| 753-62 | TDI | NMP | 15 | 762-28 | |
| 753-61 | TDI | NMP | 12 | 762-28 | |
| 753-55 | TDI | none | 0 | Lymtal | dfPET prepared with 1 mol eq NG, NG melted first |
| 753-45 | TDI | NMP | 11 | 768-6 | |
| 753-30 | TDI | NMP | 7 | 749-82 | green dfPET produced from 1.0 eq neopenthyl glycol |
| 753-29 | TDI | NMP | 6 | 749-82 | green dfPET produced from 1.0 eq neopenthyl glycol |
| 753-28 | TDI | NMP | 8 | 749-82 | green dfPET produced from 1.0 eq neopenthyl glycol |
| 753-27 | TDI | NMP | 8 | 749-82 | green dfPET produced from 1.0 eq neopenthyl glycol |
| 753-26B | TDI | NMP | 5 | 749-82 | green dfPET produced from 1.0 eq neopenthyl glycol |
| 753-26A | TDI | NMP | 5 | 749-82 | green dfPET produced from 1.0 eq neopenthyl glycol |
| 753-24B | TDI | NMP | 5 | 749-82 | green dfPET produced from 1.0 eq neopenthyl glycol |
| 753-24A | TDI | NMP | 5 | 749-82 | green dfPET produced from 1.0 eq neopenthyl glycol |
| 753-21B | TDI | NMP | 5 | 749-82 | green dfPET produced from 1.0 eq neopenthyl glycol |
| 753-21A | TDI | NMP | 5 | 749-82 | green dfPET produced from 1.0 eq neopenthyl glycol |
| 753-19B | TDI | NMP | 7 | 749-82 | green dfPET produced from 1.0 eq neopenthyl glycol |
| 753-19A | TDI | NMP | 7 | 749-82 | green dfPET produced from 1.0 eq neopenthyl glycol |
| 753-17B | TDI | NMP | 6 | 749-82 | green dfPET produced from 1.0 eq neopenthyl glycol |
| 753-17A | TDI | NMP | 6 | 749-82 | green dfPET produced from 1.0 eq neopenthyl glycol |
| 751-9 | TDI | NMP | ? | 732-78 | green dfPET produced from 1.0 eq neopenthyl glycol |
| 751-8 | H12MDI | NMP | 5 | 732-78 | green dfPET produced from 1.0 eq neopenthyl glycol |
| 751-7 | TDI | NMP | 3 | 732-78 | green dfPET produced from 1.0 eq neopenthyl glycol |
| 751-6 | TDI | NMP | 3 | 732-78 | green dfPET produced from 1.0 eq neopenthyl glycol |
| 751-45 | TDI | NMP | 5 | 751-19 | dfPET prepared with 1 mol eq NG, NG melted first |
| 751-44 | TDI | NMP | 5 | 751-19 | dfPET prepared with 1 mol eq NG (aka the usual), NG melted first |
| 751-43 | TDI | NMP | 5 | 751-19 | dfPET prepared with 1 mol eq NG (aka the usual), NG melted first |
| 751-42 | TDI | NMP | 5 | 751-19 | dfPET prepared with 1 mol eq NG (aka the usual), NG melted first |
| 751-40 | TDI | NMP | 5 | 751-19 | dfPET prepared with 1 mol eq NG (aka the usual), NG melted first |
| 751-39 | TDI | NMP | 5 | 751-19 | dfPET prepared with 1 mol eq NG (aka the usual), NG melted first |
| 751-32 | TDI | NMP | 5 | 751-19 | dfPET prepared with 1 mol eq NG (aka the usual), NG melted first |
| 751-31 | TDI | NMP | 5 | 751-19 | dfPET prepared with 1 mol eq NG (aka the usual), NG melted first |
| 751-25 | TDI | NMP | 5 | 732-78 | green dfPET produced from 1.0 eq neopenthyl glycol |
| 751-24 | TDI | NMP | 5 | 732-78 | green dfPET produced from 1.0 eq neopenthyl glycol |
| 751-23 | TDI | NMP | 5 | 732-78 | green dfPET produced from 1.0 eq neopenthyl glycol |
| 751-22 | TDI | NMP | 5 | 732-78 | green dfPET produced from 1.0 eq neopenthyl glycol |
| 751-2 | H12MDI | NMP | 3 | 732-78 | green dfPET produced from 1.0 eq neopenthyl glycol |
| 751-18 | TDI | NMP | 6 | 732-78 | green dfPET produced from 1.0 eq neopenthyl glycol |
| 751-17 | TDI | NMP | 6 | 732-78 | green dfPET produced from 1.0 eq neopenthyl glycol |
| 751-16 | TDI | NMP | 6 | 732-78 | green dfPET produced from 1.0 eq neopenthyl glycol |
| 751-15 | TDI | NMP | 6 | 732-78 | green dfPET produced from 1.0 eq neopenthyl glycol |
| 751-12 | TDI | NMP | 6 | 732-78 | green dfPET produced from 1.0 eq neopenthyl glycol |
| 751-11 | TDI | NMP | 5 | 732-78 | green dfPET produced from 1.0 eq neopenthyl glycol |
| 751-1 | TDI | NMP | >10 | 732-78 | green dfPET produced from 1.0 eq neopenthyl glycol |
| 734-99 | H12MDI | NMP | 16 | 732-58 | green dfPET produced from 1.0 eq neopenthyl glycol |
| 734-97 | H12MDI | NMP | 16 | 732-58 | green dfPET produced from 1.0 eq neopenthyl glycol |
| 734-95 | TDI | NMP | 5 | 732-58 | green dfPET produced from 1.0 eq neopenthyl glycol |
| 734-94 | TDI | NMP | 5 | 732-58 | green dfPET produced from 1.0 eq neopenthyl glycol |
| 734-92 | TDI | NMP | 4 | 732-58 | green dfPET produced from 1.0 eq neopenthyl glycol |
| 734-90 | MDI | NMP | 8 | 732-58 | green dfPET produced from 1.0 eq neopenthyl glycol |
| 734-89 | 50% TDI 50% MDI | NMP | 3 | 732-58 | green dfPET produced from 1.0 eq neopenthyl glycol |
| 734-88 | TDI | NMP | 3 | 732-58 | green dfPET produced from 1.0 eq neopenthyl glycol |
| 734-87 | TDI | NMP | 15 | 732-58 | green dfPET produced from 1.0 eq neopenthyl glycol |
| 734-86 | TDI | NMP | 15 | 732-58 | green dfPET produced from 1.0 eq neopenthyl glycol |
| 734-85 | TDI | NMP | 6 | 732-58 | green dfPET produced from 1.0 eq neopenthyl glycol |
| 734-84 | TMXDI | NMP | 6 | 732-43 | clear dfPET produced from 1.0 eq neopenthyl glycol |
| 734-83 | TMXDI | NMP | 11 | 732-43 | clear dfPET produced from 1.0 eq neopenthyl glycol |
| 734-82 | TMXDI | NMP | 1 | 732-43 | clear dfPET produced from 1.0 eq neopenthyl glycol |

TABLE X-continued

| | | | | | |
|---|---|---|---|---|---|
| 734-81 | MDI | NMP | 4 | 732-43 | clear dfPET produced from 1.0 eq neopenthyl glycol |
| 734-80 | MDI | NMP | 4 | 732-34 | green dfPET produced from 2.79 eq ethylene glycol |
| 734-79 | HDI | NMP | 4 | 732-43 | clear dfPET produced from 1.0 eq neopenthyl glycol |
| 734-78 | TDI | NEP | 5 | 732-43 | clear dfPET produced from 1.0 eq neopenthyl glycol |
| 734-75 | MDI + TDI | NMP | 7 | 732-43 | clear dfPET produced from 1.0 eq neopenthyl glycol |
| 734-74 | TDI | NMP | 7 | 732-43 | clear dfPET produced from 1.0 eq neopenthyl glycol |
| 734-73 | TDI | NMP | 7 | 732-34 | green dfPET produced from 2.79 eq ethylene glycol |
| 734-72 | TDI | NMP | 7 | 732-34 | green dfPET produced from 2.79 eq ethylene glycol |
| 734-71 | TDI | NMP | 6 | 732-34 | green dfPET produced from 2.79 eq ethylene glycol |
| 734-70 | TDI | NMP | 10 | 732-38 | green dfPET produced from 0.75 eq glycerine |
| 734-66 | TDI | NMP | 7 | 732-43 | clear dfPET produced from 1.0 eq neopenthyl glycol |
| 734-64 | HDI | NMP | 19 | 732-43 | clear dfPET produced from 1.0 eq neopenthyl glycol |
| 734-63 | TDI | NMP | 5 | 732-29 | clear dfPET produced from 1.0 eq neopenthyl glycol |
| 734-61 | TDI | NMP | 8 | 733-65 | clear dfPET produced from 1.0 eq neopenthyl glycol |
| 734-60 | TDI | NMP | 8 | 732-39 | 95 g of PET and 125 g of 732-34 (in toluene) |
| 734-57 | TDI | NMP | 12 | 733-65 | clear dfPET produced from 1.0 eq neopenthyl glycol |
| 734-56 | TDI | NMP | 6 | 733-65 | clear dfPET produced from 1.0 eq neopenthyl glycol |
| 734-55 | MDI | NMP | 10 | 732-40 | clear dfPET produced from 1.0 eq neopenthyl glycol |
| 734-54 | TDI | NMP | 9 | 732-40 | clear dfPET produced from 1.0 eq neopenthyl glycol |
| 734-53 | HDI | NMP | 13 | 732-40 | clear dfPET produced from 1.0 eq neopenthyl glycol |
| 734-51 | MDI | NMP | 10 | 733-58 | clear dfPET produced from 1.0 eq neopenthyl glycol |
| 734-50 | MDI | NMP | 11 | 733-58 | clear dfPET produced from 1.0 eq neopenthyl glycol |
| 734-116 | TDI | NMP | 3 | 732-78 | green dfPET produced from 1.0 eq neopenthyl glycol |
| 734-115 | TDI | NMP | 6 | 732-78 | green dfPET produced from 1.0 eq neopenthyl glycol |
| 734-114 | TDI | NMP | 3 | 732-78 | green dfPET produced from 1.0 eq neopenthyl glycol |
| 734-108 | TDI | di(propyleneglycol) methyl ether | 2 | 732-58 | green dfPET produced from 1.0 eq neopenthyl glycol |
| 734-107 | TDI | di(propyleneglycol) methyl ether | 2 | 732-58 | green dfPET produced from 1.0 eq neopenthyl glycol |
| 734-106 | TDI | di(propyleneglycol) methyl ether | 2 | 732-58 | green dfPET produced from 1.0 eq neopenthyl glycol |
| 734-105 | TDI | NMP | 9 | 732-58 | green dfPET produced from 1.0 eq neopenthyl glycol |
| 734-104 | TDI | NMP | 3 | 732-58 | green dfPET produced from 1.0 eq neopenthyl glycol |
| 734-103 | TDI | NMP | 3 | 732-58 | green dfPET produced from 1.0 eq neopenthyl glycol |
| 734-102 | H12MDI | NMP | 9 | 732-58 | green dfPET produced from 1.0 eq neopenthyl glycol |
| 734-101 | H12MDI | NMP | 37 | 732-58 | green dfPET produced from 1.0 eq neopenthyl glycol |
| 734-100 | IPDI | NMP | 16 | 732-58 | green dfPET produced from 1.0 eq neopenthyl glycol |
| 732-97 | TDI | NMP | 4 | 732-78 | green dfPET produced from 1.0 eq neopenthyl glycol |
| 732-92 | TDI | NMP | 4 | 732-78 | green dfPET produced from 1.0 eq neopenthyl glycol |
| 732-89 | TDI | NMP | 6 | 732-78 | green dfPET produced from 1.0 eq neopenthyl glycol |
| 732-87 | 39% TDI 61% HMDI | NMP | 6 | 732-78 | green dfPET produced from 1.0 eq neopenthyl glycol |
| 732-85 | HMDI | NMP | 6 | 732-78 | green dfPET produced from 1.0 eq neopenthyl glycol |
| 732-83 | HMDI | NMP | 6 | 732-78 | green dfPET produced from 1.0 eq neopenthyl glycol |
| 732-82 | HMDI | NMP | 6 | 732-58 | green dfPET produced from 1.0 eq neopenthyl glycol |
| 732-77 | HMDI | NMP | 8 | 732-58 | green dfPET produced from 1.0 eq neopenthyl glycol |
| 732-76 | HDMI | NMP | 6 | 732-58 | green dfPET produced from 1.0 eq neopenthyl glycol |
| 732-74 | HMDI | NMP | 5 | 732-58 | green dfPET produced from 1.0 eq neopenthyl glycol |
| 732-73 | HMDI | NMP | 5 | 732-58 | green dfPET produced from 1.0 eq neopenthyl glycol |
| 732-72 | TDI | NMP | 5 | 732-58 | green dfPET produced from 1.0 eq neopenthyl glycol |
| 732-70 | 10% TDI 90% HDI (mol) | NMP | 18 | 732-58 | green dfPET produced from 1.0 eq neopenthyl glycol |
| 732-69 | TDI | NMP | 1 | 732-58 | green dfPET produced from 1.0 eq neopenthyl glycol |
| 732-68 | TDI | acetone | n/a | 732-58 | green dfPET produced from 1.0 eq neopenthyl glycol |
| 732-67 | TDI | acetone | n/a | 732-58 | green dfPET produced from 1.0 eq neopenthyl glycol |
| 732-66 | 10% HDI 90% TDI | NMP | 5 | 732-58 | green dfPET produced from 1.0 eq neopenthyl glycol |
| 732-60 | 10% HDI 90% TDI | acetone | n/a | 732-58 | green dfPET produced from 1.0 eq neopenthyl glycol |
| 732-56 | TDI | acetone | n/a | 732-43 | clear dfPET produced from 1.0 eq neopenthyl glycol |
| 732-55 | TDI | acetone | n/a | 732-43 | clear dfPET produced from 1.0 eq neopenthyl glycol |
| 732-53 | TDI | acetone | n/a | 732-43 | clear dfPET produced from 1.0 eq neopenthyl glycol |
| 732-52 | TDI | EtOAc | n/a | 732-43 | clear dfPET produced from 1.0 eq neopenthyl glycol |
| 732-51 | TDI | NEP | 5 | 732-43 | clear dfPET produced from 1.0 eq neopenthyl glycol |
| 732-50 | TDI | NMP | 6 | 732-43 | clear dfPET produced from 1.0 eq neopenthyl glycol |
| 732-49 | TDI | NMP | 8 | 732-43 | clear dfPET produced from 1.0 eq neopenthyl glycol |
| 732-48 | MDI | NEP | 8 | 732-43 | clear dfPET produced from 1.0 eq neopenthyl glycol |
| 732-47 | MDI | NMP | 8 | 732-43 | clear dfPET produced from 1.0 eq neopenthyl glycol |
| 732-45 | MDI | NMP | 7 | 732-40 | clear dfPET produced from 1.0 eq neopenthyl glycol |
| 732-42 | HDI | NMP | 5 | 733-65 | clear dfPET produced from 1.0 eq neopenthyl glycol |
| 732-41 | HDI | NMP | 4 | 732-40 | dfPET diluted with NMP at the end of the digestion |
| 732-109 | 40% TDI 60% HMDI | NMP | 6.1 | 732-102 | green dfPET produced from 1.0 eq neopenthyl glycol |
| 732-108 | TDI | NMP | 3.3 | 751-19 | dfPET prepared with 1 mol eq NG, NG melted first |
| 732-107 | 40% TDI 60% HMDI | NMP | 2.2 | 732-102 | dfPET diluted with NMP at the end of the digestion |

TABLE X-continued

| | | | | | |
|---|---|---|---|---|---|
| 732-105 | 40% TDI 60% HMDI | NMP | 6.6 | 732-102 | dfPET diluted with NMP at the end of the digestion |
| 732-100 | TDI | NMP | 4 | 732-78 | green dfPET produced from 1.0 eq neopenthyl glycol |
| 108-45 | TDI | NMP | 4 | JHE01 | clear dfPET produced from 0.9 eq Propylene Glycol |
| 1084-41 | TDI | NMP | 4 | 753-88 | clear dfPET produced from 0.9 eq Propylene Glycol |
| 1084-13 | TDI | NEP | 8 | 753-88 | clear dfPET produced from 0.9 eq Propylene Glycol |
| 1084-12 | TDI | NMP | 8 | 753-88 | clear dfPET produced from 0.9 eq Propylene Glycol |
| 1080-46 | TDI | NMP | 5 | JHE01 | clear dfPET produced from 0.9 eq Propylene Glycol |
| 1080-44 | TDI | NMP | 4 | JHE01 | clear dfPET produced from 0.9 eq Propylene Glycol |
| 1080-41 | TDI | NMP | 8 | JHE01 | clear dfPET produced from 0.9 eq Propylene Glycol |
| 1080-22 | TDI | NMP | 8 | 753-87 | clear dfPET produced from 0.9 eq Propylene Glycol |
| 1080-21 | TDI | NMP | 8 | JHE01 | clear dfPET produced from 0.9 eq Propylene Glycol |
| 1078-56 | TDI | NMP | 7 | JHE01 | clear dfPET produced from 0.9 eq Propylene Glycol |
| 1072-77 | TDI | NMP | 8 | 753-88 | clear dfPET produced from 0.9 eq Propylene Glycol |
| 1072-76 | TDI | NMP | 8 | 753-88 | clear dfPET produced from 0.9 eq Propylene Glycol |
| 1072-49 | TDI | NMP | 8 | 753-88 | clear dfPET produced from 0.9 eq Propylene Glycol |
| 1072-48 | TDI | NMP | 8 | 753-88 | clear dfPET produced from 0.9 eq Propylene Glycol |
| 1072-45 | TDI | NMP | 6 | 753-70 | clear dfPET produced from 1.0 eq NPG |
| 1072-44 | TDI | NMP | 6 | 753-70 | clear dfPET produced from 1.0 eq NPG |
| 1067-93 | TDI | NMP | 8 | 753-65 | clear dfPET produced from 0.9 eq Propylene Glycol |
| 1067-92 | TDI | NMP | 8 | 753-70 | clear dfPET prepared with 1 mol eq NG, NG melted first |
| 1067-89 | TDI | NMP | 8 | Lymtal | dfPET prepared with 1 mol eq NG, NG melted first |
| 1067-88 | TDI | NMP | 9 | Lymtal | dfPET prepared with 1 mol eq NG, NG melted first |
| 1067-85 | TDI | NMP | 8 | Lymtal | dfPET prepared with 1 mol eq NG, NG melted first |
| 1067-84 | TDI | NMP | 9 | Lymtal | dfPET prepared with 1 mol eq NG, NG melted first |
| 1067-76 | TDI | NMP | 15 | 1059-29 | clear dfPET produced from 0.8 eq Propylene Glycol |
| 1067-69 | TDI | NMP | 14 | 1067-49 | clear dfPET produced from 0.8 eq Propylene Glycol |
| 1067-68 | TDI | NMP | 15 | 1067-49 | clear dfPET produced from 0.8 eq Propylene Glycol |
| 1067-52 | TDI | NMP | 4 | 1067-49 | clear dfPET produced from 0.8 eq Propylene Glycol |
| 1067-46 | TDI | NMP | 4 | 1067-46 | clear dPEt produced from 1.0 eq Propylene Glycol |
| 1067-38 | TDI | NMP | 4 | Lymtal | dfPET prepared with 1 mol eq NG, NG melted first |
| 1059-9 | TDI | none | 0 | 733-12 | dfPET prepared with 2.77 mol eq EG |
| 1059-8 | TDI | NMP | 5 | 733-12 | dfPET prepared with 2.77 mol eq EG |
| 1059-6 | TDI | NMP | 7 | 732-43 | clear dfPET produced from 1.0 eq neopenthyl glycol |
| 1059-25 | TDI | NMP | 4 | Lymtal | dfPET prepared with 1 mol eq NG, NG melted first |
| 1059-24 | TDI | NMP | 4 | Lymtal | dfPET prepared with 1 mol eq NG, NG melted first |

| Internal Ref. No. | % dfPET | Chain Extender | Ionic Surfactant | % ionic surfactant | Lab Procedure |
|---|---|---|---|---|---|
| 753-95 | | none | n-methyldiethanolamine | 14.6 | G |
| 753-93 | 38 | none | n-methyldiethanolamine | 22 | G |
| 753-91 | 38 | none | n-methyldiethanolamine | 22 | G |
| 753-69 | 25 | ethylene glycol | dimethylolpropionic acid | 16 | B |
| 753-67 | 32 | glycerin | dimethylolpropionic acid | 14.7 | B |
| 753-62 | 23 | ethylene glycol | dimethylolpropionic acid | 16 | B |
| 753-61 | 31 | glycerin | dimethylolpropionic acid | 14.7 | B |
| 753-55 | 40 | PEG-200 | dimethylolpropionic acid | 8.1 | B |
| 753-45 | 50 | PEG-200 | dimethylolpropionic acid | 8.6 | B |
| 753-30 | 43 | n-methyldiethanolamine | n-methyldiethanolamine | 12.1 | D |
| 753-29 | 43 | 1,6-diaminohexane | dimethylolpropionic acid | 12.1 | D |
| 753-28 | 45 | none | dimethylolpropionic acid | 7.9 | A |
| 753-27 | 45 | none | dimethylolpropionic acid | 12.7 | A |
| 753-26B | 27 | PEG-200 | dimethylolpropionic acid | 9.6 | B |
| 753-26A | 27 | PEG-200 | dimethylolpropionic acid | 9.6 | B |
| 753-24B | 27 | PEG-200 | dimethylolpropionic acid | 9.6 | B |
| 753-24A | 27 | PEG-200 | dimethylolpropionic acid | 9.6 | B |
| 753-21B | 27 | PEG-200 | dimethylolpropionic acid | 9.7 | B |
| 753-21A | 27 | PEG-200 | dimethylolpropionic acid | 9.7 | B |
| 753-19B | 27 | PEG-200 | dimethylolpropionic acid | 8.9 | B |
| 753-19A | 27 | PEG-200 | dimethylolpropionic acid | 8.9 | B |
| 753-17B | 27 | PEG-200 | dimethylolpropionic acid | 9.7 | B |
| 753-17A | 27 | PEG-200 | dimethylolpropionic acid | 9.7 | B |
| 751-9 | 42 | 55% 1,4-butanediol, 45% 1,1,1-tris(hydroxymethyl)ethane | dimethylolpropionic acid | 9 | E |
| 751-8 | 35 | 1,3-diaminopropane | dimethylolpropionic acid | 7 | D |
| 751-7 | 43 | 1,4-cyclohexanedimethanol | dimethylolpropionic acid | 7.8 | B |
| 751-6 | 42 | 60% 1,4-butanediol, 40% 1,1,1-tris(hydroxymethyl)ethane | dimethylolpropionic acid | 7.9 | E |
| 751-45 | 44 | PEG-200 | dimethylolpropionic acid | 8 | B |
| 751-44 | 44 | PEG-200 | dimethylolpropionic acid | 8.3 | B |
| 751-43 | 44 | PEG-200 | dimethylolpropionic acid | 8.4 | B |
| 751-42 | 44 | PEG-200 | dimethylolpropionic acid | 7.2 | B |
| 751-40 | 44 | PEG-200 | dimethylolpropionic acid | 8.1 | B |
| 751-39 | 44 | PEG-200 | dimethylolpropionic acid | 6.8 | B |
| 751-32 | 44 | PEG-200 | dimethylolpropionic acid | 8.3 | B |
| 751-31 | 44 | PEG-200 | dimethylolpropionic acid | 8.2 | B |
| 751-25 | 44 | PEG-200 | dimethylolpropionic acid | 8.3 | B |
| 751-24 | 44 | PEG-200 | dimethylolpropionic acid | 8.1 | B |
| 751-23 | 44 | PEG-200 | dimethylolpropionic acid | 8.1 | B |

TABLE X-continued

| | | | | | |
|---|---|---|---|---|---|
| 751-22 | 44 | PEG-200 | dimethylolpropionic acid | 8.2 | B |
| 751-2 | 35 | 1,4-butanediol | dimethylolpropionic acid | 8.2 | B |
| 751-18 | 42 | 14% 1,1,1-tris(hydroxymethyl)ethane; 86% 1,4-butanediol | dimethylolpropionic acid | 8.2 | F |
| 751-17 | 42 | 11% piperazine, 89% 1,4-butanediol | dimethylolpropionic acid | 7.9 | C |
| 751-16 | 42 | 40% piperazine, 60% 1,4-butanediol | dimethylolpropionic acid | 8.1 | C |
| 751-15 | 42 | 1,4-butanediol | dimethylolpropionic acid | 8 | B |
| 751-12 | 42 | 37% 1,4-butanediol, 63% PEG-200 | dimethylolpropionic acid | 8.4 | E |
| 751-11 | 42 | 89% 1,6-hexanediol, 11% hexanediamine | dimethylolpropionic acid | 7.4 | C |
| 751-1 | 42 | 1,4-butanediol | dimethylolpropionic acid | 8.1 | B |
| 734-99 | 26 | 27% 1,3-diaminopropane, 73% PEG-1500 | dimethylolpropionic acid | 5.8 | C |
| 734-97 | 22 | 1,3-diaminopropane | dimethylolpropionic acid | 7.4 | D |
| 734-95 | 44 | PEG-200 | dimethylolpropionic acid | 8.1 | B |
| 734-94 | 44 | PEG-200 | dimethylolpropionic acid | 8.1 | B |
| 734-92 | 44 | 25% 1,6-hexanediol, 75% PEG-200 | dimethylolpropionic acid | 8.1 | E |
| 734-90 | 36 | 61% 1,6-hexanediol 39% PEG-200 (wt %) | dimethylolpropionic acid | 6.5 | E |
| 734-89 | 60 | 28% neopentyl glycol, 72% 732-58 (wt %) | dimethylolpropionic acid | 5.5 | E |
| 734-88 | 41 | 8% 1,8-diaminooctane, 92% 1,6-hexanediol (wt %) | dimethylolpropionic acid | 7.4 | C |
| 734-87 | 44 | 8.5% 1,8-diaminooctane, 33.9% 1,6-hexanediol, 57.6% PEG-200 (wt %) | dimethylolpropionic acid | 8.1 | F |
| 734-86 | 44 | 3.8% glycerin 96.1% PEG-200 (wt) | dimethylolpropionic acid | 8.4 | E |
| 734-85 | 43 | 90% PEG 200, 10% 1,3-diaminooctane (molar basis) | dimethylolpropionic acid | 8.2 | C |
| 734-84 | 30 | 1,3-diaminopropane | dimethylolpropionic acid | 7.1 | D |
| 734-83 | 14 | 1,3-diaminopropane | dimethylolpropionic acid | 5.9 | D |
| 734-82 | 19 | none | dimethylolpropionic acid | 4.4 | A |
| 734-81 | 35 | PEG-200 | dimethylolpropionic acid | 6.9 | B |
| 734-80 | 38 | 1,8-octanediamine | dimethylolpropionic acid | 6.7 | D |
| 734-79 | 38 | none | dimethylolpropionic acid | 9.2 | A |
| 734-78 | 40 | PEG-1500, EG | dimethylolpropionic acid | 6.5 | E |
| 734-75 | 46 | neopentyl glycol | dimethylolpropionic acid | 5.3 | B |
| 734-74 | 42 | none | dimethylolpropionic acid | 11 | A |
| 734-73 | 39 | 1,6-hexanediol | dimethylolpropionic acid | 8 | B |
| 734-72 | 39 | PEG-300 | dimethylolpropionic acid | 7.9 | B |
| 734-71 | 40 | PEG-200 | dimethylolpropionic acid | 9.2 | B |
| 734-70 | 43 | PEG-200 | dimethylolpropionic acid | 9 | B |
| 734-66 | 44 | tetraethylene glycol | dimethylolpropionic acid | 5.9 | B |
| 734-64 | 45 | none | dimethylolpropionic acid | 9.8 | A |
| 734-63 | 43 | PEG-200 | dimethylolpropionic acid | 8.3 | B |
| 734-61 | 43 | neopentyl glycol | dimethylolpropionic acid | 8.6 | B |
| 734-60 | 43 | 1,6-hexanediol | dimethylolpropionic acid | 8.5 | B |
| 734-57 | 51 | 1,6-hexanediol | dimethylolpropionic acid | 8.6 | B |
| 734-56 | 43 | PEG-200 | dimethylolpropionic acid | 13.2 | B |
| 734-55 | 42 | none | dimethylolpropionic acid | 10.6 | A |
| 734-54 | 50 | none | dimethylolpropionic acid | 12.5 | A |
| 734-53 | 28 | none | dimethylolpropionic acid | 11.3 | A |
| 734-51 | 42 | none | dimethylolpropionic acid | 11 | A |
| 734-50 | 44 | none | dimethylolpropionic acid | 11 | A |
| 734-116 | 46 | 1,4-butanediol | dimethylolpropionic acid | 6.6 | B |
| 734-115 | 43 | 1,4-butanediol | dimethylolpropionic acid | 6.6 | B |
| 734-114 | 43 | 1,4-butanediol | dimethylolpropionic acid | 6.8 | B |
| 734-108 | 42 | 32% PEG-1500, 65% 1,4-butanediol, 3% tris(hydroxymethyl)ethane (wt %) | dimethylolpropionic acid | 2.8 | F |
| 734-107 | 43 | 25% PEG-1500, 75% 1,4-cyclohexanedimethanol (wt %) | dimethylolpropionic acid | 7.4 | F |
| 734-106 | 43 | 35% PEG-1500, 65% piperazine (wt %) | dimethylolpropionic acid | 7.5 | C |
| 734-105 | 42 | 35% PEG-1500, 65% piperazine (wt %) | dimethylolpropionic acid | 8.1 | C |
| 734-104 | 43 | 48% PEG-1500, 52% 1,4-butanediol (wt %) | dimethylolpropionic acid | 7.7 | E |
| 734-103 | 43 | 37% PEG-1500, 14% cis-2-butene-1,4-diol, 49% butane-1,4-diol (wt %) | dimethylolpropionic acid | 7.8 | F |
| 734-102 | 54 | PEG-1500 | dimethylolpropionic acid | 2.6 | B |
| 734-101 | 44 | 28% cis-2-butene-1,4-diol, 72% PEG-1500 (wt %) | dimethylolpropionic acid | 6.1 | F |

TABLE X-continued

| | | | | | |
|---|---|---|---|---|---|
| 734-100 | 25 | 27% 1,3-diaminopropane, 73% PEG-1500 | dimethylolpropionic acid | 6.1 | C |
| 732-97 | 37 | PEG-200 | dimethylolpropionic acid | 8.2 | B |
| 732-92 | 37 | PEG-200 | dimethylolpropionic acid | 8.3 | B |
| 732-89 | 46 | 82% PEG-600; 18% ethylene diamine | dimethylolpropionic acid | 7.3 | C |
| 732-87 | 40 | 82% PEG-600; 18% ethylene diamine | dimethylolpropionic acid | 6.5 | C |
| 732-85 | 38 | 41% PEG-200, 59% ethylene diamine | dimethylolpropionic acid | 6.1 | C |
| 732-83 | 40 | 59% PEG-200, 41% ethylene diamine | dimethylolpropionic acid | 5.8 | C |
| 732-82 | 40 | 81% PEG-600, 19% ethylene diamine (wt %) | dimethylolpropionic acid | 5.7 | C |
| 732-77 | 42 | none | dimethylolpropionic acid | 6.2 | A |
| 732-76 | 42 | 31% ethylene glycol, 69% ethylene diamine (wt %) | dimethylolpropionic acid | 6 | C |
| 732-74 | 42 | 72% PEG-200, 28% 1,3-diaminopropane (wt %) | dimethylolpropionic acid | 9.8 | C |
| 732-73 | 34 | PEG-200 | dimethylolpropionic acid | 6.8 | B |
| 732-72 | 43 | PEG-200 | dimethylolpropionic acid | 8.3 | B |
| 732-70 | 44 | none | dimethylolpropionic acid | 10 | A |
| 732-69 | 51 | 12% hydrogenated castor oil, 88% neopentyl glycol | dimethylolpropionic acid | 11.5 | C |
| 732-68 | 51 | neopentyl glycol | dimethylolpropionic acid | 11.8 | B |
| 732-67 | 48 | neopentyl glycol | dimethylolpropionic acid | 4.7 | B |
| 732-66 | 43 | 90% PEG 200, 10% 1,3-diaminopropane (molar basis) | dimethylolpropionic acid | 7.8 | C |
| 732-60 | 35 | PEG-200 | dimethylolpropionic acid | 8.3 | B |
| 732-56 | 34 | none | dimethylolpropionic acid | 17.9 | A |
| 732-55 | 37 | 1,6-hexanediol | dimethylolpropionic acid | 9.6 | B |
| 732-53 | 39 | PEG-200 | dimethylolpropionic acid | 8.2 | B |
| 732-52 | 37 | PEG-200 | dimethylolpropionic acid | 8 | B |
| 732-51 | 43 | PEG-200 | dimethylolpropionic acid | 7.9 | B |
| 732-50 | 41 | PEG-200 | dimethylolpropionic acid | 3.8 | B |
| 732-49 | 44 | PEG-200 | dimethylolpropionic acid | 4.6 | B |
| 732-48 | 39 | none | dimethylolpropionic acid | 21.3 | A |
| 732-47 | 39 | none | dimethylolpropionic acid | 21.2 | A |
| 732-45 | 43 | none | dimethylolpropionic acid | 10.7 | A |
| 732-42 | 43 | none | dimethylolpropionic acid | 11 | A |
| 732-41 | 55 | none | dimethylolpropionic acid | 14.1 | B |
| 732-109 | 41 | PEG-200 | dimethylolpropionic acid | 6.4 | B |
| 732-108 | 41 | PEG-200 | dimethylolpropionic acid | 8.5 | A |
| 732-107 | 42 | 96.5% PEG-200 3.5% ethylene diamine | dimethylolpropionic acid | 6.2 | C |
| 732-105 | 43 | 59% PEG-200 41% ethylene diamine | dimethylolpropionic acid | 9.4 | C |
| 732-100 | 37 | PEG-200 | dimethylolpropionic acid | 5.7 | B |
| 108-45 | 38 | none | n-methyldiethanolamine | 17.4 | G |
| 1084-41 | 48 | PEG-4000 | n-methyldiethanolamine | 13.6 | H |
| 1084-13 | 40 | none | n-methyldiethanolamine | 16.3 | G |
| 1084-12 | 40 | none | n-methyldiethanolamine | 16.2 | G |
| 1080-46 | 40 | none | n-methyldiethanolamine | 16.8 | G |
| 1080-44 | 38 | none | n-methyldiethanolamine | 17.4 | G |
| 1080-41 | 38 | none | n-methyldiethanolamine | 17.3 | G |
| 1080-22 | 40 | none | n-methyldiethanolamine | 17.1 | G |
| 1080-21 | 40 | none | n-methyldiethanolamine | 17.1 | G |
| 1078-56 | 48 | none | n-methyldiethanolamine | 16.8 | G |
| 1072-77 | 40 | none | n-methyldiethanolamine | 17.1 | G |
| 1072-76 | 43 | none | n-methyldiethanolamine | 14.8 | G |
| 1072-49 | 40 | none | n-methyldiethanolamine | 17.1 | G |
| 1072-48 | 37 | none | n-methyldiethanolamine | 19.2 | G |
| 1072-45 | 40 | none | n-methyldiethanolamine | 16.2 | G |
| 1072-44 | 40 | none | n-methyldiethanolamine | 16.2 | G |
| 1067-93 | 40 | none | n-methyldiethanolamine | 17.1 | G |
| 1067-92 | 39 | none | n-methyldiethanolamine | 17.1 | G |
| 1067-89 | 39 | none | n-methyldiethanolamine | 17.3 | G |
| 1067-88 | 35 | 1,3 propane diol | dimethylolpropionic acid | 11 | B |
| 1067-85 | 39 | none | n-methyldiethanolamine | 17.3 | G |
| 1067-84 | 35 | 1,3 propane diol | dimethylolpropionic acid | 11 | B |
| 1067-76 | 39 | ethylene glycol | dimethylolpropionic acid | 9 | B |
| 1067-69 | 35 | ethylene glycol | dimethylolpropionic acid | 8.1 | B |
| 1067-68 | 35 | ethylene glycol | dimethylolpropionic acid | 8.7 | B |
| 1067-52 | 35 | none | n-methyldiethanolamine | 20.6 | G |
| 1067-46 | 45 | none | n-methyldiethanolamine | 13.4 | G |
| 1067-38 | 47 | none | n-methyldiethanolamine | 12 | G |
| 1059-9 | 56 | none | dimethylolpropionic acid | 8.1 | A |
| 1059-8 | 39 | none | dimethylolpropionic acid | 5.7 | A |
| 1059-6 | 58 | 732-43, 1,6-hexanediol | dimethylolpropionic acid | 12.5 | C |

TABLE X-continued

| | | | | | | |
|---|---|---|---|---|---|---|
| 1059-25 | 41 | none | | n-methyldiethanolamine | 10.5 | G |
| 1059-24 | 41 | none | | n-methyldiethanolamine | 16 | G |

TABLE Y

| Internal Ref. No. | PUD description | Hardness (105 C.) | Hardness (room temp) | % non-volatiles | pH | Viscosity (cP) | 1 hour room temp |
|---|---|---|---|---|---|---|---|
| 753-30 | clear green dispersion | not tested | not tested | 0.354 | not tested | 981 | not tested |
| 753-29 | opaque green dispersion | not tested | not tested | 0.3542 | not tested | 1790 | not tested |
| 753-28 | opaque green mixture | 3H | F | 0.3926 | 9.55 | 46.5 | hazy surface |
| 753-27 | milky green mixture | 3H | F | 0.3946 | 9.38 | 759 | hazy, sticky surface |
| 753-26A | milky green dispersion | 3H | F | 0.2582 | 9.59 | 13.6 | rust spots |
| 753-24B | viscous mixture | not tested | not tested | n/a | not tested | n/a | not tested |
| 753-24A | green liquid | 3H | F | 0.2546 | 9.44 | 74.1 | hazy, sticky surface |
| 753-21B | milky green dispersion | 4H | H | 0.3077 | 8.84 | 12.54 | hazy w/rust spots |
| 753-21A | milky green dispersion | 4H | 2H | 0.2902 | 9.13 | 9.96 | hazy, rough surface |
| 753-19B | milky dispersion | 4H | H | n/a | 8.25 | n/a | rust spots |
| 753-19A | gelled | not tested | not tested | n/a | not tested | n/a | not tested |
| 753-17B | milky white dispersion | 4H | H | 0.3375 | 8.75 | 35.7 | hazy w/rust spots |
| 753-17A | milky white dispersion | not tested | not tested | n/a | 9.3 | n/a | not tested |
| 752-26B | milky white dispersion | not tested | not tested | n/a | not tested | n/a | not tested |
| 751-9 | difficult emulsion formulation | 3H | F | 0.2475 | 8.24 | 9.36 | hazy |
| 751-8 | cracked film | 6H | HB | 0.334 | 8.85 | 1095 | no change |
| 751-7 | cloudy blue-green emulsion | 9B | 9B | 0.3255 | 9.5 | 31.8 | film dried hazy |
| 751-6 | blue-green emulsion | 9B | 9B | 0.2997 | 9.33 | 44.1 | film dried hazy |
| 751-45 | hazy blue-green emulsion | 3H | F | 0.323 | 9.31 | 40.5 | |
| 751-44 | hazy blue-green emulsion | 3H | F | 0.3838 | 8.94 | 32.7 | hazy w/rust spots |
| 751-43 | hazy blue-green emulsion | 3H | F | 0.3792 | 8.9 | 32.7 | hazy, rough surface |
| 751-42 | hazy blue-green emulsion | 3H | F | 0.3549 | 9.29 | 51.9 | hazy, rough surface |
| 751-40 | hazy blue-green emulsion | 3H | F | 0.3577 | 9.14 | 84.6 | hazy w/rust spots |
| 751-39 | no description | 3H | F | 0.3927 | 9.31 | 33.6 | hazy, sticky surface |
| 751-32 | hazy blue-green emulsion | 3H | F | 0.3267 | 9.65 | 18.78 | hazy, rough surface |
| 751-31 | hazy blue-green emulsion | 3H | F | 0.4094 | 9.81 | 31.5 | hazy w/rust spots |
| 751-25 | hazy blue-green emulsion | 3H | F | 0.4141 | 9.59 | 33.6 | hazy |
| 751-24 | hazy blue-green emulsion | 3H | F | 0.3855 | 9.81 | 36.3 | hazy |
| 751-23 | hazy blue-green emulsion | 4H | 2H | 0.3486 | 9.85 | 165.6 | hazy, rough surface |
| 751-22 | hazy blue-green emulsion | 3H | F | 0.3595 | 9.89 | 160.5 | rust spots |
| 751-2 | blue-green emulsion | 9B | 8B | 0.3292 | 9.09 | 57.6 | film dried hazy |
| 751-18 | cloudy blue-green emulsion | 3H | HB | 0.3625 | not tested | 177.3 | no change |
| 751-17 | cloudy blue-green emulsion | 2H | HB | 0.353 | not tested | 90.9 | no change |
| 751-16 | solids formed when added to water | not tested | not tested | n/a | not tested | n/a | not tested |
| 751-15 | solids formed when added to water | not tested | not tested | n/a | not tested | n/a | not tested |
| 751-12 | solids settled out of dispersion | 3H | F | 0.3594 | 8.37 | 159 | no change |
| 751-11 | difficult emulsion formulation | 3H | F | 0.344 | 8.84 | 36.6 | no change |
| 751-1 | milky green emulsion | 3H | 2H | 0.3626 | 9.35 | 47.4 | no change |
| 734-99 | blue-green emulsion | not tested | not tested | 0.3324 | not tested | 42.6 | not tested |
| 734-97 | blue-green emulsion | 3H | HB | 0.2732 | 9.72 | 169.2 | no change |
| 734-95 | hazy blue-green emulsion | 2H | HB | 0.3186 | 8.77 | not tested | hazy, blistered surface |
| 734-94 | hazy blue-green emulsion | not tested | not tested | n/a | not tested | n/a | not tested |
| 734-92 | cloudy blue emulsion | not tested | not tested | n/a | not tested | n/a | not tested |
| 734-90 | gelled | not tested | not tested | n/a | not tested | n/a | not tested |
| 734-89 | milky green emulsion | not tested | not tested | n/a | not tested | n/a | not tested |
| 734-88 | blue-green emulsion | HB | HB | 0.3999 | 9.57 | 103.2 | no change |
| 734-87 | hazy green emulsion | 4H | HB | 0.3476 | 9.6 | 105.3 | sticky film beginning to blister |
| 734-86 | gelled | not tested | not tested | n/a | not tested | n/a | not tested |
| 734-85 | hazy green emulsion | F | F | 0.3522 | 8.39 | 340 | no change |
| 734-84 | hardened to solid | not tested | not tested | n/a | not tested | n/a | not tested |
| 734-83 | milky emulsion, hard film | 3H | B | 0.2235 | 9.74 | 10.98 | no change |
| 734-82 | viscous mixture | not tested | not tested | n/a | not tested | n/a | not tested |
| 734-81 | milky blue emulsion | 2B | 6B | n/a | 9.59 | n/a | rough surface |
| 734-80 | solids | not tested | not tested | n/a | not tested | n/a | not tested |
| 734-79 | gelled | not tested | not tested | n/a | not tested | n/a | not tested |
| 734-78 | yellow, sl hazy | 2B | 2B | n/a | 9.09 | n/a | rough surface, slight rusting |
| 734-77 | milky, emulsion | 4H | 9B | 0.3409 | 7.72 | 9.66 | no change |
| 734-76 | milky, emulsion | 4H | 9B | 0.4076 | 7.92 | 8.46 | no change |
| 734-75 | no description | not tested | not tested | n/a | not tested | n/a | not tested |
| 734-74 | milky | 4H | HB | 0.2578 | 7.34 | 47.7 | hazy |
| 734-73 | milky | 4H | 3B | 0.3301 | 7.19 | 34.5 | hazy, sticky surface |
| 734-72 | milky green | 3H | 5B | 0.3294 | 7.43 | 9.24 | hazy |
| 734-71 | gelled | not tested | not tested | n/a | not tested | n/a | not tested |

TABLE Y-continued

| | | | | | | | |
|---|---|---|---|---|---|---|---|
| 734-70 | milky, solids | not tested | not tested | n/a | not tested | n/a | not tested |
| 734-66 | milky | H | HB | 0.4636 | 8.48 | 45.9 | hazy, rough surface |
| 734-64 | gelled | not tested | not tested | n/a | not tested | n/a | not tested |
| 734-63 | milky | 4H | H | 0.3874 | 8.41 | 34.5 | slight discoloration, rough surface |
| 734-61 | milky | 5H | 2B | 0.4442 | 7.85 | 34.8 | not tested |
| 734-60 | milky green | 4H | HB | 0.4181 | 9.28 | 31.8 | not tested |
| 734-57 | milky | 4H | 4B | 0.3674 | 7.58 | 38.4 | slight discoloration |
| 734-56 | yellow, sl hazy | 3H | 2B | 0.2615 | 8.05 | 14.82 | no change |
| 734-55 | milky | 4H | 2B | 0.4067 | 7.71 | 33 | no change |
| 734-54 | yellow, sl hazy | 4H | F | 0.4691 | 7.68 | 20.46 | no change |
| 734-53 | gelled | not tested | not tested | n/a | not tested | n/a | not tested |
| 734-51 | gelled | not tested | not tested | n/a | not tested | n/a | not tested |
| 734-50 | milky | 3H | F | 0.44 | 7.98 | 22.02 | not tested |
| 734-116 | milky green emulsion | 3H | HB | 0.3856 | 9.38 | 34.8 | hazy, blistered surface |
| 734-115 | milky green emulsion | H | 9B | 0.3472 | 9.58 | 32.7 | hazy, rough surface |
| 734-114 | cloudy blue-green dispersion | 2H | B | 0.3865 | 9.63 | 54.9 | hazy, blistered surface |
| 734-108 | cloudy blue-green emulsion | 3H | B | 0.3901 | 8.99 | 57.9 | no change |
| 734-107 | cloudy blue-green emulsion | 3H | flakey film | 0.3709 | 9.67 | 78.6 | hazy |
| 734-106 | hazy blue emulsion | 4H | flakey film | 0.4854 | 9.11 | 18.9 | hazy, rough surface |
| 734-105 | gelled | not tested | not tested | n/a | not tested | n/a | not tested |
| 734-104 | hazy blue-green emulsion | 3H | 2B | 0.3687 | 9.28 | 177.9 | hazy, rough surface |
| 734-103 | blue-green emulsion | 4H | 3H | 0.4011 | 9.23 | 39.9 | hazy, rough surface |
| 734-102 | gelled | not tested | not tested | n/a | not tested | n/a | not tested |
| 734-101 | gelled | not tested | not tested | n/a | not tested | n/a | not tested |
| 734-100 | milky green emulsion | not tested | not tested | 0.328 | not tested | 32.4 | not tested |
| 732-97 | cloudy green dispersion | 4H | F | 0.2902 | 9.53 | 24.3 | rust spots |
| 732-92 | cloudy green dispersion | 4H | F | 0.2756 | 9.72 | 19.98 | rust spots |
| 732-87 | cloudy green clear film | 4H | B | 0.3005 | 8.91 | 42 | no change |
| 732-85 | cloudy green clear film | 4H | B | 0.3031 | 9.42 | 99.6 | no change |
| 732-83 | clear dispersion | 4H | 2B | 0.2635 | 10.5 | 18.12 | no change |
| 732-82 | clear film | 6H | 3H | 0.3491 | 9.79 | 77.4 | no change |
| 732-77 | milky green dispersion | not tested | not tested | not tested | not tested | not tested | not tested |
| 732-76 | milky green dispersion | 3H | B | 0.2985 | 9.05 | 30 | hazy, rough surface |
| 732-74 | green dispersion, clear film | 4H | B | 0.332 | 9.23 | 30 | yellow discoloration, blistered surface |
| 732-73 | milky green dispersion | 4H | F | 0.2834 | 7.87 | 1278 | no change |
| 732-72 | hard film | F | HB | 0.3261 | 9.16 | 5082 | hazy, rough surface |
| 732-70 | gelled | not tested | not tested | n/a | not tested | n/a | not tested |
| 732-69 | gummed out | 3H | 2B | 0.3101 | 8.2 | 18 | opaque, gummy surface |
| 732-68 | milky green mixture | 2H | B | 0.3386 | 8.64 | 34.8 | hazy, sticky surface |
| 732-67 | solids settled out of dispersion | not tested | not tested | n/a | not tested | n/a | not tested |
| 732-66 | clear film | 4H | 3B | 0.2738 | 9.27 | 22.86 | no change |
| 732-60 | hard dry film | 2B | 4B | n/a | 8.22 | n/a | hazy w/rust spots |
| 732-56 | milky, emulsion | not tested | not tested | n/a | not tested | n/a | not tested |
| 732-55 | yellow, sl hazy | 2B | 9B | n/a | 8.02 | n/a | hazy w/rust spots |
| 732-53 | yellow, sl hazy | 3H | 2B | 0.2613 | 7.82 | 14.16 | hazy, rough surface |
| 732-52 | milky | 4H | 5B | 0.2631 | 7.39 | 44.7 | hazy, rough surface |
| 732-51 | yellow, sl hazy | 4H | 2B | 0.3595 | 7.82 | 91.2 | hazy |
| 732-50 | milky | not tested | not tested | n/a | not tested | n/a | not tested |
| 732-49 | milky, solids | not tested | not tested | n/a | not tested | n/a | not tested |
| 732-48 | milky | B | 5B | 0.4079 | 7.37 | 31.5 | opaque, rough surface |
| 732-47 | milky | 3B | 7B | 0.3484 | 7.67 | 31.5 | opaque, rough surface |
| 732-45 | milky | H | B | 0.3561 | 7.97 | 26.4 | rough surface |
| 732-42 | gelled | not tested | not tested | n/a | not tested | n/a | not tested |
| 732-41 | milky | sticky | sticky | 0.3784 | 8.16 | 245.1 | film glued to surface |
| 732-109 | viscous dispersion | 3H | H | not tested | 8.03 | not tested | hazy, pitted surface |
| 732-108 | green dispersion, clear film | 4H | 2H | 0.3133 | 9.31 | 129.6 | hazy, sticky surface |
| 732-107 | opaque dispersion | 6H | 3H | 0.3957 | 8.3 | 16.08 | hazy, pitted surface |
| 732-105 | viscous polymer | 3H | F | 0.1935 | 10.01 | 15.72 | rust spots |
| 732-100 | milky green dispersion | 2H | F | 0.3282 | 9.63 | 42 | hazy |
| 1059-6 | milky | 4H | B | n/a | 9.35 | n/a | no change |

| Internal Ref. No. | 5.5-6.5 hours room temp | 21.5-22.5 hours room temp | MEK double rub |
|---|---|---|---|
| 753-30 | not tested | not tested | n/a |
| 753-29 | not tested | not tested | n/a |
| 753-28 | 25% rusted | 100% rusted | 5 double rubs haziness; 8 double rubs complete dissolution |
| 753-27 | film appears disolved | film disolved, slightly rusted | 10 double rubs haziness; 15 double rubs complete dissolution |
| 753-26A | 100% rusted | 100% rusted | 5 double rubs complete dissolution |
| 753-24B | not tested | not tested | n/a |
| 753-24A | 40% rusted | 100% rusted | 10 double rubs complete dissolution |

TABLE Y-continued

| | | | |
|---|---|---|---|
| 753-21B | 80% rusted | not tested | 50 |
| 753-21A | 100% rusted | 100% rusted | 145 |
| 753-19B | 50% rusted | 100% rusted | 77 |
| 753-19A | not tested | not tested | n/a |
| 753-17B | 75% rusted | 100% rusted | 109 |
| 753-17A | not tested | not tested | n/a |
| 752-26B | not tested | not tested | n/a |
| 751-9 | hazy, blistering | hazy, blistered surface with rust | n/a |
| 751-8 | no change | tacky surface | n/a |
| 751-7 | rust spots | 100% rusted | n/a |
| 751-6 | 75% rusted | 100% rusted | n/a |
| 751-45 | hazy, with rust | 100% rusted | n/a |
| 751-44 | 50% rusted | 100% rusted | n/a |
| 751-43 | 50% rusted | 100% rusted | n/a |
| 751-42 | 75% rusted | 100% rusted | n/a |
| 751-40 | 100% rusted | 100% rusted | n/a |
| 751-39 | rust spots | 100% rusted | n/a |
| 751-32 | 50% rusted | 75% rusted | n/a |
| 751-31 | 75% rusted | 100% rusted | n/a |
| 751-25 | 75% rusted | 100% rusted | n/a |
| 751-24 | rust spots | 50% rusted | n/a |
| 751-23 | 25% rusted | 100% rusted | n/a |
| 751-22 | 75% rusted | 100% rusted | n/a |
| 751-2 | rust spots | 100% rusted | n/a |
| 751-18 | no change | rust spots | n/a |
| 751-17 | no change | no change | n/a |
| 751-16 | not tested | not tested | n/a |
| 751-15 | not tested | not tested | n/a |
| 751-12 | no change | no change | n/a |
| 751-11 | no change | no change | n/a |
| 751-1 | no change | no change | n/a |
| 734-99 | not tested | not tested | n/a |
| 734-97 | hazy, blistering | blistered surface, rust spots | n/a |
| 734-95 | blistered surface, rust spots | 50% rusted, blistered | n/a |
| 734-94 | not tested | not tested | n/a |
| 734-92 | not tested | not tested | n/a |
| 734-90 | not tested | not tested | n/a |
| 734-89 | not tested | not tested | n/a |
| 734-88 | hazy, rough surface | hazy, blistered, rough surface | n/a |
| 734-87 | Blistered surface | hazy, blistered surface with rust | n/a |
| 734-86 | not tested | not tested | n/a |
| 734-85 | hazy, rough surface | hazy, blistered, rough surface | n/a |
| 734-84 | not tested | not tested | n/a |
| 734-83 | no change | no change | n/a |
| 734-82 | not tested | not tested | n/a |
| 734-81 | rough surface, rust spots | 50% rusted | n/a |
| 734-80 | not tested | not tested | n/a |
| 734-79 | not tested | not tested | n/a |
| 734-78 | 100% rusted | 100% rusted | n/a |
| 734-77 | no change | film disolved | n/a |
| 734-76 | no change | no change | n/a |
| 734-75 | not tested | not tested | n/a |
| 734-74 | yellowing | yellowing, with rust | n/a |
| 734-73 | gummy film with rust spots | 100% rusted | n/a |
| 734-72 | hazy, sticky surface with rusting | rust spots | n/a |
| 734-71 | not tested | not tested | n/a |
| 734-70 | not tested | not tested | n/a |
| 734-66 | rust spots | 100% rusted | n/a |
| 734-64 | not tested | not tested | n/a |
| 734-63 | rough surface, yellowing | rough surface, yellowing | n/a |
| 734-61 | not tested | not tested | n/a |
| 734-60 | not tested | not tested | n/a |
| 734-57 | rust spots | 100% rusted | n/a |
| 734-56 | rust spots | 100% rusted | n/a |
| 734-55 | no change | no change | n/a |
| 734-54 | rust spots | rust spots | n/a |
| 734-53 | not tested | not tested | n/a |
| 734-51 | not tested | not tested | n/a |
| 734-50 | not tested | not tested | n/a |
| 734-116 | 50% rusted | 100% rusted | n/a |
| 734-115 | 75% rusted | 100% rusted | n/a |

TABLE Y-continued

| | | | |
|---|---|---|---|
| 734-114 | rust spots | 100% rusted | n/a |
| 734-108 | hazy, rough surface | hazy, blistered surface with rust | n/a |
| 734-107 | hazy, blistering | hazy, blistered surface with rust | n/a |
| 734-106 | hazy, blistered surface with rust | blistered surface, rust spots | n/a |
| 734-105 | not tested | not tested | n/a |
| 734-104 | hazy, blistering | 80% rusted | n/a |
| 734-103 | hazy, blistered surface with rust | 80% rusted | n/a |
| 734-102 | not tested | not tested | n/a |
| 734-101 | not tested | not tested | n/a |
| 734-100 | not tested | not tested | n/a |
| 732-97 | 50% rusted | 100% rusted | n/a |
| 732-92 | 75% rusted | 100% rusted | n/a |
| 732-87 | no change | no change | n/a |
| 732-85 | no change | no change | n/a |
| 732-83 | no change | pitted surface | n/a |
| 732-82 | blistered, rough surface | 100% rusted | n/a |
| 732-77 | not tested | not tested | n/a |
| 732-76 | hazy, rough surface | hazy, smooth surface, with rust | n/a |
| 732-74 | blistered surface, sticky film | film disolved | n/a |
| 732-73 | hazy, rough surface | blistered surface, rust spots | n/a |
| 732-72 | Blistered surface | blistered surface | n/a |
| 732-70 | not tested | not tested | n/a |
| 732-69 | paper glued to surface | filter paper glued to plate | n/a |
| 732-68 | paper glued to surface | fitter paper glued to plate | n/a |
| 732-67 | not tested | not tested | n/a |
| 732-66 | hazy, rough surface | 100% rusted | n/a |
| 732-60 | 90% rusted | 100% rusted | n/a |
| 732-56 | not tested | not tested | n/a |
| 732-55 | 100% rusted | 100% rusted | n/a |
| 732-53 | hazy, blistered, rough surface | hazy, blistered, rough surface | n/a |
| 732-52 | hazy, rough surface with rust | 100% rusted | n/a |
| 732-51 | hazy, blistered, rough surface | hazy, blistered, rough surface | n/a |
| 732-50 | not tested | not tested | n/a |
| 732-49 | not tested | not tested | n/a |
| 732-48 | rough surface, yellowing | 100% rusted | n/a |
| 732-47 | rough surface, yellowing | opaque, with rust | n/a |
| 732-45 | hazy, rough surface | hazy, rough surface | n/a |
| 732-42 | not tested | not tested | n/a |
| 732-41 | paper glued to surface | filter paper glued to plate | n/a |
| 732-109 | 50% rusted | 100% rusted | n/a |
| 732-108 | hazy, sticky surface with rusting | 100% rusted | n/a |
| 732-107 | 100% rusted | 100% rusted | n/a |
| 732-105 | 25% rusted | 100% rusted | n/a |
| 732-100 | 75% rusted | 100% rusted | n/a |
| 1059-6 | no change | tacky surface | n/a |

TABLE Z

| Internal Ref. No. | diNCO | Solvent | % solvent | dfPET | dfPET Description | % dfPET | Chain Extender | Additional Polyester | % Addt'l Polyester | Ionic Surfactant | % Ionic Surfactant | Lab Procedure |
|---|---|---|---|---|---|---|---|---|---|---|---|---|
| 1080-26 | TDI | NMP | 9 | 753-87 | clear dfPET produced from 0.9 eq Propylene Glycol | 38 | N/A | 2000 MW 1,4, butanediol adipate polyester | 19 | DMPA | 7.7 | I |
| 1080-27 | TDI | NMP | 9 | 753-87 | clear dfPET produced from 0.9 eq Propylene Glycol | 31 | ethylene glycol | 2000 MW 1,4, butanediol adipate polyester | 31 | DMPA | 8 | J |

TABLE Z-continued

| Internal Ref. No. | diNCO | Solvent | % solvent | dfPET | dfPET Description | % dfPET | Chain Extender | Additional Polyester | % Addt'l Polyester | Ionic Surfactant | % Ionic Surfactant | Lab Procedure |
|---|---|---|---|---|---|---|---|---|---|---|---|---|
| 1080-49 | TDI | NMP | 13 | 753-88 | clear dfPET produced from 0.9 eq Propylene Glycol | 38 | N/A | 2000 MW 1,4, butanediol adipate polyester | 19 | DMPA | 7.7 | I |
| 1080-93 | TDI | NMP | 4 | 753-88 | clear dfPET produced from 0.9 eq Propylene Glycol | 32 | PEG-4000 | 2000 MW 1,4, butanediol adipate polyester | 17 | DMPA | 8.7 | J |
| 1082-85 | TDI (Pertstorp) | NMP | 4 | 1082-33 | clear dfPET produced from 0.9 eq Propylene Glycol | 34 | N/A | 2000 MW 1,4, butanediol adipate polyester | 19 | DMPA | 9 | I |
| 1082-87 | TDI | NMP | 4 | 1082-33 | clear dfPET produced from 0.9 eq Propylene Glycol | 34 | N/A | 2000 MW 1,4, butanediol adipate polyester | 19 | DMPA | 9 | I |
| 1082-96 | TDI | NMP | 4 | 753-88 | clear dfPET produced from 0.9 eq Propylene Glycol | 32 | N/A | 2000 MW 1,4, butanediol adipate polyester | 18 | DMPA | 8.2 | I |
| 1088-14 | TDI | NMP | 4 | 1082-95 | clear dfPET produced from 0.9 eq Propylene Glycol | 32 | PEG-4000 | 2000 MW 1,4, butanediol adipate polyester | 18 | DMPA | 8.7 | J |
| 1088-43 | TDI | NMP | 4 | 1082-95 | clear dfPET produced from 0.9 eq Propylene Glycol | 32 | PEG-4000 | 2000 MW 1,4, butanediol adipate polyester | 18 | DMPA | 6.7 | J |
| 1088-45 | TDI | NMP | 4 | 1082-95 | clear dfPET produced from 0.9 eq Propylene Glycol | 32 | PEG-4000 | 2000 MW 1,4, butanediol adipate polyester | 18 | DMPA | 5.7 | J |
| 1088-73 | TDI | NMP | 4 | 1082-95 | clear dfPET produced from 0.9 eq Propylene Glycol | 32 | PEG-4000 | 2000 MW 1,4, butanediol adipate polyester | 17 | DMPA | 9.5 | J |
| 1088-75 | TDI | NMP | 4 | 1082-95 | clear dfPET produced from 0.9 eq Propylene Glycol | 32 | PEG-200 | 2000 MW 1,4, butanediol adipate polyester | 17 | DMPA | 8.1 | J |
| 1093-8 | TDI | NMP | 3 | 1088-88 | clear dfPET produced from 0.9 eq Propylene Glycol | 31 | PEG-4000 | 2000 MW 1,4, butanediol adipate polyester | 17 | DMPA | 10.8 | J |

What is claimed is:

1. A composition comprising an aqueous polyurethane dispersion, wherein the dispersion is a reaction product of: (a) toluene diisocyanate; (b) dimethylolpropionic acid; (c) 42 wt. %, based on the combined amounts of toluene diisocyanate, dimethylolpropionic acid, and dfPET, of a depolymerized polyethylene terephthalate (dfPET), said dfPET having a hydroxyl number of 225 mg KOH/g and comprising a reaction product of polyethylene terephthalate (PET) and one molar equivalent of neopentyl glycol per mole of PET; and (d) a chain extender selected from the group consisting of 1,4-butanediol; a mixture of 1,4-butanediol and piperazine; a mixture of 1,4-butanediol and polyethylene glycol 200; and a mixture of 1,6-hexanediol and 1,6-hexanediamine.

2. The composition of claim 1 wherein the dispersion is prepared in a solvent mixture comprising acetone and N-methyl-2-pyrrolidone.

3. The composition of claim 2 wherein the aqueous dispersion comprises, after concentration, less than 5 wt. %, based on the amount of concentrated aqueous dispersion, of the solvent mixture.

4. A coating made from the composition of claim 1.

5. A composition comprising an aqueous polyurethane dispersion, wherein the dispersion is a reaction product of: (a) tetramethylxylylene diisocyanate (TMXDI); (b) dimethylolpropionic acid; (c) 14 wt. %, based on the combined amounts of TMXDI, dimethylolpropionic acid, and dfPET, of a depolymerized polyethylene terephthalate (dfPET), said dfPET having a hydroxyl number of 373 mg KOH/g and comprising a reaction product of polyethylene terephthalate (PET) and one molar equivalent of neopentyl glycol per mole of PET, and (d) 1,3-diaminopropane.

6. The composition of claim 5 wherein the dispersion is prepared in a solvent mixture comprising acetone and N-methyl-2-pyrrolidone.

7. The composition of claim 6 wherein the aqueous dispersion comprises, after concentration, less than 5 wt. %, based on the amount of concentrated aqueous dispersion, of the solvent mixture.

8. A coating made from the composition of claim 5.

* * * * *